United States Patent
Desmond et al.

(10) Patent No.: US 11,899,726 B2
(45) Date of Patent: *Feb. 13, 2024

(54) METHOD AND APPARATUS FOR MANAGING DIGITAL FILES

(71) Applicant: MemoryWeb, LLC, Glen Ellyn, IL (US)

(72) Inventors: Christopher J. Desmond, Glenn Ellyn, IL (US); Nancy L. Desmond, Glen Ellyn, IL (US); L. Michael Taylor, Chicago, IL (US)

(73) Assignee: MemoryWeb, LLC, Glen Ellyn, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,756

(22) Filed: Dec. 5, 2022

(65) Prior Publication Data

US 2023/0123917 A1    Apr. 20, 2023

Related U.S. Application Data

(63) Continuation of application No. 17/459,933, filed on Aug. 27, 2021, which is a continuation of application
(Continued)

(51) Int. Cl.
*G06F 16/90* (2019.01)
*G06F 16/907* (2019.01)
(Continued)

(52) U.S. Cl.
CPC ............ *G06F 16/907* (2019.01); *G06F 16/51* (2019.01); *G06F 16/5866* (2019.01); *G06F 16/901* (2019.01); *G06F 3/0481* (2013.01)

(58) Field of Classification Search
CPC ... G06F 16/5866; G06F 16/907; G06F 16/901
See application file for complete search history.

(56) References Cited

U.S. PATENT DOCUMENTS 5,450,504 A    9/1995    Calia
5,666,578 A    9/1997    Oikawa
(Continued)

FOREIGN PATENT DOCUMENTS

CA    2609873 A1    10/2007
CA    2635794 A1    1/2008
(Continued)

OTHER PUBLICATIONS

Decision Denying Institution of Inter Partes Review of U.S. Pat. No. 11,163,823 B2, IPR2022-00885, issued Nov. 17, 2022, by the United States Patent and Trademark Office (8 pages).
(Continued)

*Primary Examiner* — Loc Tran
(74) *Attorney, Agent, or Firm* — Nixon Peabody LLP

(57) ABSTRACT

A computer-implemented method of associating digital tags with digital files comprises storing a plurality of digital files having embedded therein content data and metadata including tags; receiving, via a user interface device of a client device, a first tag label containing alphanumeric text created and inputted by a user of the client device; modifying, using a controller device, a selected first one of the tags of the metadata in a first of the digital files to include the first tag label; receiving, via the user interface device or another user interface device, an instruction to search for all of the digital files having at least the first tag label; responsive to receiving the instruction, automatically searching for all of the digital files having at least the first tag label; and displaying, on a video display device associated with the client device, a first indication of the first tag label.

27 Claims, 50 Drawing Sheets

Related U.S. Application Data

No. 16/536,300, filed on Aug. 8, 2019, now Pat. No. 11,163,823, which is a continuation of application No. 15/375,927, filed on Dec. 12, 2016, now Pat. No. 10,423,658, which is a continuation of application No. 14/193,426, filed on Feb. 28, 2014, now Pat. No. 9,552,376, which is a continuation-in-part of application No. 13/157,214, filed on Jun. 9, 2011, now Pat. No. 9,098,531.

(51) Int. Cl.
*G06F 16/58* (2019.01)
*G06F 16/51* (2019.01)
*G06F 16/901* (2019.01)
G06F 3/0481 (2022.01)

(56) References Cited

U.S. PATENT DOCUMENTS

| | | | |
|---|---|---|---|
| 5,694,514 A | 12/1997 | Evans | |
| 5,835,616 A | 11/1998 | Lobo | |
| 5,850,470 A | 12/1998 | Kung | |
| 5,982,912 A | 11/1999 | Fukui | |
| 6,002,401 A | 12/1999 | Baker | |
| 6,134,339 A | 10/2000 | Luo | |
| 6,215,523 B1 | 4/2001 | Anderson | |
| 6,246,779 B1 | 6/2001 | Fukui | |
| 6,259,819 B1 | 7/2001 | Andrew | |
| 6,301,370 B1 | 10/2001 | Steffens | |
| 6,373,488 B1 * | 4/2002 | Gasper | G06F 16/972 707/E17.117 |
| 6,437,797 B1 | 8/2002 | Ota | |
| 6,590,608 B2 | 7/2003 | Matsumoto | |
| 6,629,104 B1 | 9/2003 | Parulski | |
| 6,697,502 B2 | 2/2004 | Luo | |
| 6,714,215 B1 | 3/2004 | Flora | |
| 6,728,401 B1 | 4/2004 | Hardeberg | |
| 6,883,146 B2 | 4/2005 | Prabhu | |
| 6,940,545 B1 | 9/2005 | Ray | |
| 6,965,693 B1 | 11/2005 | Kondo | |
| 7,003,135 B2 | 2/2006 | Hsieh | |
| 7,190,829 B2 | 3/2007 | Zhang | |
| 7,372,976 B2 | 5/2008 | Rhoads | |
| 7,403,642 B2 | 7/2008 | Zhang | |
| 7,415,662 B2 | 8/2008 | Rothmuller | |
| 7,461,099 B1 | 12/2008 | Sharpe | |
| 7,474,317 B2 | 1/2009 | Dolph | |
| 7,475,060 B2 | 1/2009 | Toyama | |
| 7,479,949 B2 | 1/2009 | Jobs | |
| 7,480,669 B2 | 1/2009 | Lo | |
| 7,518,650 B2 | 4/2009 | Miyamoto | |
| 7,519,200 B2 | 4/2009 | Gokturk | |
| 7,522,701 B2 | 4/2009 | Jensen | |
| 7,555,725 B2 | 6/2009 | Abramson | |
| 7,587,671 B2 | 9/2009 | Saft | |
| 7,606,819 B2 | 10/2009 | Audet | |
| 7,620,496 B2 | 11/2009 | Rasmussen | |
| 7,634,662 B2 | 12/2009 | Monroe | |
| 7,646,895 B2 | 1/2010 | Haupt | |
| 7,663,671 B2 | 2/2010 | Gallagher | |
| 7,680,817 B2 | 3/2010 | Audet | |
| 7,694,236 B2 | 4/2010 | Gusmorino | |
| 7,702,185 B2 | 4/2010 | Keating | |
| 7,706,577 B1 | 4/2010 | Casillas | |
| 7,797,019 B2 | 9/2010 | Friedmann | |
| 7,804,982 B2 | 9/2010 | Howard | |
| 7,822,746 B2 | 10/2010 | Svendsen | |
| 7,840,344 B2 | 11/2010 | Sloo | |
| 7,840,892 B2 | 11/2010 | Halammi | |
| 7,860,846 B2 | 12/2010 | Takahashi | |
| 7,890,889 B2 | 2/2011 | Artman | |
| 7,916,905 B2 | 3/2011 | Yen | |
| 7,916,976 B1 | 3/2011 | Kedikian | |
| 7,945,852 B1 | 3/2011 | Pilskalns | |
| RE42,289 E | 4/2011 | Vincent | |
| 7,929,771 B2 | 4/2011 | Ko | |
| 7,948,502 B2 | 5/2011 | Stanton | |
| 7,962,467 B2 | 6/2011 | Howard | |
| 7,965,908 B2 | 6/2011 | Hayashi | |
| 7,970,240 B1 | 6/2011 | Chao | |
| 7,978,207 B1 | 7/2011 | Herf | |
| 7,978,936 B1 | 7/2011 | Casillas | |
| 7,991,283 B2 | 8/2011 | Chen | |
| 8,001,124 B2 | 8/2011 | Svendsen | |
| 8,010,508 B2 | 8/2011 | Audet | |
| 8,010,892 B2 | 8/2011 | Audet | |
| 8,013,874 B2 | 9/2011 | Reid | |
| 8,015,144 B2 | 9/2011 | Zheng | |
| 8,024,317 B2 | 9/2011 | Nair | |
| 8,032,508 B2 | 10/2011 | Martinez | |
| 8,055,675 B2 | 11/2011 | Higgins | |
| 8,060,492 B2 | 11/2011 | Nair | |
| 8,069,142 B2 | 11/2011 | Davis | |
| 8,069,404 B2 | 11/2011 | Audet | |
| 8,073,461 B2 | 12/2011 | Altman | |
| 8,078,966 B2 | 12/2011 | Audet | |
| 8,086,048 B2 | 12/2011 | Naaman | |
| 8,086,867 B2 | 12/2011 | Freeman | |
| 8,099,679 B2 | 1/2012 | Yee | |
| 8,108,778 B2 | 1/2012 | Athsani | |
| 8,116,598 B2 | 2/2012 | Filley | |
| 8,121,408 B2 | 2/2012 | Omori | |
| 8,122,024 B2 | 2/2012 | Tysowski | |
| 8,136,030 B2 | 3/2012 | Audet | |
| 8,144,232 B2 | 3/2012 | Larson | |
| 8,150,844 B2 | 4/2012 | Redstone | |
| 8,150,967 B2 | 4/2012 | King | |
| 8,151,185 B2 | 4/2012 | Audet | |
| 8,160,400 B2 | 4/2012 | Snavely | |
| 8,165,352 B1 | 4/2012 | Mohanty | |
| 8,166,016 B2 | 4/2012 | Higgins | |
| 8,166,168 B2 | 4/2012 | Hayashi | |
| 8,169,505 B2 | 5/2012 | Hoshi | |
| 8,171,388 B2 | 5/2012 | Zaltzman | |
| 8,175,340 B2 | 5/2012 | Tsuitsui | |
| 8,189,880 B2 | 5/2012 | Wen | |
| 8,230,338 B2 | 7/2012 | Dugan | |
| 8,239,784 B2 | 8/2012 | Hotelling | |
| 8,255,379 B2 | 8/2012 | Govindachetty | |
| 8,264,570 B2 | 9/2012 | Karimoto | |
| 8,271,506 B2 | 9/2012 | Martinez | |
| 8,281,027 B2 | 10/2012 | Martinez | |
| 8,285,483 B2 | 10/2012 | Amer-Yahia | |
| 8,306,982 B2 | 11/2012 | Audet | |
| 8,307,029 B2 | 11/2012 | Davis | |
| 8,315,959 B2 | 11/2012 | Zheng | |
| 8,316,306 B2 | 11/2012 | Audet | |
| 8,326,000 B2 | 12/2012 | Jung | |
| 8,332,402 B2 | 12/2012 | Forstall | |
| 8,340,695 B2 | 12/2012 | Song | |
| 8,358,811 B2 | 1/2013 | Adams | |
| 8,359,314 B2 | 1/2013 | Svendsen | |
| 8,364,611 B2 | 1/2013 | Tendjoukian | |
| 8,380,039 B2 | 2/2013 | Luo | |
| 8,386,506 B2 | 2/2013 | Martinez | |
| 8,390,702 B2 | 3/2013 | Bhatt | |
| 8,401,771 B2 | 3/2013 | Krumm | |
| 8,402,356 B2 | 3/2013 | Martinez | |
| 8,416,312 B2 | 4/2013 | Matsunaga | |
| 8,429,156 B2 | 4/2013 | Buchmueller | |
| 8,447,120 B2 | 5/2013 | Ji | |
| 8,458,115 B2 | 6/2013 | Cai | |
| 8,463,931 B2 | 6/2013 | Evans | |
| 8,484,223 B2 | 7/2013 | Ota | |
| 8,489,115 B2 | 7/2013 | Rodriguez | |
| 8,490,011 B2 | 7/2013 | Stapleton | |
| 8,493,495 B2 | 7/2013 | D'Souza | |
| 8,503,791 B2 | 8/2013 | Conwell | |
| 8,504,073 B2 | 8/2013 | Svendsen | |
| 8,520,979 B2 | 8/2013 | Conwell | |
| D689,079 S | 9/2013 | Edwards | |
| D689,080 S | 9/2013 | Edwards | |
| D689,083 S | 9/2013 | Pasceri | |

(56) References Cited

U.S. PATENT DOCUMENTS

| | | |
|---|---|---|
| D689,084 S | 9/2013 | Pasceri |
| D689,085 S | 9/2013 | Pasceri |
| 8,531,478 B2 | 9/2013 | Lee |
| 8,538,811 B2 | 9/2013 | Higgins |
| 8,538,813 B2 | 9/2013 | Kakarla |
| 8,542,294 B2 | 9/2013 | Bhatt |
| 8,543,917 B2 | 9/2013 | Ketola |
| 8,554,623 B2 | 10/2013 | Higgins |
| 8,560,390 B2 | 10/2013 | Higgins |
| 8,560,517 B2 | 10/2013 | Yang |
| 8,583,620 B2 | 11/2013 | Govindachetty |
| 8,583,668 B2 | 11/2013 | Higgins |
| 8,584,015 B2 | 11/2013 | Osten |
| 8,589,389 B2 | 11/2013 | Bisdikian |
| 8,589,486 B2 | 11/2013 | Martinez |
| 8,594,702 B2 | 11/2013 | Naaman |
| 8,595,638 B2 | 11/2013 | Belitz |
| 8,601,392 B2 | 12/2013 | Audet |
| 8,606,021 B2 | 12/2013 | Conwell |
| 8,606,493 B1 | 12/2013 | Gold |
| 8,607,155 B2 | 12/2013 | Audet |
| 8,626,699 B2 | 1/2014 | Xie |
| 8,645,826 B2 | 2/2014 | Audet |
| 8,649,572 B2 | 2/2014 | Gokturk |
| 8,649,604 B2 | 2/2014 | Steinberg |
| 8,660,358 B1 | 2/2014 | Bergboer |
| 8,671,154 B2 | 3/2014 | Davis |
| 8,676,001 B2 | 3/2014 | Brucher |
| 8,698,762 B2 | 4/2014 | Wagner |
| 8,701,039 B2 | 4/2014 | Audet |
| 8,706,406 B2 | 4/2014 | Kalaboukis |
| 8,712,192 B2 | 4/2014 | Thota |
| 8,732,149 B2 | 5/2014 | Iida |
| 8,739,050 B2 | 5/2014 | Audet |
| 8,743,411 B2 | 6/2014 | Bachman |
| 8,745,133 B2 | 6/2014 | Martinez |
| 8,750,574 B2 | 6/2014 | Ganong |
| 8,762,285 B2 | 6/2014 | Davis |
| D708,196 S | 7/2014 | Pasceri |
| D708,197 S | 7/2014 | Pasceri |
| D708,198 S | 7/2014 | Pasceri |
| 8,769,099 B2 | 7/2014 | Kalaboukis |
| 8,769,393 B1 | 7/2014 | Abhyanker |
| 8,788,937 B2 | 7/2014 | Audet |
| 8,799,371 B2 | 8/2014 | Davis |
| 8,805,165 B2 | 8/2014 | Luo |
| 8,806,365 B2 | 8/2014 | Stapleton |
| 8,810,597 B2 | 8/2014 | Akiya |
| 8,811,775 B1 | 8/2014 | Chao |
| 8,813,107 B2 | 8/2014 | Higgins |
| 8,825,472 B2 | 9/2014 | Raghuveer |
| 8,826,123 B2 | 9/2014 | Audet |
| 8,831,352 B2 | 9/2014 | Gao |
| 8,845,855 B2 | 9/2014 | Hubacek |
| 8,849,854 B2 | 9/2014 | Kakarla |
| 8,849,909 B2 | 9/2014 | Farmer |
| D715,819 S | 10/2014 | Pasceri |
| 8,880,535 B1 | 11/2014 | Agarwal |
| 8,880,568 B2 | 11/2014 | Perczynski |
| 8,890,888 B2 | 11/2014 | Lee |
| 8,892,495 B2 | 11/2014 | Hoffberg |
| 8,893,046 B2 | 11/2014 | Audet |
| 8,904,281 B2 | 12/2014 | Audet |
| 8,914,342 B2 | 12/2014 | Kalaboukis |
| 8,923,889 B2 | 12/2014 | Svendsen |
| 8,930,848 B2 | 1/2015 | Lim |
| 8,949,212 B1 | 2/2015 | Dhandapani |
| 8,954,425 B2 | 2/2015 | Xiao |
| 8,954,847 B2 | 2/2015 | Audet |
| 8,966,121 B2 | 2/2015 | Josefsberg |
| 8,966,398 B2 | 2/2015 | Wright |
| 8,972,177 B2 | 3/2015 | Zheng |
| 8,984,417 B2 | 3/2015 | Audet |
| 8,998,422 B1 | 4/2015 | Snavely |
| 9,009,177 B2 | 4/2015 | Zheng |
| 9,014,511 B2 | 4/2015 | Brucher |
| 9,015,617 B2 | 4/2015 | Stapleton |
| 9,015,633 B2 | 4/2015 | Takamura |
| 9,020,247 B2 | 4/2015 | Adam |
| 9,031,953 B2 | 5/2015 | Rathnavelu |
| 9,032,320 B2 | 5/2015 | Crawford |
| 9,047,847 B2 | 6/2015 | Hochmuth |
| 9,055,037 B2 | 6/2015 | Evans |
| 9,058,093 B2 | 6/2015 | Audet |
| 9,063,226 B2 | 6/2015 | Zheng |
| 9,076,259 B2 | 7/2015 | Hourie |
| 9,092,409 B2 | 7/2015 | Charaniya |
| 9,098,531 B2 | 8/2015 | Desmond |
| 9,098,545 B2 | 8/2015 | Abhyanker |
| 9,098,832 B1 * | 8/2015 | Scardino ............. G06Q 10/107 |
| 9,104,695 B1 | 8/2015 | Cervelli |
| 9,104,729 B2 | 8/2015 | Dong |
| 9,104,915 B2 | 8/2015 | Conwell |
| 9,110,903 B2 | 8/2015 | Martinez |
| 9,122,374 B2 | 9/2015 | Audet |
| 9,135,751 B2 | 9/2015 | Moore |
| 9,151,618 B2 | 10/2015 | Amer-Yahia |
| 9,152,849 B2 | 10/2015 | Ganong |
| 9,158,794 B2 | 10/2015 | Higgins |
| 9,160,802 B2 | 10/2015 | Svendsen |
| 9,172,666 B2 | 10/2015 | Murdock |
| D742,405 S | 11/2015 | Choi |
| 9,185,299 B2 | 11/2015 | Irimoto |
| 9,189,129 B2 | 11/2015 | Cassistat |
| 9,202,200 B2 | 12/2015 | Stibel |
| 9,218,328 B2 | 12/2015 | Stapleton |
| 9,224,172 B2 | 12/2015 | Churchill |
| 9,235,766 B2 | 1/2016 | Yi |
| 9,239,848 B2 | 1/2016 | Liu |
| 9,245,041 B2 | 1/2016 | Pilskalns |
| 9,251,643 B2 | 2/2016 | Audet |
| 9,261,376 B2 | 2/2016 | Zheng |
| D751,597 S | 3/2016 | Pasceri |
| 9,311,396 B2 | 4/2016 | Meadow |
| 9,323,855 B2 | 4/2016 | Hochmuth |
| 9,336,240 B2 | 5/2016 | Bhatt |
| 9,372,931 B2 | 6/2016 | Capt |
| 9,390,104 B2 | 7/2016 | Thomee |
| 9,405,981 B2 | 8/2016 | Li |
| 9,418,485 B2 | 8/2016 | Lindberg |
| 9,424,595 B2 | 8/2016 | Svendsen |
| 9,436,374 B2 | 9/2016 | Marr |
| 9,454,529 B2 | 9/2016 | Audet |
| 9,460,116 B2 | 10/2016 | Pilskalns |
| 9,462,054 B2 | 10/2016 | Poletto |
| 9,465,513 B2 | 10/2016 | Sims |
| 9,465,890 B1 * | 10/2016 | Wilson ................... G06F 16/29 |
| 9,471,200 B2 | 10/2016 | Dellinger |
| 9,471,834 B1 | 10/2016 | Filip |
| 9,483,500 B2 | 11/2016 | Brucher |
| 9,495,583 B2 | 11/2016 | Gilley |
| 9,501,577 B2 | 11/2016 | Zheng |
| 9,507,778 B2 | 11/2016 | Jaffe |
| 9,419,682 B2 | 12/2016 | Pujara |
| 9,535,563 B2 | 1/2017 | Hoffberg |
| 9,536,146 B2 | 1/2017 | Zheng |
| 9,552,376 B2 | 1/2017 | Desmond |
| 9,557,162 B2 | 1/2017 | Rodriguez |
| 9,576,253 B2 | 2/2017 | Zaltzman |
| 9,582,546 B2 | 2/2017 | Hartford |
| 9,593,957 B2 | 3/2017 | Zheng |
| 9,600,484 B2 | 3/2017 | Davis |
| 9,606,668 B2 | 3/2017 | Hotelling |
| 9,612,126 B2 | 4/2017 | Beletski |
| 9,626,685 B2 | 4/2017 | Martinez |
| 9,639,740 B2 | 5/2017 | Ganong |
| 9,646,025 B2 | 5/2017 | Boyns |
| 9,654,570 B2 | 5/2017 | Bisdikian |
| 9,665,597 B2 | 5/2017 | Haitani |
| 9,674,650 B2 | 6/2017 | Hartford |
| 9,677,886 B2 | 6/2017 | Didjusto |
| 9,679,456 B2 | 6/2017 | East |
| 9,680,929 B2 | 6/2017 | Tseng |
| 9,683,858 B2 | 6/2017 | Zheng |

(56) References Cited

U.S. PATENT DOCUMENTS

| | | |
|---|---|---|
| 9,691,073 B2 | 6/2017 | Tseng |
| 9,703,873 B2 | 7/2017 | Fakeih |
| 9,706,345 B2 | 7/2017 | Davis |
| 9,710,961 B2 | 7/2017 | Setlur |
| 9,715,366 B2 | 7/2017 | Bostick |
| 9,721,188 B2 | 8/2017 | Adam |
| 9,754,226 B2 | 9/2017 | Zheng |
| 9,772,745 B2 | 9/2017 | Hasenei |
| 9,787,799 B2 | 10/2017 | Grue |
| 9,805,123 B2 | 10/2017 | Nair |
| 9,811,879 B2 | 11/2017 | Miller |
| 9,836,183 B1 | 12/2017 | Love |
| 9,857,941 B2 | 1/2018 | Wagner |
| 9,858,348 B1 | 1/2018 | Higgins |
| 9,870,572 B2 | 1/2018 | Chapin |
| 9,881,179 B2 | 1/2018 | Patton |
| 9,882,994 B2 | 1/2018 | Bisdikian |
| 9,916,075 B2 | 3/2018 | Chen |
| 9,942,121 B2 | 4/2018 | Poletto |
| 10,001,917 B2 | 6/2018 | Kim |
| 10,019,850 B2 | 7/2018 | Lindberg |
| 10,037,327 B2 | 7/2018 | Thomee |
| 10,068,178 B2 | 9/2018 | van Zwol |
| 10,073,584 B2 | 9/2018 | Miura |
| 10,074,093 B2 | 9/2018 | Higgins |
| 10,083,533 B2 | 9/2018 | Bhatt |
| 10,110,541 B2 | 10/2018 | Li |
| 10,120,947 B2 | 11/2018 | Kritt |
| 10,139,989 B2 | 11/2018 | Shiroor |
| 10,140,743 B2 | 11/2018 | Hochmuth |
| 10,145,704 B2 | 12/2018 | Lanza |
| 10,147,215 B2 | 12/2018 | Lanza |
| 10,187,543 B2 | 1/2019 | Lahcanski |
| 10,223,701 B2 | 3/2019 | King |
| 10,230,803 B2 | 3/2019 | Higgins |
| 10,235,444 B2 | 3/2019 | Poletto |
| 10,242,051 B2 | 3/2019 | Shinn |
| 10,282,752 B2 | 5/2019 | Athsani |
| 10,288,433 B2 | 5/2019 | Zheng |
| 10,289,643 B2 | 5/2019 | Brucher |
| 10,303,975 B2 | 5/2019 | Adam |
| 10,311,611 B2 | 6/2019 | Stoop |
| 10,318,110 B2 | 6/2019 | Naaman |
| 10,324,973 B2 | 6/2019 | Circlaeys |
| 10,331,863 B2 | 6/2019 | Patton |
| 10,360,352 B2 | 7/2019 | Patton |
| 10,423,658 B2 | 9/2019 | Desmond |
| 10,430,452 B2 | 10/2019 | Ross |
| 10,430,495 B2 | 10/2019 | Audet |
| 10,445,346 B2 | 10/2019 | Govindachetty |
| 10,489,980 B1 | 11/2019 | Canavor |
| 10,540,668 B2 | 1/2020 | Hoertz |
| 10,599,712 B2 | 3/2020 | Friedmann |
| 10,606,449 B2 | 3/2020 | Canavor |
| 10,621,228 B2 | 4/2020 | Desmond |
| 10,628,463 B2 | 4/2020 | Purumala |
| 10,643,263 B2 | 5/2020 | Wormhoudt |
| 10,650,039 B2 | 5/2020 | Mariner |
| 10,650,475 B2 | 5/2020 | Berg |
| 10,719,658 B2 | 7/2020 | Audet |
| 11,017,020 B2 | 5/2021 | Desmond |
| 11,163,823 B2 | 11/2021 | Desmond |
| 11,170,042 B1 | 11/2021 | Desmond |
| 11,281,840 B2 | 3/2022 | Audet |
| 11,281,841 B2 | 3/2022 | Audet |
| 11,281,842 B2 | 3/2022 | Audet |
| 11,341,312 B2 | 5/2022 | Audet |
| 11,392,750 B2 | 7/2022 | Audet |
| 11,481,433 B2 | 10/2022 | Desmond |
| 11,550,987 B2 | 1/2023 | Audet |
| 2001/0030667 A1 | 10/2001 | Kelts |
| 2001/0043727 A1 | 11/2001 | Cooper |
| 2002/0019224 A1 | 2/2002 | Meyers |
| 2002/0075322 A1 | 6/2002 | Rosenzweig |
| 2002/0097894 A1 | 7/2002 | Staas |
| 2002/0112237 A1 | 8/2002 | Kelts |
| 2002/0191818 A1 | 12/2002 | Matsuo |
| 2003/0033296 A1 | 2/2003 | Rothmuller |
| 2003/0039380 A1 | 2/2003 | Sukegawa |
| 2003/0053663 A1 | 3/2003 | Chen |
| 2003/0063669 A1 | 4/2003 | Lee |
| 2003/0103652 A1 | 6/2003 | Lee |
| 2003/0122787 A1 | 7/2003 | Zimmerman |
| 2003/0133599 A1 | 7/2003 | Tian |
| 2003/0179911 A1 | 9/2003 | Ho |
| 2003/0198368 A1 | 10/2003 | Kee |
| 2003/0210808 A1 | 11/2003 | Chen |
| 2004/0004663 A1 | 1/2004 | Kahn |
| 2004/0081338 A1 | 4/2004 | Takenaka |
| 2004/0109584 A1 | 6/2004 | Lestideau |
| 2004/0125991 A1 | 7/2004 | Yokoi |
| 2004/0135797 A1 | 7/2004 | Meier |
| 2004/0190758 A1 | 9/2004 | Doi |
| 2004/0205504 A1 | 10/2004 | Phillips |
| 2004/0218894 A1 | 11/2004 | Harville |
| 2004/0225635 A1 | 11/2004 | Toyama |
| 2004/0264780 A1 | 12/2004 | Zhang |
| 2004/0264810 A1 | 12/2004 | Taugher |
| 2005/0031173 A1 | 2/2005 | Hwang |
| 2005/0060299 A1 | 3/2005 | Filley |
| 2005/0094849 A1 | 5/2005 | Sung |
| 2005/0100195 A1 | 5/2005 | Li |
| 2005/0105806 A1 | 5/2005 | Nagaoka |
| 2005/0116954 A1 | 6/2005 | Ripps |
| 2005/0117802 A1 | 6/2005 | Yonaha |
| 2005/0141766 A1 | 6/2005 | Nagahashi |
| 2005/0180627 A1 | 8/2005 | Yang |
| 2005/0183026 A1 | 8/2005 | Amano |
| 2005/0220347 A1 | 10/2005 | Enomoto |
| 2005/0246324 A1 | 11/2005 | Smaa |
| 2005/0251015 A1 | 11/2005 | Takikawa |
| 2005/0265603 A1 | 12/2005 | Porter |
| 2006/0001652 A1 | 1/2006 | Chiu |
| 2006/0021027 A1 | 1/2006 | Saito |
| 2006/0029265 A1 | 2/2006 | Kim |
| 2006/0050933 A1 | 3/2006 | Adam |
| 2006/0078201 A1 | 4/2006 | Kim |
| 2006/0080342 A1 | 4/2006 | Takaki |
| 2006/0095397 A1 | 5/2006 | Torres |
| 2006/0133672 A1 | 6/2006 | Li |
| 2006/0165380 A1* | 7/2006 | Tanaka ............ H04N 5/772 386/230 |
| 2006/0204034 A1 | 9/2006 | Steinberg |
| 2006/0206264 A1 | 9/2006 | Rasmussen |
| 2006/0222215 A1 | 10/2006 | Jung |
| 2006/0222217 A1 | 10/2006 | Kitamura |
| 2006/0224738 A1 | 10/2006 | McIntyre |
| 2006/0253771 A1 | 11/2006 | Baschy |
| 2007/0016575 A1 | 1/2007 | Hurst-Hiller |
| 2007/0030391 A1 | 2/2007 | Kim |
| 2007/0110305 A1 | 5/2007 | Corcoran |
| 2007/0110338 A1 | 5/2007 | Snavely |
| 2007/0118508 A1 | 5/2007 | Svendsen |
| 2007/0139546 A1 | 6/2007 | Baiping |
| 2007/0152984 A1 | 7/2007 | Ording |
| 2007/0198495 A1 | 8/2007 | Buron |
| 2007/0198951 A1 | 8/2007 | Frank |
| 2007/0206834 A1 | 9/2007 | Shinkai |
| 2007/0211925 A1 | 9/2007 | Aoki |
| 2007/0219968 A1 | 9/2007 | Frank |
| 2007/0239764 A1 | 10/2007 | Song |
| 2007/0256026 A1 | 11/2007 | Klassen |
| 2007/0258642 A1 | 11/2007 | Thota |
| 2007/0271297 A1 | 11/2007 | Jaffe |
| 2007/0279438 A1 | 12/2007 | Takakura |
| 2007/0282908 A1 | 12/2007 | Van Der Meulen |
| 2008/0040034 A1 | 2/2008 | Kanno |
| 2008/0051994 A1 | 2/2008 | Fisher |
| 2008/0052945 A1 | 3/2008 | Matas |
| 2008/0056580 A1 | 3/2008 | Okada |
| 2008/0058106 A1 | 3/2008 | Audet |
| 2008/0071822 A1 | 3/2008 | Audet |
| 2008/0072169 A1 | 3/2008 | Audet |
| 2008/0077597 A1 | 3/2008 | Butler |

(56) References Cited

U.S. PATENT DOCUMENTS

| | | |
|---|---|---|
| 2008/0080743 A1 | 4/2008 | Schneiderman |
| 2008/0098316 A1 | 4/2008 | Declan |
| 2008/0098320 A1 | 4/2008 | Geier |
| 2008/0122944 A1 | 5/2008 | Zhang |
| 2008/0126958 A1 | 5/2008 | Louie |
| 2008/0133526 A1 | 6/2008 | Haitani |
| 2008/0133697 A1 | 6/2008 | Stewart |
| 2008/0148175 A1 | 6/2008 | Naaman |
| 2008/0168349 A1 | 7/2008 | Lamiraux |
| 2008/0168402 A1 | 7/2008 | Blumenberg |
| 2008/0172288 A1 | 7/2008 | Pilskalns |
| 2008/0177723 A1 | 7/2008 | Abe |
| 2008/0201302 A1 | 8/2008 | Kimchi |
| 2008/0212849 A1 | 9/2008 | Gao |
| 2008/0212879 A1 | 9/2008 | Torii |
| 2008/0220750 A1 | 9/2008 | Steinberg |
| 2008/0232695 A1 | 9/2008 | Noda |
| 2008/0250398 A1 | 10/2008 | Takahashi |
| 2008/0263103 A1 | 10/2008 | McGregor |
| 2008/0276279 A1 | 11/2008 | Gossweiler |
| 2008/0292130 A1 | 11/2008 | Nafarich |
| 2008/0298766 A1 | 12/2008 | Wen |
| 2008/0306921 A1 | 12/2008 | Rothmuller |
| 2008/0307343 A1 | 12/2008 | Robert |
| 2008/0309632 A1 | 12/2008 | Westerman |
| 2008/0317379 A1 | 12/2008 | Steinberg |
| 2009/0013041 A1 | 1/2009 | Farmer |
| 2009/0019031 A1 | 1/2009 | Krovitz |
| 2009/0019085 A1 | 1/2009 | Abhyanker |
| 2009/0028393 A1 | 1/2009 | Kim |
| 2009/0049408 A1 | 2/2009 | Naaman |
| 2009/0082385 A1 | 3/2009 | Krause |
| 2009/0106705 A1 | 4/2009 | Takamura |
| 2009/0113350 A1* | 4/2009 | Hibino ............ G06F 16/41 715/853 |
| 2009/0132689 A1 | 5/2009 | Zaltzman |
| 2009/0132941 A1 | 5/2009 | Pilskalns |
| 2009/0135438 A1 | 5/2009 | Chopra |
| 2009/0160972 A1 | 6/2009 | Wang |
| 2009/0161962 A1 | 6/2009 | Gallagher |
| 2009/0185784 A1 | 7/2009 | Hiroike |
| 2009/0210793 A1 | 8/2009 | Yee |
| 2009/0216704 A1 | 8/2009 | Zheng |
| 2009/0222302 A1 | 9/2009 | Higgins |
| 2009/0254867 A1 | 10/2009 | Farouki |
| 2009/0265631 A1 | 10/2009 | Sigurbjornsson |
| 2009/0278806 A1 | 11/2009 | Duarte |
| 2009/0279794 A1 | 11/2009 | Brucher |
| 2009/0284551 A1 | 11/2009 | Stanton |
| 2009/0287693 A1 | 11/2009 | Audet |
| 2009/0288005 A1 | 11/2009 | Stapleton |
| 2009/0290812 A1 | 11/2009 | Naaman |
| 2009/0297065 A1 | 12/2009 | Matraszek |
| 2009/0307618 A1 | 12/2009 | Lawler |
| 2009/0324018 A1 | 12/2009 | Tell |
| 2009/0325602 A1 | 12/2009 | Higgins |
| 2010/0030578 A1 | 2/2010 | Siddique |
| 2010/0036818 A1 | 2/2010 | Valencia-Campo |
| 2010/0041419 A1 | 2/2010 | Svendsen |
| 2010/0046842 A1 | 2/2010 | Conwell |
| 2010/0053371 A1 | 3/2010 | Karimoto |
| 2010/0058212 A1 | 3/2010 | Belitz |
| 2010/0061631 A1 | 3/2010 | Omori |
| 2010/0064239 A1 | 3/2010 | Crawford |
| 2010/0066822 A1 | 3/2010 | Steinberg |
| 2010/0082427 A1 | 4/2010 | Burgener |
| 2010/0083173 A1 | 4/2010 | Germann |
| 2010/0088641 A1 | 4/2010 | Choi |
| 2010/0107125 A1 | 4/2010 | Ockene |
| 2010/0115407 A1 | 5/2010 | Kim |
| 2010/0125438 A1 | 5/2010 | Audet |
| 2010/0149212 A1 | 6/2010 | Fukuya |
| 2010/0153348 A1 | 6/2010 | Perczynski |
| 2010/0153386 A1 | 6/2010 | Tysowski |
| 2010/0162411 A1 | 6/2010 | Chang |
| 2010/0171763 A1 | 7/2010 | Bhatt |
| 2010/0172550 A1 | 7/2010 | Gilley |
| 2010/0172551 A1 | 7/2010 | Gilley |
| 2010/0182341 A1 | 7/2010 | Lee |
| 2010/0185509 A1 | 7/2010 | Higgins |
| 2010/0231537 A1 | 9/2010 | Pisula |
| 2010/0238191 A1 | 9/2010 | Lee |
| 2010/0241689 A1 | 9/2010 | Davis |
| 2010/0241944 A1 | 9/2010 | Athsani |
| 2010/0245614 A1 | 9/2010 | Matsunaga |
| 2010/0257178 A1 | 10/2010 | Arrouye |
| 2010/0268717 A1 | 10/2010 | Pilskalns |
| 2010/0268766 A1 | 10/2010 | Bouget |
| 2010/0272363 A1 | 10/2010 | Steinberg |
| 2010/0280913 A1 | 11/2010 | O'Sullivan |
| 2010/0283743 A1 | 11/2010 | Coddington |
| 2010/0287053 A1 | 11/2010 | Ganong |
| 2010/0293035 A1 | 11/2010 | Athsani |
| 2010/0293193 A1 | 11/2010 | Harrison |
| 2010/0293224 A1 | 11/2010 | Moriwaki |
| 2010/0302179 A1 | 12/2010 | Ahn |
| 2010/0312596 A1 | 12/2010 | Saffari |
| 2011/0040779 A1 | 2/2011 | Svendsen |
| 2011/0058087 A1 | 3/2011 | Ito |
| 2011/0063108 A1 | 3/2011 | Aonuma |
| 2011/0074811 A1 | 3/2011 | Hanson |
| 2011/0093458 A1 | 4/2011 | Zheng |
| 2011/0109769 A1 | 5/2011 | Bhatt |
| 2011/0113064 A1 | 5/2011 | Govindachetty |
| 2011/0122153 A1 | 5/2011 | Okamura |
| 2011/0145258 A1 | 6/2011 | Kankainen |
| 2011/0150340 A1 | 6/2011 | Gotoh |
| 2011/0159885 A1 | 6/2011 | Song |
| 2011/0163971 A1 | 7/2011 | Wagner |
| 2011/0188713 A1 | 8/2011 | Chin |
| 2011/0191014 A1 | 8/2011 | Feng |
| 2011/0191253 A1 | 8/2011 | Pilskalns |
| 2011/0202267 A1 | 8/2011 | Svendsen |
| 2011/0208426 A1 | 8/2011 | Zheng |
| 2011/0234613 A1 | 9/2011 | Hanson |
| 2011/0289031 A1 | 11/2011 | Zheng |
| 2011/0301832 A1 | 12/2011 | Zheng |
| 2011/0302529 A1 | 12/2011 | Yamamoto |
| 2011/0305437 A1 | 12/2011 | Sakaguchi |
| 2011/0307836 A1 | 12/2011 | Cho |
| 2011/0314016 A1 | 12/2011 | Svendsen |
| 2012/0047457 A1 | 2/2012 | Park |
| 2012/0059818 A1 | 3/2012 | Phang |
| 2012/0087548 A1 | 4/2012 | Wu |
| 2012/0096361 A1 | 4/2012 | Osten |
| 2012/0113475 A1 | 5/2012 | Sugiyama |
| 2012/0114249 A1 | 5/2012 | Conwell |
| 2012/0158755 A1 | 6/2012 | Gammill |
| 2012/0159320 A1 | 6/2012 | Audet |
| 2012/0162249 A1 | 6/2012 | Tsuda |
| 2012/0192110 A1 | 7/2012 | Wu |
| 2012/0204101 A1 | 8/2012 | Yoshida |
| 2012/0204108 A1 | 8/2012 | Audet |
| 2012/0210200 A1 | 8/2012 | Berger |
| 2012/0213497 A1 | 8/2012 | Lou |
| 2012/0218150 A1 | 8/2012 | Oyabu |
| 2012/0220311 A1 | 8/2012 | Rodriguez |
| 2012/0221687 A1 | 8/2012 | Hunter |
| 2012/0251011 A1 | 10/2012 | Gao |
| 2012/0266090 A1 | 10/2012 | Nealer |
| 2012/0278171 A1 | 11/2012 | Tang |
| 2012/0278767 A1 | 11/2012 | Stibel |
| 2012/0290619 A1 | 11/2012 | DeLise |
| 2012/0317111 A1 | 12/2012 | Desmond |
| 2012/0329441 A1 | 12/2012 | Tseng |
| 2012/0331091 A1 | 12/2012 | Tseng |
| 2013/0018881 A1 | 1/2013 | Bhatt |
| 2013/0036165 A1 | 2/2013 | Tseng |
| 2013/0063613 A1 | 3/2013 | Conwell |
| 2013/0073202 A1 | 3/2013 | Zheng |
| 2013/0101157 A1 | 4/2013 | Li |
| 2013/0138685 A1 | 5/2013 | Brucher |
| 2013/0141467 A1 | 6/2013 | Han |
| 2013/0141612 A1 | 6/2013 | Bhatt |

(56) References Cited

U.S. PATENT DOCUMENTS

| | | |
|---|---|---|
| 2013/0151597 A1 | 6/2013 | Akiya |
| 2013/0185676 A1 | 7/2013 | Cao |
| 2013/0198602 A1 | 8/2013 | Kokemohr |
| 2013/0202198 A1 | 8/2013 | Adam |
| 2013/0275536 A1 | 10/2013 | Murdock |
| 2013/0290891 A1 | 10/2013 | Audet |
| 2013/0326338 A1 | 12/2013 | Secord |
| 2013/0339440 A1 | 12/2013 | Balassanian |
| 2014/0040774 A1 | 2/2014 | Chartyoniuk |
| 2014/0059477 A1 | 2/2014 | Wong |
| 2014/0059492 A1 | 2/2014 | Hashida |
| 2014/0071160 A1 | 3/2014 | Sugiura |
| 2014/0071272 A1 | 3/2014 | Rodriguez |
| 2014/0088861 A1 | 3/2014 | Nash |
| 2014/0089811 A1 | 3/2014 | Meadow |
| 2014/0101531 A1 | 4/2014 | Capt |
| 2014/0101601 A1 | 4/2014 | Tang |
| 2014/0108405 A1 | 4/2014 | Rathnavelu |
| 2014/0112553 A1 | 4/2014 | Yamaguchi |
| 2014/0143247 A1 | 5/2014 | Rathnavelu |
| 2014/0149036 A1 | 5/2014 | Amer-Yahia |
| 2014/0161326 A1 | 6/2014 | Ganong |
| 2014/0181089 A1 | 6/2014 | Desmond |
| 2014/0188880 A1 | 7/2014 | Abhyanker |
| 2014/0193087 A1 | 7/2014 | Conwell |
| 2014/0207444 A1 | 7/2014 | Heiman |
| 2014/0225925 A1 | 8/2014 | Hayashi |
| 2014/0258850 A1 | 9/2014 | Carey |
| 2014/0282099 A1 | 9/2014 | Bronder |
| 2014/0354628 A1 | 12/2014 | Lindberg |
| 2015/0039630 A1 | 2/2015 | Thomee |
| 2015/0066919 A1 | 3/2015 | Park |
| 2015/0066941 A1 | 3/2015 | Martin |
| 2015/0070165 A1 | 3/2015 | East |
| 2015/0070397 A1 | 3/2015 | Miller |
| 2015/0116540 A1 | 4/2015 | Gilman |
| 2015/0117713 A1 | 4/2015 | Zheng |
| 2015/0131872 A1 | 5/2015 | Ganong |
| 2015/0156247 A1 | 6/2015 | Hensel |
| 2015/0186389 A1 | 7/2015 | Zheng |
| 2015/0213057 A1 | 7/2015 | Brucher |
| 2015/0213329 A1 | 7/2015 | Adam |
| 2015/0244794 A1 | 8/2015 | Poletto |
| 2015/0244833 A1 | 8/2015 | Gru |
| 2015/0358224 A1 | 12/2015 | Poletto |
| 2016/0048279 A1 | 2/2016 | Han |
| 2016/0092741 A1 | 3/2016 | Li |
| 2016/0162512 A1 | 6/2016 | Battistini |
| 2016/0247307 A1 | 8/2016 | Stoop |
| 2016/0253358 A1 | 9/2016 | Bhatt |
| 2016/0292494 A1 | 10/2016 | Ganong |
| 2016/0314187 A1 | 10/2016 | Poletto |
| 2016/0321269 A1 | 11/2016 | Thomee |
| 2016/0328444 A1 | 11/2016 | Shinn |
| 2016/0344888 A1 | 11/2016 | Lahcanski |
| 2016/0357822 A1 | 12/2016 | Woods |
| 2017/0024415 A1 | 1/2017 | Brucher |
| 2017/0046565 A1 | 2/2017 | Gilley |
| 2017/0069123 A1 | 3/2017 | Hochmuth |
| 2017/0103081 A1 | 4/2017 | Jones |
| 2017/0192645 A1 | 7/2017 | Murray |
| 2017/0357672 A1 | 12/2017 | Circlaeys |
| 2018/0181281 A1 | 6/2018 | Suki |
| 2018/0364872 A1 | 12/2018 | Miura et al. |
| 2023/0085394 A1 | 3/2023 | Audet |

FOREIGN PATENT DOCUMENTS

| | | |
|---|---|---|
| CA | 2638101 A1 | 8/2008 |
| CA | 2630428 A1 | 11/2008 |
| CA | 2631828 A1 | 11/2008 |
| CA | 2601154 A1 | 1/2009 |
| CA | 2602831 A1 | 1/2009 |
| CA | 2644327 A1 | 5/2009 |
| CA | 2657835 A1 | 9/2009 |
| CA | 2666016 A1 | 11/2009 |
| CA | 2677921 A1 | 3/2010 |
| CA | 2684446 A1 | 5/2010 |
| CA | 2765998 A1 | 8/2012 |
| CA | 2766140 A1 | 8/2012 |
| CA | 2766652 A1 | 8/2012 |
| CN | 102591922 B | 10/2015 |
| EP | 2 572 264 B1 | 2/2011 |
| EP | 1 987 683 B1 | 4/2016 |
| EP | 2466869 A3 | 2/2017 |
| EP | 2410414 B1 | 10/2019 |
| JP | 2001-160058 | 6/2001 |
| JP | 2006-323621 | 11/2006 |
| JP | 2007-323544 | 12/2007 |
| JP | 2008-165701 | 7/2008 |
| JP | 2008-217695 | 9/2008 |
| KR | 20090002656 A | 1/2009 |
| KR | 20090041750 A | 4/2009 |
| KR | 20090050420 A | 5/2009 |
| KR | 20100050221 A | 5/2010 |
| KR | 20110068587 A | 6/2011 |
| WO | WO 2006/026567 A2 | 3/2006 |
| WO | WO 2007/109890 A1 | 10/2007 |
| WO | WO 2011/070225 A1 | 6/2011 |
| WO | WO 2013/019376 A1 | 2/2013 |
| WO | WO 2013/099704 A1 | 7/2013 |

OTHER PUBLICATIONS

Decision Granting Institution of Post-Grant Review of U.S. Pat. No. 11,163,823 B2, PGR2022-00034, issued Nov. 17, 2022, by the United States Patent and Trademark Office (64 pages).

Patent Owner's Demonstrative Exhibit, filed Dec. 14, 2022, by Memory Web, LLC, before the Patent Trial and Appeal Board of the United States Patent and Trademark Office, Inter Partes Review of U.S. Pat. No. 10,621,228, IPR2021-01413 (73 pages).

Patent Owner's Opposition to Motion to Exclude Evidence, filed Dec. 1, 2022, by Memory Web, LLC, before the Patent Trial and Appeal Board of the United States Patent and Trademark Office, for Inter Partes Review of U.S. Pat. No. 10,621,228, IPR2021-01413 (9 pages).

Patent Owner's Response, filed Oct. 31, 2022, by Memory Web, LLC, before the Patent Trial and Appeal Board of the United States Patent and Trademark Office, in Inter Partes Review of U.S. Pat. No. 10,423,658, IPR2022-00221 (102 pages).

Patent Owner's Response, Exhibit 2023: Declaration of Professor Glen Reinman, Ph. D., filed Oct. 31, 2022, by Memory Web, LLC, before the Patent Trial and Appeal Board of the United States Patent and Trademark Office, in Inter Partes Review of U.S. Pat. No. 10,423,658, IPR2022-00221 (178 pages).

Patent Owner's Response, Exhibit 2024: Deposition of Philip Greenspun, Ph.D. taken via videoconference before Clifford Edwards, Certified Shorthand Reporter and Notary Public, on Oct. 21, 2022, at 9:13 a.m. EDT., filed Oct. 31, 2022, by Memory Web, LLC, before the Patent Trial and Appeal Board of the United States Patent and Trademark Office, in Inter Partes Review of U.S. Pat. No. 10,423,658, IPR2022-00221 (91 pages).

Petitioner's Authorized Sur-Sur Reply to Patent Owner's Sur-Reply, filed Nov. 4, 2022, by Unified Patents, LLC, before the Patent Trial and Appeal Board of the United States Patent and Trademark Office, for U.S. Pat. No. 10,621,228, IPR2021-01413 (11 pages).

Petitioner's Motion to Exclude, filed Nov. 22, 2022, by Unified Patents, LLC, before the Patent Trial and Appeal Board of the United States Patent and Trademark Office, for U.S. Pat. No. 10,621,228, IPR2021-01413 (9 pages).

Petitioner's Reply, Exhibit 1066: Thinking Person's Complete Guide to Mac OS X: Learn Mac OS X Snow Leopard, filed Dec. 23, 2022, by Apple Inc., before the Patent Trial and Appeal Board of the United States Patent and Trademark Office for U.S. Pat. No. 10,621,228, IPR2022-00031 (138 pages).

Petitioner's Reply, Exhibit 1067: Apress.com ordering page for Learn Mac OS X Snow Leopard, available at https://web.archive.org/web/20100201093806/http://apress.com/book/view/9781430219460, filed Dec. 23, 2022, by Apple Inc., before the

(56) References Cited

OTHER PUBLICATIONS

Patent Trial and Appeal Board of the United States Patent and Trademark Office for U.S. Pat. No. 10,621,228, IPR2022-00031 (6 pages).
Petitioner's Reply, Exhibit 1068: Mac Dev Center—Apple Developer Webpages, available at https://web.archive.org/web/20100414095727/http:/developer.apple.com/mac, filed Dec. 23, 2022, by Apple Inc., before the Patent Trial and Appeal Board of the United States Patent and Trademark Office for U.S. Pat. No. 10,621,228, IPR2022-00031 (3 pages).
Petitioner's Reply, Exhibit 1069: Mac OS X Technology Overview, available at https://web.archive.org/web/20101113134432mp_/http://developer.apple.com/library/mac/documentation/MacOSX/Conceptual/OSX_Technology_Overview/OSX_Technology_Overview.pdf filed Dec. 23, 2022, by Apple Inc., before the Patent Trial and Appeal Board of the United States Patent and Trademark Office for U.S. Pat. No. 10,621,228, IPR2022-00031 (183 pages).
Petitioner's Reply, Exhibit 1070: Bundle Programming Guide, available at https://web.archive.org/web/20100525020133/http://developer.apple.com/mac/library/documentation/corefoundation/conceptual/CFBundles/Introduction, filed Dec. 23, 2022, by Apple Inc., before the Patent Trial and Appeal Board of the United States Patent and Trademark Office for U.S. Pat. No. 10,621,228, IPR2022-00031 (42 pages).
Petitioner's Reply, Exhibit 1071: Resource Programming Guide, available at https://web.archive.org/web/20100114164340/http://developer.apple.com/mac/library/documentation/Cocoa/Conceptual/LoadingResources/Introduction/Introduction.html, filed Dec. 23, 2022, by Apple Inc., before the Patent Trial and Appeal Board of the United States Patent and Trademark Office for U.S. Pat. No. 10,621,228, IPR2022-00031 (56 pages).
Petitioner's Reply, Exhibit 1072: Internet Archive Extended URLs and Corresponding Screen Shots, filed Dec. 23, 2022, by Apple Inc., before the Patent Trial and Appeal Board of the United States Patent and Trademark Office for U.S. Pat. No. 10,621,228, IPR2022-00031 (8 pages).
Petitioner's Reply, Exhibit 1073: Install Disk Screen Shots, filed Dec. 23, 2022, by Apple Inc., before the Patent Trial and Appeal Board of the United States Patent and Trademark Office for U.S. Pat. No. 10,621,228, IPR2022-00031 (6 pages).
Petitioner's Reply, Exhibit 1074: Collection of Aperture 3 Webpages, available at https://web.archive.org/web/20100316213353/http://www.apple.com/aperture/, filed Dec. 23, 2022, by Apple Inc., before the Patent Trial and Appeal Board of the United States Patent and Trademark Office for U.S. Pat. No. 10,621,228, IPR2022-00031 (4 pages).
Petitioner's Reply, Exhibit 1076: Collection of Aperture 3 Webpages, available at https://web.archive.org/web/20100411022811/http://www.apple.com:80/aperture/, filed Dec. 23, 2022, by Apple Inc., before the Patent Trial and Appeal Board of the United States Patent and Trademark Office for U.S. Pat. No. 10,621,228, IPR2022-00031 (5 pages).
Petitioner's Reply, Exhibit 1077: Jason Snell, "Apple releases Aperture 3," Macworld, available at https://web.archive.org/web/20100211033049/http://www.macworld.com/article/146231/2010/02/aperture3.html, filed Dec. 23, 2022, by Apple Inc., before the Patent Trial and Appeal Board of the United States Patent and Trademark Office for U.S. Pat. No. 10,621,228, IPR2022-00031 (3 pages).
Petitioner's Reply, Exhibit 1078: Collection of Aperture 3 Webpages, available at https://web.archive.org/web/20100212221924/http://www.apple.com/aperture, filed Dec. 23, 2022, by Apple Inc., before the Patent Trial and Appeal Board of the United States Patent and Trademark Office for U.S. Pat. No. 10,621,228, IPR2022-00031 (2 pages).
Petitioner's Reply, Exhibit 1079: Panoramio, Screen Shot of "Popular photos in Google Earth" available at https://web.archive.org/web/20101126084240/http://www.panoramio.com:80/map, filed Dec. 23, 2022, by Apple Inc., before the Patent Trial and Appeal Board of the United States Patent and Trademark Office for U.S. Pat. No. 10,621,228, IPR2022-00031 (2 pages).
Petitioner's Reply, Exhibit 1080: Panoramio, "Adding photos to Panoramio," Help Webpage, available at https://web.archive.org/web/20100328220626/http://www.panoramio.com/help/adding_photos, filed Dec. 23, 2022, by Apple Inc., before the Patent Trial and Appeal Board of the United States Patent and Trademark Office for U.S. Pat. No. 10,621,228, IPR2022-00031 (3 pages).
Petitioner's Reply, Exhibit 1081: Places View Annotated with Arrow, filed Dec. 23, 2022, by Apple Inc., before the Patent Trial and Appeal Board of the United States Patent and Trademark Office for U.S. Pat. No. 10,621,228, IPR2022-00031 (1 page).
Petitioner's Reply, Exhibit 1083: Window Area Measurement Illustration, Places View from IPR2022-00032, filed Dec. 23, 2022, by Apple Inc., before the Patent Trial and Appeal Board of the United States Patent and Trademark Office for U.S. Pat. No. 10,621,228, IPR2022-00031 (5 pages).
Petitioner's Reply, Exhibit 1084: Revealing Files on the Aperture 3 Installer DVD, Video Demonstration, filed Dec. 23, 2022, by Apple Inc., before the Patent Trial and Appeal Board of the United States Patent and Trademark Office for U.S. Pat. No. 10,621,228, IPR2022-00031 (1 page).
Petitioner's Reply, Exhibit 1085: Screen Shot from Video Demonstration, filed Dec. 23, 2022, by Apple Inc., before the Patent Trial and Appeal Board of the United States Patent and Trademark Office for U.S. Pat. No. 10,621,228, IPR2022-00031 (1 page).
Petitioner's Reply, Exhibit 1086: Screen Shot from Final Frame of Video Demonstration, filed Dec. 23, 2022, by Apple Inc., before the Patent Trial and Appeal Board of the United States Patent and Trademark Office for U.S. Pat. No. 10,621,228, IPR2022-00031 (2 pages).
Petitioner's Reply, Exhibit 1087: Corrected Window Area Measurement Illustration, Places View from IPR2022-00032, filed Dec. 23, 2022, by Apple Inc., before the Patent Trial and Appeal Board of the United States Patent and Trademark Office for U.S. Pat. No. 10,621,228, IPR2022-00031 (5 pages).
Petitioner's Reply, Exhibit 1088: Corrected Window Area Measurement Illustration, Places View from IPR2022-00032, filed Dec. 23, 2022, by Apple Inc., before the Patent Trial and Appeal Board of the United States Patent and Trademark Office for U.S. Pat. No. 10,621,228, IPR2022-00031 (5 pages).
Petitioner's Reply, Exhibit 1089: Remote Deposition of Rajeev Surati, Ph.D., filed Dec. 23, 2022, by Apple Inc., before the Patent Trial and Appeal Board of the United States Patent and Trademark Office for U.S. Pat. No. 10,621,228, IPR2022-00031 (506 pages).
Petitioner's Reply, Exhibit 1090: Affidavit of Nathaniel E. Frank-White, Internet Archive, filed Dec. 23, 2022, by Apple Inc., before the Patent Trial and Appeal Board of the United States Patent and Trademark Office for U.S. Pat. No. 10,621,228, IPR2022-00031 (287 pages).
Petitioner's Reply, Exhibit 1091: Declaration of Jeffrey P. Kushan, filed Dec. 23, 2022, by Apple Inc., before the Patent Trial and Appeal Board of the United States Patent and Trademark Office for U.S. Pat. No. 10,621,228, IPR2022-00031 (13 pages).
Petitioner's Reply, Exhibit 1092: Merriam Webster Dictionary Definition of "group," retrieved from the Internet at https:/unabridged.merriam-webster.com/advanced-search/unabridged/?word=Group&searchType=advanced, filed Dec. 23, 2022, by Apple Inc., before the Patent Trial and Appeal Board of the United States Patent and Trademark Office for U.S. Pat. No. 11,017,020, PGR2022-00006 (2 pages).
Petitioner's Reply, filed Dec. 23, 2022, by Apple Inc., before the Patent Trial and Appeal Board of the United States Patent and Trademark Office for U.S. Pat. No. 10,621,228, IPR2022-00031 (39 pages).
Petitioner's Reply, filed Dec. 23, 2022, by Apple Inc., before the Patent Trial and Appeal Board of the United States Patent and Trademark Office for U.S. Pat. No. 10,423,658, IPR2022-00033 (46 pages).
Petitioner's Reply, filed Dec. 23, 2022, by Apple Inc., before the Patent Trial and Appeal Board of the United States Patent and Trademark Office for U.S. Pat. No. 11,017,020, PGR2022-00006 (51 pages).

(56) References Cited

OTHER PUBLICATIONS

Petitioner's Reply, filed Dec. 23, 2022, by Apple Inc., before the Patent Trial and Appeal Board of the United States Patent and Trademark Office for U.S. Pat. No. 9,552,376, IPR2022-00032 (45 pages).
Petitioner's Reply to Patent Owner's Response, Exhibit 1040: Videoconference Deposition of Glenn Reinman, Ph.D., dated Nov. 16, 2022, by Samsung Electronics Co., Ltd, before the Patent Trial and Appeal Board of the United States Patent and Trademark Office for U.S. Pat. No. 10,621,228, IPR2022-00222 (157 Pages).
Petitioner's Reply to Patent Owner's Response, Exhibit 1041: Second Declaration of Dr. Philip Greenspun, dated Dec. 13, 2022, by Samsung Electronics Co., Ltd, before the Patent Trial and Appeal Board of the United States Patent and Trademark Office for U.S. Pat. No. 10,621,228, IPR2022-00222 (17 Pages).
Petitioner's Reply to Patent Owner's Response, Exhibit 1043: U.S. Patent Application Publication No. US20090196510 A1, published Aug. 6, 2009, by Samsung Electronics Co., Ltd, before the Patent Trial and Appeal Board of the United States Patent and Trademark Office for U.S. Pat. No. 10,621,228, IPR2022-00222 (242 Pages).
Petitioner's Reply to Patent Owner's Response, filed Dec. 13, 2022, by Samsung Electronics Co., Ltd, before the Patent Trial and Appeal Board of the United States Patent and Trademark Office for U.S. Pat. No. 10,621,228, IPR2022-00222 (32 Pages).
Public Record of Oral Hearing, held Dec. 16, 2022, before the Patent Trial and Appeal Board of the United States Patent and Trademark Office for U.S. Pat. No. 10,621,228, IPR2021-01413 (52 pages).
Exhibit 2003: Chris Foresman, "Ars Reviews iLife '09: making the cut with iMovie and iPhoto," Ars Technica, dated Mar. 1, 2009 (https://arstechnica.com/gadgets/2009/03/ilife-09-revivewimovie-iphoto/) by Memory Web, LLC, before the Patent Trial and Appeal Board of the United States Patent and Trademark Office in Post Grant Review of U.S. Pat. No. 11,163,823, PGR2022-00034 (22 pages).
Exhibit 2004: "iPhoto '09—assigning places" (https://www.youtube.com/watch?v=fjCSoNcUixI) filed Feb. 23, 2023, by Memory Web, LLC, before the Patent Trial and Appeal Board of the United States Patent and Trademark Office in Post Grant Review of U.S. Pat. No. 11,163,823, PGR2022- 00034 (1 page).
Exhibit 2009: "Replaced: Date of Last Replace," OCLC Support & Training (https://www.oclc.org/bibformats/en/gixedfield/replaced.html) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (3 pages).
Exhibit 2010: "040 Cataloging Source (NR)," OCLC Support & Training (https://www.oclc.org/bibformats/en/0xx/040.html) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (14 pages).
Exhibit 2011: WorldCat Registry, Profile Summary: Yankee Book Peddler B&T Catalog Project (https://worldcat.org/webservices/registry/Institutions/86970) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2012: WorldCat Registry, Profile Summary: Blackwell's Book Service (https://worldcat.org/webservices/registry/Institutions/87110) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2013: WorldCat Registry, Profile Summary: Queens Public Library (https://worldcat.org/webservices/registry/Institutions/71949) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2014: WorldCat Registry, Profile Summary: Chicago Public Library (https://worldcat.org/ registry/Institutions/9812) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2015: WorldCat Registry, Profile Summary: Illinois State University (https://worldcat.org/webservices/registry/Institutions/840) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2016: WorldCat Registry, Profile Summary: Carnegie Library of Pittsburgh (https://worldcat.org/ registry/Institutions/14692) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2017: Library of Congress, Network Development & Marc Standards Office (https://www.loc.gov/marc/organizations/org-search.php) filed Feb. 23, 2023, by Memory Web, LLC, before the Patent Trial and Appeal Board of the United States Patent and Trademark Office in Post Grant Review of U.S. Pat. No. 11,163,823, PGR2022-00034 (1 page).
Exhibit 2020: Declaration of Professor Glenn Reinman, Ph.D, filed Feb. 23, 2023, by Memory Web, LLC, before the Patent Trial and Appeal Board of the United States Patent and Trademark Office in Post Grant Review of U.S. Pat. No. 11,163,823, PGR2022-00034 (92 pages).
Exhibit 2021: Declaration of Laura A. Whitbeck, filed Feb. 23, 2023, by Memory Web, LLC, before the Patent Trial and Appeal Board of the United States Patent and Trademark Office in Post Grant Review of U.S. Pat. No. 11,163,823, PGR2022-00034 (7 pages).
Exhibit 2025: Transcript of Deposition of Dr. Philip Greenspun, dated Jan. 19, 2023, submitted by Memory Web, LLC, before the Patent Trial and Appeal Board of the United States Patent and Trademark Office in Inter Partes Review of U.S. Pat. No. 10,621,228, IPR2022-00222 (77 pages).
Exhibit 2026: Views 1-6, filed Feb. 2, 2023, submitted by Memory Web, LLC, before the Patent Trial and Appeal Board of the United States Patent and Trademark Office in Inter Partes Review of U.S. Pat. No. 10,621,228, IPR2022-00222 (1 page).
Patent Owner's Response, filed Feb. 23, 2023, by Memory Web, LLC, before the Patent Trial and Appeal Board of the United States Patent and Trademark Office in Post Grant Review of U.S. Pat. No. 11,163,823, PGR2022-00034 (89 pages).
Patent Owner's Sur-Reply, filed Feb. 2, 2023, by Memory Web, LLC, before the Patent Trial and Appeal Board of the United States Patent and Trademark Office in Inter Partes Review of U.S. Pat. No. 10,621,228, IPR2022-00222 (43 pages).
Patent Owner's Sur-Reply, filed Jan. 30, 2023, by Memory Web, LLC, before the Patent Trial and Appeal Board of the United States Patent and Trademark Office in Inter Partes Review of U.S. Pat. No. 10,423,658 IPR2022-00033 (38 pages).
Patent Owner's Sur-Reply, filed Jan. 30, 2023, by Memory Web, LLC, before the Patent Trial and Appeal Board of the United States Patent and Trademark Office in Inter Partes Review of U.S. Pat. No. 10,621,228, IPR2022-00031 (36 pages).
Patent Owner's Sur-Reply, filed Jan. 30, 2023, by Memory Web, LLC, before the Patent Trial and Appeal Board of the United States Patent and Trademark Office in Inter Partes Review of U.S. Pat. No. 9,552,376, IPR2022-00032 (35 pages).
Patent Owner's Sur-Reply, filed Jan. 30, 2023, by Memory Web, LLC, before the Patent Trial and Appeal Board of the United States Patent and Trademark Office in Post Grant Review of U.S. Pat. No. 11,017,020, PGR2022-00006 (35 pages).
Transcript of Remote Deposition of Dr. Philip Greenspun, dated Jan. 26, 2023, before the Patent Trial and Appeal Board of the United States Patent and Trademark Office in Inter Partes Review of U.S. Pat. No. 10,621,228, IPR2022-00222 (180 pages).
[Redacted] Petitioner's Reply to Patent Owner's Response, Exhibit 1032: Joint Claim Construction Statement of U.S. Pat. Nos. 10,423,658;

(56) References Cited

OTHER PUBLICATIONS 10,621,228; and 11,163,823, entered May 20, 2022, by Unified Patents, LLC, in the United States District Court for the Western Division of Texas (Waco Division), Civil Action No. 6:21-cv-00411-ADA (7 pages).

[Redacted] Petitioner's Reply to Patent Owner's Response, Exhibit 1034: Transcript of the Deposition of Glenn Reinman, Ph.D., dated Aug. 18, 2022, by Unified Patents, LLC, before the Patent Trial and Appeal Board of the United States Patent and Trademark Office in Inter Partes Review of U.S. Pat. No. 10,621,228, IPR2021-01413 (170 pages).

[Redacted] Petitioner's Reply to Patent Owner's Response, Exhibit 1035: Cambridge English Dictionary, "map," retrieved from the internet on Aug. 25, 2022, available online at URL: https://dictionary.cambridge.org/US/dictionary/english/map; by Unified Patents, LLC, in Inter Partes Review of U.S. Pat. No. 10,621,228, IPR2021-01413 (13 pages).

[Redacted] Petitioner's Reply to Patent Owner's Response, Exhibit 1036: Dictionary.com, "map," retrieved from the internet on Aug. 26, 2022, available online at URL: https://www.dictionary.com/browse/map; by Unified Patents, LLC, in Inter Partes Review of U.S. Pat. No. 10,621,228, IPR2021-01413 (8 pages).

[Redacted] Petitioner's Reply to Patent Owner's Response, Exhibit 1038: Reply Declaration of Benjamin B. Bederson, Ph.D., entered Aug. 29, 2022, by Unified Patents, LLC, in Inter Partes Review of U.S. Pat. No. 10,621,228, IPR2021-01413 (60 pages).

[Redacted] Petitioner's Reply to Patent Owner's Response, filed Aug. 29, 2022, by Unified Patents, LLC, in the United States Patent and Trademark Office, in Inter Partes Review of U.S. Pat. No. 10,621,228, IPR2021-01413 (39 pages).

[Redacted] Petitioner's Updated Exhibit List, Exhibit 1039: Patent Owner's Sur-Reply, dated Oct. 11, 2022, by Unified Patents, LLC, before the Patent Trial and Appeal Board of the United States Patent and Trademark Office, in Inter Partes Review of U.S. Pat. No. 10,621,228, IPR2021-01413 (39 pages).

"Apple Releases Aperture 3," Apple.com, published online on Feb. 9, 2010, at http://www.apple.com/pr/library/2010/02/09aperture.html; Archived on Feb. 12, 2010, at https://web.archive.org/web/20100212060022/http://www.apple.com/pr/library/2010/02/09aperture.html.

"Apple Unveils iOS 7," Apple.com, published online on Jun. 10, 2013, at https://www.apple.com/newsroom/2013/06/10Apple-Unveils-iOS-7/.

"Exchangeable image file format for digital still cameras: Exif Version 2.2," JEITA CP-3451 http://www.exif.org/exif2-2.pdf Apr. 2002.

"Exchangeable image file format for digital still cameras: Exif Version 2.2," JEITA CP-3451, available online at URL: http://www.exif.org/exif2-2.pdf ; Apr. 2002, Exhibit 1036 of Smith Declaration entered Jul. 13, 2022, in Post-Grant Review of U.S. Pat. No. 11,017,020, PGR2022-00006 (154 pages).

"Top 11 Technologies of the Decade," IEEE Spectrum, pp. 27-63, Jan. 2011 (37 pages).

"Top 11 Technologies of the Decade," IEEE Spectrum, pp. 27-63, Jan. 2011, Exhibit 1029 of Smith Declaration entered Jul. 13, 2022, in Post-Grant Review of U.S. Pat. No. 11,017,020, PGR2022-00006 (37 pages).

Agostini. H., "Geotags Invade Privacy and OPSEC," DVIDSHub.net, published online on Jan. 7, 2011, at https://www.dvidshub.net/news/63192/geotags-invade-privacy-and-opsec/.

Ahern et al., "World Explorer: Visualizing Aggregate Data From Unstructured Text in Geo-Referenced Collections", JCDL'07, pp. 1-10, 2007, ACM.

Alejandro Ramirez, "Using Flickr (Part 1 of 3)," YouTube.com, published online on Mar. 19, 2012, at https://www.youtube.com/watch?v=1qAdxeSE0w8.

Alejandro Ramirez, "Using Flickr (Part 3 of 3)," YouTube.com, published online on Mar. 20, 2012, at https://www.youtube.com/watch?v=PIVboIulKjQ.

Amber Sparks, "Panoramio Tutorial," YouTube.com, published online on Aug. 6, 2012, at https://www.youtube.com/watch?v=k8VB7hnYi9Q.

Amended Complaint, *MemoryWeb LLC* v. *Apple Inc.*, 6:21-cv-00531-ADA (W.D.Tex.), dares Aug. 13, 2021 (40 pages).

Amended Complaint, *MemoryWeb, LLC* v. *Samsung Electronics Co., Ltd. and Samsung Electronics America, Inc.*, Case No. 21-cv-411 (W.D. Tex.), filed Nov. 24, 2021, by Applicant in the United States District Court, Western District of Texas, Waco Division (33 pages).

Ames et al., "Why we tag: motivations for annotation in mobile and online media," CHI '07 Proceedings of the SIGCHI Conference on Human Factors in Computing Systems, pp. 971-980, ACM, 2007 (10 pages).

Amundsen, J.; "Using the Geographical Location of Photos in Mobile Phones"; Master of Science in Computer Science submission; Norwegian University of Science and Technology; Jul. 2008 (112 pages).

Antoniou, V., "User Generated Spatial Content: An Analysis of the Phenomenon and its Challenges for Mapping Agencies," Thesis submitted for the Degree of Doctor of Philosophy, University College London, London, England, United Kingdom, Feb. 2011.

Aperture 3 Apple Store (U.S.), originally published online athttp://store.apple.com/us/product/MB957Z/A?fnode=MTY1NDAzOA&mco=MTY5NjU1MTE ; Archived on Apr. 3, 2010, at https://web.archive.org/web/20100403000325/http://store.apple.com/us/product/MB957Z/A?fnode=MTY1NDAzOA&mco=MTY5NjU1MTE.

Apple—Aperture—Pro performance with iPhoto simplicity, originally published online at http://www.apple.com/aperture ; Archived on Feb. 10, 2010, at https://web.archive.org/web/20100212221924/http://www.apple.com/aperture.

Apple Inc., "Aperture 3 Retail Case Label."

Apple Inc., "Aperture 3 Retail CD Label," 2009.

Apple Inc., "Aperture 3 Retail Instructions," 2009.

Apple Inc., "Aperture 3 User Manual (A3UM)," referenced by the source code in Exhibit 1055 of the Smith Declaration entered Jul. 13, 2022 in Post-Grant Review of U.S. Pat. No. 11,017,020, PGR2022-00006, and available online at URL: https://web.archive.org/web/20100217035925/http://documentation.apple.com/en/aperture/usermanual/ (1122 pages).

Apple Inc., "Aperture 3 User Manual HTML Source File," available online at URL: http://documentation.apple.com/en/aperture/usermanual/ ; archived on Feb. 17, 2010, at URL: https://web.archive.org/web/20100217035925/http://documentation.apple.com/en/apertur e/usermanual/ ; Exhibit 1055 of Smith Declaration entered Jul. 13, 2022, in Post-Grant Review of U.S. Pat. No. 11,017,020, PGR2022-00006 (11 pages).

Apple Inc., "Aperture 3 User Manual HTML Source File," http://documentation.apple.com/en/aperture/usermanual/ archived on Feb. 17, 2010, at https://web.archive.org/web/20100217035925/http://documentation.apple.com/en/aperture/usermanual/ (11 pages).

Apple Inc., "Exploring Aperture 3," published 2010, available online at URL: https://manuals.info.apple.com/MANUALS/1000/MA1522/en_US/Exploring_Aperture_.pdf ; Exhibit 1051 of Smith Declaration entered Jul. 13, 2022, in Post-Grant Review of U.S. Pat. No. 11,017,020, PGR2022-00006 (160 pages).

Apple Inc., "Exploring Aperture 3," published 2010, available online athttps://manuals.info.apple.com/MANUALS/1000/MA1522/en_US/Exploring_Aperture3.pdf.

Apple Inc., "Mac OS X v10.6.3 Update (Mar. 29, 2010)," archived on Apr. 11, 2010, at https://web.archive.org/web/20100411001846/https://support.apple.com/kb/dl1018.

Apple Inc., "Various Packaging and Marketing Materials for Aperture 3."

Apple Inc., "Various Packaging and Marketing Materials for iLife."

Apple Inc., "Various Web Pages for Apple Products," Apple.com (various), Archived Feb. 17 to Mar. 5, 2010.

Apple Software—Apple Store (U.S.), originally published online at http://store.apple.com/us/browse/home/shop_mac/software/apple?mco=OTY2ODUzOA ; Archived on May 11, 2010, at https://web.archive.org/web/20100511235532/http://store.apple.com/us/browse/home/shop_mac/software/apple?mco=OTY2ODUzOA.

(56) References Cited

OTHER PUBLICATIONS

Apple, "Apple Introduces iLife '09," Apple.com, published online on Jan. 6, 2009, at http://www.apple.com/pr/library/2009/01/06ilife.html ; Archived on Jan. 12, 2009, at https://web.archive.org/web/20090112105204/http://www.apple.com/pr/library/2009/01/06ilife.html.
Apple, "Apple Software—iLife," Apple Store (U.S.), originally published online athttp://store.apple.com/us/browse/home/shop_mac/software/apple?mco=OTY2ODUzOA ; Archived on Nov. 12, 2009, at https://web.archive.org/web/20091112134040/http://store.apple.com/us/browse/home/shop_mac/software/apple?mco=OTY2ODUzOA.
Apple, "iPhoto—Faces, Places, and other new features," Apple.com, originally published online at http://www.apple.com/ilife/iphoto ; Archived on Jan. 10, 2009, at https://web.archive.org/web/20090110084246/http://www.apple.com/ilife/iphoto.
Apple's Preliminary Invalidity Contentions, Exhibit A-1: "Aperture 3," date alleged by Apple to be at least as early as Feb. 9, 2010, Civil Case No. 3:1-cv-09839 (VC), in the United States District Court for the Northern District of California, 2022.
Apple's Preliminary Invalidity Contentions, Exhibit A-10: "Flora," date alleged by Apple to be at least as early as May 19, 2000, Civil Case No. 3:1-cv-09839 (VC), in the United States District Court for the Northern District of California, 2022.
Apple's Preliminary Invalidity Contentions, Exhibit A-11: "Sugiura," date alleged by Apple to be at least as early as Sep. 7, 2012, Civil Case No. 3:1-cv-09839 (VC), in the United States District Court for the Northern District of California, 2022.
Apple's Preliminary Invalidity Contentions, Exhibit A-12: "Prabhu," date alleged by Apple to be at least as early as Jun. 20, 2000, Civil Case No. 3:1-cv-09839 (VC), in the United States District Court for the Northern District of California, 2022.
Apple's Preliminary Invalidity Contentions, Exhibit A-13: "Invalidity Claim Chart for U.S. Pat. No. 9,552,375, Based on Obviousness References," as alleged by Apple Inc., Civil Case No. 3:1-cv-09839 (VC), in the United States District Court for the Northern District of California, 2022.
Apple's Preliminary Invalidity Contentions, Exhibit A-2: "iPhoto '09," date alleged by Apple to be at least as early as Jan. 6, 2009, Civil Case No. 3:1-cv-09839 (VC), in the United States District Court for the Northern District of California, 2022.
Apple's Preliminary Invalidity Contentions, Exhibit A-3: "Picasa," date alleged by Apple to be at least as early as Sep. 22, 2004, Civil Case No. 3:1-cv-09839 (VC), in the United States District Court for the Northern District of California, 2022.
Apple's Preliminary Invalidity Contentions, Exhibit A-4: "Panoramio," date alleged by Apple to be at least as early as September May 30, 2007, Civil Case No. 3:1-cv-09839 (VC), in the United States District Court for the Northern District of California, 2022.
Apple's Preliminary Invalidity Contentions, Exhibit A-5: "Flickr," date alleged by Apple to be at least as early as September Feb. 27, 2006, Civil Case No. 3:1-cv-09839 (VC), in the United States District Court for the Northern District of California, 2022.
Apple's Preliminary Invalidity Contentions, Exhibit A-6: "Instagram," date alleged by Apple to be at least as early as September Aug. 2012, Civil Case No. 3:1-cv-09839 (VC), in the United States District Court for the Northern District of California, 2022.
Apple's Preliminary Invalidity Contentions, Exhibit A-7: "Belitz," date alleged by Apple to be at least as early as September Aug. 28, 2008, Civil Case No. 3:1-cv-09839 (VC), in the United States District Court for the Northern District of California, 2022.
Apple's Preliminary Invalidity Contentions, Exhibit A-8: "Okamura," date alleged by Apple to be at least as early as September Nov. 26, 2009, Civil Case No. 3:1-cv-09839 (VC), in the United States District Court for the Northern District of California, 2022.
Apple's Preliminary Invalidity Contentions, Exhibit A-9: "Wagner," date alleged by Apple to be at least as early as September Jan. 6, 2010, Civil Case No. 3:1-cv-09839 (VC), in the United States District Court for the Northern District of California, 2022.
Apple's Preliminary Invalidity Contentions, Exhibit B-1: "Aperture 3," date alleged by Apple to be at least as early as Feb. 9, 2010, Civil Case No. 3:1-cv-09839 (VC), in the United States District Court for the Northern District of California, 2022.
Apple's Preliminary Invalidity Contentions, Exhibit B-10: "Flora," date alleged by Apple to be at least as early as May 19, 2000, Civil Case No. 3:1-cv-09839 (VC), in the United States District Court for the Northern District of California, 2022.
Apple's Preliminary Invalidity Contentions, Exhibit B-11: "Sugiura," date alleged by Apple to be at least as early as Sep. 7, 2012, Civil Case No. 3:1-cv-09839 (VC), in the United States District Court for the Northern District of California, 2022.
Apple's Preliminary Invalidity Contentions, Exhibit B-12: "Prabhu," date alleged by Apple to be at least as early as Jun. 20, 2000, Civil Case No. 3:1-cv-09839 (VC), in the United States District Court for the Northern District of California, 2022.
Apple's Preliminary Invalidity Contentions, Exhibit B-13: "Invalidity Claim Chart for U.S. Pat. No. 10,423,658, Based on Obviousness References," as alleged by Apple Inc., Civil Case No. 3:1-cv-09839 (VC), in the United States District Court for the Northern District of California, 2022.
Apple's Preliminary Invalidity Contentions, Exhibit B-2: "iPhoto '09," date alleged by Apple to be at least as early as Jan. 6, 2009, Civil Case No. 3:1-cv-09839 (VC), in the United States District Court for the Northern District of California, 2022.
Apple's Preliminary Invalidity Contentions, Exhibit B-3: "Picasa," date alleged by Apple to be at least as early as Sep. 22, 2009, Civil Case No. 3:1-cv-09839 (VC), in the United States District Court for the Northern District of California, 2022.
Apple's Preliminary Invalidity Contentions, Exhibit B-4: "Panoramio," date alleged by Apple to be at least as early as May 30, 2007, Civil Case No. 3:1-cv-09839 (VC), in the United States District Court for the Northern District of California, 2022.
Apple's Preliminary Invalidity Contentions, Exhibit B-5: "Flickr," date alleged by Apple to be at least as early as Feb. 27, 2006, Civil Case No. 3:1-cv-09839 (VC), in the United States District Court for the Northern District of California, 2022.
Apple's Preliminary Invalidity Contentions, Exhibit B-6: "Instagram," date alleged by Apple to be at least as early as Aug. 2012, Civil Case No. 3:1-cv-09839 (VC), in the United States District Court for the Northern District of California, 2022.
Apple's Preliminary Invalidity Contentions, Exhibit B-7: "Belitz," date alleged by Apple to be at least as early as Aug. 28, 2008, Civil Case No. 3:1-cv-09839 (VC), in the United States District Court for the Northern District of California, 2022.
Apple's Preliminary Invalidity Contentions, Exhibit B-8: "Okamura," date alleged by Apple to be at least as early as Nov. 26, 2009, Civil Case No. 3:1-cv-09839 (VC), in the United States District Court for the Northern District of California, 2022.
Apple's Preliminary Invalidity Contentions, Exhibit B-9: "Wagner," date alleged by Apple to be at least as early as Jan. 6, 2010, Civil Case No. 3:1-cv-09839 (VC), in the United States District Court for the Northern District of California, 2022.
Apple's Preliminary Invalidity Contentions, Exhibit C-1: "Aperture 3," date alleged by Apple to be at least as early as Feb. 9, 2010, Civil Case No. 3:1-cv-09839 (VC), in the United States District Court for the Northern District of California, 2022.
Apple's Preliminary Invalidity Contentions, Exhibit C-10: "Flora," date alleged by Apple to be at least as early as May 19, 2000, Civil Case No. 3:1-cv-09839 (VC), in the United States District Court for the Northern District of California, 2022.
Apple's Preliminary Invalidity Contentions, Exhibit C-11: "Sugiura," date alleged by Apple to be at least as early as Sep. 7, 2012, Civil Case No. 3:1-cv-09839 (VC), in the United States District Court for the Northern District of California, 2022.
Apple's Preliminary Invalidity Contentions, Exhibit C-12: "Prabhu," date alleged by Apple to be at least as early as Jun. 20, 2000, Civil Case No. 3:1-cv-09839 (VC), in the United States District Court for the Northern District of California, 2022.
Apple's Preliminary Invalidity Contentions, Exhibit C-13: "Invalidity Claim Chart for U.S. Pat. No. 10,621,228," as alleged by Apple Inc., Civil Case No. 3:1-cv-09839 (VC), in the United States District Court for the Northern District of California, 2022.

(56) References Cited

OTHER PUBLICATIONS

Apple's Preliminary Invalidity Contentions, Exhibit C-2: "iPhoto '09," date alleged by Apple to be at least as early as Jan. 6, 2009, Civil Case No. 3:1-cv-09839 (VC), in the United States District Court for the Northern District of California, 2022.

Apple's Preliminary Invalidity Contentions, Exhibit C-3: "Picasa," date alleged by Apple to be at least as early as Sep. 22, 2004, Civil Case No. 3:1-cv-09839 (VC), in the United States District Court for the Northern District of California, 2022.

Apple's Preliminary Invalidity Contentions, Exhibit C-4: "Panoramio," date alleged by Apple to be at least as early as May 30, 2007, Civil Case No. 3:1-cv-09839 (VC), in the United States District Court for the Northern District of California, 2022.

Apple's Preliminary Invalidity Contentions, Exhibit C-5: "Flickr," date alleged by Apple to be at least as early as Feb. 27, 2006, Civil Case No. 3:1-cv-09839 (VC), in the United States District Court for the Northern District of California, 2022.

Apple's Preliminary Invalidity Contentions, Exhibit C-6: "Instagram," date alleged by Apple to be at least as early as Aug. 2012, Civil Case No. 3:1-cv-09839 (VC), in the United States District Court for the Northern District of California, 2022.

Apple's Preliminary Invalidity Contentions, Exhibit C-7: "Belitz," date alleged by Apple to be at least as early as Aug. 28, 2008, Civil Case No. 3:1-cv-09839 (VC), in the United States District Court for the Northern District of California, 2022.

Apple's Preliminary Invalidity Contentions, Exhibit C-8: "Okamura," date alleged by Apple to be at least as early as Nov. 26, 2009, Civil Case No. 3:1-cv-09839 (VC), in the United States District Court for the Northern District of California, 2022.

Apple's Preliminary Invalidity Contentions, Exhibit C-9: "Wagner," date alleged by Apple to be at least as early as Jan. 6, 2010, Civil Case No. 3:1-cv-09839 (VC), in the United States District Court for the Northern District of California, 2022.

Apple's Preliminary Invalidity Contentions, Exhibit D-1: "Aperture 3," date alleged by Apple to be at least as early as Feb. 9, 2010, Civil Case No. 3:1-cv-09839 (VC), in the United States District Court for the Northern District of California, 2022.

Apple's Preliminary Invalidity Contentions, Exhibit D-13: "Invalidity Claim Chart for U.S. Pat. No. 11,017,020," as alleged by Apple Inc., Civil Case No. 3:1-cv-09839 (VC), in the United States District Court for the Northern District of California, 2022.

Apple's Preliminary Invalidity Contentions, Exhibit D-2: "iPhoto '09," date alleged by Apple to be at least as early as Jan. 6, 2009, Civil Case No. 3:1-cv-09839 (VC), in the United States District Court for the Northern District of California, 2022.

Apple's Preliminary Invalidity Contentions, Exhibit D-3: "Picasa," date alleged by Apple to be at least as early as Sep. 22, 2004, Civil Case No. 3:1-cv-09839 (VC), in the United States District Court for the Northern District of California, 2022.

Apple's Preliminary Invalidity Contentions, Exhibit D-4: "Panoramio," date alleged by Apple to be at least as early as May 30, 2007, Civil Case No. 3:1-cv-09839 (VC), in the United States District Court for the Northern District of California, 2022.

Apple's Preliminary Invalidity Contentions, Exhibit D-5: "Flickr," date alleged by Apple to be at least as early as Feb. 27, 2006, Civil Case No. 3:1-cv-09839 (VC), in the United States District Court for the Northern District of California, 2022.

Apple's Preliminary Invalidity Contentions, Exhibit D-6: "Instagram," date alleged by Apple to be at least as early as Aug. 2012, Civil Case No. 3:1-cv-09839 (VC), in the United States District Court for the Northern District of California, 2022.

Apple's Preliminary Invalidity Contentions, Exhibit D-7: "Belitz," date alleged by Apple to be at least as early as Aug. 28, 2008, Civil Case No. 3:1-cv-09839 (VC), in the United States District Court for the Northern District of California, 2022.

Apple's Preliminary Invalidity Contentions, Exhibit D-8: "Okamura," date alleged by Apple to be at least as early as Nov. 26, 2009, Civil Case No. 3:1-cv-09839 (VC), in the United States District Court for the Northern District of California, 2022.

Apple's Preliminary Invalidity Contentions, *MemoryWeb, LLC* v. *Apple Inc.*, Civil Case No. 3:21-CV-09839 (VC), in the United States District Court for the Northern District of California, 2022 (99 pages).

Apples Preliminary Invalidity Contentions, Exhibit D-10: "Flora," date alleged by Apple to be at least as early as May 19, 2000, Civil Case No. 3:1-cv-09839 (VC), in the United States District Court for the Northern District of California, 2022.

Apples Preliminary Invalidity Contentions, Exhibit D-11: "Sugiura," date alleged by Apple to be at least as early as Sep. 7, 2012, Civil Case No. 3:1-cv-09839 (VC), in the United States District Court for the Northern District of California, 2022.

Apples Preliminary Invalidity Contentions, Exhibit D-12: "Prabhu," date alleged by Apple to be at least as early as Jun. 20, 2000, Civil Case No. 3:1-cv-09839 (VC), in the United States District Court for the Northern District of California, 2022.

Apples Preliminary Invalidity Contentions, Exhibit D-9: "Wagner," date alleged by Apple to be at least as early as Jan. 6, 2010, Civil Case No. 3:1-cv-09839 (VC), in the United States District Court for the Northern District of California, 2022.

Aris, A. et al., "Exploiting Location and time for Photo Search and Storytelling in MyLifeBits," University of Maryland, College Park, Microsoft Research, Sep. 2004.

Austen, I., "Pictures, with Map and Pushpin Included," NewYorkTimes.com, published online on Nov. 2, 2006 at https://nytimes.com/2006/11/02/technology/02basics.html.

Avrithis et al., "Retrieving Landmark and Non-Landmark Images from Community Photo Collections," MM'10, pp. 153-162, Firenze, Italy, Oct. 25-29, 2010.

Bamford, W. et al., "Space-Time Travel Blogging Using a Mobile Phone," Proceedings of the International Conference on Advances in Computer Entertainment Technology, pp. 1-8, Jun. 2007.

Bartolini et al., "Integrating Semantic and Visual Facets for Browsing Digital Photo Collections", SBED, pp. 65-72, 2009.

Basu, S., "How to Geotag Your Flickr Photo & Explore Them by Location," MakeUseOf.com, published online on Jun. 9, 2010, at https://www.makeuseof.com/tag/geotag-flickr-photos-explore-location/; Archived on Jun. 13, 2010, at http://web.archive.org/web/20100613214305/https://www.makeuseof.com/tag/geotag- flickr-photos-explore-location/Basu, S., "View Photos Taken Around the World with Google Panoramio," GuidingTech.com, published online on Mar. 28, 2012, at https://www.guidingtech.com/10399/view-photos-taken-around-world-google- panoramio/.

Basu, S., "View Photos Taken Around the World with Google Panoramio," GuidingTech.com, published online on Mar. 28, 2012, at https://www.guidingtech.com/10399/view-photos-taken-around-world-google-panoramio/.

Bederson, B, "PhotoMesa: A Zoomable Image Browser Using Quantum Treemaps and Bubblemaps," Proceedings of the 14th Annual ACM Aymposium on User Interface Software and Technology, pp. 71-80, Nov. 11-14, 2001 (10 pages).

Bederson, B. B., "Quantum Treemaps and Bubblemaps for a Zoomable Image Browser," Human-Computer Interaction Laboratory, Computer Science Department, Institute for Advanced Computer Studies, University of Maryland, College Park, 2001.

Bennett, E., "Linking Up the Google Maps and Flickr APIs," WebDesign.TutsPlus.com, published online on Aug. 8, 2013, at https://webdesign.tutsplus.com/articles/linking-up-the-google-maps-and-flickr-apis--webdesign-14199.

Blake, I. A., "How to Find Someone Using Geotagging on Flickr," SmallBusiness.Chron.com, published online at http://smallbusiness.chron.com/someone-using-geotagging-flickr-50858.html ; Archived on May 11, 2013, at http://web.archive.org/web/20130511042113/https://smallbusiness.chron.com/someone-using-geotagging-flickr-50858.html.

Bob Brackett, "Flickr searching and geotagging," YouTube.com, published online on Aug. 18, 2010, at https://www.youtube.com/watch?v=-vzQBdPZNUc.

Bogdan, T., "Announcing Picasa 3.5, now with name tags, better geotagging and more," The Official Google Blog, published online on Sep. 22, 2009, at http://googlephotos.blogspot.com/2009/09/announcing-picasa-35-now-with-name-Tags.html ; Archived on Sep.

(56) References Cited

OTHER PUBLICATIONS 25, 2009, at https://web.archive.org/web/20090925002030/http://googlephotos.blogspot.com/2009/09/announcing-picasa-35-now-with-name-tags.html.

Bogdan, T., "Picasa 3.5, Now With Name Tags and More," The Official Google Blog, published online on Sep. 22, 2009, Archived on Sep. 27, 2009, at https://web.archive.org/web/20090927021855/https://googleblog.blogspot.com/2009/09/picasa-35-now-with-name-tags-and-more.html.

Brown, M. C., *Hacking Google Maps and Google Earth*, Wiley Publishing, Inc., ISBN-13: 978-0-471-79009-9, 2006.

Business Wire, "Illustra introduces two new DataBlade modules; 'Database for Cyberspace' announces new Web DataBlade, as well as OMF DataBlade targeted for entertainment industry," Dow Jones, published Dec. 6, 1994.

Butterscotchcom, "Creating Albums on Picasa," YouTube.com, published online on Dec. 7, 2010, at https://www.youtube.com/watch?v=YO-9LknEvQU.

Byous, J., "View with a Zoom—Browse and Zoom Digital Images in One Application," Java.Sun.com, published online on Aug. 1, 2002.

Carboni, D. et al., "GeoPix: Image Retrieval on the Geo Web, from Camera Click to Mouse Click," Proceedings of the 8th Conference on Human-Computer Interaction with Mobile Devices and Services, pp. 169-172, Helsinki, Finland, Sep. 2006.

Carboni, D. et al., "Visualisation of geo-tagged pictures in the web," Int. J. Web Engineering and Technology, vol. 6, No. 3, pp. 220-242, 2011.

Chareyron, G., "Picturing the World: an IT tool to monitor tourists flows thru photographies posted on the web," EarthMapper.org, published online on Jun. 21, 2010.

Chen, Y-F. et al.; "GeoTracker: Geospatial and Temporal RSS Navigation"; AT&T Labs—Research, Florham Park, NJ; WWW 2007 / Track: Browsers and User Interfaces, Session: Smarter Browsing, pp. 41-50 (10 pages).

Chizari, S., "Using Google Earth To Visualise Photographs Captured with Advanced Data," A study submitted in partial fulfillment of the requirements for the degree of Master of Science in Information Management, The University of Sheffield, Sep. 2010.

Chow, S.-W., *PHP Web 2.0 Mashups Projects*, Packt Publishing, ISBN: 978-847190-88-8, 2007 (300 pages).

Chow, S.-W., *PHP Web 2.0 Mashups Projects*, Packt Publishing, ISBN: 978-847190-88-8, 2007, Exhibit 1035 of Kushan Declaration entered Jul. 13, 2022, in Post-Grant Review of U.S. Pat. No. 11,017,020, PGR2022-00006 (300 pages).

Christel, M. & Olligschlaeger, A., "Interactive Maps for a Digital Video Library," Proceedings of the IEEE International Conference on Multimedia Computing and Systems, Florence, Italy, Jun. 7-11, 1999.

Classroomnext, "Picasa Facial Recognition," YouTube.com, published online on Sep. 23, 2009, at https://www.youtube.com/watch?v=9EvRboZeQIk.

CNET, "iOS 7 gets revamped photos app," YouTube.com, published online on Jun. 10, 2013, at https://www.youtube.com/watch?v=k2WhfesYA5c.

Coldeway, D., "Review: Aperture 3, CrunchGear," TechCrunch.com, published online on Mar. 19, 2010, at https://techcrunch.com/2010/03/19/review-aperture-3.

Complaint for Declaratory Judgment, *MyHeritage (USA), Inc. et al. v. MemoryWeb, LLC*, Case No. 1:21-cv-02666 (N.D. Ill.) dated May 17, 2021 (209 pages).

Complaint for Infringment, *MemoryWeb, LLC v. Samsung Electronics Co., Ltd. and Samsung Electronics America, Inc.*, 6:21-cv-00411-ADA (W.D.Tex.), dated Apr. 26, 2021 (29 pages).

Complaint, *MemoryWeb, LLC v. Apple Inc.*, Civ. No. 6:21-cv-531 (W.D. Tex.), dated May 25, 2021 (37 pages).

Computergram International, "Illustra-Virage Searcher Looks Up Pictures Without Needing Keywords," ISSN: 02688-716X, published Apr. 28, 1995.

Cooray, S. H., "Enhancing Person Annotation for Personal Photo Management Using Content and Context based Technologies," A Thesis Submitted in Partial Fulfillment of the Requirements for the Degree of Doctor of Philosophy, Dublin City University School of Electronic Engineering, Sep. 2008.

Coreyhulse.Com, "Picasa 3.5 face recognition impressions," originally published online on Awesomeopolis.com on Sep. 26, 2009.

Crandall, D. et al., "Mapping the World's Photos," WWW 2009, pp. 761-770, Madrid. Spain, Apr. 20-24, 2009.

Crook, J., "Instagram Video Vs. Vine: What's The Difference?," TechCrunch.com, published online on Jun. 20, 2013, at https://techcrunch.com/2013/06/20/instagram-video-vs-vine-whats-the-difference/.

Decision Denying Institution of Inter Partes Review of U.S. Pat. No. 11,017,020 B2, IPR2022-00111, entered Jun. 10, 2022, by the United States Patent and Trademark Office (8 pages).

Decision Granting Institution of Inter Partes Review of U.S. Pat. No. 10,423,658 B2, IPR2022-00033, entered May 20, 2022, by the United States Patent and Trademark Office (41 pages).

Decision Granting Institution of Inter Partes Review of U.S. Pat. No. 10,423,658 B2, IPR2022-00221, entered Aug. 1, 2022, by the United States Patent and Trademark Office (26 pages).

Decision Granting Institution of Inter Partes Review of U.S. Pat. No. 10,621,228 B2, IPR2022-00031, entered May 20, 2022, by the United States Patent and Trademark Office (54 pages).

Decision Granting Institution of Inter Partes Review of U.S. Pat. No. 10,621,228 B2, IPR2022-00222, entered Jun. 13, 2022, by the United States Patent and Trademark Office (35 pages).

Decision Granting Institution of Inter Partes Review of U.S. Pat. No. 9,552,376 B2, IPR2022-00032, entered Jul. 8, 2022, by the United States Patent and Trademark Office (40 pages).

Decision Granting Institution of Post-Grant Review of U.S. Pat. No. 11,017,020 B2, PGR2022-000006, entered Jun. 10, 2022, by the United States Patent and Trademark Office (31 pages).

Declaration of Allan A. Kassenoff in Support of Defendant's Reply Claim Construction Brief, *MemoryWeb, LLC v. Samsung Electronics Co., Ltd. (A Korean Company) and Samsung Electronics America, Inc.*, Civil Action No. 21-cv-411, in the United States District Court for the Western District of Texas (Waco Division), May 3, 2022.

Declaration of Angelo J. Christopher regarding U.S. Pat. No. 11,017,020, dated Mar. 14, 2022 (4 pages).

Declaration of Angelo J. Christopher regarding U.S. Pat. No. 9,552,376, dated Apr. 13, 2022 (4 pages).

Declaration of Angelo J. Christopher regarding U.S. Patent Nos. 10,621,228 and 10,423,658, dated Feb. 23, 2022 (4 pages).

Declaration of Daniel J. Schwartz, *MemoryWeb, LLC v. Samsung Electronics Co., Ltd. (A Korean Company) and Samsung Electronics America, Inc.*, Civil Action No. 21-cv-411, in the United States District Court for the Western District of Texas (Waco Division), Apr. 19, 2022.

Declaration of Dr. Benjamin B. Bederson supporting the IPR Petition of Unified Patents, LLC Sep. 2, 2021 (251 pages).

Declaration of Dr. Loren Terveen regarding U.S. Pat. No. 10,423,658, dated Nov. 3, 2021, (173 pages).

Declaration of Dr. Loren Terveen regarding U.S. Pat. No. 10,621,228, dated Oct. 30, 2021 (151 pages).

Declaration of Dr. Loren Terveen regarding U.S. Pat. No. 11,017,020, dated Nov. 20, 2021 (163 pages).

Declaration of Dr. Loren Terveen regarding U.S. Pat. No. 9,552,376, dated Nov. 8, 2021 (169 pages).

Declaration of Dr. Philip Greenspun regarding U.S. Pat. No. 10,621,228, dated Dec. 3, 2021 (110 pages).

Declaration of Dr. Philip Greenspun regarding U.S. Pat. No. 11,163,823, dated Apr. 14, 2022 (118 pages).

Declaration of Jeffrey P. Kushan, entered Jul. 13, 2022, by *Apple Inc.*, in the United States Patent and Trademark Office, in Post-Grant Review of U.S. Pat. No. 11,017,020, PGR2022-00006 (2 pages).

Declaration of June Ann Munford regarding U.S. Pat. No. 11,163,823, dated Mar. 30, 2022 (32 pages).

Declaration of Kevin Jakel supporting the IPR Petition of Unified Patents, LLC Sep. 2, 2021 (7 pages).

(56) References Cited

OTHER PUBLICATIONS

Declaration of Kyle S. Smith, entered Jul. 13, 2022, by *Apple Inc.*, in the United States Patent and Trademark Office, in Post-Grant Review of U.S. Pat. No. 11,017,020, PGR2022-00006 (4 pages).
Declaration of Matthew Birdsell regarding U.S. Pat. No. 10,423,658, dated Oct. 29, 2021 (11 pages).
Declaration of Matthew Birdsell regarding U.S. Pat. No. 10,621,228, dated Oct. 29, 2021 (11 pages).
Declaration of Matthew Birdsell regarding U.S. Pat. No. 11,017,020, dated Oct. 29, 2021 (11 pages).
Declaration of Matthew Birdsell regarding U.S. Pat. No. 9,552,376, dated Oct. 29, 2021 (11 pages).
Declaration of Philip Greenspun regarding U.S. Pat. No. 10,423,658 (131 pages).
Declaration of Professor Glenn Reinman dated Jun. 6, 2021, filed by Applicant in the United States Patent and Trademark Office, in Inter Partes Review of U.S. Pat. No. 10,621,228, IPR2021-01413.
Declaration of Professor Glenn Reinman, Ph.D., regarding U.S. Pat. No. 10,621,228, dated Dec. 17, 2021 (68 pages).
Declaration of Rajeev Surati, Ph.D. regarding U.S. Pat. Nos. 10,621,228 and 10,423,658, dated Feb. 23, 2022 (91 pages).
Declaration of Rajeev Surati, Ph.D., regarding U.S. Pat. No. 11,017,020, dated Mar. 14, 2022 (30 pages).
Declaration of Rajeev Surati, Ph.D., regarding U.S. Pat. No. 9,552,376, dated Apr. 13, 2022 (77 pages).
Declaration of Riana J. Freedman, entered Jul. 13, 2022, by *Apple Inc.*, in the United States Patent and Trademark Office, in Post-Grant Review of U.S. Pat. No. 11,017,020, PGR2022-00006 (2 pages).
Defendant's Opening Claim Construction Brief, Exhibit 1: U.S. Pat. No. 10,423,658 in Construction of Terms 1-8, 10, Civil Action No. 21-cv-411, in the United States District Court for the Western District of Texas (Waco Division), Mar. 28, 2022.
Defendant's Opening Claim Construction Brief, Exhibit 10: Notice of Final Office Action in U.S. Appl. No. 14/193,426, dated Nov. 20, 2015, by the United States Patent and Trademark Office, in Construction of Term 5, Civil Action No. 21-cv-411, in the United States District Court for the Western District of Texas (Waco Division), Mar. 28, 2022.
Defendant's Opening Claim Construction Brief, Exhibit 11: Notice of Non-Final Office Action in U.S. Appl. No. 14/193,426, dated Apr. 15, 2016, by the United States Patent and Trademark Office, in Construction of Term 5, Civil Action No. 21-cv-411, in the United States District Court for the Western District of Texas (Waco Division), Mar. 28, 2022.
Defendant's Opening Claim Construction Brief, Exhibit 12: Response to Non-Final Office Action dated Apr. 15, 2016, in U.S. Appl. No. 14/193,426, filed May 5, 2016, in the United States Patent and Trademark Office, in Construction of Term 5, Civil Action No. 21-cv-411, in the United States District Court for the Western District of Texas (Waco Division), Mar. 28, 2022.
Defendant's Opening Claim Construction Brief, Exhibit 13: Notice of Final Office Action in U.S. Appl. No. 14/193,426, dated Jun. 3, 2016, by the United States Patent and Trademark Office, in Construction of Term 5, Civil Action No. 21-cv-411, in the United States District Court for the Western District of Texas (Waco Division), Mar. 28, 2022.
Defendant's Opening Claim Construction Brief, Exhibit 14: Second Preliminary Amendment in U.S. Appl. No. 15/375,927, filed Mar. 16, 2017, in the United States Patent and Trademark Office, in Construction of Term 5, Civil Action No. 21-cv-411, in the United States District Court for the Western District of Texas (Waco Division), Mar. 28, 2022.
Defendant's Opening Claim Construction Brief, Exhibit 15: Notice of Allowance in U.S. Appl. No. 15/375,927, dated Jul. 15, 2019, by the United States Patent and Trademark Office, in Construction of Term 5, Civil Action No. 21-cv-411, in the United States District Court for the Western District of Texas (Waco Division), Mar. 28, 2022.
Defendant's Opening Claim Construction Brief, Exhibit 16: Kisilevich, S. et al., "Event-based analysis of people's activities and behavior using Flickr and Panoramio geotagged photo collections," 14$^{th}$ International Conference Information Visualization, pp. 289-296, 2010 IEEE, in Construction of Term 5, Civil Action No. 21-cv-411, in the United States District Court for the Western District of Texas (Waco Division), Mar. 28, 2022.
Defendant's Opening Claim Construction Brief, Exhibit 17: Kustanowitz, J. et al., "Motivating Annotation for Personal Digital Photo Libraries: Lowering Barriers while Raising Incentives," Tech. Report HCIL-2004-18, U. Maryland, 2005, in Construction of Term 5, Civil Action No. 21-cv-411, in the United States District Court for the Western District of Texas (Waco Division), Mar. 28, 2022.
Defendant's Opening Claim Construction Brief, Exhibit 18: *Concise Oxford English Dictionary*, p. 1219, Oxford University Press, in Construction of Term 6, Civil Action No. 21-cv-411, in the United States District Court for the Western District of Texas (Waco Division), Mar. 28, 2022.
Defendant's Opening Claim Construction Brief, Exhibit 19: *Collins English Dictionary*, p. 443, HarperCollins Publishers, ISBN13: 978-0-00-783277-4, 2008, in Construction of Term 6, Civil Action No. 21-cv-411, in the United States District Court for the Western District of Texas (Waco Division), Mar. 28, 2022.
Defendant's Opening Claim Construction Brief, Exhibit 2: U.S. Pat. No. 10,621,228, in Construction of Terms 1, 2, 4, 6, Civil Action No. 21-cv-411, in the United States District Court for the Western District of Texas (Waco Division), Mar. 28, 2022.
Defendant's Opening Claim Construction Brief, Exhibit 20: *Collins English Dictionary*, p. 1392, HarperCollins Publishers, ISBN13: 978-0-00-732119-3, 2009, in Construction of Term 6, Civil Action No. 21-cv-411, in the United States District Court for the Western District of Texas (Waco Division), Mar. 28, 2022.
Defendant's Opening Claim Construction Brief, Exhibit 21: *Merriam-Webster's Advanced Learner's English Dictionary*, p. 1291 Merriam-Webster, Incorporated, ISBN13: 978-0-87779-551-3, 2008, in Construction of Term 10, Civil Action No. 21-cv-411, in the United States District Court for the Western District of Texas (Waco Division), Mar. 28, 2022.
Defendant's Opening Claim Construction Brief, Exhibit 22: *New Oxford American Dictionary, Third Edition*, p. 1394, Oxford University Press, ISBN13: 978-0-19-539288-3, 2010, in Construction of Term 10, Civil Action No. 21-cv-411, in the United States District Court for the Western District of Texas (Waco Division), Mar. 28, 2022.
Defendant's Opening Claim Construction Brief, Exhibit 3: U.S. Pat. No. 11,163,823 in Construction of Terms 1, 9, Civil Action No. 21-cv-411, in the United States District Court for the Western District of Texas (Waco Division), Mar. 28, 2022.
Defendant's Opening Claim Construction Brief, Exhibit 4: Deposition of Henry H. Houh, Ph.D. in Support of Samsung's Proposed Claim Constructions, in Construction of Terms 1-3, 5-10, Civil Action No. 21-cv-411, in the United States District Court for the Western District of Texas (Waco Division), Mar. 28, 2022.
Defendant's Opening Claim Construction Brief, Exhibit 5: Gibson, R. & Schuyler, E., *Google Maps Hacks*, p. 198, O'Reilly Media, Inc., ISBN13: 978-596-10161-9, Jan. 2006, in Construction of Term 1, Civil Action No. 21-cv-411, in the United States District Court for the Western District of Texas (Waco Division), Mar. 28, 2022.
Defendant's Opening Claim Construction Brief, Exhibit 6: Pogue, D., *iPhone—The Missing Manual*, pp. 108-109, O'Reilly Media, Inc., ISBN13: 98-0-596-52167-7, Aug. 2008, in Construction of Term 1, Civil Action No. 21-cv-411, in the United States District Court for the Western District of Texas (Waco Division), Mar. 28, 2022.
Defendant's Opening Claim Construction Brief, Exhibit 7: Newton, H., *Newton's Telecom Dictionary*, p. 928, Flatiron Publishing, ISBN13: 978-097938-731-9, Mar. 2008, in Construction of Term 2, Civil Action No. 21-cv-411, in the United States District Court for the Western District of Texas (Waco Division), Mar. 28, 2022.
Defendant's Opening Claim Construction Brief, Exhibit 8: Lindley, C. A., *Photographic Imaging Techniques in C++*, pp. 390-391, 400, John Wiley & Sons, Inc., IBSN13: 0-471-11568-1, 1995, in Construction of Term 2, Civil Action No. 21-cv-411, in the United States District Court for the Western District of Texas (Waco Division), Mar. 28, 2022.

(56) References Cited

OTHER PUBLICATIONS

Defendant's Opening Claim Construction Brief, Exhibit 9: U.S. Pat. No. 10,423,658 Infringement Claim Chart, Samsung's Initial Invalidity Contentions, in Construction of Term 5, Civil Action No. 21-cv-411, in the United States District Court for the Western District of Texas (Waco Division), Mar. 28, 2022.
Defendant's Opening Claim Construction Brief, *MemoryWeb, LLC v. Samsung Electronics Co., Ltd. (A Korean Company ) and Samsung Electronics America, Inc.*, Civil Action No. 21-cv-411, in the United States District Court for the Western District of Texas (Waco Division), Mar. 28, 2022 (36 pages).
Defendant's Reply Claim Construction Brief, Exhibit 23: demonstrative exhibit from Dr. Houh deposition, in Construction of Term 5, Civil Action No. 21-cv-411, in the United States District Court for the Western District of Texas (Waco Division), May 3, 2022.
Defendant's Reply Claim Construction Brief, Exhibit 24: Plaintiff *MemoryWeb LLC's* Initial Disclosure of Extrinsic Evidence, filed Mar. 15, 2022, in Construction of Term 5, Civil Action No. 21-cv-411, in the United States District Court for the Western District of Texas (Waco Division), May 3, 2022.
Defendant's Reply Claim Construction Brief, Exhibit 25: Merriam-Webster, "overlap," retrieved from the internet on Mar. 13, 2022, available online at URL: https://web.archive.org/web/20140112013135/http://www.merriam-webster.com/dictionary/overlap ; in Construction of Term 5, Civil Action No. 21-cv-411, in the United States District Court for the Western District of Texas (Waco Division), May 3, 2022.
Defendant's Reply Claim Construction Brief, Exhibit 26: Cambridge Dictionary, "overlap," retrieved from the internet on Mar. 13, 2022, available online at URL: https://dictionary.cambridge.org/us/dictionary/english/overlap ; in Construction of Term 5, Civil Action No. 21-cv-411, in the United States District Court for the Western District of Texas (Waco Division), May 3, 2022.
Defendant's Reply Claim Construction Brief, Exhibit 27: U.S. Patent Application Publication No. 2006/0165380 A1, dated Jul. 27, 2006, in Construction of Term 5, Civil Action No. 21-cv-411, in the United States District Court for the Western District of Texas (Waco Division), May 3, 2022.
Defendant's Reply Claim Construction Brief, Exhibit 28: *Samsung's* Initial Infringement Contentions—U.S. Pat. No. 11,163,823—Infringement Claim Chart, in Construction of Term 10, Civil Action No. 21-cv-411, in the United States District Court for the Western District of Texas (Waco Division), May 3, 2022.
Defendant's Reply Claim Construction Brief, *MemoryWeb, LLC v. Samsung Electronics Co., Ltd. (A Korean Company) and Samsung Electronics America, Inc.*, Civil Action No. 21-cv-411, in the United States District Court for the Western District of Texas (Waco Division), May 3, 2022 (90 pages).
Diosanagroup, "VA-90.02 Adding title, description and tags to pics in Flickr," YouTube.com, published online on Dec. 11, 2010, at https://www.youtube.com/watch?v=1EBk4DPZ5wM.
Dörk, M. et al., "VisGets: Coordinated Visualizations for Web-based Information Exploration and Discovery," IEEE Transactions on Visualization and Computer Graphics, vol. 14, No. 6, published Nov./Dec. 2008.
Easy Photo Website, "Tagging People in Flickr," YouTube.com, published online on Jun. 22, 2011, at https://www.youtube.com/watch?v=5Onr-M3SARw.
Edmonds, R., "GeoPhotos for Windows Phone allows editing and adding of geotags to your memories," WindowsCentral.com, published online on Aug. 13, 2013, at https://www.windowscentral.com/geophoto-windows-phone-add-edit-geotags.
Engst, A. C., *iPhoto '09 for Mac OS X: Visual Quickstart Guide*, Peachpit Press, ISBN 13: 978-0-321-60131-6, 2009 (242 pages).
Expert Village Leaf Group, "Using Flickr to Share Photos: How to Use the Flickr Explore Tab," YouTube.com, published online on Oct. 24, 2008, at https://www.youtube.com/watch?v=JN7GiLah_Ts.

Ferre, "CAMELIS: Organizing and Browsing a Personal Photo Collection with a Logical Information System", Int. Conf. Concept Lattices and Their Applications, pp. 112-123, 2007, HAL.
File History of U.S. Pat. No. 10,621,228.
File History of U.S. Pat. No. 6,714,215.
Flickr, "Flickr Maps Tour," Flickr.com, published online at http://www.flickr.com:80/tour/maps ; Archived on Feb. 9, 2010, at https://web.archive.org/web/20100209013357/http://http://www.flickr.com:80/tour/maps.
Flickr, "Flickr FAQ: Collections," Flickr.com, published online at http://www.flickr.com/help/collections; Archived on Feb. 10, 2010, at https://web.archive.org/web/20100210083921/http://www.flickr.com/help/collections.
Flickr, "Flickr FAQ: Galleries" Flickr.com, published online at, http://www.flickr.com/help/galleries; Archived on Feb. 16, 2010, at https://web.archive.org/web/20100216162228/http://www.flickr.com/help/galleries.
Flickr, "Flickr FAQ: People in Photos," Flickr.com, published online at http://www.flickr.com/help/people; Archived on Feb. 10, 2010, at http://web.archive.org/web/20100210111724/help/people.
Flickr, "Flickr FAQ: Photos," Flickr.com, published online at http://www.flickr.com/help/photos/ ; Archived on Feb. 14, 2010, at https://web.archive.org/web/20100214153152/http://www.flickr.com/help/photos.
Flickr, "Flickr FAQ: The Map," Flickr.com, published online at http://www/flickr.com/help/map ; Archived on Feb. 10, 2010, at https://web.archive.org/web/20100210111719/http://www.flickr.com/help/map.
Flickr, "Flickr FAQ: Video," Flickr.com, published online at http://www.flickr.com/help/video; Archived on Feb. 8, 2010, at https://web.archive.org/web/20100208125754/http://www.flickr.com/help/video.
Flickr, "Flickr! It's made of people!," Flickr.com, published online on Oct. 21, 2009, at https://blog.flickr.net/en/2009/10/21/people-in-photos/.
Fong, K., "Google Picasa 3.5," MacWorld.com, published online on Nov. 2, 2009.
Frederick County Public Schools, "Picasa Introduction and Tutorial," Apr. 14, 2010.
Freedman, C., *Yahoo! Maps Mashups*, Wiley Publishing, Inc., ISBN: 978-0-470-09778- 6, 2007.
Geeks on Tour, "Geotagging Photos With Picasa 3.5," YouTube.com, published online on Sep. 25, 2009, at https://www.youtube.com/watch?app=desktop&v=S7aBwCU7e1I.
Gentile, L; "Using Flickr Geotags to Find Similar Tourism Destinations"; master thesis, 2011; Politecnico di Milano, Dept. of Computer Engineering (96 pages).
Gilbertson, S., "Picasa Photo App Gets better at Recognizing Faces, Locations," Wired.com, published online on Sep. 22, 2009.
Giorgi Lekveishvili, "Google Picasa Web Album #2," YouTube.com, published online on Sep. 3, 2008, at https://www.youtube.com/watch?v=d_x3j2Awkc0.
Girgensohn, A. et al., "Flexible Access to Photo Libraries via Time, Place, Tags, and Visual Features," JCDL'10, pp. 187-196, Gold Coast, Queensland. Australia, Jun. 21- 25, 2010.
Girgensohn, A. et al., "Leveraging Face Recognition Technology to Find and Organize Photos," MUR'04, pp. 99-106, New York, New York, USA, Oct. 15-16, 2004.
Goldman J., "Geotagging photos the Google way (photos)," CNET.com, published online on Dec. 15, 2009, at https://www.cnet.com/pictures/geotagging-photos-the-google-way-photos/.
Gomi, A. & Itoh, T., "A Personal Photograph Browser for Life Log Analysis based on Location, Time, and Person," SAC'11, TaiChung, Taiwan, Mar. 21-25, 2011.
Goodman, E.; "Destination Services: Tourist media and networked places"; School of Information, UC Berkeley; Mar. 2, 2007 (11 pages).
Google Code, "Google Maps API Reference," published online at http://code.google.com/apis/maps/documentation/reference.html ; Archived on Feb. 23, 2010, at https://web.archive.org/web/20100223005330/http://code.google.com/apis/maps/documentation/reference.html.

(56) References Cited

OTHER PUBLICATIONS

Google Developers, "Customizing a Google Map: Custom Markers," last accessed Feb. 17, 2022.
Google Earth, "Learn Google Earth: Geotagging Photos," YouTube.com, published online on Aug. 24, 2010, at https://www.youtube.com/watch?app=desktop&v=zwQgD95C9T4.
Google, "Picasa and Picasa Web Albums Help," Picasa.Google.com, published online on Dec. 7, 2009, at http://picasa.google.com/support/bin/answer.py?hl=en_US&answer=161869&ctx=featuresGeo ; Archived on Feb. 14, 2010, at https://web.archive.org/web/20100214201015/http://picasa.google.com/support/bin/answer.py?hl=en_US&answer=161869&ctx=featuresGeo.
Google, "What's new in Picasa 3.5," YouTube.com, published online on Sep. 15, 2009, at https://www.youtube.com/watch?v=gYO2uhrIZJ4.
Graham, J., "Flickr of idea on a gaming project led to photo website," USAToday.com. published online on Feb. 27, 2006.
Greenbaum, H., "Who Made Google's Map Pin?" The New York Times, published online on Apr. 18, 2011.
Greisdorf, H. F. & O'Connor, B. C., *Image Collections Chauvet-Pont-d' Arc to Flickr—Structure of Image Collections*, Libraries Unlimited, ISBN-13: 978-1-59158-375-2, 2008.
Grey, T., *Adobe Photoshop Lightroom Workflow: The Digital Photographer's Guide*, Wiley Publishing, Inc., ISBN: 978-0-470-11919-8 (2007).
GSMactiesNL, "Instagram 3.0—Photo Maps Walkthrough," YouTube.com, published online on Aug. 17, 2012, at https://www.youtube.com/watch?v=MZ-2Ww9xl-o.
Guld, C., "Picasa 3 and Video Files," PicasaGeeks.com, published online on Dec. 4, 2008, at https://picasageeks.com/2008/12/picasa-3-and-video-files/.
Hall, M., "Contextual Mobile Adaptation," Thesis submitted to the University of Glasgow, Department of Computer Science, May 2008.
Hamburger, E., "Instagram 3.0 bets on location with Photo Map, adds infinite scrolling," The Verge.com, published online on Aug. 16, 2012 at https://www.theverge.com/2012/8/16/3246690/instagram-3-0-photo-map-iphone-android.
Hanke, J., "A picture's worth a thousand clicks," The Official Google Blog, published online on May 30, 2007, at https://googleblog.blogspot.com/2007/05/pictures-worth-thousand-clicks.html ; Archived on Jun. 1, 2007, at https://web.archive.org/web/20070601162006/https://googleblog.blogspot.com/2007/05/pictures-worth-thousand-clicks.html.
Hao, Q. et al., "Generating Location Overviews with Images and Tags by Mining User-Generated Travelogues," MM'09, pp. 801-804, Beijing, China, Oct. 19-24, 2009.
Hartsell, T., "In the privacy of our homes," Code.Flickr.net, published online on Aug. 30, 2011, at https://code.flickr.net/2011/08/30/in-the-privacy-of-our-homes/.
Henderson, J., "How to Create Flickr Slideshows," MakeUseOf.com, published online on Jan. 11, 2009, at https://www.makeuseof.com/tag/flickr-slideshows-easy-but-good/ ; Archived on Jan. 18, 2009, at http://web.archive.org/web/20090118231209/https://www.makeuseof.com/tag/flickr-slideshows-easy-but-good/.
Heussner, K. M., "Creepy or Convenient? Apps for Tracking, Keeping Tabs," ABCNews.com, published online on Mar. 1, 2011, at https://abcnews.go.com/Technology/smartphone-apps-tracking-keeping-tabs-past-lovers-people/story?id=13022144.
Hoffman, A.; "Create Great iPhone Photos: Apps, Tips, Tricks, and Effects"; copyright 2011; ISBN-10: 1-59327-285-5, ISBN-13: 978-1-59327-285-2 (216 pages).
Hollenstein, L.; "Capturing Vernacular Geography from Georeferenced Tags"; Master Thesis; Institute of Geography, University of Zurich; Nov. 2008 (139 pages).
Holloway, J., "Instagram 3.0 adds Photo Maps," NewAtlas.com, published online on Aug. 16, 2012, at https://newatlas.com/instagram-3-maps/23735/.
Holzner, S., *Sams Teach Yourself Flickr® in 10 Minutes*, Pearson Education, Inc., ISBN-13: 978-0-672-33095-7, 2010.
HTC Corporation, "HTC Hero User Manual," 2009.
ILife '09 Retail Case Label.
ILife '09 Retail CD Label, 2009.
ILife '09 Retail Instructions, 2009.
Ina-Maria, "Panoramio World Map Italty Liguria Riomaggiore," Panoramio.com, published online at http://www.panoramio.com/photo/26776175 ; Archived on Nov. 14, 2009, at https://www.web.archive.org/web/20091114165935/http://www.panoramio.com/photo/26776175.
Internet Services and Social Networks Tutorials from HowTech, "How to Get Google Maps Latitude Longitude," YouTube.com, published online on Mar. 4, 2013, at https://www.youtube.com/watch?v=pZ8a1aadfBc.
IPTC—NAA Information Interchange Model Version No. 4, Rev. Jul. 1, 1999 (72 pages).
IPTC—NAA Information Interchange Model Version No. 4, Rev. Jul. 1, 1999., Exhibit 1037 of Smith Declaration entered Jul. 13, 2022, in Post-Grant Review of U.S. Pat. No. 11,017,020, PGR2022-00006 (72 pages).
Isenberg, D., "Pixamo—INC, AG, or OOO?" (N9-806-123), President and Fellows of Harvard College, published Feb. 9, 2006.
Jaffe et al., "Generating Summaries and Visualization for Large Collections of GeoReferenced Photographs", MIR'06, pp. 89-98, 2006 ACM.
Japan Electronics and Information Technology Industries Association (JEITA), "JEITA Standards > Please Read First," available online at URL: https://www.jeita.or.jp/english/standard/readme.htm ; retrieved from the internet on Jun. 29, 2022, Exhibit 1065 of Freedman Declaration, in Post-Grant Review of U.S. Pat. No. 11,017,020, PGR2022-00006 (2 pages).
Jindrich Sarson, "Using geotagged photos in Flickr," YouTube.com, published online on Apr. 28, 2010, at https://www.youtube.com/watch?v=NA5jsNh9eNw.
Jing, F. et al., "VirtualTour: An Online Travel Assistant Based on High Quality Images," MM'06 , pp. 599-602, Santa Barbara, California, USA, Oct. 23-27, 2006.
Johnhildreth, "TechTalk: Flickr Maps," YouTube.com, published online on Apr. 10, 2008, at https://www.youtube.com/watch?v=KXjoJQWqtTQ.
Johnson, G., "Kodak Systems Puts on Audio CD," Los Angeles Times, published Jul. 31, 1992.
Kadar, B. et al.; "Where Do Tourists Go? Visualizing and Analysing the Spatial Distribution of Geotagged Photography"; Cartographica 48:2, pp. 78-88; 2013; University of Toronto Press; doi: 10.3138/carto.48.2.1839 (11 pages).
Kang et al., "Capture, Annotate, Browse, Find, Share: Novel Interfaces for Personal Photo Management", International Journal of Human-Computer Interaction, 23(3), pp. 315-337, 2007, Lawrence Eribaum Associates, Inc.
Kang, H. & Shneiderman, B., "Visualization Methods for Personal Photo Collections: Browsing and Searching in the PhotoFinder," Department of Computer Science, Human- Computer Interaction Laboratory, University of Maryland at College Park, 2000.
Kang, H., "Managing and Exploring Personal Media Using Semantic Regions: A Spatial Interface Supporting User-Defined Mental Models," Dissertation submitted to the Faculty of the Graduate School of the University of Maryland, College Park, in partial fulfillment of the requirements for the degree of Doctor of Philosophy, 2003.
Kennedy, L. et al.; "How Flickr Helps US Make Sense of the World: Context and Content in Community-Contributed Media Collections"; MM '07, Sep. 23-28, 2007; Augsburg, Bavaria, Germany; Copyright 2007; ACM 978-1-59593-701-8/07/0009 (10 pages).
Khalid, H., "The New iOS 7 Photos App with Timeline View & ImageEffects," AddictiveTips.com, published online on Sep. 18, 2013, at https://www.addictivetips.com/ios/ios-7-photos-app-with-timeline-view-image-effects/Archived on Sep. 22, 2013, at https://web.archive.org/web/20130922025653/https://www.addictivetips.com/ios/ios-7-photos-app-with-timeline-view-image-effects.
Kim, K.- S et al., "Stick Viz: A New Visualization Tool for Phenomenon-based k-Neighbors Searches in Geosocial Networking Services," 2010 12th International Asia-Pacific Web Conference, pp. 22-28, 2010.

(56) References Cited

OTHER PUBLICATIONS

Kisilevich et al., "Event-based analysis of People's Activities and Behavior Using Flickr and Panoramio Geotagged Photo Collections", 14th International Conference Information Visualization, pp. 289-296, 2010 IEEE.
KML4Earth, "Google Earth/Maps Public Icons," published online at http://kml4earth.appspot.com:80/icons.html ; Archived on May 27, 2012, at https://web.archive.org/web/20120527122157/http://km14earth.appspot.com:80/icons.html.
Kopf et al., "Deep photo: model-based photograph enhancement and viewing", ACM Transactions on Graphics, vol. 27, No. 5, Article 116, Dec. 2008, ACM (10 pages).
Kunkle, R. & Morton, A., Building Flickr Application with PHP, Apress, ISBN-13: 978-1-59059-612-8, 2006.
Kustanowitz et al., "Motivating Annotation for Personal Digital Photo Libraries: Lowering Barriers while Raising Incentives," Tech. Report HCIL-2004-18, U. Maryland, 2005 (10 pages)+ A11A3A1:A7A1:A18A3A1:A7AA1:A482.
Lacerda, Y. et al., "PhotoGeo: a self-organizing system for personal photo collections," 10th IEEE International Symposium on Multimedia, pp. 258-265, Dec. 15-17, 2008.
Larson, R. R., "Geographic Information Retrieval and Spatial Browsing," in L.C. Smith and M. Gluck (eds) *Geographic information systems and libraries: patrons, maps, and spatial information* (papers presented at the 1995 Clinic on Library Applications of Data Processing), pp. 81-123, Apr. 10-12, 1995.
Latif, K. et al., "An Approach for a Personal Information Management System for Photos for a Lifetime by Exploiting Semantics," DEXA'06: Proceedings of the 17th International Conference on Database and Expert Systems Applications, pp. 467-477, published online Sep. 4, 2006.
Lefebvre, R., "How to See Where You Took Your Photos at on Your Phone," CultofMac.com, published online on Feb. 17, 2014.
Leonhard, W., *Windows Vista All-in-One Desk Reference for Dummies*, Wiley Publishing, Inc., ISBN-13: 978-0-471-74941-7 (2007).
LiveSmart BC, "King Tide Tutorial—FLICKR—Geotag," YouTube. com, published online on Nov. 25, 2011, at https://www.youtube.com/watch?v=vdgVFyCxjeA.
Lowensohn, J., "Newbie's Guide to Flickr," CNET.com, published online on Jun. 23, 2008, at https://www.cnet.com/tech/services-and-software/newbies-guide-to-flickr/.
Lowensohn, J., "Picasa 3.5 brings facial recognition to the desktop," CNET.com, published online on Sep. 22, 2009.
Macworld Staff, "Macworld Expo Best of Show," Mac World.com, published online on Jan. 7, 2009, at http://www.macworld.com/article/138002-2/2009/01/bos2009.html?sr=hotnews ; Archived on Jan. 13, 2009, at https://web.archive.org/web/20090113175422mp_/http://www.macworld.com/article/138002-2/2009/01/bos2009.html?sr=hotnews.
Madirakshi, D. et al., "Event-based Location Matching for Consumer Image Collections," CIVR'08, pp. 339-347, Niagara Falls, Ontario, Canada, Jul. 7-9, 2008.
Malka, M., "iPhoto '09 Review," KillerSites.com, published online on May 22, 2009, at http://www.killersites.com/magazine/2009/iphoto-09-review/ ; Archived on May 26, 2009, at https://www.web.archive.org/web/20090901000000*/http://www.killersites.com/magazine/2009/iphoto-09-review/.
Marco et al., "Location privacy and public metadata in social media platforms: attitudes, behaviors and opinions," Springer Science + Business Media New York, 2014 (31 pages).
McCracken, H., "Picasa Gets Face Recognition, Built-in Google Maps," Technologizer.com, published online on Sep. 22, 2009.
Metadata Working Group, "Guidelines for Handling Image Metadata Version 1.0," Sep. 2008, Archived on Feb. 6, 2009, at https://web.archive.org/web/20090206012835/http://metadataworkinggroup.org/pdf/mwg_guidance.pdf (42 pages).
Metadata Working Group, "Guidelines for Handling Image Metadata Version 1.0," Sep. 2008, Archived on Feb. 6, 2009, at URL:https://web.archive.org/web/20090206012835/http://metadataworkinggroup.org/pdf/mwg_guidance.pdf ; Exhibit 1038 of Kushan Declaration entered Jul. 13, 2022, in Post-Grant Review of U.S. Pat. No. 11,017,020, PGR2022-00006 (42 pages).
Microsoft Store, "Get Photo Location Viewer" Microsoft.com, originally published online at https://www.microsoft.com/en-us/p/photo-location-viewer/9wzdncrdg8kl?activetab=pivot:overviewtab.
Microsoft, "Microsoft Store—GetGeoPhoto," published online at https://www.microsoft.com/en-us/p/geophoto-geotag-map-slideshow/9wzdncrfj0f2#activetab=pivot:overviewtab.
Microsoft, "The taskbar (overview)," Windows.Microsoft.com, originally published online at http://windows.microsoft.com/en-us/windows7/The-taskbar-overview ; archived on Dec. 29, 2009, at https://web.archive.org/web/20091229005652/http://windows.microsoft.com/en-us/windows7/The-taskbar-overview.
Microsoft, "Various marketing materials for GeoPhoto,"
Microsoft, "Various marketing materials for Photo Location Viewer,"
Milian, M., "Digital Photos can reveal your location raise privacy fears," CNN.com. published online Oct. 15, 2010.
Miller et al., "Give and take: a study of consumer photo-sharing culture and practice," CHI '07 Proceedings of the SIGCHI Conference on Human Factors in Computing Systems, pp. 347-356, 2007 (10 pages).
Monmonier, M., "Webcams, Interactive Index Maps, and Our Brave New World's Brave New Globe," Cartographic Perspectives, No. 37, pp. 51-64, Fall 2000.
Naaman, M. et al., "Automatic Organization for Digital Photographs with Geographic Coordinates," JCDL '04, pp. 53-62, Tucson, Arizona, USA, Jun. 7-11, 2004.
National Aeronautics and Space Administration, "Space Station Assembly—Baikonur Cosmosphere," Retrieved from the Internet on Sep. 1, 2021, https://web.archive.org/web/20060928234623/http://www.nasa.gov/misson_pages/station/structure/elements/baikonur.html/; alleged by Unified Patents to have been published on Sep. 28, 2006 (3 pages).
Net101training, "What is Panoramio?," YouTube.com, published online on May 18, 2012, at https://www.youtube.com/watch?v=t3A0jZuBfSU.
Nguyen, Q. M. et al., "Tagnsearch: Searching and navigating geo-referenced collections of photographs," ECDL 2008, LNCS 5173, pp. 62-73, Sep. 2008.
Niccolai, J., "Google to buy location-based photo site Panoramio," Networkorld.com, published online on May 31, 2007, at https://www.networkworld.com/article/2290566/google-to-buy-location-based-photo-site-panoramio.html#:~:text=Google%20is%20acquiring%20Panoramio%2C%20a,be%20viewed%20by%20the%20public.
Nutanong, S. et al.; "An Efficient Layout Method for a Large Collection of Geographic Data Entries"; Center for Automation Research, Institute for Advanced Computer Studies, Dept. of Computer Science, University of Maryland; pp. 717-720 (4 pages).
O'Neill, M., "How to Geotag Your Flickr Photos on Google Maps & Earth," MakeUseOf.com, published online on Oct. 21, 2009 ; Archived on Oct. 24, 2010, at http://web/archive.org/web/20091024050010/https://www.makeuseof.com/tag/how-to-geo-tag-upload-your-photos-to-google-maps-google-earth/.
O'Neill, M., "How to Geotag Your Panoramio Photos on Google Maps & Earth," MakeUseOf.com, published online on Oct. 21, 2009, at https://www.makeuseof.com/tag/how-to-geo-tag-upload-your-photos-to-google-maps-google-earth.
Oracle, "Oracle intermedia User's Guide and Reference Release 8.1.7 Part No. A85336-01," Sep. 2000.
Oracle, "Oracle Spatial Users Guide and Reference Release 8.1.7 Part No. A85337-01," Sep. 2000.
Oracle, "Oracle® interMedia User's Guide 10g Release 2 (10.2) B14302-01," Jun. 2005.
Order details from a purchase of *Apple Aperture 3 Academic Software DVD with Serial Code* from eBay on Sep. 17, 2021, Exhibit 1052 of Smith Declaration entered Jul. 13, 2022 (1 page).
Panoramio, "About Panoramio," Panoramio.com, published online at http://www.panaramio.com/about ; Archived on Apr. 5, 2007, at https://web.archive.org/web/20070405220527/http:/www.panoramio.com/about/.
Panoramio, "Panoramio—Help—Adding Photos," Panoramio.com, published online at http://www.panoramio.com/help/adding_

(56) References Cited

OTHER PUBLICATIONS photos; Archived on Mar. 28, 2010, at https://web.archive.org/web/20100328220626/http:/www.panoramio.com/help/adding_photos.
Panoramio, "Panoramio—Help—Embedding a Panoramio map into your web page," Panoramio.com, published online at http://www.panoramio.com/help/embedding ; Archived on Mar. 28, 2010, at https://web.archive.org/web/20100328220929/http://www.panoramio.com/help/embedding.
Panoramio, "Panoramio—Help—Embedding a Panoramio map into your web page," Panoramio.com, published online at http://www.panoramio.com:80/help/embedding ; Archived on Mar. 28, 2010, at https://web.archive.org/web/20100328215828/http://www.panoramio.com:80/help/embedding.
Panoramio, "Panoramio—Help—Viewing Photos," Panoramio.com, published online at http://www.panoramio.com/help/viewing_photos ; Archived on Mar. 30, 2010, at https://web.archive.org/web/20100330104002/http:/www.panoramio.com/help/viewing_photos.
Panoramio, "Panoramio—Help," Panoramio.com, published online at http://www.panoramio.com/help/ ; Archived on Jun. 4, 2007, at https://web.archive.org/web/20070604095523/http:/www.panoramio.com/help/.
Panoramio, "Panoramio—Map," Panoramio.com, published online at http://www.panoramio.com/map/; Archived on Mar. 28, 2010, at https://web.archive.org/web/20100328220929/http://www.panoramio.com/map/.
Panoramio, "Panoramio—Photo of Bilderbuchdorf Manarola," Panoramio.com, published online at http://www.panoramio.com/photo/26776175 ; Archived on Nov. 14, 2009, at https://www.web.archive.org/web/20091114165935/http://www.panoramio.com/photo/26776175.
Panoramio, "Panoramio—Photos by Eduardo Manchón—Bergamo", Panoramio.com, published online at http://www.panoramio.com/user/7/tags/bergamo ; Archived on Feb. 21, 2007, at http://www.web.archive.org/web/20070221020400/http://www.panoramio.com/user/7/tags/bergamo.
Panoramio, "Panoramio—Photos by Eduardo Manchón—Friends," Panoramio.com, published online at http://www.panoramio.com/user/7/tags/friends ; Archived on Feb. 20, 2007, at https://web.archive.org/web/20070220185952/http://www.panoramio.com/user/7/tags/friends.
Panoramio, "Panoramio—Photos by Eduardo Manchón—New York," Panoramio.com, published online at http://www.panoramio.com/user/7/tags/new%20york ; Archived on Jun. 30, 2007, at https://web.archive.org/web/20070630005005/http://www.panoramio.com/user/7/tags/new%20york.
Panoramio, "Panoramio—Photos by Eduardo Manchón," Panoramio.com, published online at http://www.panoramio.com/user/7 ; Archived on Jul. 2, 2007, at https://web.archive.org/web/20070702024855/http://www.panoramio.com/user/7.
Panoramio, "Panoramio—Untitled Photo," Panoramio.com, published online at http://www.panoramio.com:80/photo/107 ; Archived on Feb. 24, 2008, at https://web.archive.org/web/20080224215610/http://www.panoramio.com:80/photo/107.
Panoramio, "Panoramio API—Display photos from Panoramio on your own website," Panoramio.com, published online at http://www.panoramio.com/api/data/api.html ; Archived on May 29, 2010, at https://web.archive.org/web/20100529022726/http://www.panoramio.com/api/data/api.html.
Panoramio, "Panoramio Home Page," Panoramio.com, published online at http://www.panoramio.com/ , ; Archived on Aug. 23, 2010, at https://web.archive.org/web/20100823001016/http:/www.panoramio.com.
Panoramio, "Panoramio Widget API Reference," Panoramio.com, published online at http://www.panoramio.com/api/widget/reference.html ; Archived on Aug. 28, 2013, at https://web.archive.org/web/20130828205856/http://www.panoramio.com/api/widget/reference.html.
Papadapoulos, S. et al., "ClustTour: City Exploration by use of Hybrid Photo Clustering," MM'10, pp. 1617-1620, Firenze, Italy, Oct. 25-29, 2010.

Patent Owner's Evidence Objections, filed Jul. 14, 2022, by Applicant in the United States Patent and Trademark Office, to Petition for Inter Partes Review of U.S. Pat. No. 9,552,376, IPR2022-00032 (20 pages).
Patent Owner's Notice of Deposition of Dr. Benjamin B. Bederson, Ph.D, filed May 6, 2022, by Applicant in the United States Patent and Trademark Office, in Inter Partes Review of U.S. Pat. No. 10,621,228, IPR2021-01413.
Patent Owner's Notice of Deposition of Kevin Jakel, filed May 6, 2022, by Applicant in the United States Patent and Trademark Office, in Inter Partes Review of U.S. Pat. No. 10,621,228, IPR2021-01413.
Patent Owner's Objections to Evidence, filed Jun. 28, 2022, by Applicant in the United States Patent and Trademark Office, in Inter Partes Review of U.S. Pat. No. 10,621,228, IPR2022-00222 (7 pages).
Patent Owner's Objections to Evidence, filed Jun. 28, 2022, by Applicant in the United States Patent and Trademark Office, in Post-Grant Review of U.S. Pat. No. 11,017,020, PGR2022-00006 (21 pages).
Patent Owner's Objections to Evidence, filed Jun. 6, 2022, by Applicant in the United States Patent and Trademark Office, in Inter Partes Review of U.S. Pat. No. 10,423,658 B2, IPR2022-00033 (20 pages).
Patent Owner's Objections to Evidence, filed Jun. 6, 2022, by Applicant in the United States Patent and Trademark Office, in Inter Partes Review of U.S. Pat. No. 10,621,228 B2, IPR2022-00031 (20 pages).
Patent Owner's Objections to Evidence, to Petition for Inter Partes Review of U.S. Pat. No. 10,621,228 by *Unified Patents, LLC*, filed Mar. 28, 2022, by Applicant in the United States Patent and Trademark Office (5 pages).
Patent Owner's Preliminary Response filed Mar. 14, 2022, by Applicant in the United States Patent and Trademark Office, to Petition for Post Grant Review of U.S. Pat. No. 11,017,020, filed Nov. 20, 2021 by *Apple Inc.*, in the United States Patent and Trademark Office (37 pages).
Patent Owner's Preliminary Response to Petition for Inter Partes Review of U.S. Pat. No. 11,163,823 Pursuant to 37 C.F.R. § 42.107, filed Aug. 22, 2022, by Memory Web, LLC, before the Patent Trial and Appeal Board of the United States Patent and Trademark Office, in Inter Partes Review of U.S. Pat. No. 11,163,823, IPR2022-00885 (37 pages).
Patent Owner's Preliminary Response to Petition for Post-Grant Review of U.S. Pat. No. 11,163,823 Pursuant to 37 C.F.R. § 42.200 et seq., filed Aug. 22, 2022, by Memory Web, LLC, before the Patent Trial and Appeal Board of the United States Patent and Trademark Office, in Post-Grant Review of U.S. Pat. No. 11,163,823, PGR2022-00034 (36 pages).
Patent Owner's Preliminary Response under 37 C.F.R. § 42.107, filed Apr. 13, 2022, by Applicant in the United States Patent and Trademark Office, to Petition for Inter Partes Review of U.S. Pat. No. 9,552,376, filed Nov. 8, 2021 by *Apple Inc.*, in the United States Patent and Trademark Office (74 pages).
Patent Owner's Preliminary Response under 37 C.F.R. § 42.107, filed Dec. 17, 2021, by Applicant in the United States Patent and Trademark Office, to Petition for Inter Partes Review of U.S. Pat. No. 10,621,228, filed Sep. 3, 2021 by *Unified Patents, LLC*, in the United States Patent and Trademark Office (78 pages).
Patent Owner's Preliminary Response under 37 C.F.R. § 42.107, filed Feb. 23, 2022, by Applicant in the United States Patent and Trademark Office, to Petition for Inter Partes Review of U.S. Pat. No. 10,621,228, filed Oct. 30, 2021 by *Apple Inc.* in the United States Patent and Trademark Office (76 pages).
Patent Owner's Preliminary Response under 37 C.F.R. § 42.107, filed Mar. 14, 2022, by Applicant in the United States Patent and Trademark Office, to Petition for Inter Partes Review of U.S. Pat. No. 11,017,020, filed Nov. 20, 2021 by *Apple Inc.*, in the United States Patent and Trademark Office (37 pages).
Patent Owner's Preliminary Response under 37 C.F.R. § 42.107, filed Mar. 16, 2022, by Applicant in the United States Patent and Trademark Office, to Petition for Inter Partes Review of U.S. Pat.

(56) References Cited

OTHER PUBLICATIONS

No. 10,621,228, filed Dec. 3, 2021, by *Samsung Electronics Co., Ltd.* in the United States Patent and Trademark Office (79 pages).
Patent Owner's Preliminary Response, filed May 9, 2022, by Applicant in the United States Patent and Trademark Office, to Petition for Inter Partes Review of U.S. Pat. No. 10,423,658, IPR2022-00221 (63 pages).
Patent Owner's Preliminary Sur-Reply filed Jan. 6, 2022, by Applicant in the United States Patent and Trademark Office, to Petition for Inter Partes Review of U.S. Pat. No. 10,621,228, filed Sep. 3, 2021, by *Unified Patents, LLC* in the United States Patent and Trademark Office (10 pages).
Patent Owner's Preliminary Sur-Reply to Petitioner *Apple Inc.'s* Reply to Patent Owner's Preliminary Response to Petition for Inter Partes Review of U.S. Pat. No. 10,423,658, filed Apr. 25, 2022, by Applicant in the United States Patent and Trademark Office (8 pages).
Patent Owner's Preliminary Sur-Reply to Petitioner *Apple Inc.'s* Reply to Patent Owner's Preliminary Response to Petition for Inter Partes Review of U.S. Pat. No. 11,017,020, filed Apr. 25, 2022, by Applicant in the United States Patent and Trademark Office (8 pages).
Patent Owner's Preliminary Sur-Reply to Petitioner *Apple Inc.'s* Reply to Patent Owner's Preliminary Response to Petition for Inter Partes Review of U.S. Pat. No. 9,552,376, filed Apr. 25, 2022, by Applicant in the United States Patent and Trademark Office (8 pages).
Patent Owner's Preliminary Sur-Reply to Petitioner *Apple Inc.'s* Reply to Patent Owner's Preliminary Response to Petition for Post Grant Review of U.S. Pat. No. 11,017,020, filed Apr. 25, 2022, by Applicant in the United States Patent and Trademark Office (8 pages).
Patent Owner's Preliminary Sur-Reply to Petitioner *Apple Inc.'s* Reply to Patent Owner's Preliminary Response to Petition for Inter Partes Review of U.S. Pat. No. 10,621,228, filed Apr. 25, 2022, by Applicant in the United States Patent and Trademark Office (8 pages).
Patent Owner's Preliminary Sur-Reply to Petitioner *Samsung Electronics Co., Ltd.'s* Reply to Patent Owner's Preliminary Response to Petition for Inter Partes Review of U.S. Pat. No. 10,621,228, filed Apr. 26, 2022, by Applicant in the United States Patent and Trademark Office (7 pages).
Patent Owner's Preliminary Sur-Reply, filed Sep. 26, 2022, by Memory Web, LLC, in the United States Patent and Trademark Office, in Inter Partes Review of U.S. Pat. No. 11,163,823, IPR2022-00885 (8 pages).
Patent Owner's Response [Redacted], filed Jun. 6, 2022, by Applicant in the United States Patent and Trademark Office, in Inter Partes Review of U.S. Pat. No. 10,621,228, IPR2021-01413 (91 pages).
Patent Owner's Response, Exhibit 2001: Declaration of Professor Glenn Reinman, dated Aug. 22, 2022, by Memory Web, LLC, before the Patent Trial and Appeal Board of the United States Patent and Trademark Office, in Post Grant Review and Inter Partes Review of U.S. Pat. No. 11,163,823, PGR2022-00034, IPR2022-00885 (53 pages).
Patent Owner's Response, Exhibit 2002: Google Patents page of U.S. Pat. No. 11,163,823, Method and Apparatus for Managing Digital Files, available online at URL: https://patents.google.com/patent/U.S. Appl. No. 11/163,823B2/en?oq=11163823#patentCitations ; retrieved from the Internet Aug. 21, 2022, by Memory Web, LLC, in Inter Partes Review of U.S. Pat. No. 10,621,228, IPR2022-00222 (33 pages).
Patent Owner's Response, Exhibit 2021: Apple Inc., "Apple Human Interface Guidelines," dated Aug. 20, 2009, entered Sep. 23, 2022, by Memory Web, LLC, in the United States Patent and Trademark Office, in Post-Grant Review of U.S. Pat. No. 11,017,020, PGR-2022-00006 (398 pages).
Patent Owner's Response, Exhibit 2022: Deposition of Dr. Philip Greenspun, Zoom examination on Aug. 26, 2022, by Memory Web, LLC, before the Patent Trial and Appeal Board of the United States Patent and Trademark Office, in Inter Partes Review of U.S. Pat. No. 10,621,228, IPR2022-00222 (69 pages).
Patent Owner's Response, Exhibit 2022: Galitz, W. O., The Essential Guide to User Interface Design: An Introduction to GUI Design Principles and Techniques, 3rd Edition, Part 1, Wiley Publishing, Inc., 2007, entered Sep. 23, 2022, by Memory Web, LLC, in the United States Patent and Trademark Office, in Post-Grant Review of U.S. Pat. No. 11,017,020, PGR-2022-00006 (874 pages).
Patent Owner's Response, Exhibit 2023: Declaration of Professor Glenn Reinman, Ph.D., dated Sep. 6, 2021, by Memory Web, LLC, before the Patent Trial and Appeal Board of the United States Patent and Trademark Office, in Inter Partes Review of U.S. Pat. No. 10,621,228, IPR2022-00222 (80 pages).
Patent Owner's Response, Exhibit 2023: Transcript of the Deposition of Loren Terveen, Ph.D., vol. I, dated Sep. 13, 2022, by Memory Web, LLC, before the Patent Trial and Appeal Board of the United States Patent and Trademark Office, in Inter Partes Review of U.S. Pat. No. 10,621,228, IPR2022-00031 (99 pages).
Patent Owner's Response, Exhibit 2024: Transcript of the Deposition of Loren Terveen, Ph.D., vol. II, dated Sep. 13, 2022, by Memory Web, LLC, before the Patent Trial and Appeal Board of the United States Patent and Trademark Office, in Inter Partes Review of U.S. Pat. No. 10,621,228, IPR2022-00031 (75 pages).
Patent Owner's Response, Exhibit 2025: Declaration of Rajeev Surati, Ph.D., entered Sep. 23, 2021, by Memory Web, LLC, in the United States Patent and Trademark Office, in Inter Partes Review of U.S. Pat. No. 10,423,658, IPR2022-00033 (135 pages).
Patent Owner's Response, Exhibit 2025: Declaration of Rajeev Surati, Ph.D., entered Sep. 23, 2021, by Memory Web, LLC, in the United States Patent and Trademark Office, in Inter Partes Review of U.S. Pat. No. 10,621,228, IPR2022-00031 (101 pages).
Patent Owner's Response, Exhibit 2025: Declaration of Rajeev Surati, Ph.D., entered Sep. 23, 2021, by MemoryWeb, LLC, in the United States Patent and Trademark Office, in Inter Partes Review of U.S. Pat. No. 9,552,376, IPR2022-00032 (118 pages).
Patent Owner's Response, Exhibit 2025: Declaration of Rajeev Surati, Ph.D., entered Sep. 23, 2021, by MemoryWeb, LLC, in the United States Patent and Trademark Office, in Post-Grant Review of U.S. Pat. No. 11,017,020, PGR2022-00006 (159 pages).
Patent Owner's Response, Exhibit 2026: Transcript of Deposition of Matthew Birdsell, entered Aug. 11, 2022, by Memory Web, LLC, in the United States Patent and Trademark Office, in Post-Grant Review of U.S. Pat. No. 11,017,020, PGR2022-00006 (38 pages).
Patent Owner's Response, Exhibit 2027: Affidavit of Nathaniel E. Frank-White, entered Sep. 7, 2022, by Memory Web, LLC, in the Patent Trial and Appeal Board of the United States Patent and Trademark Office, in Post-Grant Review of U.S. Pat. No. 11,017,020, PGR2022-00006 (399 pages).
Patent Owner's Response, Exhibit 2028: Cambridge English Dictionary, "responsive," retrieved from the internet on Aug. 15, 2022, available online at URL: https://dictionary.cambridge.org/US/dictionary/english/responsive; by Memory Web, LLC, before the Patent Trial and Appeal Board of the United States Patent and Trademark Office, in Post-Grant Review of U.S. Pat. No. 11,017,020, PGR2022-00006 (9 pages).
Patent Owner's Response, Exhibit 2029: Webster's Third New International Dictionary, "responsive," Merriam-Webster, Incorporated, 2002, p. 1935, entered Sep. 23, 2022, by Memory Web, LLC, in the United States Patent and Trademark Office, in Post-Grant Review of U.S. Pat. No. 11,017,020, PGR-2022-00006 (3 pages).
Patent Owner's Response, Exhibit 2030: Johnson, J., Designing with the Mind in Mind: Simple Guide to Understanding User Interface Rules, Elsevier Inc., 2010, entered Sep. 23, 2022, by Memory Web, LLC, in the United States Patent and Trademark Office, in Post-Grant Review of U.S. Pat. No. 11,017,020, PGR-2022-00006 (190 pages).
Patent Owner's Response, Exhibit 2031: Apple Inc., "Human Interface Guidelines—Layout—Foundation," retrieved from the internet on Aug. 26, 2022, available online at URL: https://developer.apple.com/design/human-interface-guidelines/foundations/layout entered Sep. 23, 2022, by Memory Web, LLC, in the United States Patent

(56) References Cited

OTHER PUBLICATIONS and Trademark Office, in Post-Grant Review of U.S. Pat. No. 11,017,020, PGR-2022-00006 (13 pages).
Patent Owner's Response, Exhibit 2033: Tidwell, J., Designing Interfaces, 1st Edition, O'Reilly, 2005, entered Sep. 23, 2022, by Memory Web, LLC, in the United States Patent and Trademark Office, in Inter Partes Review of U.S. Pat. No. 10,423,658, IPR2022-00033 (349 pages).
Patent Owner's Response, Exhibit 2034: Coldeway, D. "Review: Aperture 3," dated Mar. 19, 2020, Techcrunch.com, retrieved from the internet on Feb. 22, 2022, available at URL: https://techcrunch.com/2010/03/19/review-aperture-3/; entered Sep. 23, 2022, by MemoryWeb, LLC, in the United States Patent and Trademark Office, in Post-Grant Review of U.S. Pat. No. 11,017,020, PGR-2022-00006 (13 pages).
Patent Owner's Response, filed Sep. 23, 2022, by Memory Web, LLC, before the Patent Trial and Appeal Board of the United States Patent and Trademark Office, in Inter Partes Review of U.S. Pat. No. 10,621,228, IPR2022-00031 (81 pages).
Patent Owner's Response, filed Sep. 23, 2022, by Memory Web, LLC, in the United States Patent and Trademark Office, in Inter Partes Review of U.S. Pat. No. 10,423,658, IPR2022-00033 (98 pages).
Patent Owner's Response, filed Sep. 23, 2022, by Memory Web, LLC, in the United States Patent and Trademark Office, in Inter Partes Review of U.S. Pat. No. 9,552,376, IPR2022-00032 (92 pages).
Patent Owner's Response, filed Sep. 23, 2022, by Memory Web, LLC, in the United States Patent and Trademark Office, in Post-Grant Review of U.S. Pat. No. 11,017,020, PGR-2022-00006 (117 pages).
Patent Owner's Response, filed Sep. 6, 2022, by Memory Web, LLC, before the Patent Trial and Appeal Board of the United States Patent and Trademark Office, in Inter Partes Review of U.S. Pat. No. 10,621,228, IPR2022-00222 (77 pages).
Patent Owner's Sur-Reply, Exhibit 2041: Cambridge English Dictionary entry for "responsive", available online at URL: https://dictionary.cambridge.org/US/dictionary/english/responsive; retrieved from the Internet on Aug. 15, 2022, by Memory Web, LLC, in Inter Partes Review of U.S. Pat. No. 10,621,228, IPR2021-01413 (9 pages).
Patent Owner's Sur-Reply, Exhibit 2042: Cambridge English Dictionary entry for "causing", available online at https://dictionary.cambridge.org/dictionary/english/causing; filed Oct. 11, 2022, by Memory Web, LLC, in Inter Partes Review of U.S. Pat. No. 10,621,228, IPR2021-01413 (7 pages).
Patent Owner's Sur-Reply, Exhibit 2043: Dictionary.com entry for "causing", available online at URL: https://www.dictionary.com/browse/causing; filed on Oct. 11, 2022, by Memory Web, LLC, in Inter Partes Review of U.S. Pat. No. 10,621,228, IPR2021-01413 (7 pages).
Patent Owner's Sur-Reply, Exhibit 2044: Views # 1-3 Visual, filed on Oct. 11, 2022, by Memory Web, LLC, in Inter Partes Review of U.S. Pat. No. 10,621,228, IPR2021-01413 (1 page).
Patent Owner's Sur-Reply, Exhibit 2045: U.S. Pat. No. 11,061,524, Techniques to Modify Content and View Content on a Mobile Device, issued Jul. 13, 2021, by Memory Web, LLC, in Inter Partes Review of U.S. Pat. No. 10,621,228, IPR2021-01413 (26 pages).
Patent Owner's Sur-Reply, Exhibit 2046: Remote Deposition of Benjamin B. Bederson, Ph. D., dated Sep. 29, 2022, by Memory Web, LLC, before the Patent Trial and Appeal Board of the United States Patent and Trademark Office, in Inter Partes Review of U.S. Pat. No. 10,621,228, IPR2021-01413 (92 pages).
Patent Owner's Sur-Reply, filed Sep. 26, 2022, by Memory Web, LLC in the United States Patent and Trademark Office, in Post-Grant Review of U.S. Pat. No. 11,163,823, PGR2022-00034 (8 pages).

Pearson, "Indexing Photos Using Faces and Places in Aperture 3, moving from iPhoto to Aperture," PeachPit.com, published online on Apr. 28, 2010, at https://www.peachpit.com/articles/article.aspx?p=1585143.
Perez, L., "iPhoto 09 Basics," Florida Center for Instructional Technology, Retrieved from the Internet on Apr. 10, 2021, https://etc.usf.edu/te_mac/movies/pdf/iphoto09.pdf/; alleged by Unified Patents to have been published on Aug. 9, 2009 (15 pages).
Petition for Inter Partes Review of U.S. Pat. No. 10,423,658, filed Dec. 17, 2021, by *Samsung Electronics Co., Ltd.*, in the United States Patent and Trademark Office (113 pages).
Petition for Inter Partes Review of U.S. Pat. No. 10,621,228 by Unified Patents, filed Sep. 3, 2021 (104 pages).
Petition for Inter Partes Review of U.S. Pat. No. 10,621,228, filed Dec. 3, 2021, by *Samsung Electronics Co., Ltd.*, in the United States Patent and Trademark Office (105 pages).
Petition for Inter Partes Review of U.S. Pat. No. 10,423,658, filed Nov. 3, 2021 by *Apple Inc.*, in the United States Patent and Trademark Office (100 pages).
Petition for Inter Partes Review of U.S. Pat. No. 10,621,228, filed Oct. 30, 2021 by *Apple Inc.*, in the United States Patent and Trademark Office (95 pages).
Petition for Inter Partes Review of U.S. Pat. No. 11,017,020, filed Nov. 20, 2021 by *Apple Inc.*, in the United States Patent and Trademark Office (97 pages).
Petition for Inter Partes Review of U.S. Pat. No. 11,163,823, filed Apr. 20, 2022, by *Samsung Electronics Co., Ltd.* in the United States Patent and Trademark Office (108 pages).
Petition for Inter Partes Review of U.S. Pat. No. 9,552,376, filed Nov. 8, 2021 by *Apple Inc.*, in the United States Patent and Trademark Office (96 pages).
Petition for Post Grant Review of U.S. Pat. No. 11,017,020, filed Nov. 20, 2021 by *Apple Inc.*, in the United States Patent and Trademark Office (108 pages).
Petition for Post-Grant Review of U.S. Pat. No. 11,163,823, filed Apr. 20, 2022, by *Samsung Electronics Co., Ltd.* in the United States Patent and Trademark Office (114 pages).
Petitioner's Reply to Patent Owner's Preliminary Response to Petition for Inter Partes Review of U.S. Pat. No. 10,423,658, filed Apr. 18, 2022, by *Apple Inc.*, in the United States Patent and Trademark Office (9 pages).
Petitioner's Reply to Patent Owner's Preliminary Response to Petition for Inter Partes Review of U.S. Pat. No. 10,621,228, filed Apr. 18, 2022, by *Apple Inc.*, in the United States Patent and Trademark Office (9 pages).
Petitioner's Reply to Patent Owner's Preliminary Response to Petition for Inter Partes Review of U.S. Pat. No. 10,621,228, filed Apr. 19, 2022, by *Samsung Electronics Co., Ltd.* in the United States Patent and Trademark Office (11 pages).
Petitioner's Reply to Patent Owner's Preliminary Response to Petition for Inter Partes Review of U.S. Pat. No. 11,017,020, filed Apr. 18, 2022, by *Apple Inc.*, in the United States Patent and Trademark Office (9 pages).
Petitioner's Reply to Patent Owner's Preliminary Response to Petition for Inter Partes Review of U.S. Pat. No. 9,552,376, filed Apr. 18, 2022, by *Apple Inc.*, in the United States Patent and Trademark Office (9 pages).
Petitioner's Reply to Patent Owner's Preliminary Response to Petition for Post Grant Review of U.S. Pat. No. 11,017,020, filed Apr. 18, 2022, by *Apple Inc.*, in the United States Patent and Trademark Office (9 pages).
Petitioner's Reply to Patent Owner's Preliminary Response, filed Sep. 19, 2022, by Samsung Electronics Co., Ltd. et al., in the United States Patent and Trademark Office, in Post-Grant Review of U.S. Pat. No. 11,163,823, PGR2022-00034 (8 pages).
Petitioner's Reply to Patent Owner's Response, filed Sep. 19, 2022, by Samsung Electronics Co., Ltd. et al., in the United States Patent and Trademark Office, in Inter Partes Review of U.S. Pat. No. 11,163,823, IPR2022-00885 (8 pages).
Petitioner's Supplemental Evidence regarding Patent Owner's Objections to Evidence of Petition for Inter Partes Review of U.S. Pat. No. 10,621,228, filed Apr. 11, 2022, by *Unified Patents, LLC* in the United States Patent and Trademark Office (27 pages).

(56) References Cited

OTHER PUBLICATIONS

Petitioner's Unopposed Second Motion to Seal, filed Jun. 14, 2022, by *Unified Patents, LLC*, in the United States Patent and Trademark Office, in Inter Partes Review of U.S. Pat. No. 10,621,228, IPR2021-01413.

Petitioner's Updated Exhibit List, filed Jun. 14, 2022, by *Unified Patents, LLC* in the United States Patent and Trademark Office, in Inter Partes Review of U.S. Pat. No. 10,621,228, IPR2021-01413 (6 pages).

Petitioner's Updated Exhibit List, filed Oct. 13, 2022, by Unified Patents, LLC, before the Patent Trial and Appeal Board of the United States Patent and Trademark Office, in U.S. Pat. No. 10,621,228, Case No. IPR2021-01413 (6 pages).

Petitioner's Updated Mandatory Notices regarding U.S. Pat. No. 10,621,228, filed Mar. 18, 2022, by *Unified Patents, LLC* in the United States Patent and Trademark Office (5 pages).

Picasa Crash Course, "Picasa and Google+ Web Albums," available online at https://docs.google.com/document/preview?hgd=1&id=14LIeLJsnC0zPBwJeworFUQc2Bfy3_myENjItVLwkjo0.

Picasa Geeks, "Automatically Geotag Pictures with Droid," PicasaGeeks.com, published online on Jun. 16, 2010, at https://picasageeks.com/tag/auto-geotagging/ ; Archived on Jan. 7, 2014, at https://web.archive.org/web20140107025358/https://picasageeks.com/tag/auto-geotagging/.

Picasa Team, "The Picasa 3 Readme: Picasa 3.5, now with name tags—Build 79.67," Picasa-ReadMe.Blogspot.com, published online on Sep. 22, 2009, at http://picasa-readme.blogspot.com/ ; Archived on Feb. 18, 2010, at https://web.archive.org/web/20100218225456/http://picasa-readme.blogspot.com/.

Plaintiff *MemoryWeb, LLC's* Initial Infringement Contentions, *MemoryWeb, LLC* v. *Apple Inc*., Civ. No. 6:21-cv-531 (W.D. Tex.), dated Sep. 24, 2021 (705 pages).

Plaintiff's Responsive Claim Construction Brief, Exhibit A: Declaration of R. David Etchells, M.S. in Support of Memory Web's Responsive Claim Construction Brief, in Construction of Terms 1-10, Civil Action No. 21-cv-411, in the United States District Court for the Western District of Texas (Waco Division), Apr. 19, 2022.

Plaintiff's Responsive Claim Construction Brief, Exhibit AA: *The American Heritage College Dictionary, Fourth Edition*, pp. 992, 1437, Houghton Mifflin Company, ISBN: 0-618-45300-8, 2004, in Construction of Term 5, Civil Action No. 21-cv-411, in the United States District Court for the Western District of Texas (Waco Division), Apr. 19, 2022.

Plaintiff's Responsive Claim Construction Brief, Exhibit B: Remote Deposition of Dr. Henry Houh, dated Apr. 14, 2022, in Construction of Terms 1-4, 6, 8-9, Civil Action No. 21-cv-411, in the United States District Court for the Western District of Texas (Waco Division), Apr. 19, 2022.

Plaintiff's Responsive Claim Construction Brief, Exhibit C: Petition for Inter Partes Review of U.S. Pat. No. 10,423,658, Pursuant to 35 U.S.C. § § 311-319, 37 C.F.R. § 42, IPR2022-00221, filed Dec. 17, 2021, in the United States Patent and Trademark Office, in Construction of Terms 2-4, 6-7, Civil Action No. 21-cv-411, in the United States District Court for the Western District of Texas (Waco Division), Apr. 19, 2022.

Plaintiff's Responsive Claim Construction Brief, Exhibit D: Declaration of Dr. Philip Greenspun, IPR2022-00221, in Construction of Terms 1, 3, 7, Civil Action No. 21-cv-411, in the United States District Court for the Western District of Texas (Waco Division), Apr. 19, 2022.

Plaintiff's Responsive Claim Construction Brief, Exhibit E: Petition for Inter Partes Review of U.S. Pat. No. 10,423,658, IPR2022-00033, filed Nov. 3, 2021, in the United States Patent and Trademark Office, in Construction of Terms 3-4, 7, Civil Action No. 21-cv-411, in the United States District Court for the Western District of Texas (Waco Division), Apr. 19, 2022.

Plaintiff's Responsive Claim Construction Brief, Exhibit F: Declaration of Dr. Loren Terveen Regarding U.S. Pat. No. 10,423,658, IPR2022-00033, filed Nov. 3, 2021, in the United States Patent and Trademark Office, in Construction of Terms 1-3, 7, Civil Action No. 21-cv-411, in the United States District Court for the Western District of Texas (Waco Division), Apr. 19, 2022.

Plaintiff's Responsive Claim Construction Brief, Exhibit G: Petition for Inter Partes Review of U.S. Pat. No. 10,621,228 Pursuant to 35 U.S.C. § § 311-319, 37 C.F.R. § 42, IPR2022-00222, filed Dec. 3, 2021, in the United States Patent and Trademark Office, in Construction of Terms 2, 4, 8, Civil Action No. 21-cv-411, in the United States District Court for the Western District of Texas (Waco Division), Apr. 19, 2022.

Plaintiff's Responsive Claim Construction Brief, Exhibit H: Declaration of Dr. Philip Greenspun, IPR2022-00222, filed Dec. 3, 2021, in the United States Patent and Trademark Office, Civil Action No. 21-cv-411, in the United States District Court for the Western District of Texas (Waco Division), Apr. 19, 2022.

Plaintiff's Responsive Claim Construction Brief, Exhibit I: Petition for Inter Partes Review of U.S. Patent No. 10,621.228, IPR2022-00031, filed Oct. 30, 2021, in the United States Patent and Trademark Office, in Construction of Term 4, Civil Action No. 21-cv-411, in the United States District Court for the Western District of Texas (Waco Division), Apr. 19, 2022.

Plaintiff's Responsive Claim Construction Brief, Exhibit J: Declaration of Dr. Loren Terveen Regarding U.S. Pat. No. 10,621,228, IPR2022-00031, filed Oct. 30, 2021, in the United States Patent and Trademark Office, Civil Action No. 21-cv-411, in the United States District Court for the Western District of Texas (Waco Division), Apr. 19, 2022.

Plaintiff's Responsive Claim Construction Brief, Exhibit K: Petition for Inter Partes Review of U.S. Pat. No. 10,621,228, IPR2021-01413, filed Sep. 3, 2021, in the United States Patent and Trademark Office, in Construction of Term 4, Civil Action No. 21-cv-411, in the United States District Court for the Western District of Texas (Waco Division), Apr. 19, 2022.

Plaintiff's Responsive Claim Construction Brief, Exhibit L: Declaration of Dr. Benjamin B. Bederson, Ph.D., IPR2021-01413, filed Sep. 2, 2021, in the United States Patent and Trademark Office, in Construction of Term 2, Civil Action No. 21-cv-411, in the United States District Court for the Western District of Texas (Waco Division), Apr. 19, 2022.

Plaintiff's Responsive Claim Construction Brief, Exhibit M: Examiner Interview Summary Regarding U.S. Appl. No. 14/193,426, dated May 3, 2016, in the United States Patent and Trademark Office, in Construction of Terms 1, 5, Civil Action No. 21-cv-411, in the United States District Court for the Western District of Texas (Waco Division), Apr. 19, 2022.

Plaintiff's Responsive Claim Construction Brief, Exhibit N: Gibson, R. & Schuyler, E., *Google Maps Hacks: Tips and Tools for Geographic Searching and Remixing*, pp. 36-42, O'Reilly Media, Inc., ISBN: 0-596-10161-9, Jan. 2006, in Construction of Term 1, Civil Action No. 21-cv-411, in the United States District Court for the Western District of Texas (Waco Division), Apr. 19, 2022.

Plaintiff's Responsive Claim Construction Brief, Exhibit O: Cambridge Dictionary, "geotag," retrieved from the internet on Mar. 13, 2022, available online at URL: https://dictionary.cambridge.org/us/dictionary/english/geotag/ ; in Construction of Term 1, Civil Action No. 21-cv-411, in the United States District Court for the Western District of Texas (Waco Division), Apr. 19, 2022.

Plaintiff's Responsive Claim Construction Brief, Exhibit P: Dictionary.Com, "geotag," retrieved from the internet on May 22, 2016, available online at URL: https://web.archive.org/web/20160522214001/https://www.dictionary.com/browse/geotag/ ; in Construction of Term 1, Civil Action No. 21-cv-411, in the United States District Court for the Western District of Texas (Waco Division), Apr. 19, 2022.

Plaintiff's Responsive Claim Construction Brief, Exhibit Q: Merriam-Webster, "geotag," available online at URL: https://www.merriam-webster.com/dictionary/geotag ; in Construction of Term 1, Civil Action No. 21-cv-411, in the United States District Court for the Western District of Texas (Waco Division), Apr. 19, 2022.

Plaintiff's Responsive Claim Construction Brief, Exhibit R: Wikipedia, "Geotagging," retrieved from the internet on Mar. 13, 2022, available online at URL: https://web.archive.org/web/2014/0226120642/https://en.wikipedia.org/wiki/Geotagging ; in Construction of Term 1, Civil Action No. 21-cv-411, in the United States District Court for the Western District of Texas (Waco Division), Apr. 19, 2022.

(56) References Cited

OTHER PUBLICATIONS

Plaintiff's Responsive Claim Construction Brief, Exhibit S: Kang et al., "Capture, Annotate, Browse, Find, Share: Novel Interfaces for Personal Photo Management", International Journal of Human-Computer Interaction, 23(3), pp. 315-337, 2007, Lawrence Eribaum Associates, Inc.; in Construction of Term 2, Civil Action No. 21-cv-411, in the United States District Court for the Western District of Texas (Waco Division), Apr. 19, 2022.
Plaintiff's Responsive Claim Construction Brief, Exhibit T: U.S. Pat. No. 6,215,523 B1, dated Apr. 10, 2001, in Construction of Term 2, Civil Action No. 21-cv-411, in the United States District Court for the Western District of Texas (Waco Division), Apr. 19, 2022.
Plaintiff's Responsive Claim Construction Brief, Exhibit U: *The American Heritage College Dictionary, Fourth Edition*, p. 1180, Houghton Mifflin Company, ISBN: 0-618-45300-8, 2004, in Construction of Term 6, Civil Action No. 21-cv-411, in the United States District Court for the Western District of Texas (Waco Division), Apr. 19, 2022.
Plaintiff's Responsive Claim Construction Brief, Exhibit V: *Webster's II New College Dictionary*, p. 940, Houghton Mifflin Company, ISBN: 0-395-70869-9, 1995, in Construction of Term 6, Civil Action No. 21-cv-411, in the United States District Court for the Western District of Texas (Waco Division), Apr. 19, 2022.
Plaintiff's Responsive Claim Construction Brief, Exhibit W: U.S. Pat. No. 9,098,531 B2, dated Aug. 4, 2015, in Construction of Term 8, Civil Action No. 21-cv-411, in the United States District Court for the Western District of Texas (Waco Division), Apr. 19, 2022.
Plaintiff's Responsive Claim Construction Brief, Exhibit X: Cambridge Dictionary, "thumbnail," retrieved from the internet on Mar. 13, 2022, available online at URL: https://web.archive.org/web/20150831043131/http://dictionary.cambridge.org:80/us/dictionary/english/thumbnail; Civil Action No. 21-cv-411, in the United States District Court for the Western District of Texas (Waco Division), Apr. 19, 2022.
Plaintiff's Responsive Claim Construction Brief, Exhibit Y: Wikipedia, "Thumbnail," retrieved from the internet on Mar. 13, 2022, available online at URL: https://web.archive.org/web/20140225231552/https://en.wikipedia.org/wiki/Thumbail; in Construction of Term 2, Civil Action No. 21-cv-411, in the United States District Court for the Western District of Texas (Waco Division), Apr. 19, 2022.
Plaintiff's Responsive Claim Construction Brief, Exhibit Z: Notice of Allowance in U.S. Appl. No. 16/536,300, dated Aug. 27, 2021, by the United States Patent and Trademark Office, in Construction of Term 9, Civil Action No. 21-cv-411, in the United States District Court for the Western District of Texas (Waco Division), Apr. 19, 2022.
Plaintiff's Responsive Claim Construction Brief, *MemoryWeb, LLC v. Samsung Electronics Co., Ltd. (A Korean Company) and Samsung Electronics America, Inc.*, Civil Action No. 21-cv-411, in the United States District Court for the Western District of Texas (Waco Division), Apr. 19, 2022 (37 pages).
Plaintiff's Sur-Reply Claim Construction Brief, Exhibit BB: Cambridge Dictionary, "overlap," available online at URL: https://dictionary.cambridge.org/US/dictionary/english/overlap; in Construction of Term 5, Civil Action No. 21-cv-411, in the United States District Court for the Western District of Texas (Waco Division), May 16, 2022.
Plaintiff's Sur-Reply Claim Construction Brief, Exhibit CC: Petition for Post-Grant Review of U.S. Pat. No. 11,163,823 Pursuant to 37 C.F.R. § 42.200 et seq., PRG2022-00034, in Construction of Terms 9-10, Civil Action No. 21-cv-411, in the United States District Court for the Western District of Texas (Waco Division), May 16, 2022.
Plaintiff's Sur-Reply Claim Construction Brief, Exhibit DD: Declaration of Dr. Philip Greenspun, IPR2022-00885, filed Apr. 14, 2022, in the United States Patent and Trademark Office, in Construction of Term 9, Civil Action No. 21-cv-411, in the United States District Court for the Western District of Texas (Waco Division), May 16, 2022.
Plaintiff's Sur-Reply Claim Construction Brief, Exhibit EE: Petition for Inter Partes Review of U.S. Pat. No. 11,163,823 Pursuant to 35 U.S.C. §§ 311-319, 37 C.F.R. § 42, IPR2022-00885, filed Apr. 20, 2022, in the United States Patent and Trademark Office, in Construction of Terms 9-10, Civil Action No. 21-cv-411, in the United States District Court for the Western District of Texas (Waco Division), May 16, 2022.
Plaintiff's Sur-Reply Claim Construction Brief, Exhibit FF: Declaration of Dr. Philip Greenspun, IPR2022-00885, filed Apr. 14, 2022, in the United States Patent and Trademark Office, in Construction of Terms 9-10, Civil Action No. 21-cv-411, in the United States District Court for the Western District of Texas (Waco Division), May 16, 2022.
Plaintiff's Sur-Reply Claim Construction Brief, *MemoryWeb, LLC v. Samsung Electronics Co., Ltd. (A Korean Company) and Samsung Electronics America, Inc.*, Civil Action No. 21-cv-411, in the United States District Court for the Western District of Texas (Waco Division), May 16, 2022 (21 pages).
Pogue, D. & Biersdorfer, J. D., "iPhoto '09: The Missing Manual," O'Reilly Media, Inc., 2009 (304 pages).
Prosecution History of U.S. Pat. No. 11,163,823.
Prosecution History of U.S. Pat. No. 9,098,531.
Prosecution History of U.S. Pat. No. 9,552,376.
Quack, T. et al., "World-scale Mining of Objects and Events from Community Photo Collections," CIVR'08, pp. 47-56, Niagara Falls, Ontario, Canada, Jul. 7-9, 2008.
Rathbone, A., *Windows Vista for Dummies*, Wiley Publishing, Inc., ISBN-13: 978-0-471-75421-3 (2007).
Rattenbury, T. et al.; "Towards Automatic Extraction of Event and Place Semantics from Flickr Tags"; SIGIR '07, Jul. 23-27, 2007; Amsterdam, The Netherlands; ACM 978-1-59593-597-7/07/0007 (8 pages).
Richard, G. et al.; "Geotagging Photographs for Distribution on the Web"; Mineral Physics Institute, Earth and Space Sciences Building, Stony Brook University, Stony Brook. NY; date unknown (9 pages).
Rosen, R. J., "This Is the World on Flickr," TheAtlantic.com, published online on Oct. 18, 2013, at http://www.theatlantic.com/technology/archive/2013/10/this-is-the-world-on-flickr/280697 ; Archived on Oct. 18, 2013, at http://web.archive.org/web/20131018203751/https://www.theatlantic.com/technology/archive/2013/10/this-is-the-world-on-flickr/280697/.
Saleh, I. et al., "Creation of Personal Space with HyWebMap," Proceedings of the ACS/IEEE International Conference on Computer Systems and Applications (AICCSA 2001), Beirut, Lebanon, Jun. 26-29, 2001.
Salmeron Perez, M. D. et al., "Media Database with web interface for a local history society: Improvement of the previous system," Bachelor's project, Computer Science, submitted to Karlstads universitet, Karlstad, Sweden, Jun. 9, 2010, available online at https://www.diva-portal.org/smash/get/diva2:324770/FULLTEXT01.pdf.
Samsung's Preliminary Invalidity Contentions, Exhibit A-1: "Belitz and Okamura," date alleged by Samsung to be at least as early as Mar. 4, 2010, for the Belitz patent, and May 26, 2011, for the Okamura patent, Civil Action No. 21-CV-411, in the United States District Court for the Western District of Texas (Waco Division), 2022.
Samsung's Preliminary Invalidity Contentions, Exhibit A-10: "Panoramio," date alleged by Samsung to be at least as early as May 30, 2007, Civil Action No. 21-CV-411, in the United States District Court for the Western District of Texas (Waco Division), 2022.
Samsung's Preliminary Invalidity Contentions, Exhibit A-11: "Prabhu," date alleged by Samsung to be at least as early as Jun. 20, 2002, Civil Action No. 21-CV-411, in the United States District Court for the Western District of Texas (Waco Division), 2022.
Samsung's Preliminary Invalidity Contentions, Exhibit A-12: "Sugiura," date alleged by Samsung to be at least as early as Mar. 13, 2014, Civil Action No. 21-CV-411, in the United States District Court for the Western District of Texas (Waco Division), 2022.
Samsung's Preliminary Invalidity Contentions, Exhibit A-2: "Picasa/Google," date alleged by Samsung to be at least as early as Sep. 22, 2009, Civil Action No. 21-CV-411, in the United States District Court for the Western District of Texas (Waco Division), 2022.

(56) References Cited

OTHER PUBLICATIONS

Samsung's Preliminary Invalidity Contentions, Exhibit A-3: "Bronder," date alleged by Samsung to be at least as early as Sep. 18, 2014, Civil Action No. 21-CV-411, in the United States District Court for the Western District of Texas (Waco Division), 2022.
Samsung's Preliminary Invalidity Contentions, Exhibit A-4: "Instagram," date alleged by Samsung to be at least as early as Aug. 2012, Civil Action No. 21-CV-411, in the United States District Court for the Western District of Texas (Waco Division), 2022.
Samsung's Preliminary Invalidity Contentions, Exhibit A-5: "Hochmuth," date alleged by Samsung to be at least as early as Aug. 7, 2014, Civil Action No. 21-CV-411, in the United States District Court for the Western District of Texas (Waco Division), 2022.
Samsung's Preliminary Invalidity Contentions, Exhibit A-6: "Artman," date alleged by Samsung to be at least as early as Mar. 30, 2006, Civil Action No. 21-CV-411, in the United States District Court for the Western District of Texas (Waco Division), 2022.
Samsung's Preliminary Invalidity Contentions, Exhibit A-7: "Aperture 3," date alleged by Samsung to be at least as early as Feb. 9, 2010, Civil Action No. 21-CV-411, in the United States District Court for the Western District of Texas (Waco Division), 2022.
Samsung's Preliminary Invalidity Contentions, Exhibit A-8: "iPhoto '09," date alleged by Samsung to be at least as early as Jan. 6, 2009, Civil Action No. 21-CV-411, in the United States District Court for the Western District of Texas (Waco Division), 2022.
Samsung's Preliminary Invalidity Contentions, Exhibit A-9: "Flickr," date alleged by Samsung to be at least as early as Feb. 27, 2006, Civil Action No. 21-CV-411, in the United States District Court for the Western District of Texas (Waco Division), 2022.
Samsung's Preliminary Invalidity Contentions, Exhibit B-1: "Belitz and Okamura," date alleged by Samsung to be at least as early as Mar. 4, 2010, for the Belitz patent, and May 26, 2011, for the Okamura patent, Civil Action No. 21-CV-411, in the United States District Court for the Western District of Texas (Waco Division), 2022.
Samsung's Preliminary Invalidity Contentions, Exhibit B-10: "Panoramio," date alleged by Samsung to be at least as early as May 30, 2007, Civil Action No. 21-CV-411, in the United States District Court for the Western District of Texas (Waco Division), 2022.
Samsung's Preliminary Invalidity Contentions, Exhibit B-11: "Prabhu," date alleged by Samsung to be at least as early as Jun. 20, 2002, Civil Action No. 21-CV-411, in the United States District Court for the Western District of Texas (Waco Division), 2022.
Samsung's Preliminary Invalidity Contentions, Exhibit B-12: "Sugiura," date alleged by Samsung to be at least as early as Mar. 13, 2014, Civil Action No. 21-CV-411, in the United States District Court for the Western District of Texas (Waco Division), 2022.
Samsung's Preliminary Invalidity Contentions, Exhibit B-2: "Picasa/Google," date alleged by Samsung to be at least as early as Sep. 22, 2009, Civil Action No. 21-CV-411, in the United States District Court for the Western District of Texas (Waco Division), 2022.
Samsung's Preliminary Invalidity Contentions, Exhibit B-3: "Bronder," date alleged by Samsung to be at least as early as Sep. 18, 2014, Civil Action No. 21-CV-411, in the United States District Court for the Western District of Texas (Waco Division), 2022.
Samsung's Preliminary Invalidity Contentions, Exhibit B-4: "Instagram," date alleged by Samsung to be at least as early as Aug. 2012, Civil Action No. 21-CV-411, in the United States District Court for the Western District of Texas (Waco Division), 2022.
Samsung's Preliminary Invalidity Contentions, Exhibit B-5: "Hochmuth," date alleged by Samsung to be at least as early as Aug. 7, 2014, Civil Action No. 21-CV-411, in the United States District Court for the Western District of Texas (Waco Division), 2022.
Samsung's Preliminary Invalidity Contentions, Exhibit B-6: "Artman," date alleged by Samsung to be at least as early as Mar. 30, 2006, Civil Action No. 21-CV-411, in the United States District Court for the Western District of Texas (Waco Division), 2022.
Samsung's Preliminary Invalidity Contentions, Exhibit B-7: "Aperture 3," date alleged by Samsung to be at least as early as Feb. 9, 2010, Civil Action No. 21-CV-411, in the United States District Court for the Western District of Texas (Waco Division), 2022.
Samsung's Preliminary Invalidity Contentions, Exhibit B-8: "iPhoto '09," date alleged by Samsung to be at least as early as Jan. 6, 2009, Civil Action No. 21-CV-411, in the United States District Court for the Western District of Texas (Waco Division), 2022.
Samsung's Preliminary Invalidity Contentions, Exhibit B-9: "Flickr," date alleged by Samsung to be at least as early as Feb. 27, 2006, Civil Action No. 21-CV-411, in the United States District Court for the Western District of Texas (Waco Division), 2022.
Samsung's Preliminary Invalidity Contentions, Exhibit C-1: "Okamura," date alleged by Samsung to be at least as early as May 26, 2011, Civil Action No. 21-CV-411, in the United States District Court for the Western District of Texas (Waco Division), 2022.
Samsung's Preliminary Invalidity Contentions, Exhibit C-2: "Picasa/Google," date alleged by Samsung to be at least as early as Sep. 22, 2009, Civil Action No. 21-CV-411, in the United States District Court for the Western District of Texas (Waco Division), 2022.
Samsung's Preliminary Invalidity Contentions, Exhibit C-3: "Artman," date alleged by Samsung to be at least as early as Mar. 30, 2006, Civil Action No. 21-CV-411, in the United States District Court for the Western District of Texas (Waco Division), 2022.
Samsung's Preliminary Invalidity Contentions, Exhibit C-4: "Aperture 3," date alleged by Samsung to be at least as early as Feb. 9, 2010, Civil Action No. 21-CV-411, in the United States Court for the Western of Texas (Waco Division),.
Samsung's Preliminary Invalidity Contentions, Exhibit C-5: "iPhoto '09," date alleged by Samsung to be at least as early as Jan. 6, 2009, Civil Action No. 21-CV-411, in the United States District Court for the Western District of Texas (Waco Division), 2022.
Samsung's Preliminary Invalidity Contentions, Exhibit C-6: "Bronder," date alleged by Samsung to be at least as early as Sep. 18, 2014, Civil Action No. 21-CV-411, in the United States District Court for the Western District of Texas (Waco Division), 2022.
Samsung's Preliminary Invalidity Contentions, *MemoryWeb, LLC v. Samsung Electronics Co., Ltd. (A Korean Company) and Samsung Electronics America, Inc.*, Civil Action No. 21-CV-411, in the United States District Court for the Western District of Texas (Waco Division), 2022 (20 pages).
Sande, S. et al., *Taking Your iPad to the Max*, Chapter 13: Touching Your Digital Photos, pp. 301-327, Springer Science+Business Media, LLC, ISBN-13 (pbk): 978-1-4302-3108-0, 2010.
Sanpaco13, "Picasa Tutorial part 1," YouTube.com, published online on Aug. 7, 2009, at https://www.youtube.com/watch?app=desktop&v=B_93BwkOyyk.
Scaine.Net, "Tagging JPG Photos using EXIF properties," published online Jan. 14, 2010.
Scherp, A. et al., "Event-centric Media Management," OFFIS—Institute for Information Technology, Oldenburg, Germany, University of California Irvine, CA, USA, published Jan. 28, 2008.
Screenshots from GeoPhoto installed on Windows machine.
Screenshots from Photo Location Viewer installed on Windows machine.
Screenshots taken from iPhoto '09 Retail Version installed on MacBook Pro with Mac OS X Snow Leopard (iPhoto '09 Retail).
Shankland, S., "What's the best Web site for geotagged photos?," CNET.com, published online on Mar. 18, 2009, at https://www.cnet.com/tech/computing/whats-the-best-web-site-for-geotagged-photos/ (6 pages).
Shankland, S., "What's the best Web site for geotagged photos?," CNET.com, published online on Mar. 18, 2009, at URL: https://www.cnet.com/tech/computing/whats-the-best-website-for-geotagged-photos/; Exhibit 1033 of Smith Declaration entered Jul. 13, 2022, in Post-Grant Review of U.S. Pat. No. 11,017,020, PGR2022-00006 (6 pages).
Sheong, C, S., *Ruby on Rails Web Mashups Projects*, Packt Publishing, ISBN: 978-847193-93-3, 2008.
Shneiderman, B. & Plaisant, C., "Designing the User Interface: Strategies for Effective Human-Computer Interaction (5th. ed.)," Addison-Wesley Publishing Company, USA, pp. vii-xviii, 456-457, alleged by Unified Patent to have been published in 2009 (28 pages).

(56) References Cited

OTHER PUBLICATIONS

Shneiderman, B. et al., "A Photo History of SIGCHI: Evolution of Design from Personal to Public," Interactions, pp. 17-23, May-Jun. 2002.

Shneiderman, B. et al., "Find That Photo! Interface Strategies to Annotate, Browse, and Share," Communications of the ACM, 49(4):69-71, Apr. 2006 (3 pages).

SimpleK12, "Flickr—Navigate Flickr—Imaging and Multimedia," YouTube.com, published online on Jul. 6, 2011, at https://www.youtube.com/watch?v=kpL1j89os9g.

Sjödin, E., "Photographs with Embedded Spatial Metadata," Linkopings Universitet, Department of Science and Technology, Norrkoping, Sweden, published Oct. 31, 2006.

Slingsby, A. et al.; "Interactive tag maps and tag clouds for the multiscale exploration of large spatio-temporal datasets"; Information Visualization, pp. 497-504; 2007, IV '07. 11$^{th}$ International Conference. ISSN: 1550-6037 (9 pages).

Snavely et al., "Photo Tourism: Exploring Photo Collection in 3D", SIGGRAPH '06 ACM Transactions on Graphics, vol. 25, Issue 3, pp. 835-846, 2006 ACM.

Soham Adwani, "Instagram 3.0 Features and First Look," YouTube.com, published online on Aug. 16, 2012, at https://www.youtube.com/watch?v=bJThox0QpSg.

Spinellis, D., "Position-Annotated Photographs: A Geotemporal Web," Pervasive Computing, 2(2): 72-79, Apr.-Jun. 2003, Jun. 11, 2003.

Suh, B. et al., "Automatic Thumbnail Cropping and its Effectiveness," Proceedings of the 16th Annual ACM Symposium on User Interface Software and Technology, pp. 95-104, 2003 (10 pages).

Suh, B., "Image Management Using Pattern Recognition Systems," Dissertation submitted to the Faculty of the Graduate School of the University of Maryland, College Park, in partial fulfillment of the requirements for the degree of Doctor of Philosophy, 2005.

Supplemental Declaration of Kevin Jakel (redacted version), regarding U.S. Pat. No. 10,621,228, dated Dec. 30, 2021 (13 pages).

Tomasson et al., "PhotoCube: Effective and Efficient Multi-Dimensional Browsing of Personal Photo Collections", ICMR '11, 2011, ACM.

Torniai et al., "Sharing, Discovering and Browsing Geotagged Pictures on the Web", 2007, Hewlett-Packard Development Company, L.P., pp. 1-18.

Toyama, K. et al., "Geographic Location Tags on Digital Images," MM'03, pp. 156-166, Berkeley, California, USA, Nov. 2-8, 2003.

Transcript of Deposition of Kevin Jakel (redacted version) of IPR2019-00482, dated Oct. 15, 2019 (209 pages).

Transcript of the Deposition of Dr. Benjamin B. Bederson, Ph.D, vol. I-II, dated May 24, 2022, before the United States Patent and Trademark Office Patent Trial and Appeal Board, in Inter Partes Review of U.S. Pat. No. 10,621,228, IPR2021-01413.

Transcript of the Deposition of Kevin Jakel [Redacted], dated May 26, 2022, before the United States Patent and Trademark Office Patent Trial and Appeal Board, in Inter Partes Review of U.S. Pat. No. 10,621,228, IPR2021-01413.

Trattner et al., "Evaluating Tag-Based Information Access in Image Collections", Proceedings of the 23$^{rd}$ ACM Conference on Hypertext and Social Media, pp. 113-122, 2012 ACM.

Unified Patents Website Link, "Benefits for Large Company Members," available online at URL:https://web.archive.org/web/20130907064849/http://www.unifiedpatents.com:80/benefits/large_companies.html ; archived on Sep. 7, 2013.

Unified Patents Website Link, "FAQ," available online at URL:https://www.unifiedpatents.com/faq ; retrieved from the internet on Dec. 16, 2021.

Unified Patents Website Link, "NPE Zones," available online at URL:https://www.unifiedpatents.com/npe ; retrieved from the internet on Dec. 16, 2021.

Unified Patents Website Link, "Unified Patents' Collaborative Deterrence Approach," available online at URL:https://web.archive.org/web/20130413073000/www.unifiedpatents.com:80/solution/unified_patents.html ; archived on Apr. 13, 2013.

Unified Patents Website Link,"Success at Challenging Bad Patents," available online at URL:https://www.unifiedpatents.com/success; retrieved from the internet on Dec. 16, 2021.

Verhoog, T., "How to Tag Your Friends in Photos on Flickr," MakeUseOf.com, published online on Nov. 6, 2009, at https://www.makleuseof.com/tag/how-to-tag-your-friends-in-photos-on-flickr/.

Viana, W. et al., "PhotoMap: automatic spatiotemporal annotation for mobile photos," Journal of Location Based Services, 2(3): 211-235, published online Jan. 27, 2009.

Wezlo, "Searching Flickr," YouTube.com, published online on Aug. 2, 2012, at https://www.youtube.com/watch?v=--dtW81js-A.

Wiegner, K., "Illustra Charts Its Own Path—Positions hybrid relational database to handle multimedia," Dow Jones, InformationWeek, No. 498, published on Oct. 24, 1994.

Wikipedia.org, "Image organizer," archived online on Apr. 27, 2010, at https://web.archive.org/web/20100427092553/https:/en.wikipedia.org/wiki/Image_organizer.

Wikipedia.org, "Photo sharing," archived online on Jan. 1, 2012, at https://web.archive.org/web/20120121103630/http://en.wikipedia.org/wiki/Photo_sharing.

Wilkinson, D., *Flickr Mashups*, Wiley Publishing, Inc., ISBN: 978-0-470-09774-8, 2007.

Wu, T., "Aperture 3: Part 1," Tony WuBlog.com, published online on Mar. 30, 2010, archived on Apr. 2, 2010, at https://web.archiveorg/web/20100402224207/http://www.tonywublog.com/20100330/first-good-impressions-using-aperture-3.html.

Yee et al., "Faceted Metadata for Image Search and Browsing", CHI 2003, pp. 401-408, 2003, ACM.

Yousef, K. & O'Neill, E., "Sunrise: Towards Location Based Clustering for Assisted Photo Management," ICMI '07 Workshop on Tagging, Mining and Retrieval of Human-Related Activity Information, pp. 47-54, Nagoya, Japan, Nov. 15, 2007.

Zang, N., "Mashups for the Web-Active End User," A Thesis in Information Sciences and Technology, submitted in partial fulfillment of the requirements for the degree of Master of Science, The Pennsylvania State University, Dec. 2008.

Zhang, L. et al., "Auto+A1:A534mated Annotation of Human Faces in Family Albums," Proceedings of the 11th ACM International Conference on Multimedia, pp. 355-358, Nov. 2003.

Aperture 3 System, alleged by Apple Inc. to be available as early as Feb. 9, 2010, in Apple's Preliminary Invalidity Contentions (See Ref. D90) and alleged by Samsung Electronics Co., Ltd. to be available as early as Feb. 2010 in Samsung's Preliminary Invalidity Contentions (See Ref. D488); the Aperture 3 System is alleged to by Apple to be exemplified in the documents cited by Applicant as Refs. H57-H65, H177-H178, and H192, in the Second Information Disclosure Statement of prior U.S. Appl. No. 17/667,408, filed Feb. 8, 2022, now issued as U.S. Pat. No. 11,481,433, and also alleged by Samsung to be exemplified in the documents cited by Applicant as Refs. H57-H58, H64 in the Second Information Disclosure Statement of prior U.S. Appl. No. 17/667,408, filed Feb. 8, 2022, now issued as U.S. Pat. No. 11,481,433.

Flickr System, alleged by Apple Inc. to be available as early as Feb. 27, 2006, in Apple's Preliminary Invalidity Contentions (See Ref. D90) and alleged by Samsung Electronics Co., Ltd. to be available as early as 2011 in Samsung's Preliminary Invalidity Contentions (See Ref. D488); the Flickr System is alleged by Apple to be exemplified in the documents cited by Applicant as Refs. H49, H71, H87, H125, H130, H136-H140, H142-H153, H187, and H274, in the Second Information Disclosure Statement of prior U.S. Appl. No. 17/667,408, filed Feb. 8, 2022, now issued as U.S. Pat. No. 11,481,433, and also alleged by Samsung to be exemplified in the documents cited by Applicant as Refs. H49, H87, H121, H125, H130, H136-H143, H145-H153, and H274, in the Second Information Disclosure Statement of prior U.S. Appl. No. 17/667,408, filed Feb. 8, 2022, now issued as U.S. Pat. No. 11,481,433..

Google Earth System, alleged by Apple Inc. to be available as early as 2006 in Apple's Preliminary Invalidity Contentions (See Ref. D90); the Google Earth System is alleged by Apple to be exemplified in the document cited by Applicant as Ref. H171, in the Second Information Disclosure Statement of prior U.S. Appl. No. 17/667,408, filed Feb. 8, 2022, now issued as U.S. Pat. No. 11,481,433.

(56) References Cited

OTHER PUBLICATIONS

Google Maps System, alleged by Apple Inc. to be available as early as 2006 in Apple's Preliminary Invalidity Contentions (See Ref. D90); the Google Maps System is alleged by Apple to be exemplified in the documents cited by Applicant as Refs. H161 and H171, in the Second Information Disclosure Statement of prior U.S. Appl. No. 17/667,408, filed Feb. 8, 2022, now issued as U.S. Pat. No. 11,481,433.
Google Picasa System, including Picasa 3.5, alleged by Apple Inc. to be available as early as Sep. 22, 2009, in Apple's Preliminary Invalidity Contentions (See Ref. D90) and alleged by Samsung Electronics Co., Ltd. to be available as early as Sep. 2008 in Samsung's Preliminary Invalidity Contentions (See Ref. D488); the Google Picasa System, including Picasa 3.5, is alleged by Apple to be exemplified in the documents cited by Applicant as Refs. H85, H93-H99, H103, H128, H131, H167, and H187, in the Second Information Disclosure Statement of prior U.S. Appl. No. 17/667,408, filed Feb. 8, 2022, now issued as U.S. Pat. No. 11,481,433, and also alleged by Samsung to be exemplified in the documents cited by Applicant as Refs. H93-H102 and H245, in the Second Information Disclosure Statement of prior U.S. Appl. No. 17/667,408, filed Feb. 8, 2022, now issued as U.S. Pat. No. 11,481,433.
Instagram System, including Instagram 3.0, alleged by Apple Inc. to be available as early as Aug. 2012 in Apple's Preliminary Invalidity Contentions (See Ref. D90) and alleged by Samsung Electronics Co., Ltd. to be available as early as Aug. 2012 in Samsung's Preliminary Invalidity Contentions (See Ref. D488); the Instagram System, including Instagram 3.0, is alleged by Apple to be exemplified in the documents cited by Applicant as Refs. H88-H92, in the Second Information Disclosure Statement of prior U.S. Appl. No. 17/667,408, filed Feb. 8, 2022, now issued as U.S. Pat. No. 11,481,433, and also alleged by Samsung to be exemplified in the documents cited by Applicant as Refs. H88-H92, in the Second Information Disclosure Statement of prior U.S. Appl. No. 17/667,408, filed Feb. 8, 2022, now issued as U.S. Pat. No. 11,481,433.
IOS 7 Photos System, alleged by Apple Inc. to be available as early as Jun. 10, 2013, in Apple's Preliminary Invalidity Contentions (See Ref. D90); the iOS 7 Photos System is alleged by Apple to be exemplified in the documents cited by Applicant as Refs. H66, H70, H84, and H176, in the Second Information Disclosure Statement of prior U.S. Appl. No. 17/667,408, filed Feb. 8, 2022, now issued as U.S. Pat. No. 11,481,433.
IPhoto '09 System, alleged by Apple Inc. to be available as early as Jan. 6, 2009, in Apple's Preliminary Invalidity Contentions (See Ref. D90) and alleged by Samsung Electronics Co., Ltd. to be available as early as Jan. 2009 in Samsung's Preliminary Invalidity Contentions (See Ref. D488); the iPhoto '09 System is alleged by Apple to be exemplified in the documents cited by Applicant as Refs. H67, H173, and H179-H186, in the Second Information Disclosure Statement of prior U.S. Appl. No. 17/667,408, filed Feb. 8, 2022, now issued as U.S. Pat. No. 11,481,433, and also alleged by Samsung to be exemplified in the documents cited by Applicant as Refs. H67 and H179, in the Second Information Disclosure Statement of prior U.S. Appl. No. 17/667,408, filed Feb. 8, 2022, now issued as U.S. Pat. No. 11,481,433.
Microsoft GeoPhoto System, alleged by Apple Inc. to be available as early as Jun. 4, 2013, in Apple's Preliminary Invalidity Contentions (See Ref. D90); the Microsoft GeoPhoto System is alleged by Apple to be exemplified in the documents cited by Applicant as Refs. H156-H158, in the Second Information Disclosure Statement of prior U.S. Appl. No. 17/667,408, filed Feb. 8, 2022, now issued as U.S. Pat. No. 11,481,433.
Microsoft Photo Location Viewer System, alleged by Apple Inc. to be available as early as Jul. 8, 2013, in Apple's Preliminary Invalidity Contentions (See Ref. D90); the Microsoft Photo Location Viewer System is alleged by Apple to be exemplified in the documents cited by Applicant as Refs. H188-H189, in the Second Information Disclosure Statement of prior U.S. Appl. No. 17/667,408, filed Feb. 8, 2022, now issued as U.S. Pat. No. 11,481,433.
Panoramio System, alleged by Apple Inc. to be available as early as May 30, 2007, in Apple's Preliminary Invalidity Contentions (See Ref. D90) and alleged by Samsung Electronics Co., Ltd. to be available as early as 2011 in Samsung's Preliminary Invalidity Contentions (See Ref. D488); the Panoramio System is alleged by Apple to be exemplified in the documents cited by Applicant as Refs. H50, H82, H104-H122, and H32, in the Second Information Disclosure Statement of prior U.S. Appl. No. 17/667,408, filed Feb. 8, 2022, now issued as U.S. Pat. No. 11,481,433, and also alleged by Samsung to be exemplified in the documents cited by Applicant as Refs. H50, H82, H104-H108, H110-H118, and H122, in the Second Information Disclosure Statement of prior U.S. Appl. No. 17/667,408, filed Feb. 8, 2022, now issued as U.S. Pat. No. 11,481,433.
Record of Oral Hearing, held Mar. 14, 2023, before the Patent Trial and Appeal Board of the United States Patent and Trademark Office in Inter Partes and Post Grant Review of U.S. Pat. Nos. 10,621,228, IPR2022-00031; 9,552,376, IPR2022-00032; 10,423,658, IPR2022-00033; and 11,017,020, PGR2022-00006 (86 pages).
Record of Oral Hearing, held virtually May 9, 2023, before the Patent Trial and Appeal Board of the United States Patent and Trademark Office in Inter Partes Review of U.S. Pat. No. 10,423,658, IPR2022-00221 (59 pages).
Petitioner's Reply to Patent Owner's Response, filed Jun. 15, 2023, by Samsung Electronics Co. Ltd., before the Patent Trial and Appeal Board of the United States Patent and Trademark Office in Post Grant Review of U.S. Pat. No. 11,163,823, PGR2022- 00034 (32 pages).
Ex. 1027: Second Declaration of Dr. Philip Greenspun, by Samsung Electronics Co. Ltd., before the Patent Trial and Appeal Board of the United States Patent and Trademark Office in Post Grant Review of U.S. Pat. No. 11,163,823, PGR2022-00034 (14 pages).
Ex. 1028: Second Declaration of Ms. June Munford, by Samsung Electronics Co. Ltd., before the Patent Trial and Appeal Board of the United States Patent and Trademark Office in Post Grant Review of U.S. Pat. No. 11,163,823, PGR2022-00034 (82 pages).
Ex. 1029: Transcript of the deposition of Dr. Glenn Reinman dated May 25, 2023, by Samsung Electronics Co. Ltd., before the Patent Trial and Appeal Board of the United States Patent and Trademark Office in Post Grant Review of U.S. Pat. No. 11,163,823, PGR2022-00034 (91 pages).
Ex. 1030: Transcript of the deposition of Dr. Glenn Reinman dated Nov. 16, 2022, from IPR2022-00222, by Samsung Electronics Co. Ltd., before the Patent Trial and Appeal Board of the United States Patent and Trademark Office in Post Grant Review of U.S. Pat. No. 11,163,823, PGR2022-00034 (157 pages).
Ex. 1031: Transcript of the deposition of Dr. Glenn Reinman dated Jan. 24, 2023, from IPR2022-00221, by Samsung Electronics Co. Ltd., before the Patent Trial and Appeal Board of the United States Patent and Trademark Office in Post Grant Review of U.S. Pat. No. 11,163,823, PGR2022-00034 (196 pages).
Ex. 1032: Transcript of the deposition of Dr. Philip Greenspun dated Aug. 26, 2022, from IPR2022-00222, by Samsung Electronics Co. Ltd., before the Patent Trial and Appeal Board of the United States Patent and Trademark Office in Post Grant Review of U.S. Pat. No. 11,163,823, PGR2022-00034 (69 pages).
Ex. 1033: Transcript of the deposition of Dr. Philip Greenspun dated Oct. 21, 2022, from IPR2022-00221, by Samsung Electronics Co. Ltd., before the Patent Trial and Appeal Board of the United States Patent and Trademark Office in Post Grant Review of U.S. Pat. No. 11,163,823, PGR2022-00034 (91 pages).
Ex. 1034: O'Reilly, iPhoto '09: The Missing Manual (Archive.org: May 4, 2009), available at [https://web.archive.org/web/20090504220134/http://oreilly.com:80/catalog/9780596801441/] [https://web.archive.org/web/20090504115342/http://oreilly.com:80/pub/topic/digiphoto], by Samsung Electronics Co. Ltd., before the Patent Trial and Appeal Board of the United States Patent and Trademark Office in Post Grant Review of U.S. Pat. No. 11,163,823, PGR2022-00034 (1 pages).
Ex. 1035: O'Reilly, Digital Photography (Archive.org: May 4, 2009), available at [https://web.archive.org/web/20090504115342/http://oreilly.com:80/pub/topic/digiphoto], by Samsung Electronics Co. Ltd., before the Patent Trial and Appeal Board of the United

(56) References Cited

OTHER PUBLICATIONS

States Patent and Trademark Office in Post Grant Review of U.S. Pat. No. 11,163,823, PGR2022-00034 (10 pages).
Ex. 1036: iPhoto '09: Visual QuickStart Guide (Archive.org: Jul. 17, 2009), available at [https://web.archive.org/web/20090717045838/http://www.take controlbooks.com:80/iPhoto09-vqs], by Samsung Electronics Co. Ltd., before the Patent Trial and Appeal Board of the United States Patent and Trademark Office in Post Grant Review of U.S. Pat. No. 11,163,823, PGR2022-00034 (1 pages).
Ex. 1037: IPhoto 09 for MAC OSX: Visual QuickStart Guide First Edition (accessed Jun. 15, 2023), available at [https://www.amazon.com/dp/B0BWSG7T8R/?_encoding-UTF8&actionCode=AMZPP30DTRIAL38505222394DB&ref_dbl_ilm_brth&pd_rd_w=G6ryD&contentid=amzn1.sym.c1059ee9-4524-46e0-9adba8346eecdda6&pf_rd_p=c1059ee9-4524-46e0-9adba8346eecdda6&pf_rd_r=1PME5858AP0DKPK8Q2PM&pd_rd_wg=DEwzg&pd_rd_r=46f5fa0b-b0c0-4be6-blde-95f7903c8146], by Samsung Electronics Co. Ltd., before the Patent Trial and Appeal Board of the United States Patent and Trademark Office in Post Grant Review of U.S. Pat. No. 11,163,823, PGR2022-00034 (4 pages).
[Public Version] Final Written Decision Determining All Challenged Claims Unpatentable 35 U.S.C. § 318(a), entered Apr. 5, 2023, before the Patent Trial and Appeal Board of the United States Patent and Trademark Office in Inter Partes Review of U.S. Pat. No. 10,621,228, IPR2021-01413 (118 pages).
Final Written Decision Determining All Challenged Claims Unpatentable 35 U.S.C. § 318(a), entered May 18, 2023, before the Patent Trial and Appeal Board of the United States Patent and Trademark Office in Inter Partes Review of U. S. Pat. No. 10,423,658, IPR2022-00033 (87 pages).
Patent Owner's Demonstrative Exhibit, filed Mar. 9, 2023, by MemoryWeb, LLC, before the Patent Trial and Appeal Board of the United States Patent and Trademark Office in Inter Partes Review of U.S. Pat. Nos. 10,621,228, IPR2022-00031; 10,423,658, IPR2022-00033; 9,552,376, IPR2022-00032; and Post Grant review of U.S. Pat. No. 11,017,020, PGR2022-00006 (154 pages).
Patent Owner's Demonstrative Exhibit, filed Mar. 9, 2023, by MemoryWeb, LLC, before the Patent Trial and Appeal Board of the United States Patent and Trademark Office in Inter Partes Review of U.S. Pat. No. 10,621,228, IPR2022-00222 (71 pages).
Patent Owner's Demonstrative Exhibit, filed May 2, 2023, by MemoryWeb, LLC, before the Patent Trial and Appeal Board of the United States Patent and Trademark Office in Inter Partes Review of U.S. Pat. No. 10,621,228, IPR2022-00222 (90 pages).
Patent Owner's Request for Rehearing, filed Apr. 13, 2023, by MemoryWeb, LLC, before the Patent Trial and Appeal Board of the United States Patent and Trademark Office in Inter Partes Review of U.S. Pat. No. 10,621,228, IPR2021-01413 (24 pages).
Petitioner's Demonstratives, filed May 2, 2023, by Samsung Electronics Co. Ltd., before the Patent Trial and Appeal Board of the United States Patent and Trademark Office in Inter Partes Review of U.S. Pat. No. 10,423,658, IPR2022-00221 (62 pages).
Record of Oral Hearing, held Mar. 16, 2023, submitted Apr. 26, 2023, by the Patent Trial and Appeal Board of the United States in Inter Partes Review of U.S. Pat. No. 10,621,228, IPR2022-00222 (80 pages).

* cited by examiner

FIG. 2
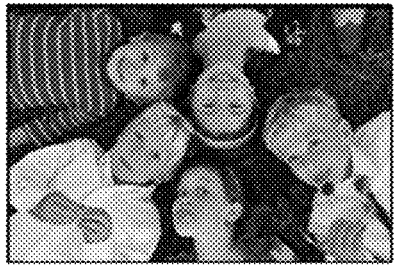
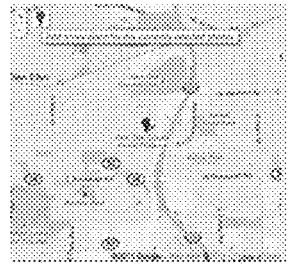
Comments:
Suzanne and Anthony's Wedding Party where the cousins posed for a photo in the grass. Note, Jack with the lollipop and the photographer with his shoe in the photo
People:
Jack Wong
CJ Wong
Mary Firestone
Zoe Peika
Nick Persons
Event: Suzanne & Anthony's Wedding Reception 2010
Camera Details: more
Location:
Historical Society
Lisle, IL 60532

FIG. 7

Clinton Dewitt Firestone IV

Birth: July 12, 1896
Death: April 29, 1971
Parents: Clinton Dewitt Firestone III and Viola Miller
Comments: He was a WWII U.S. Air force pilot and POW in WWII and veteran honorably discharged in December of 1947. He worked for 44 years for the Firestone Tire and Rubber Company in retail, wholesale and original equipment sales, marketing and management. He was born in Akron, OH and is buried in Columbiana, OH.

Edit bio

Locations       Timeline       Family Tree       Recipes

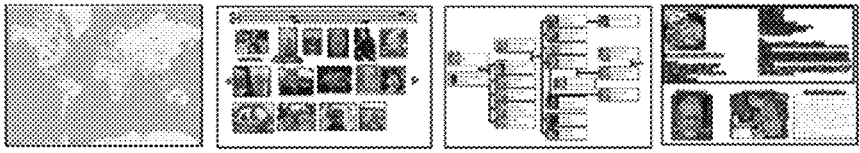

FIG. 10

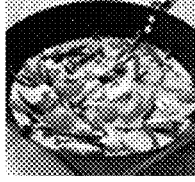

Desmond's Yellow Thai Chicken Curry

Curry Mix
- Coconut milk (400 ml) -- DO NOT SHAKE IT UP
- 800 gram of chicken (4 chicken breast)
- Fish sauce (Nam Pla) Thai Bamboo Garden – Bottle
- Garlic (2 cloves)
- Broccoli ( 2cups chopped)
- 2 Peppers (chopped)
- 2 Carrots (chopped)

- 1 Zucchini (chopped)
- Thai Basil (8 leaves)
- Lemon Grass (in jar) 1 teaspoon
- Chinese Ginger Root (in jar) 1 teaspoon Rice
- Thai Rice (something that only takes 2 cups of water)
- Dice chicken in bowl and add two tablespoons of fish sauce. Let marinate for 20 minutes.
- Take thick part of coconut milk out into pan (about 4 tablespoons), Curry paste, 1 spoon of lemon grass, 1 spoon of ginger and garlic. Heat over high with boil and THEN stir for 1 minute. Add meat (uncooked) and fry until cooked over high heat
- Add milk, brown sugar and salt. Bring back to slight boil and constantly stir. Add veggies and soy sauce. Cook for about 10-14 minutes COVERED until veggies are cooked. Serve with a smile.

Chef: Barry Desmond

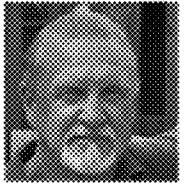

Video on How to Make It

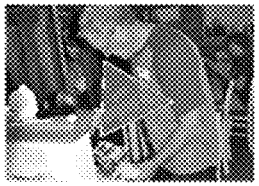

Original Handwritten Recipe

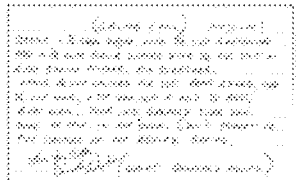

FIG. 11

| Album/Event | Date | Location | # Photos | # Videos | # Docs |
|---|---|---|---|---|---|
| Jack Monk's Arrival | 26-Dec-2003 | Chicago, IL | 69 | 4 | 4 |
| Mike Testy's First Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 2nd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 3rd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Wrigley Monk's Arrival | 29-Dec-2003 | Chicago, IL | 69 | 4 | 4 |
| Mike Testy's 4th Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Nancy Learns How to Ride a Bike | 21-Jul-1978 | St. Louis, MO | 76 | 2 | 0 |

Thumbnail | Table

FIG. 12

| Album/Event | Date | Location | # Photos | # Videos | # Docs |
|---|---|---|---|---|---|
| Jack Monk's Arrival | 26-Dec-2003 | Chicago, IL | 69 | 4 | 4 |
| Mike Testy's First Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 2nd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Monk's Arrival | 29-Dec-2003 | Chicago, IL | 69 | 4 | 4 |
| Mike Testy's 3rd Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Jack Wrigley Monk's Arrival | 29-Dec-2003 | Chicago, IL | 69 | 4 | 4 |
| Mike Testy's 4th Birthday | 13-Sep-1983 | Minneapolis, MN | 54 | 21 | 0 |
| Cubs Beat Cards 1998 | 5-Aug-1998 | Chicago, IL | 36 | 2,199 | 2 |
| Nancy Learns How to Ride a Bike | 21-Jul-1978 | St. Louis, MO | 76 | 2 | 0 |

Thumbnail | Table

FIG. 14

| Last Name | Relationship | # Photos | # Videos | # Docs |
|---|---|---|---|---|
| Alberts, John | Cousin | 8 | 0 | 0 |
| Killian, Jack | Son | 7 | 0 | 0 |
| Killian, Brian | Nephew | 8 | 0 | 0 |
| Killian, Kevin | Nephew | 8 | 0 | 0 |
| Killian, Sarah | Daughter-in-law | 7 | 1 | 0 |
| Killian, John | Great Nephew | 6 | 2 | 2 |
| Killian, Mark | Great Nephew | 5 | 4 | 1 |
| Killian, Louis | Great Grandson | 7 | 3 | 2 |
| Killian, John | Grandson | 499 | 4 | 14 |
| Monk, CJ | Great Grandson | 200 | 2 | 7 |
| Monk, Jack | Great Grandson | 199 | 2 | 7 |
| Firestone, Mike | Third Cousin | 1249 | 17 | 39 |
| Moore, Bertha | Great Niece | 4 | 6 | 3 |
| Slythe, Sarah | Sister | 9 | 0 | 9 |
| Killian, John | Brother | 249 | 1 | 3 |
| Killian, Mike | Brother | 788 | 2 | 12 |

Thumbnail | Table

FIG. 15

| Location Name | Address | City | State | Country | # Photos | # Videos | # Docs |
|---|---|---|---|---|---|---|---|
| Dom | | Cologne | | Germany | 3 | 2 | 0 |
| Lucilla & Roberto | | Montalcino | | Italy | 6 | 1 | 0 |
| Lisle Home | 898 West St | Lisle | IL | USA | 45 | 12 | 2 |
| College | 545 Market | Akron | OH | USA | 64 | 2 | 0 |
| Amazon Trip | | Manus | | Brazil | 235 | 8 | 2 |
| Cabin | 999 Pine | Lake Geneva | WI | USA | 98 | 2 | 0 |
| Grad School | 903 Plymouth | Charleston | IL | USA | 1256 | 32 | 4 |
| Griffith Park | 298 Glencarin | Los Feliz | CA | USA | 12 | 0 | 0 |
| LA Equestrian Ctr | 568 Horse Dr | Glendale | CA | USA | 4 | 4 | 0 |
| Del Coronado | 12 Coronado Dr | Coronado | CA | USA | 321 | 4 | 0 |
| Fenway Park | 123 Yawke | Boston | MA | USA | 57 | 3 | 5 |
| Wrigley Field | 1190 W Addison | Chicago | IL | USA | 498 | 7 | 3 |
| Home | 444 Main | Anywhere | IL | USA | 10,987 | 49 | 9 |
| GA Grill Party | 321 Silver | Macon | GA | USA | 15 | 0 | 0 |
| Pike's Market | 786 Market | Seattle | WA | USA | 18 | 1 | 0 |
| Raffels | 345 Fong | Singapore | | Singapore | 23 | 2 | 0 |

Thumbnail | Table

FIG. 16

| | | | Category \| Card \| Table |
|---|---|---|---|

| Recipe | Chef | Date | Category |
|---|---|---|---|
| Blacks Yellow Thai Chicken Curry | Jack Black | 31 Jan 2010 | Dinner |
| Skinny Germans | Gerda | 29 Dec 2003 | Breakfast |
| KFC in a Bag | The Kernal | 13 Sept 1988 | Anytime |
| Shit on a Shingle | George James | 5 Aug 1998 | Anytime |
| Mrs. Fields Cookies | Mrs. Fields | 21 July 1978 | Dessert |
| Chicken Pot Pie | Jack Black | 31 Jan 2010 | Dinner |
| Roll Your Own Dough | Vito Spadavecchio | 29 Dec 2003 | Dinner |
| Pizza ala Franciscan | Charles Faso | 13 Sept 1988 | Dinner |
| Meatball Delight | Ben Delight | 5 Aug 1998 | Dinner |
| Almond Cookies | Lori James | 21 July 1978 | Dessert |
| Jumpin Jack Flap Jacks | Jack Jack | 31 Jan 2010 | Breakfast |
| Vicki's Chow Mein | Vicki Firestone | 29 Dec 2003 | Dinner |
| Fat Steak | Barry Monk | 13 Sept 1988 | Dinner |
| Mud Pie | Nancy Monk | 5 Aug 1998 | Dessert |
| Caesar Salad | Christopher Monk | 21 July 1978 | Anytime |
| Daddio Pancakes | Barry Monk | 2 March 2011 | Breakfast |

FIG. 19

Captain Phil's Memory-Webb

Welcome, Captain Phil
Last Login:   11.18.2010

My recent memories:
- 123 Photos uploaded on 11.07.10
- 2 albums created 11.17.10
- 12 visitors since last login date
- 123 Photos uploaded on 11.07.10
- 2 albums created 11.17.10

My recent Webb views:
- Captain Phil 2010 (photo album)
- Chicken Pot Pie (recipe)
- Captain Phil (Timeline)

Updates and Alerts:
- License renewal due 1.15.2011

| Media | Count | Archive Status | Count |
|---|---|---|---|
| # Photos | 1,342 | | 80% complete |
| # Videos | 75 | | 61% complete |
| # Documents | 173 | | |

People Stats:

| Last Name | # People | # Photos | # Videos | # Docs |
|---|---|---|---|---|
| Monk | 7 | 499 | 4 | 14 |
| Firestone | 11 | 1,249 | 17 | 39 |
| Testy | 4 | 788 | 1 | 12 |

Event Stats:

| Event | Date | Location | # Media |
|---|---|---|---|
| Mike Testy's 1st Birthday | 13-Sept-1988 | Minneapolis, MN | 21 |
| Cubs Beat Cards Aug 1998 | 5-Aug-1998 | Chicago, IL | 2,199 |
| Nancy Learns to Ride Bike | 21-July-1978 | St. Louis, MO | 2 |

FIG. 29
Structure
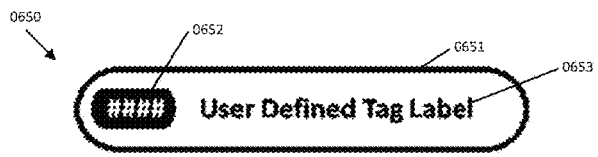
Examples
Within Character Limit for Labels and Numbers
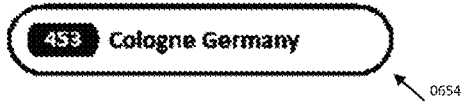
Exceeds Character Limit for Label and Numbers
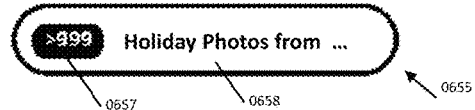
Dotted Application Dot-Tag denotes partial relationship. In this example, person is a half-sibling to another person.
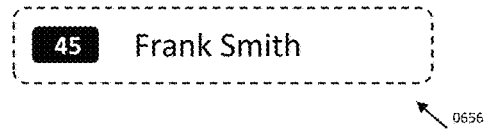

FIG. 34
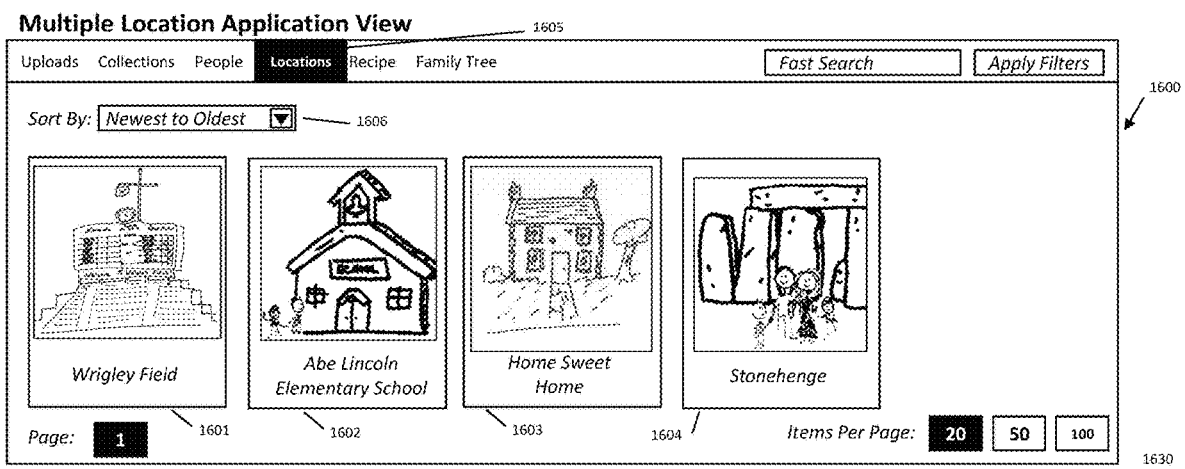
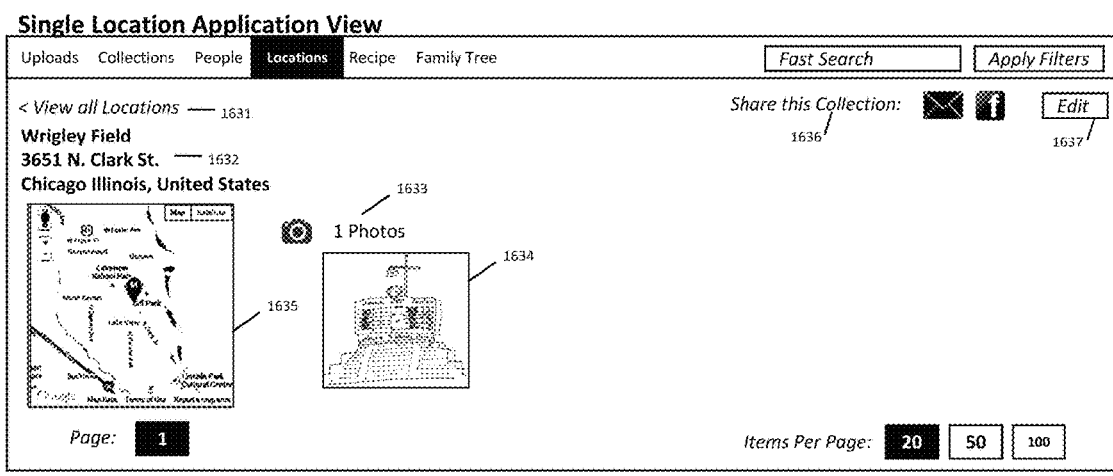

METHOD AND APPARATUS FOR MANAGING DIGITAL FILES

CROSS-REFERENCE TO RELATED APPLICATIONS

This application is a continuation of U.S. patent application Ser. No. 17/459,933, filed Aug. 27, 2021, which is a continuation of U.S. patent application Ser. No. 16/536,300, filed Aug. 8, 2019, now U.S. Pat. No. 11,163,823, which is a continuation of U.S. patent application Ser. No. 15/375,927, filed Dec. 12, 2016, now U.S. Pat. No. 10,423,658, which is a continuation of U.S. patent application Ser. No. 14/193,426, filed Feb. 28, 2014, now U.S. Pat. No. 9,552,376, which is a continuation-in-part of and claims priority to U.S. patent application Ser. No. 13/157,214, filed Jun. 9, 2011, now U.S. Pat. No. 9,098,531, each of which is hereby incorporated by reference herein in its entirety.

FIELD OF THE INVENTION

The present invention relates generally to the management of digital files and, more particularly, to a computer-implemented system and method for managing and using digital files such as digital photographs.

BACKGROUND OF THE INVENTION

Prior to the invention of digital photography, people tended to share photos by displaying printed copies in frames and albums, or would store them in a container in hope of preserving these assets for future use or future generations. Important photos would often be inscribed on the back with significant details (people, location, event, etc.) to preserve the memory of that particular occasion. Many people would share their memories by assembling an album that could be viewed with others. Occasionally, extra copies of special photos were printed for friends, relatives, etc. At one time, film slide shows were also a popular medium for sharing photo memories.

With the evolution of digital files, there has been explosive growth in the number of individuals taking digital photos, converting old photos to digital copies, making movies and gathering digital documents and in the sheer number of files people are capturing digitally. Today, virtually every personal computing device contains some kind of photo, movie or other type of digital file creator/player/viewer/storer/etc.

At the same time, there is little to no cost for people to store large amounts of photos in various "containers" of the modern age. Facebook, Flickr, Shutterfly and countless other social media and specialty digital files sites allow users to post and share images to a community with a frequency and ease that continues to feed the fire of the digital revolution. However, they don't allow much organization of digital tags, dynamic viewing of digital files, and the ability to export the digital files with new digital tags. Questionable and ever-changing privacy terms for user/account information, including digital files, have also left the marketplace leery of posting their full digital archive and associated context to these sites.

What is needed to complement the widespread availability of digital files is a medium that allows people to organize, view, preserve and share these files with all the memory details captured, connected and vivified via an interactive interface. Such a solution would allow digital files, including documents, photos, videos and audio, to tell a full story now, and for generations to come.

SUMMARY

In accordance with one embodiment, a computer-implemented method of associating digital tags with digital files comprises (1) storing, on one or more non-transitory computer-readable storage media, a plurality of digital files, each of the digital files having embedded therein content data and metadata including tags; (2) receiving, via a user interface device of a client device, a first tag label containing alpha-numeric text created and inputted by a user of the client device; (3) modifying, using a controller device, a selected first one of the tags of the metadata in a first of the digital files to include the first tag label; (4) receiving, via the user interface device or another user interface device, an instruction to search for all of the digital files having at least the first tag label; (5) responsive to receiving the instruction, automatically searching for all of the digital files having at least the first tag label; and (6) displaying, on a video display device associated with the client device, a first indication of the first tag label.

In another embodiment a computer-implemented method of associating digital tags with digital files comprises storing, on one or more non-transitory computer-readable storage media, a plurality of digital files, each of the digital files having a content data portion and a metadata portion including tags; displaying, on a video display device associated with a client device, a first graphical representation of a first tag label of a first of the tags and associated with a first of the digital files; receiving, via a user interface device of the client device, a selection by a user of the client device of the first graphical representation of the first tag label as a search filter criterion or a search string entered via the user interface device corresponding to the first tag label; responsive to the receiving, automatically searching through the digital files, using at least the first tag label as a search filter, for the digital files satisfying at least the search filter criterion; and displaying, on the video display device, an indication of the first tag label and a representation of the number of the digital files satisfying at least the search filter criterion.

In accordance with a further embodiment, a web-based digital file storage system comprises a digital file repository for storing and retrieving digital files; a digital tagging system permitting the user to assign a plurality of digital tags to each of the digital files, wherein the digital tagging system comprises at least one type of data selected from the group consisting of a person's name, a location, a recipe, a date, a family relationship, a person's profile, an event name, a rating, and a document type; a search filter, wherein the search filter allows the digital files to be searched according to a plurality of types of data; and a user interface that presents the digital files on a user's screen based on the digital tags, wherein the user interface further comprises a digital tag image, the digital tag image having at least one type of data represented thereon with text.

As described in detail below, the various embodiments provide much-needed platforms that save a user significant time, provide significant information with minimal screen space, and provide an appealing and customizable interface that will enhance the user experience.

BRIEF DESCRIPTION OF THE DRAWINGS

The invention may best be understood by reference to the following description taken in conjunction with the accompanying drawings, in which:

FIG. 2 is a screenshot of a photo detail view of one embodiment of the disclosed system.

FIG. 7 is a screenshot of a people profile view of one embodiment of the disclosed system.

FIG. 10 is a screenshot of a recipe chart, according to one embodiment of the disclosed system.

FIG. 11 is a screenshot of an album chart view of one embodiment of the disclosed system.

FIG. 12 is a screenshot of an event chart view of one embodiment of the disclosed system.

FIG. 14 is a screenshot of a family tree chart view of one embodiment of the disclosed system.

FIG. 15 is a screenshot of a location chart view of one embodiment of the disclosed system.

FIG. 16 is a screenshot of a recipe chart view of one embodiment of the disclosed system.

FIG. 19 is a screenshot of a homepage view of one embodiment of the disclosed system.

FIG. 29 is an illustration of the Application Dot-Tag Shape and Content.

FIG. 34 is a screenshot of Location Application Views.

DETAILED DESCRIPTION OF ILLUSTRATED EMBODIMENTS

Figure 1:
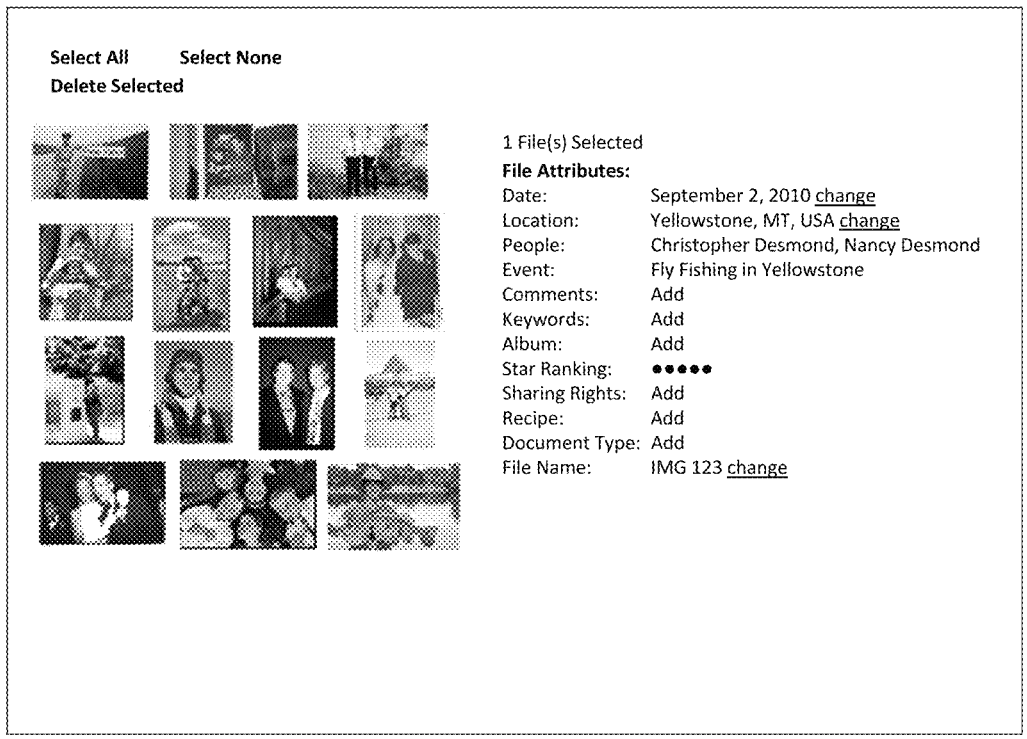
FIG. 1 is a screenshot of an organizational functionality view of one embodiment of the disclosed system.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

The present disclosure relates to one or more of the following features, elements or combinations thereof. A web-based digital file storage system is disclosed. The storage system may include a digital file repository for storing and retrieving digital files, such as photos, a digital tagging system configured to assign digital tags to the digital files, a sorting system, and a user interface.

The digital tagging system may include various types of data, such as a person's name, a location, a recipe, a date, a family relationship to the user, an event name, a rating, sharing rights, file type and a document name. The sorting system can allow the digital files to be searched and sorted according to a plurality of types of data and can be used for creating and organizing special views. The user interface may be user-configurable, and can present the digital files on a user's screen based on these user inputs.

The digital file repository may be accessible over the Internet. The sorting system may provide a user with the ability to search based on a plurality of digital tags. The disclosed system may also provide a way to track relationships between users, so that a family tree can be displayed.

Recipes may also be linked to a person's name, with, for example, a video and digital copy of original hand-written recipe to create a recipe view.

Moreover, the digital files and data can be exported as a single file with the digital tagging embedded within the exported file.

In another embodiment, a method of storing digital photographs is disclosed. The method may include the steps of storing a digital photograph in a file repository, associating a plurality of digital tags having different tag types with the digital photograph, providing a search function that permits searching by a plurality of digital tag types and provides a search result, and providing a user-configurable output to display the search result. The digital tag types may include, for example, a person's name, a location, a recipe, a date, a relationship, an event name, a rating, file type and a document type. The method may include a further step of providing access to the file repository via the Internet. The method may also allow for tracking relationships between users so that a family tree can be displayed.

Additional features of the disclosure will become apparent to those skilled in the art upon consideration of the following detailed description of preferred embodiments exemplifying the best mode of carrying out the invention as presently perceived.

The presently disclosed method and application (herein alternatively referred to as a "system") provides users with an Internet-based interactive platform to gather, organize, view, share and archive digital files using a proprietary organization system and export tagging process. As used herein, the word "tag" refers to any type of digital data that can be assigned to a file to describe some aspect of that file through a tagging process. For images, the tagging is preferably in EXIF format. For videos, documents and other file formats, any appropriate format may be used. The disclosed system allows users to create, view and share digital files, which could represent, for example, the memories a user has collected from the past and present, and could incorporate additional memories for generations to come. As outlined herein, various embodiments are disclosed that can accomplish these and other goals.

One disclosed embodiment includes an import feature. Users can import media files from users' favorite sources (e.g., computers, mobile phones, social networks, etc.). If any meta-tag information is embedded within the media (e.g., date taken and GPS coordinates), the system could automatically read and utilize it for the user. Digital files, media, meta-tags, and other data discussed herein may be saved to one or more file repositories (also referred to as a database herein).

In another aspect of the disclosed system, organizational functionality is provided. Similar to the concept of writing certain information "on the back of a photo," the system's digital tagging system and organizing feature allows a user to arrange large amounts of digital files with tags that can characterize and document the digital file(s). Digital files can be individually or group organized at the same time for many tags including, but not limited to, a person's name, family relationships of the subjects to the user and between each other (e.g., mother/father), location, date, event, album, comments, document type (e.g., birth certificate, poetry), recipe, ranking or rating, and sharing rights. Tags can be assigned to a single file at a time, or to a plurality of files at once. For example, if a user wishes to assign the tag "grandma" to 100 photos at once, the system provides a way for a user to select all 100 photos and enter the tag only once. An example of the manner in which digital photos can be organized is presented is seen in FIG. 1.

Yet another feature is the multiple views from which a user can display his or her digital media files and their tagged attributes. Using a user interface (e.g. a keyboard, mouse, or touch screen), users can select individual files, groups of files meeting specific criteria, or all files in their account from which to create views. These views may alternately take the form of a chart. These views will be auto-populated based upon either tag information already associated with the digital file upon import or the tags assigned to the digital files by the user within the aforementioned organization functionality. Each digital file can be enlarged, from any view or chart, by clicking an information ("i") button to show an enlarged version of the digital media file with all the tags that are assigned to that digital file, as illustrated in FIG. 2. In another embodiment, the user interface may be user-configurable, as discussed further herein.

Figure 3:
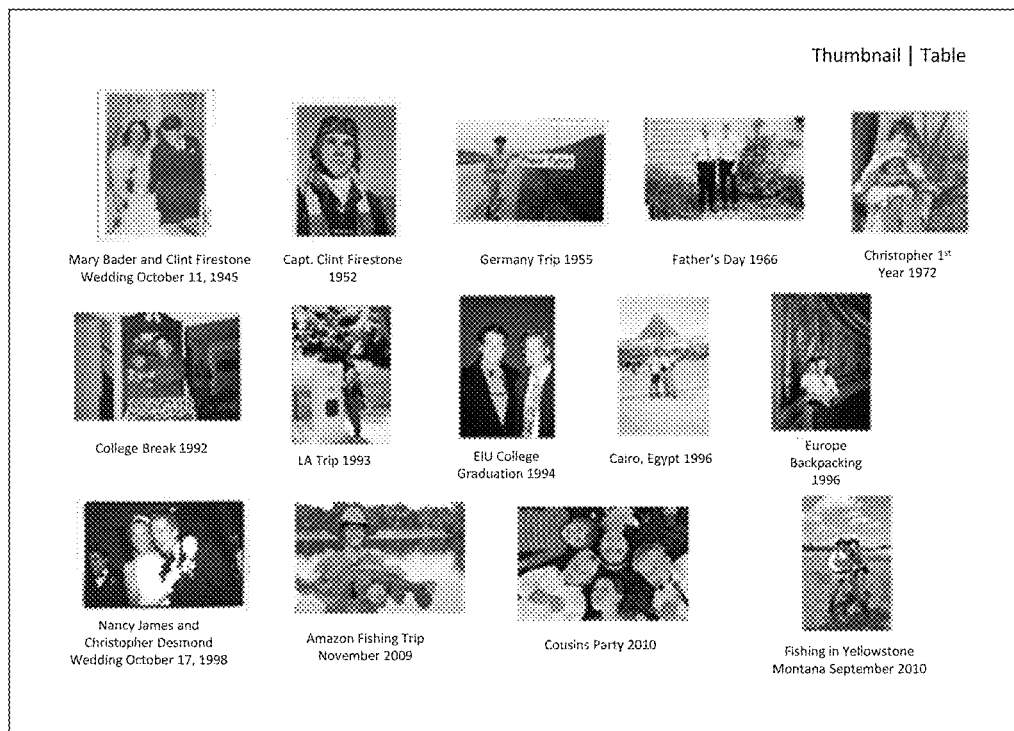
FIG. 3 is a screenshot of a gallery view of an event or album of one embodiment of the disclosed system.

The following views are shown with particularity. In FIG. 1, the gallery view allows the user to see all the digital media that are associated within a group such as an event or custom album. The gallery view for either events or albums is illustrated in FIG. 3.

Figure 4:
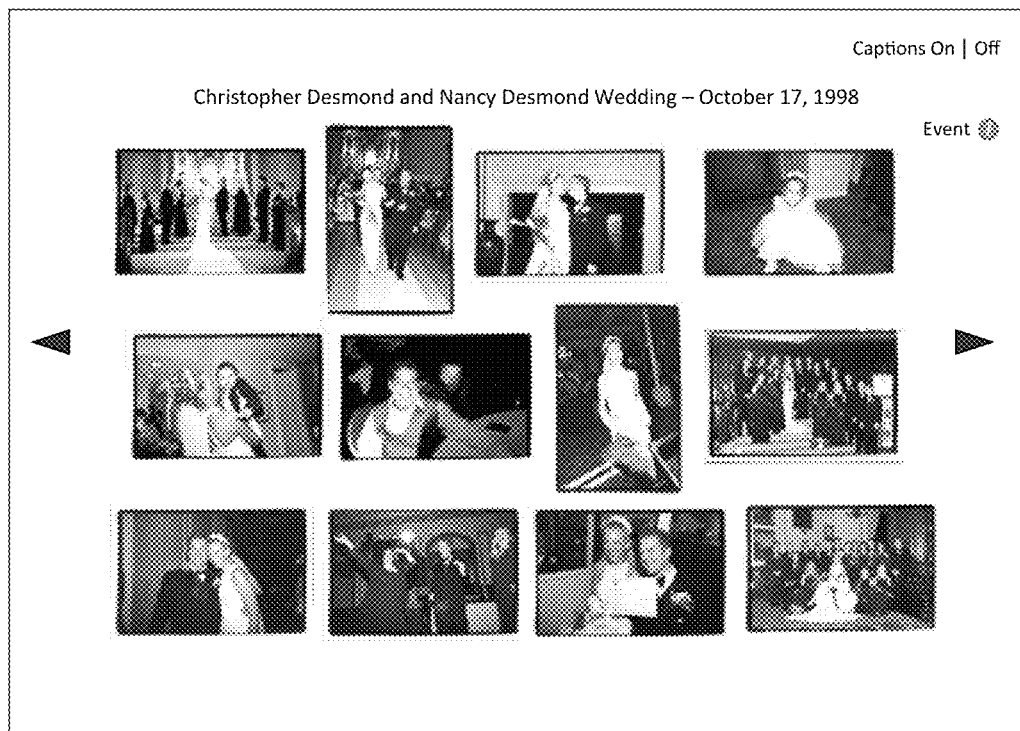
FIG. 4 is screenshot of an individual event or album view of one embodiment of the disclosed system.

As shown in FIG. 2, an individual album or event view allows one to see the files associated with a specific group. For example, one can view the digital files that relate to a group of files called "Trip to Italy 2011." The individual album or event view is illustrated in FIG. 4.

Figure 5:
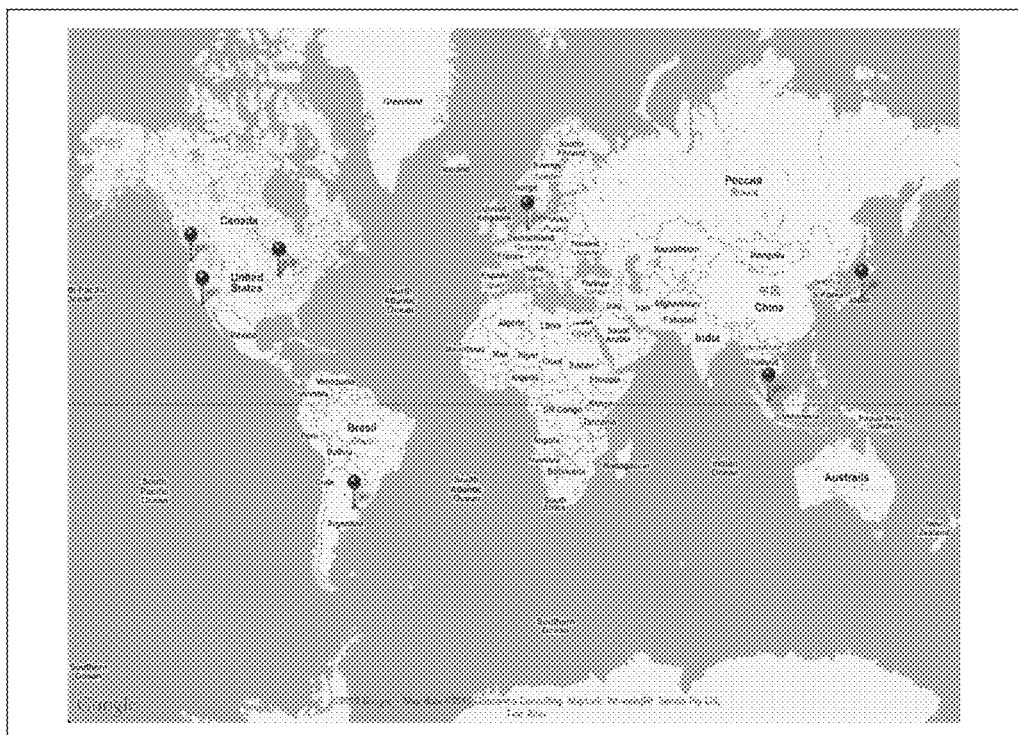
FIG. 5 is a screenshot of a location view of one embodiment of the disclosed system.

A location view, as shown in FIG. 5, identifies within an interactive map (Google map shown as an example), where digital files were taken or originated. The location view can also provide additional outputs such as a journey route that identifies the specific locations for an event or trip that can be customized by users.

Figure 6:
FIG. 6 is a screenshot of a people thumbnail view of one embodiment of the disclosed system.

A people view, as shown in FIG. 6, shows thumbnail photos of all the people in the system that can be clicked in for a people profile view. A people profile view, as shown in FIG. 7, shows a profile picture of an individual, their birth/death information, family relationships, overview (comments) on the person, as well as links to other views that contain that individual in the system.

Figure 8:
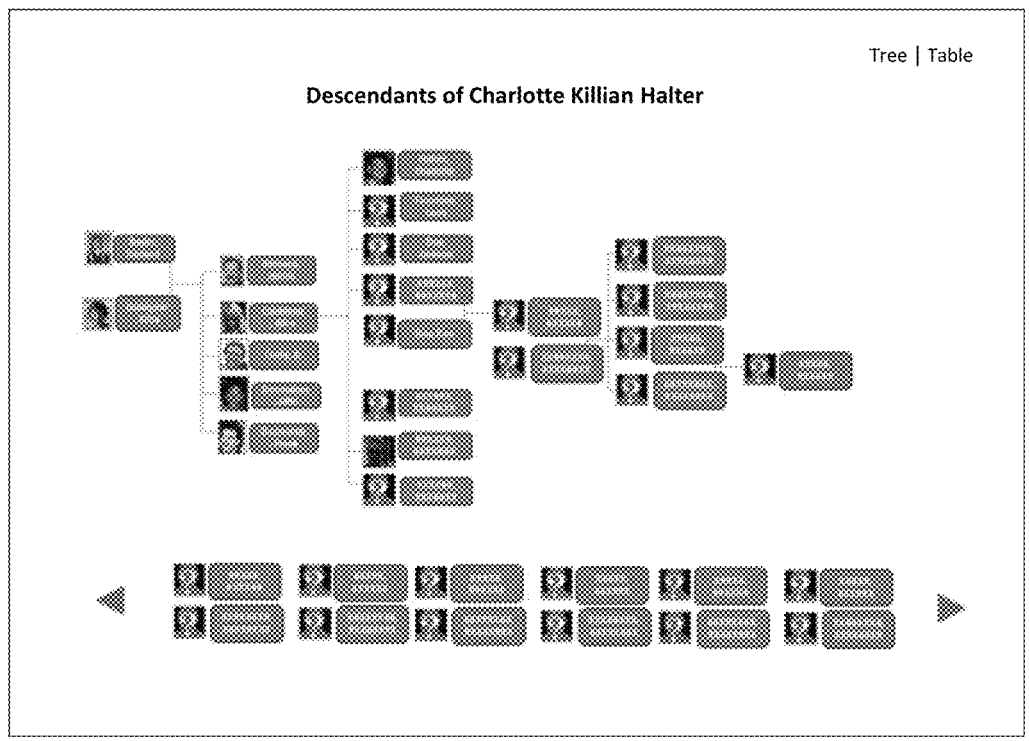
FIG. 8 is a screenshot of a family tree view of one embodiment of the disclosed system.

A family tree view, as shown in FIG. 8, can illustrate interactive family trees where one can see the family tree of an individual or family. If a user clicks on an individual within the family tree, it will take him or her to the people profile view of that person.

Figure 9:
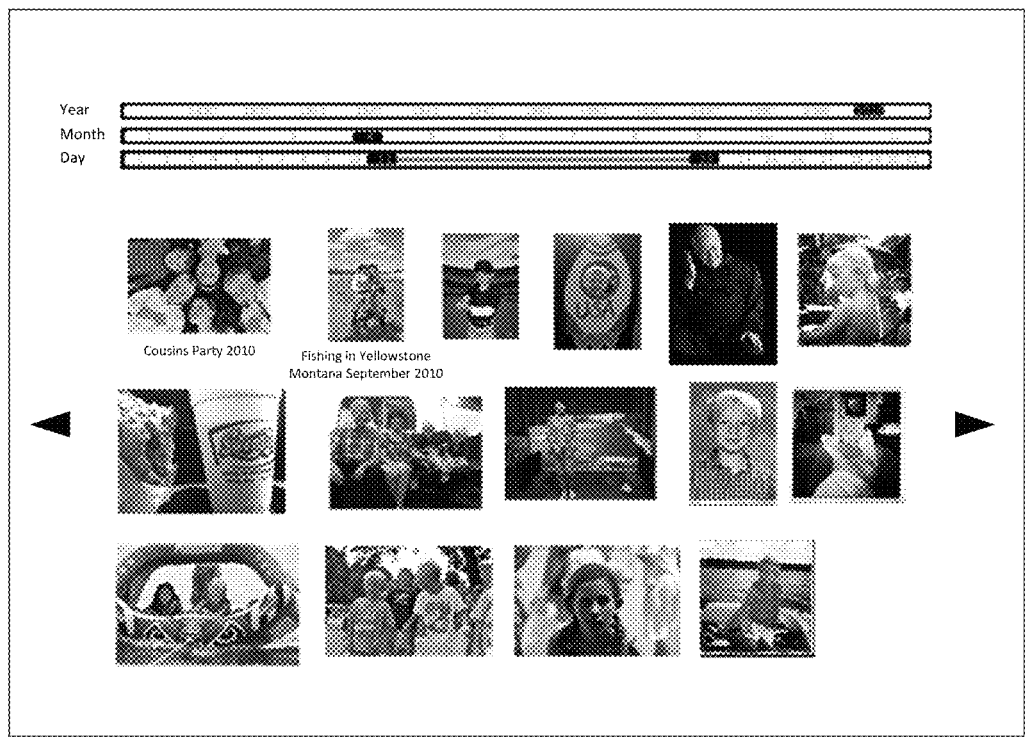
FIG. 9 is a screenshot of a timeline view of one embodiment of the disclosed system.

The timeline view, as shown in FIG. 9, will be an interactive timeline that allows you to set ranges of digital files by year, month and day. The digital files shown in the timeline will also be interactive and if the user clicks on a digital file or group of digital files (e.g., event or album), the user will then view the information related to the digital file(s).

A recipe view, as shown in FIG. 10, will show a recipe along with any digital files that are associated with it. For example, a cherished family recipe may show a digital copy of the original handwritten recipe, a photo of the family member who was the chef and a video of the family member making the recipe.

Each of the aforementioned views may also be seen in a chart format view that is interactive when any item on the chart is clicked, the user will them be taken to a new screen that details all relevant digital files (and file types) for the clicked item.

For album or event chart views, as shown in FIGS. 11 and 12, the elements listed in those charts will include individuals who are part of each album/event, number of digital files, date and other pertinent information.

Figure 13:
FIG. 13 is a screenshot of a people chart view of one embodiment of the disclosed system.

A people view, shown in FIG. 13, may demonstrate all the names of individuals that are in the system in an alphabetical listing. Such a people view can also contain details on each person such as the number of photos and videos that are associated with that person. The user can click on that person to pull up the profile view of the individual or click on the number of photos to see all the photos associated with that person.

In the family tree chart view, shown in FIG. 14, family lineage can be viewed in multiple ways. For example, a user can set himself as the tree anchor and then see a tree of all people entered into the database related to the user. The user could also set a contact as the tree anchor and then just view the descendants of that individual.

For a location chart view, as show in FIG. 15, listings of all the locations that are in the system are displayed along with the number of digital files, as well as names of persons associated with each. A user can click on the location to see all the digital media files that are associated with a specific location.

A recipe chart, as shown in FIG. 16, can show recipes that uploaded to the system. Along with the ingredients and steps of each recipe, this view can identify the chef(s) name, number of photos and videos associated with each.

Figure 17:
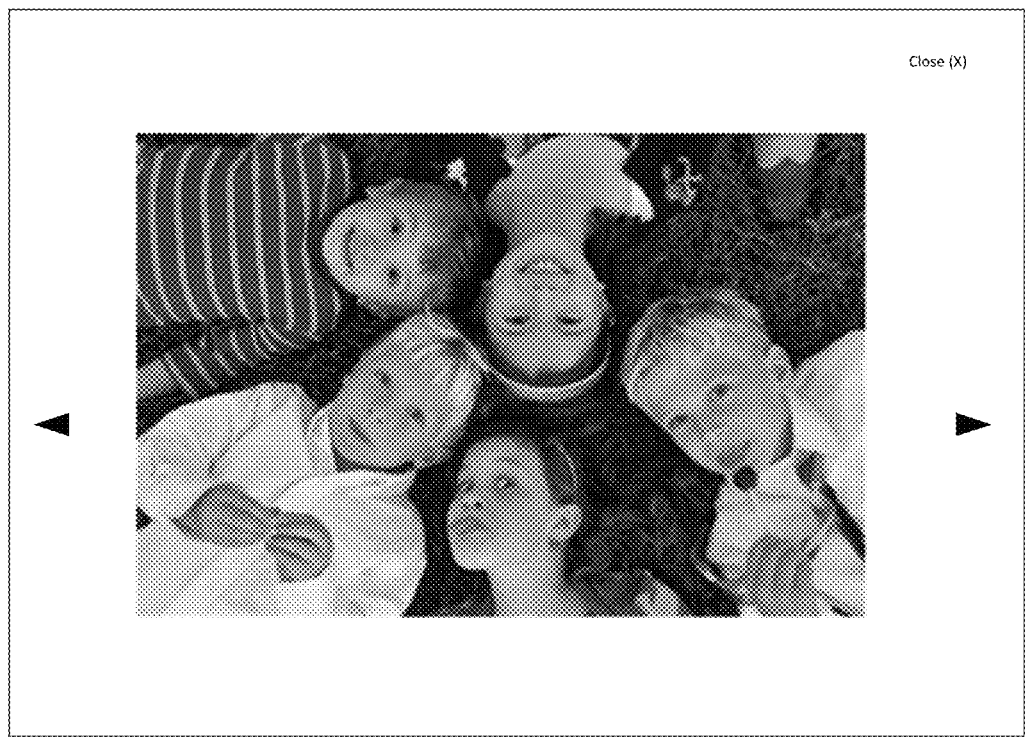
FIG. 17 is a screenshot of a slideshow view of one embodiment of the disclosed system.

For any of the views, the user can click on the digital file to start a slideshow feature that will allow them to scroll through an enlarged view of the digital file as illustrated in FIG. 17.

Another aspect of the disclosure is the search filter. This filter allows users to select one or more criteria that will narrow down their results to just those digital files matching input criteria. The entire system can be filtered by, for example, key words (or plurality of key words), event names, location, people, albums, star rating, file type, document type, and dates. A user may filter based on more than one criterion at a time. To help users quickly identify digital files that may still need to be organized, the advanced search filter also allows users to isolate files that have no date, no location, no people, no specific date/range, no upload date information or are lacking any other tag.

It should be noted that in one embodiment, searching via key word will search through all tagged information (user populated or auto-generated upon import). For example, if a user searched for the term "Ohio," the system would search for that term associated with any file in any way. If the user had files with Ohio as a state, file name, street name, person's name, file comment, etc., all would be retrieved.

Figure 18:
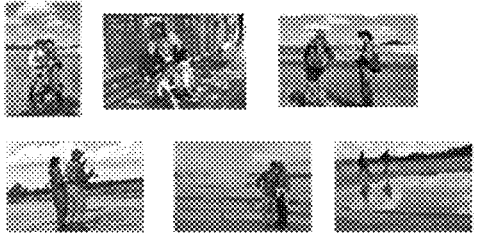
FIG. 18 is a screenshot of an advanced search filter view of one embodiment of the disclosed system.

Settings applied in the advanced search filter can cumulatively carry over to any subsequent pages until new criteria are selected. For example, a user can apply a filter to retrieve files associated with a particular person. Then the user can set a date range to further narrow results to show only those files for that selected person within the date range. Any pages viewed from that point forward throughout the entire site would only contain files associated with person and the date range specified. The advanced search filter is illustrated in FIG. 18.

Yet another feature can be a user's homepage, as illustrated in FIG. 19, that can summarize the user's content within the system including relevant information in the system. It is contemplated that a user's homepage may show a summary of the total number of photos, videos, documents and audio files that the user has uploaded. In this embodiment, for each group of digital files (e.g., photos), the percent of files that has been organized with pertinent data such as date, name(s) and location can be noted. In addition, the homepage can show a list of people that are in the system and the respective count for photos, videos, documents and audio files associated with each person. Also contemplated is a summary of the events, albums and locations that have been entered into the system. The user homepage may serve as an executive summary dashboard of one's entire system and can be modified to provide data in an executive summary format for a user.

Another feature is that the entire system including the dynamic views can be presented in a wide range of user outputs—e.g. on the user's computer, smartphone or tablet display. The user may choose to present the digital files in any of the various types of ways disclosed herein. Other ways of outputting the files are also possible. The user can create and modify various sharing rights so that third parties may view the files and if desired, provide comments, apply tags or even download/copy the files for their own use.

Still another embodiment can provide export functionality. Once a user has used the organization functionality to assign information to data file(s), a user may want to export the data file in its original form (e.g., .jpg, .mp4, etc.) with the tags embedded within the digital file in the form of EXIF tags. In other words, a user can export his or her entire set of digital files, or may choose a subset based on keywords and tags. The exported digital files can include key tags and attributes users have assigned, and in one embodiment, such tags and attributes can be embedded within the digital files. For example, each exported digital file may be imbedded with user-entered data such as the people, location, and event name. This feature will allow the users to back up their files to another source (e.g., external computer hard drive) or to transport it to another venue (e.g., another website that is used for viewing and/or sharing digital files such as a social media website) where it can be viewed with these attributes. This export feature can provide users with the advantage of never losing key data that was stored simply because the user chooses to move its digital files to a new digital archiving system.

A method is also disclosed. The method may include the steps of storing a digital file in a file repository, associating a plurality of digital tags having different tag types with the digital file, providing a search function that permits simultaneously searching by a plurality of digital tag types and provides a search result, and providing a user-configurable output to display the search result. The digital tag types may include, for example, a person's name, a location, a recipe, a date, a relationship between individuals, an event name, a rating, and a document type.

Under the disclosed method, access may be provided to the repository via the Internet. Relationships between users may also be tracked such that a family tree can be displayed. A recipe may also be linked to a user or person. Finally, the method may include the step of outputting a digital file and its associated digital tags into a single file.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

A plurality of advantages arise from the various features of the present disclosure. It will be noted that alternative embodiments of various components of the disclosure may not include all of the features described yet still benefit from at least some of the advantages of such features. Those of ordinary skill in the art may readily devise their own implementations of a digital file organization system that incorporate one or more of the features of the present disclosure and fall within the spirit and scope of the disclosure.

Application (also called "MemoryWeb Application" or "System")— The Application is an online program constructed using a mix of freeware code as well as custom-built proprietary coding with an interface that has many functions including: 1) the ability to import, associate and embed Digital Tags to Digital Files by using existing Tags of a Digital File as well as the Application's custom Digital Tag options (also called the Application Digital Tag Organizer) for use in the Application; 2) view, sort, annotate, and share Digital Files from the various Application Views; 3) navigate using the proprietary Application Dot-Tag System; 4) filter Digital Files using the Application Advanced Filter System or Fast Search System; 5) store the Digital Files through an interactive Storage System through a User Relationship Table; and 6) export the Digital Files with the Digital Tags embedded within the Digital Files. This Applications has already been disclosed in U.S. patent application Ser. No. 13/157,214 and incorporated herein by reference. This Applications is also being trademarked as "MemoryWeb" with the US Commissioner for Trademarks on Dec. 26, 2013 under application No.: 86/152,930. The Applications may be accessible over various user interfaces that may use the Internet and via applications that would be used on mobile communication devices such as smart phones (e.g., iPhones), Personal Digital Assistants (PDAs) and Tablets (e.g., iPads).

Application Views—The Application Views utilizes the Application's ability to associate Digital Tags to Digital Files and display them in customized views such as Uploads, Collections, Slideshow, Location, Timeline, Family Tree, People Profile, and Recipes.

Application Advanced Filter System—A function that provides search capabilities using one or more Digital Tags within the Application, resulting in a narrowed output display of the applied filters to display one or more Digital Files and viewed in one or more Application Views. The Application Advanced Filter System can allow Digital Files to be searched and sorted according to a plurality of types of data and can be used for creating and organizing special views. The user interface may be user-configurable, and can present the Digital Files on a user's screen based on these user inputs.

Application Dot-Tag—The manner in which a Digital Tag is displayed within the Application using pill-shaped indicators that can reside near a file's image or overlaid on the file's image. MemoryWeb Tags are illustrated as Application Dot-Tags within the Application to help the user organize their Digital Files with key components of related information such as people, date of file, location, collection, star ranking, and recipe. The MemoryWeb Application Dot-Tag is more than just text (as traditional tagging systems) because Memory-Web Application Dot-Tags act as mini search engines that allow the user to see how many matching files there are to that MemoryWeb Tag and if selected will take the user to the corresponding Application View to illustrate the linked search results of that Application Dot-Tag. However, it should be understood that other shapes and indicators are contemplated by the present invention, and may even be user-configurable. For example, the indicator may take the form of a sticky note, a different shape, a doted shape, or any number of variations of indicators that may be functional in displaying one or more words. Colors may also be used to indicate differing categories of indicators, or differing associations/intersection of the indicators. Within the pill-shaped indicator, the specific Digital Tag information is used to display information about a Digital File. Throughout this document, the Application Dot-Tag is shown as illustrated in FIG. 29 (indicators 0650, 0654, 0655 and 0656).

Application Digital Tag Organizer System—Within the Application, a function for assigning one or more Digital Tags to one or more Digital Files at the same time through the Application Dot-Tag Organizer System. This feature allows Digital Tags to be assigned to items such as photos, videos, audio files, and documents. The information created from this functionality drives the outputs for the Application Views. The Application Digital Tag Organizer System will allow the tagging of key items as date, GPS location, star ranking, people (both name and facial recognition), album(s), family relationships, a date, event name, sharing rights, file type, document name, and recipes. Each of the Digital Tags is user-configurable.

Application Export System—Ability to export Digital File(s) from the Application, with the Digital Tags that were created within or imported/uploaded into the Application, embedded inside the Digital File. The Digital Tags within the exported Digital File can then be viewed and used by any other applications that can read EXIF tags.

Application Programming Interface ("API")—The Application Programming Interface (API) is the system that interacts with other communication points or services over HTTP via a POST, GET, PUT, DELETE methods. The API provides a way for users to access their MemoryWeb data outside of the web browser on mobile devices or other web connected devices. The actions within the API deliver MemoryWeb Digital Files and Digital Tags along with all meta data associated with such files and tags.

MW Automatic Uploader/Downloader Application—Separate from the main MemoryWeb Application, there are additional proprietary applications created by MemoryWeb for user to upload and download (export) Digital files to and from the main MemoryWeb Application. The first is the MW Automatic Uploader/Downloader built for Window's compatible computers. The second is the MW Automatic Uploader/Downloader build for MAC computer. Both of the MW Automatic Uploader/Downloader applications can be installed on the user's computer to automatically upload the desired Digital Files from their computer to the main MemoryWeb Application. In addition, the MW Automatic Uploader/Downloader applications allow for Digital Files to be exported from the main MemoryWeb Application to a desired folder on the user's computer with the updated tags embedded within the Digital File.

Storage System—A storage system can be a cloud-based Storage System (e.g., Amazon's AWS, Dropbox, Box.net, Deutsche Telecom's Cloud, etc.), hard-drive, server, or any venue that allows one's information to be stored. The storage system would act as a database and file repository for storage and retrieval of Digital Files to and from the Application.

Digital Files—An electronic file that can be in various file formats (e.g., PNG, JPEG, PDF, TIFF, MP3, MP4, WAV, and GIF) that are of items such as photos, videos, audio files, and documents.

Digital Tags—The word "Digital Tag" refers to any type of digital data that can be assigned to a file to distinguish and describe some aspect of that file through a tagging process. Digital Tags will be comprised of various groups of digital data including:

a) EXIF Tags— EXIF stands for "Exchangeable Image File Format" and is a standard that specifies the formats for images, sound, video, and ancillary tags. The EXIF standard is an Open Standard produced by the Standardization Committee and is detailed within their document called Standard of the Camera & Imaging Products Association. Standard of the Camera & Imaging Products Association, CIPA DC-008 Translation-2012. Exchangeable image file format for digital still cameras: EXIF Version 2. 3. Established on April, 2010 and Revised on December, 2012. Prepared by: Standardization Committee. EXIF tags are also called "meta tags" or "metadata." The EXIF information is formatted according to the TIFF specification, and may be found in JPG, TIFF, PNG, JP2, PGF, MIFF, HDP, PSP and XCF images, as well as many TIFF-based RAW images, and even some AVI and MOV videos. The EXIF meta information is organized into different Image File Directories (IFD's) within an image. The names of these IFD's correspond to the ExifTool family 1 group names.

When Digital Files are captured with digital cameras (including smartphones), scanners and other systems handling image, video and sound files, certain EXIF tags are automatically populated within the Digital File and can cover a broad spectrum of information such as:

Descriptions (e.g., Title, Subject, Star Ratings, Tags, People, Comments)

Origin (e.g., Authors, Date taken, Copyright)

Image information (e.g., dimensions, color representation and size)

Camera Setting Information (e.g., camera maker, camera model), including static information such as the camera model and make, and information that varies with each image such as orientation (rotation), aperture, shutter speed, focal length, metering mode, and ISO speed information.

Advanced Photo Information (e.g., lens maker, lens model, contrast, brightness, EXIF version, etc.)

File Information (e.g., file name, item type (e.g., JPG file), date created, date modified, size, etc.)

A thumbnail for previewing the picture on the camera's LCD screen, in file managers, or in photo manipulation software.

Global Positioning System (GPS) information that is also known as geocoding.

Figure 21:
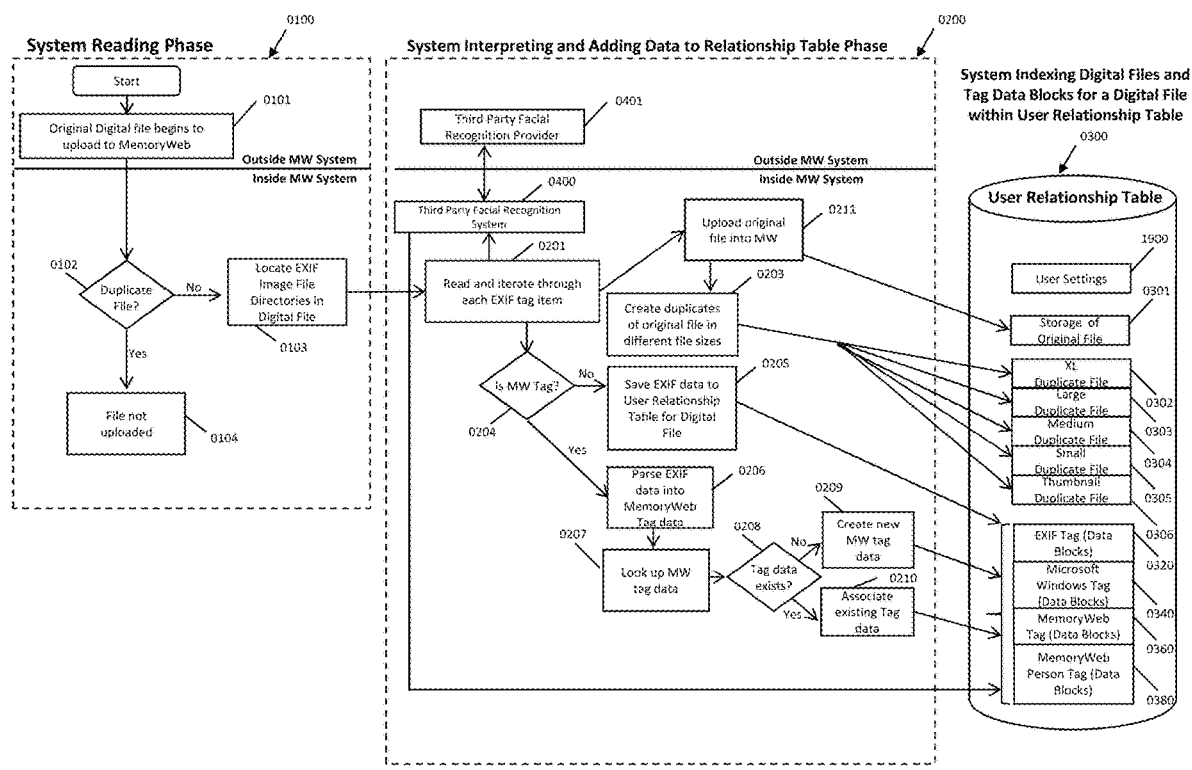
FIG. 21 is a diagram of the System for Reading Phase, System Interpreting, and Adding Digital File and Corresponding Data to Relationship Table Phase.

The Application will auto-populate any existing EXIF Tags from the original Digital File upon upload into the Applications (as illustrated in FIG. 21) and put this information into the Users Relationship Table on the Storage System.

b) Extensible Metadata Platform (XMP)—This is Adobe's Extensible Metadata Platform (XMP) format for labeling metadata within an Adobe file.

c) Png Textual Data (tEXt)—This is Portable Network Graphics (PNG) metadata format for labeling within a PNG file.

d) Microsoft Windows Tags—These are Microsoft Windows File Attributes that are stored in Data Blocks from Microsoft's system.

e) MemoryWeb Tags—These tags are typically developed within MemoryWeb and can relate to People Names, Recipes, Collections, Location Name, Family Relationships (also discussed in MemoryWeb Person Tags), Social Network Data (e.g., ID, contact IDs, etc.), File Folder Batch Name. This would be folder directory name that includes the name of each folder that eventually leads to the folder that the digital file was actually stored within the User's PC. This is used to help the user organize data within MemoryWeb based upon the users organization system used on their PC. Facial Recognition Data, and other type of tags that are user defined.

f) MemoryWeb Person Tags—These user defined tags within MemoryWeb are specific to each person profile including such areas as Nicknames, Birthdates, Date of Birth, Date of Death, Biography, Family Relationships (e.g., Mother, Father, Brother, Sister, Daughter, Son, Spouse, etc.), Pets, and Firsts (e.g., First Steps, First Words, First time riding a bike, etc.).

The combination of all the aforementioned tags is collectively referred to as "Digital Tags." The list of groups and Digital Tag types will grow as technology in this area improves over time. These Digital Tags are also referred to as "File DNA" for MemoryWeb.

User Relationship Table—Within the Application, each User will store the data related to Digital Files, Digital Tags, User Settings, and other specific information related to a User's repository of information is kept within the User Relationship Table.

Data Blocks—Within the User Relationship Table, there are Data Blocks that will store information related to EXIF Tags, Microsoft Windows Tags, MemoryWeb Tags, and MemoryWeb Person Tags. These Data Blocks are used to generate the information that is displayed in such key components such as the Application Views and Application Dot-Tags.

Custom Code—Proprietary scripts and code developed by MemoryWeb to enable key functions such as Dot-Tag relationships and ability to embed new user-defined tags into a file and/or override existing EXIF tags and the ability to navigate the application and it's functions via connections drawn from the associated tags Open Source Libraries—Non-proprietary code taken from the free, open source community integrated that is used by the Application.

User Interface—The Application may be accessible over various "User Interfaces" including Personal Computers (e.g., Macs, Windows, etc.), Personal Digital Assistants (PDA) (e.g., iPhones) and Tablets (e.g., iPad). The User Interfaces can be controlled through the Application using various tools such as a keyboard, mouse, and touch screen.

The present invention relates to an Application that has many functions including: 1) the ability to import, associate and embed Digital Tags to Digital Files by using existing Tags of a Digital File as well as the Application's custom Digital Tag options (also called the Application Digital Tag Organizer) for use in the Application; 2) view, sort, annotate, and share Digital Files from the various Application Views; 3) navigate using the proprietary Application Dot-Tag System; 4) filter Digital Files using the Application Advanced Filter System or Fast Search System; 5) store the Digital Files through an interactive Storage System through a User Relationship Table; and 6) export the Digital Files with the Digital Tags embedded within the Digital Files.

Prior to the invention of digital photography, people tended to share photos by displaying printed copies in frames and albums or would store them in a container in hope of preserving these assets for future use or future generations. Important photos would often be inscribed on the back with significant details (people, location, and event) to preserve the memory of that particular occasion. Many people would share their memories by assembling an album that could be viewed with others. Occasionally, extra copies of special photos may have been printed for friends, relatives, etc. At one time, film slide shows were also a popular medium for sharing photo memories.

With the evolution of Digital Files, there has been explosive growth in the number of individuals taking digital photos, converting old photos to digital copies, making movies and gathering digital documents and in the sheer number of files people are capturing digitally. Today, virtually every personal computing device contains some kind of photo, movie or other type of digital file creator/player/viewer/storer/etc.

At the same time, there is little to no cost for people to store large amounts of photos in various "containers" of the modern age. Facebook, Flickr, Shutterfly and countless other social media and specialty Digital Files sites allow users to post and share images to a community with a frequency and ease that continues to feed the fire of the digital revolution. However, they don't allow much organization of Digital Tags, dynamic viewing of Digital Files, and the ability to export the Digital Files with new Digital Tags. Questionable and ever-changing privacy terms for user/account information, including digital files, have also left the marketplace leery of posting their full digital archive and associated context to these sites.

What is needed to complement the widespread availability of Digital Files is a medium that allows people to organize, view, navigate, search, preserve and share these files with all the memory details captured, connected and vivified via an interactive interface. Such a solution would allow Digital Files, including documents, photos, videos and audio, to tell a full story now, and for generations to come.

As disclosed in detail herein, the application provides the much needed platform that saves a user significant time, provides significant information with minimal screen space, and provides an appealing and customizable interface that will enhance the user experience.

Anytime the MemoryWeb Application exchanges information with an external Storage System or User Interface such as a phone, tablet, computer or other internet based user device, the interaction with the MemoryWeb Application involves Application Programming Interface (API). The API's allow each system to call the specific Digital Files and Digital Tags associated with each request so they can be viewed.

Additional features of the disclosure will become apparent to those skilled in the art upon consideration of the following detailed description of preferred embodiments exemplifying the best mode of carrying out the invention as presently perceived.

The present disclosure relates to one or more of the following features, elements or combinations thereof. The Application allows the importation of Digital Files and then the association of Digital Tags to the Digital Files by using existing EXIF Tags of a Digital File as well as the Application's custom organization of Digital Tags for use in the Application. The Application then allows the Digital Files to be viewed, sorted, annotated, navigated, and shared using the various Application Views. The Application can also filter Digital Files using the Application Advanced Filter System functionality. The Digital Files can be stored through a Storage System that interacts with the Application. In addition, the Application allows for Digital Files to be exported with the Application's Digital Tags embedded within the Digital Files.

The Application may be accessible over various user interfaces that may use the Internet and via applications that would be used on User Interfaces such as Personal Digital Assistants (PDA) (e.g., iPhones) and Tablets (e.g., iPad).

The presently disclosed Application provides users with an interactive platform to gather, organize, view, share and archive Digital Files using a proprietary organization system called the Application Digital Tag Organizer and export the modified Digital files with the Application's Digital Tags embedded within the Digital Flies using the Application Export feature.

The Application allows users to create, navigate, search, view and share Digital Files, which could represent, for example, the memories a user has collected from the past and present, and could incorporate additional memories for generations to come. As outlined herein, various embodiments are disclosed that can accomplish these and other goals.

Description of Embodiments

Figure 20:
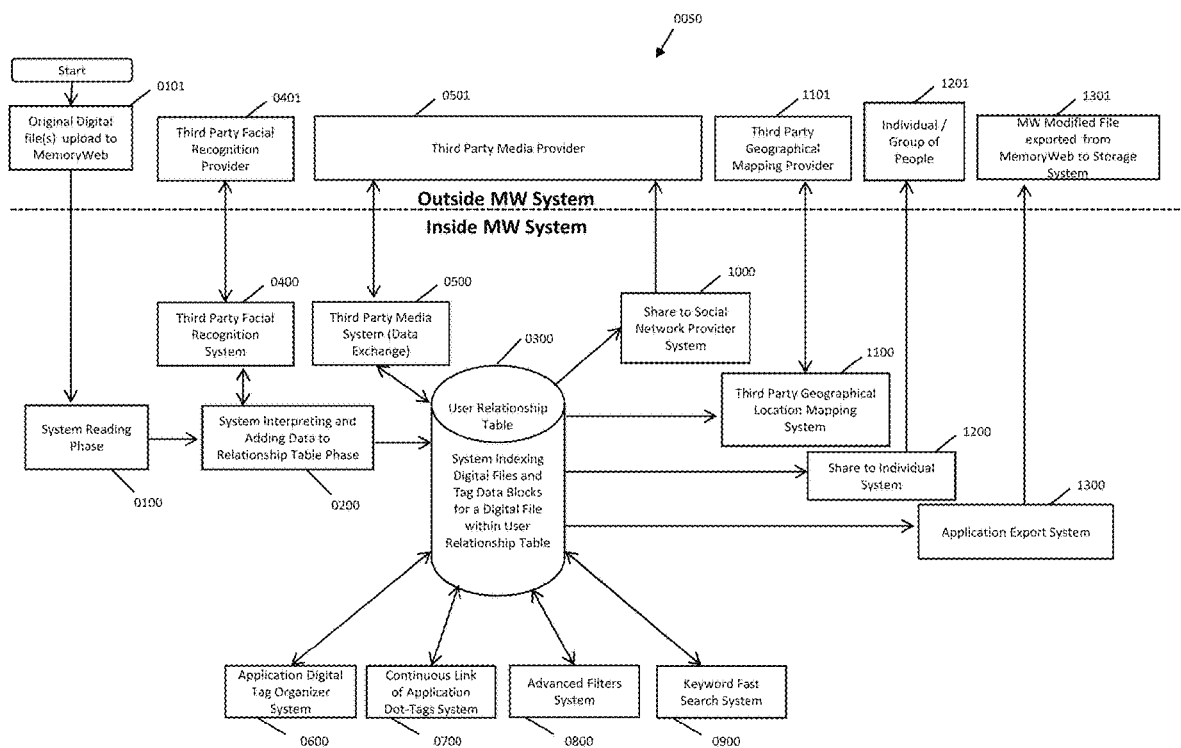
FIG. 20 is a diagram of the Overall System Process Flow of MemoryWeb.

In FIG. 20, the overall process flow of MemoryWeb is depicted. Each of the boxes depicted that are Inside the Memory-Web System (0050) are detailed additional figures within this application. However, to help illustrate the overall process flow, FIG. 20 was created. In FIG. 20, the process begins when original digital file(s) are uploaded to MemoryWeb (0101). This process can take place in a variety of ways including when a user manually selects uploads from the Uploads Application View (see FIG. 35 indicator 1701), installs the a MW Automatic Uploader/Downloader Application on their computer, or imports Digital Files from the users' other sources (e.g., mobile phones, social networks, etc.).

Once a file is uploaded, the System Reading Phase (0100) begins. Information from the System Reading Phase is then sent to the System Interpreting and Adding Data to Relationship Table Phase (0200). During this phase, information is passed back and forth to the Third Party Facial Recognition System (0400) to the Third Party Facial Recognition Provider (0401). The system will also coordinate between the Third Party Social Media (Data Exchange) (0500) and then to various Third Party Media Providers (0501). Another key step from the System Interpreting and Adding Data to Relationship Table Phase is adding both the Digital Files and the corresponding tags to the User Relationship Table (0300). As illustrated in subsequent figures within the patent application, the User Relationship Table serves as the key repository for all of the user's data that generates virtually every display from the application. From the User Relationship Table, the user can use the Applications Digital Tag Organizer System (0600), the Continuous Link of the Application Dot-Tag System (0700), the Advanced Filters System (0800), or the Keyword Fast Search System (0900). The user can also share Digital File(s) through the Share to Social Network Provider System (1000) to a Third Party Social Network Provider (0501) that is outside the MemoryWeb system or use the Share to Individual System (1200) to a Person (1201) that is Outside the MemoryWeb system using the data from the User Relationship Table. To help generate some of the map views, the system will utilize a Third Party Geographical Mapping System (1100) that connects to a Third Party Geographical Mapping Provider (1101) that is Outside the MemoryWeb system. The user can also export Digital Files with the Digital Tags embedded within the Digital File using the Application Export System (1300) that will send a MemoryWeb Modified File from MemoryWeb (1301) to a designated location by the User that is outside the MemoryWeb system.

As illustrated in FIG. 21, the System Reading Phase (0100) is described in further detail. The System Reading Phase will first check if the digital file is a duplicate file (0102) that is already in the User's collection. If the file is a duplicate, it will not be uploaded (0104). However, if it is a new file for the user, the System Reading Phase will then locate the EXIF Image File Directories in the digital file (0103) and then send that information to the System Interpreting and Adding Data to Relationship Table Phase (0200).

As further illustrated in FIG. 21, the System Interpreting and Adding Data to Relationship Table Phase will take the EXIF Image File Directories sent from the System Reading Phase and read and iterate through each EXIF tag item (0201). At this time, the system will identify faces from the digital file and then send this information to the Third Party Facial Recognition System (0400) that will coordinate with the Third Party Facial Recognition Provider (0401) that is outside the MemoryWeb. When the Third Party Facial Recognition System (0400) sends back data related to facial recognition of faces in the Digital File, it comes back then the system sends information related to people facial recognition tags to the MemoryWeb Person Tag (Data Blocks) within the User Relationship Table (0300). The detailed process of the Third Party Facial Recognition System (0400) is further explained in FIG. 25.

During the Read & Integrate Through Each EXIF Tag item (0201) the process will also upload a the original Digital File in MemoryWeb (0211), the process will also store a copy of the original file within the User Relationship Table (0300) and create five duplicate copies (0203) of different resolution sizes as follows: XL Duplicate File (0302, Large Duplicate File (0303), Medium Duplicate File (0304), Small Duplicate File (0304), and a Thumbnail Duplicate File (0306). Each duplicate file is used in different parts of the application depending upon the photo size needed for such areas within the Application such as Application Views, Application Dot-Tags, and Application Digital Tag Organizer System.

Another embodiment during the Read and iterate through each EXIF tag item (0201) stage is determining if a MemoryWeb tag exists (0204). A MemoryWeb tag is a Digital Tag that is currently being used as an Application Dot-Tag within the Application. If it is not a Digital Tag that MemoryWeb is currently using, the application will Save EXIF data to the User Relationship Table for Digital File (0205) and send this to the User Relationship table. This is done in case there are EXIF data that are desired to be used in future releases of the Application. For the Digital Tags that are being used in the Application, the system will Parse EXIF data into MemoryWeb Tags (0206), look up MW tag data (0207) and determine if a Digital Tag currently exists (0208). If a Digital Tag does not exist, the system will Create a new MW tag data ((0209) and send this to the appropriate Data Blocks within the User Relationship Table (0300). If Digital Tag data does exist, the system will Associate existing tag data ((0210) to the appropriate Data Blocks within the User Relationship Table (0300).

The third and final area within FIG. 21 is the System Indexing Digital Files and Tag Data Blocks for a Digital File within the User Relationship table (0300). In the User Relationship Table, the user's information system information stored such as User Settings (0390). Copies of the Original Digital File (0301), XL Duplicate File (0302, Large Duplicate File (0303), Medium Duplicate File (0304), Small Duplicate File (0304), and Thumbnail Duplicate File (0306) are stored. The final area of the User Relationship Table relates to the data blocks including EXIF Tag (Data Blocks) (0320), Microsoft Windows Tag (Data Blocks) (0320), MemoryWeb Tag (Data Blocks) (0360), and MemoryWeb Person Tag (Data Blocks) (0380).

Figure 22:
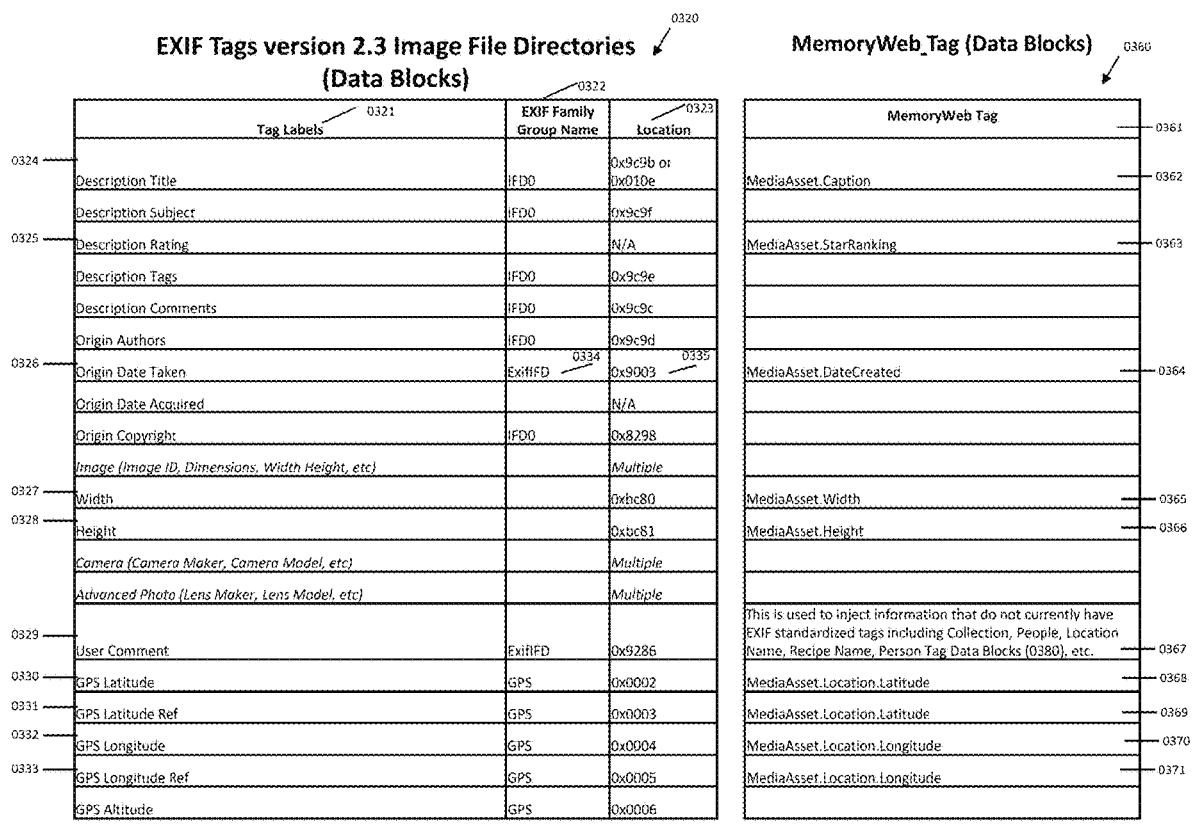
FIG. 22 is a table of the EXIF and MemoryWeb Tag Data Blocks

In FIG. 22, there are two charts that illustrate EXIF and MemoryWeb Tag Data Blocks. The first chart illustrates the EXIF Tags Version 2.3 (Data Blocks) (0320). For the EXIF Tags Version 2.3 (Data Blocks) (0320), the information from this table is an expert from an Open Source Library code produced by the Standardization Committee that is detailed within their document called Standard of the Camera & Imaging Products Association. While all the EXIF tags that are contained within a Digital File are read (as previously illustrated in FIG. 21 within the System Interpreting and Adding Data to Relationship Table Phase (0200)) and are stored within the system's User Relationship Table (0300), a summary of the primary EXIF tags that are currently used within MemoryWeb are illustrated in the EXIF Tag Blocks (0320). The EXIF tag information is organized into different Image File Directories (IFD's) or "Data Blocks" within an image and organized in the column heading of Tag Label (0321). The names of these IFD's correspond to an EXIF standard for ExifTool family 1 group names that are depicted in the column heading of EXIF Group (0322). The IFD's are stored within a specific data block location within a Digital File and these locations have a standard name of the specific location (0323) within the Digital File. The primary EXIF tags that are read and used by MemoryWeb to generate Application Dot-Tags are: Description Title (0324), Description Rating (0325), Origin Date Taken (0326), Digital File Width (0327), Digital File Height (0328), User Comment (0329), GPS Latitude (0330), GPS Latitude Ref (0331), GPS Longitude (0332), and GPS Longitude Ref (0333).

In FIG. 22, the second chart illustrates the MemoryWeb Tag (Data Blocks) (0360) that overlap with standard EXIF Tag blocks. As previously illustrated in FIG. 21, the EXIF Tag Data blocks are read and brought into the User Relationship Table (0300). When the data is stored within the system's User Relationship Table, they are also stored with the corresponding EXIF tag label as illustrated in the column called MemoryWeb Tag (0361). For example, when a Digital File is brought into MemoryWeb and the system reads the Origin Date Taken (0326) for the EXIF Tag block, the system will denote this in the MemoryWeb table as MediaAsset.DateCreated (0364). This designation is very important as it allows MemoryWeb to re-inject any updated or new MemoryWeb Tag data into the corresponding standard EXIF Tag blocks of a Digital File when it is exported from MemoryWeb (as previously illustrated in FIG. 20 with the Application Export System (1300)). Continuing with this example, if the Origin Date Taken is modified within the MemoryWeb system, when the file is exported through the Application Export System (1300), the new updated date from MemoryWeb (0364) will be mapped to the EXIF Tag Data block with the Tag Label of Origin Date Taken (0326) with the EXIF Group called ExifIFD (0334) and the Location called 0x9003 (0335).

In situations where there is no standard EXIF Tag data block for the MemoryWeb Tag for such items such as Collections, People Location Name, Recipe Name, etc. (0367), they are mapped to a general EXIF Tag data block called User Comment (0329). As the standards for EXIF Tag data blocks change, the system can be mapped to any new specific EXIF Tag data blocks. For example, if an EXIF Tag Data block is made for Recipe Name, the MemoryWeb Tag related to Recipe Name will be mapped specifically to that new EXIF Tag data block as opposed to User Comment.

Figure 23:
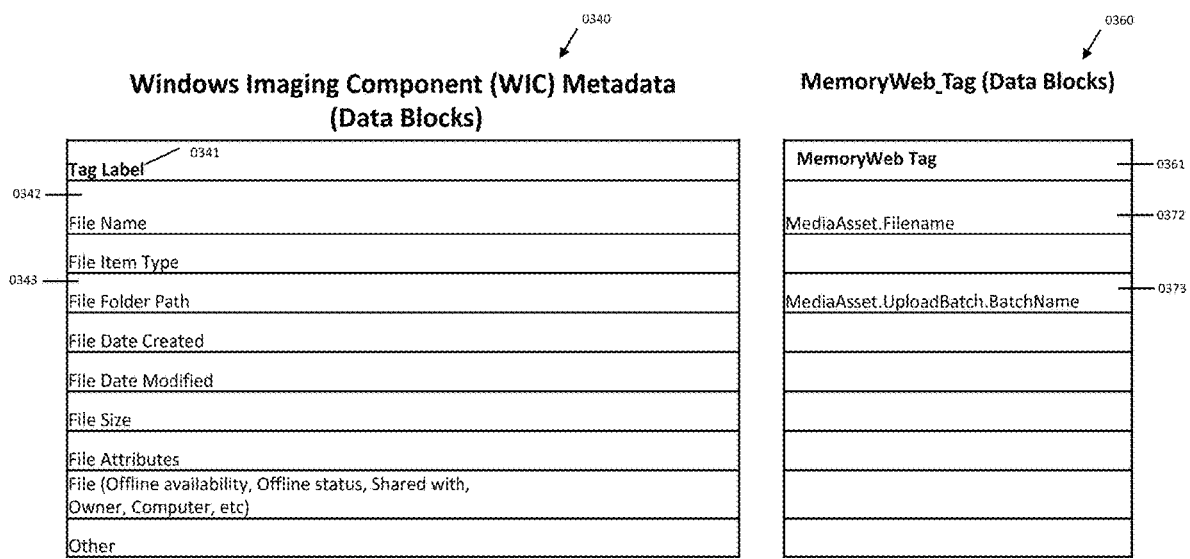
FIG. 23 is a table of the Microsoft Windows and MemoryWeb Tag Data Blocks.

In FIG. 23, there are two charts that illustrate Microsoft Windows and MemoryWeb Tag Data Blocks. The first chart illustrates the standard Windows Imaging Component (WIC) Metadata (Data Blocks) (0340). Microsoft Windows has their metadata tag blocks contained in areas called Tag Labels (0341). The primary WIC Metadata data blocks that are read and used by MemoryWeb to generate Application Dot-Tags are: File Name (0342) and File Folder Path (0343). The corresponding MemoryWeb Tag data blocks (0360) for the WIC metadata tag blocks are called MediaAsset.Filename (0372) for the Microsoft file name and MediaAsset.UploadBatch.Batchname (0373) for the Microsoft File Folder Path. The ability for MemoryWeb to read the File Folder Path from Microsoft is a unique process used within MemoryWeb to help the user organize their photos based upon the organization methods they have already used within Microsoft. For example, if the user stored a group of photos on their Microsoft computer in the file directory C:/Photos/2013/First Day of School, MemoryWeb will automatically place the photos that were located within that Microsoft File Folder Path into a MemoryWeb Application Dot-Tag under a collection called "First Day of School" based upon the last folder within the file folder path. An example of the Application Dot-Tag that would be generated from the File Folder Path is in FIG. 31 with the label "First Day of School" (0770). In addition, MemoryWeb will allow the user to view the photos that are within a specific File Folder Path in the MemoryWeb Uploads Application View so that the user can organize photos from the same File Folder Path. An example of how this will be illustrated within MemoryWeb's Uploads Application View is in FIG. 35 with the groping of photos with the File Path Name C:/Photos/2013/First Day of School (0709).

Figure 24:
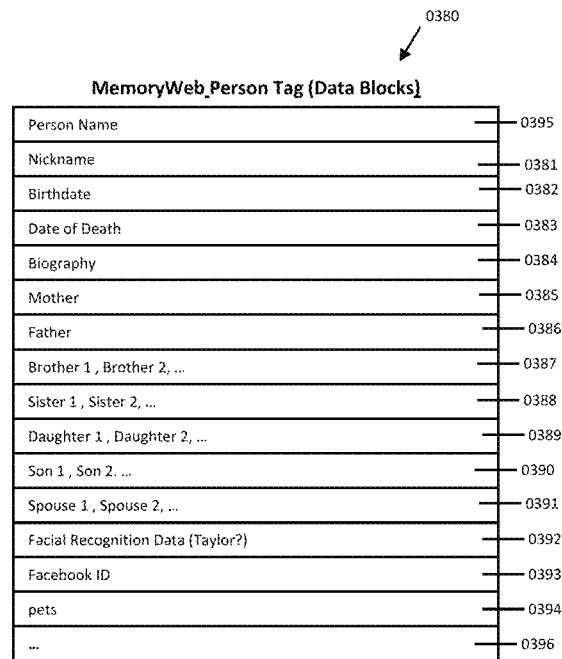
FIG. 24 is a table of the MemoryWeb Person Tag Data Blocks.
Figure 26:
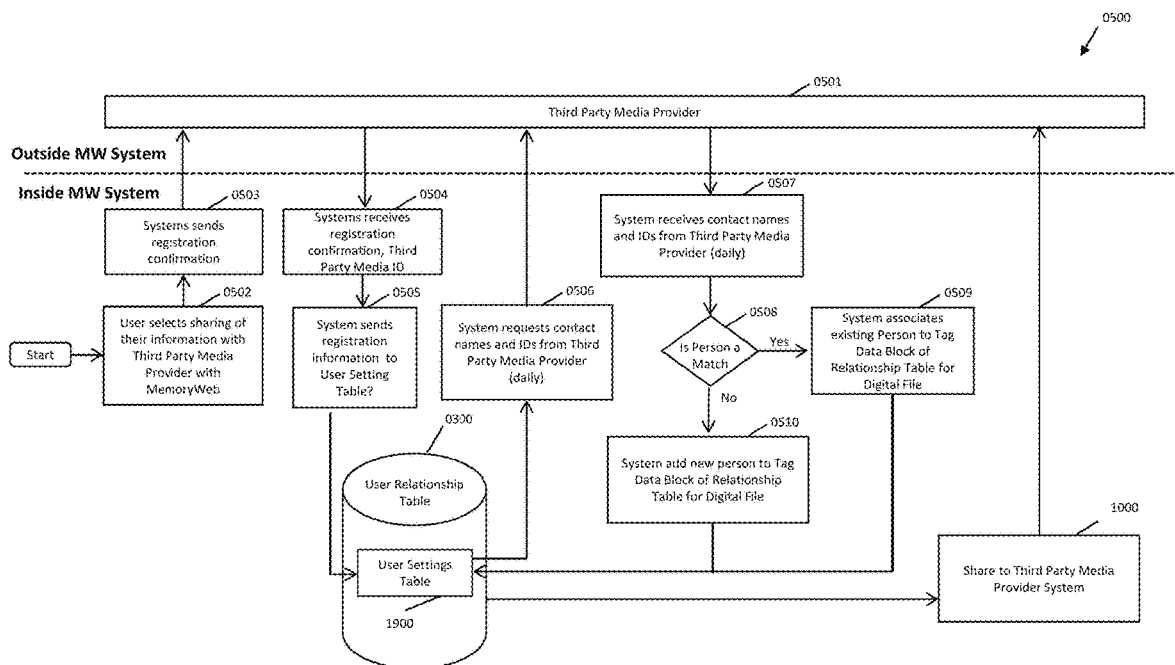
FIG. 26 is a diagram of the Third Party Media System (Data Exchange).
Figure 32:
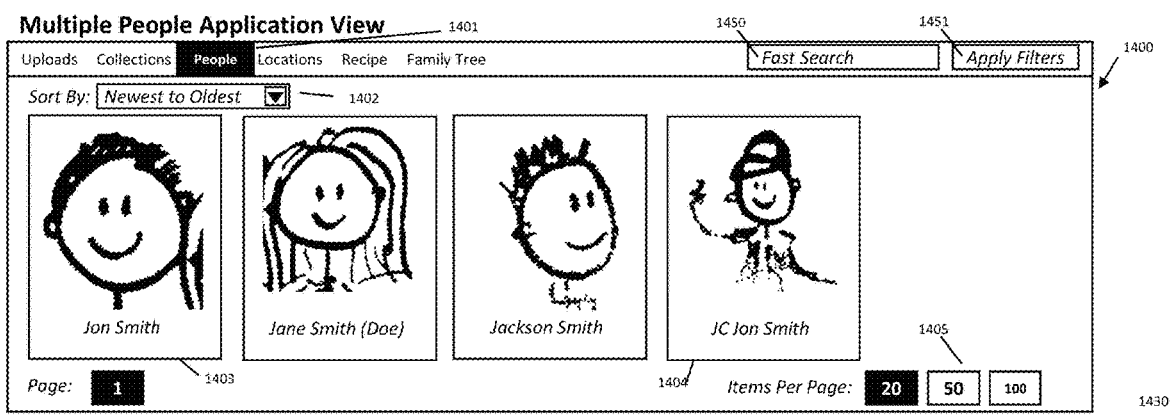
FIG. 32 is a screenshot of People Application Views.

In FIG. 24, the MemoryWeb Person Tag Data Blocks (0380) that are contained with a User Relationship Table are illustrated. For any person that is added within a user's account, various MemoryWeb Person Tag Data Blocks are stored including: Person Name (0395), Nickname (0381), Birthdate (0382), Date of Death (0383), Biography (0384), Mother (0385), Father (0386), Brother(s) (0387), Sister(s) (0388), Daughter(s) (0389), Son(s) (0390), Spouse(s) (0391), Facial Recognition (0392), FacebookID (0393), Pets (0394), and other data blocks that will be added in the future as the Application grows (0396). These data blocks are primarily used in the People Profile Application View as illustrated in FIG. 32 (indicator 1430). One embodiment within the MemoryWeb Person Tag Data Block contains the FacebookID (0393). As illustrated in FIG. 26 (indicator 0507), information from Third Party Media Providers will be exchanged within MemoryWeb and the user's FacebookID will be provided and stored within the MemoryWeb Person Tag Data Block. In addition, any of the User's contacts from Facebook will also be downloaded into the corresponding MemoryWeb Person Tag Data Blocks for any matching persons within the User's MemoryWeb account. The information from the Third Party Media Providers that are stored within MemoryWeb will be used to provide "push notifications" to the user for various items such as when the user or any one of its contacts posts a photo to that Social Media venue.

Figure 25:
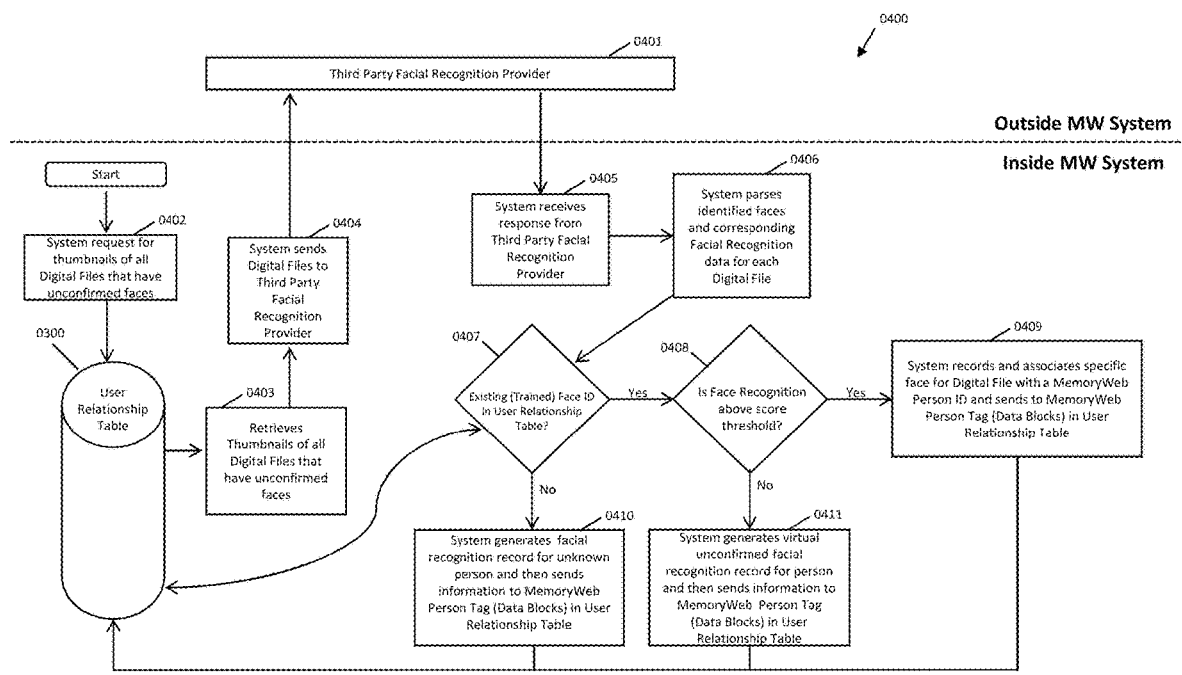
FIG. 25 is a diagram of the Third Party Facial Recognition System.

As illustrated in FIG. 25, the Third Party Facial Recognition System (0400) is described in further detail. As photos are imported or uploaded into the Application, the systems will request thumbnail Digital Files (0404) from the User Relationship Table (0300). On a routine basis (e.g., daily), the system will retrieve all the thumbnails of Digital Files with unconfirmed faces (0403) and the send those Digital Files (0404) to the Third Party Recognition Provider (0401). The Third Party Facial Recognition Provider (0401) uses their algorithms to find location of eyes, nose, mouth and many other points for each face detected in the photo. They will also determine gender, check if the person is smiling, have eyes open, lips sealed or wearing glasses. The Third Party Facial Recognition Provider will use their algorithms to associate potential matches of faces for the user's collection of photos. For each face, the system will send back attributes including gender (male, female), glasses (true, false), smiling (true, false), lips (sealed, parted), eyes, (open, closed), mood (happy, sad, angry, surprised, disgusted, scared, neutral), field in the response have two subfields: value (string) and confidence (integer). For each attribute, the Third Party Facial Recognition Provider will assign percentages of confidence (0% to 100%) for each attribute that can be used by the MemoryWeb Application to utilize.

The Third Party Facial Recognition Provider will then send the information relating to a person back to MemoryWeb (0405). The MemoryWeb Application parse the identified faces and corresponding Facial Recognition data for each Digital File (0406). The system will interact with the User Relationship Table and determine if the face is an existing (i.e., "trained") face in MemoryWeb where there is a Face ID in the User Relationship Table (0407). If not, the system generates a facial recognition record for unknown person and then sends information to MemoryWeb Person Tag (Data Blocks) in User Relationship Table (0410). If yes, the system will then determine if the face is above the system's thresholds for confirming a face is a specific person in the user's MemoryWeb system (0408). If no, system generates virtual unconfirmed facial recognition record for person and then sends information to MemoryWeb Person Tag (Data Blocks) in User Relationship Table (0411). If yes, the system records and associates specific face for Digital File with a MemoryWeb Person ID and sends to MemoryWeb Person Tag (Data Blocks) in User Relationship Table (0409).

Typically, the ability to confirm and deny facial recognition matches will be within the People Profile Application View as illustrated in FIG. 32 within the facial recognitions area (indicator 1442). The system will also have other facial resonations area where the user can confirm or deny the suggested facial recognitions of a person for a Digital File. When the user denies the suggested facial recognition, the system dis-associates potential person match Tag, search's the user's collection for other potential matches, and then sends information to Tag Data Block of Relationship Table for the Digital File. If the user accepts the suggested facial recognition, the system sends this facial recognition tag confirmation to the User Relationship Table for the Digital File. Once a confirmation is made, the newly associated Digital File will have that confirmed person Application Dot-Tag associated to that Digital File for all Application Views. Each time an accepted or denied facial recognition is made for a specific person, the specific data points used for facial recognition is improved and sent to the Third Party Facial Recognition Provider for more accurate confirmations of that person during the next run for that person.

As illustrated in FIG. 26, the Third Party Media System (Data Exchange) (0500) is described in further detail. There are numerous types of third party media systems that are contemplated for MemoryWeb including social network providers (e.g., Facebook, Twitter, and LinkedIn) and other photo sites (e.g., Flickr and Picasa). In addition, it is contemplated for the ability to print Digital Files from MemoryWeb using third party print providers such as Walgreens or Shutterfly. Further contemplated solutions might be from digital file warehouses such as Dropbox and box.net. All of the Third Party Media Systems will interact with MemoryWeb using the same system that is described within FIG. 26. The Third Party Social Media System starts when the user initiates sharing of their information with Third Party Media Provider with MemoryWeb (0502).

When this is initiated, the system will send registration information (0503) to the Third Party Media Provider (0501). Once received, the Third Party Media Provider will send back a confirmation with the Third Party Social Media ID (0504) and then the system will send the information (0505) to the User Settings Table (0390) within the User Relationship Table (0300). The system will then send daily requests from the User Relationship Table for contact names and IDs (0506) to the Social Media Provider (0506). If there are new contact names that are not part of the user's current people, the system will receive new contact names and IDs from the Social Media Provider (0501). The user will have the ability to confirm or deny matches (0508) with their contacts within MemoryWeb. If there is a match, the system will associate the existing person within MemoryWeb to the same ID of the person within the Third Party Social Media platform (0509) and then send this to the User Relationship Table. If there is not a match, the system will add this additional contact as a new person and send (0510) this to the User Relationship Table. If the user wants to share or print Digital Files from MemoryWeb, they can do this with the Share to Third Party Media Provider System (1000) that is further detailed within FIG. 46.

Figure 27:
FIG. 27 is a table of the User Settings Table.

In FIG. 27, the MemoryWeb User Settings Table is illustrated. As illustrated in the User Settings Table (1900), various data blocks of information is stored including the User's Name (1901), Payment ID (1902) that is used with third party payment providers, Password (1903), Account Type (1904) (i.e., free or paid account), User's email (1905), Language preference (1906), Date format preference (1907), Email notification (1908) preferences, the ability to share Contacts (with third Party Social Media) (1909), Facebook ID (1910), API Token (1911), Payment Date (1912) and other settings that will evolve as the Application grows (1913).

Figure 28:
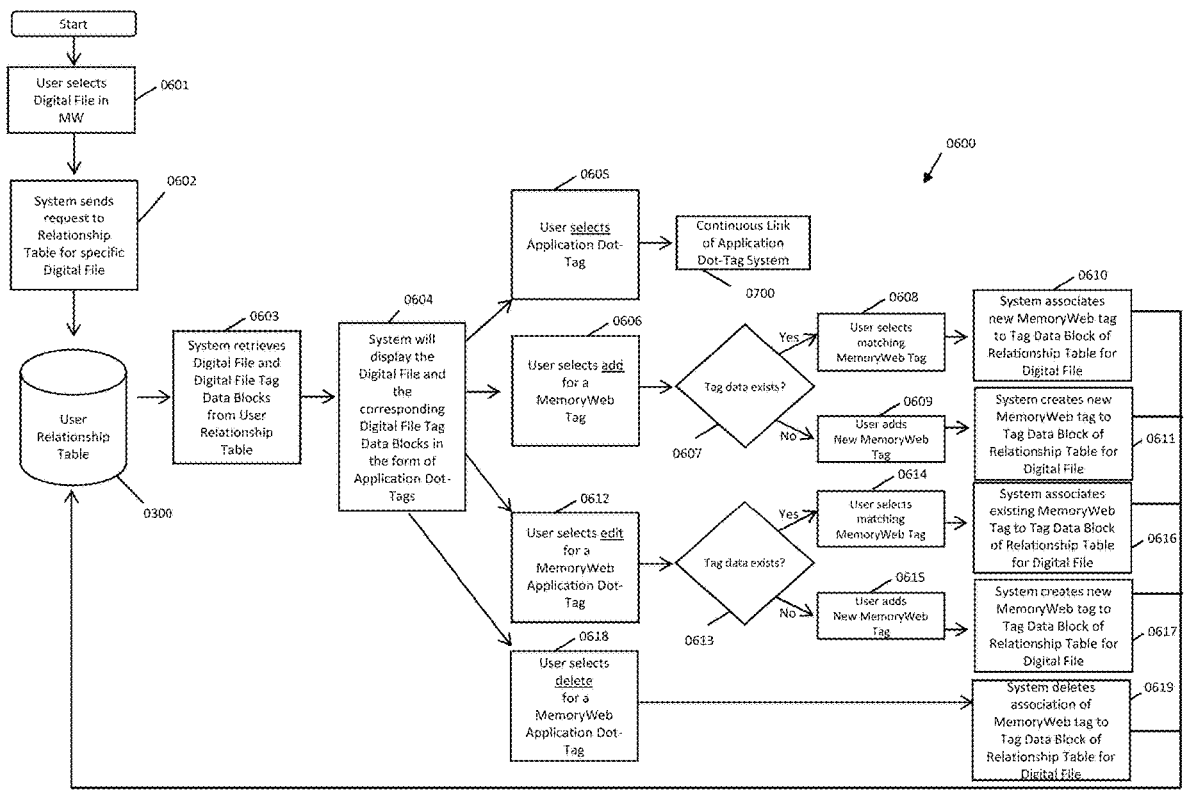
FIG. 28 is a diagram of the Application Digital Tag Organizer System.
Figure 35:
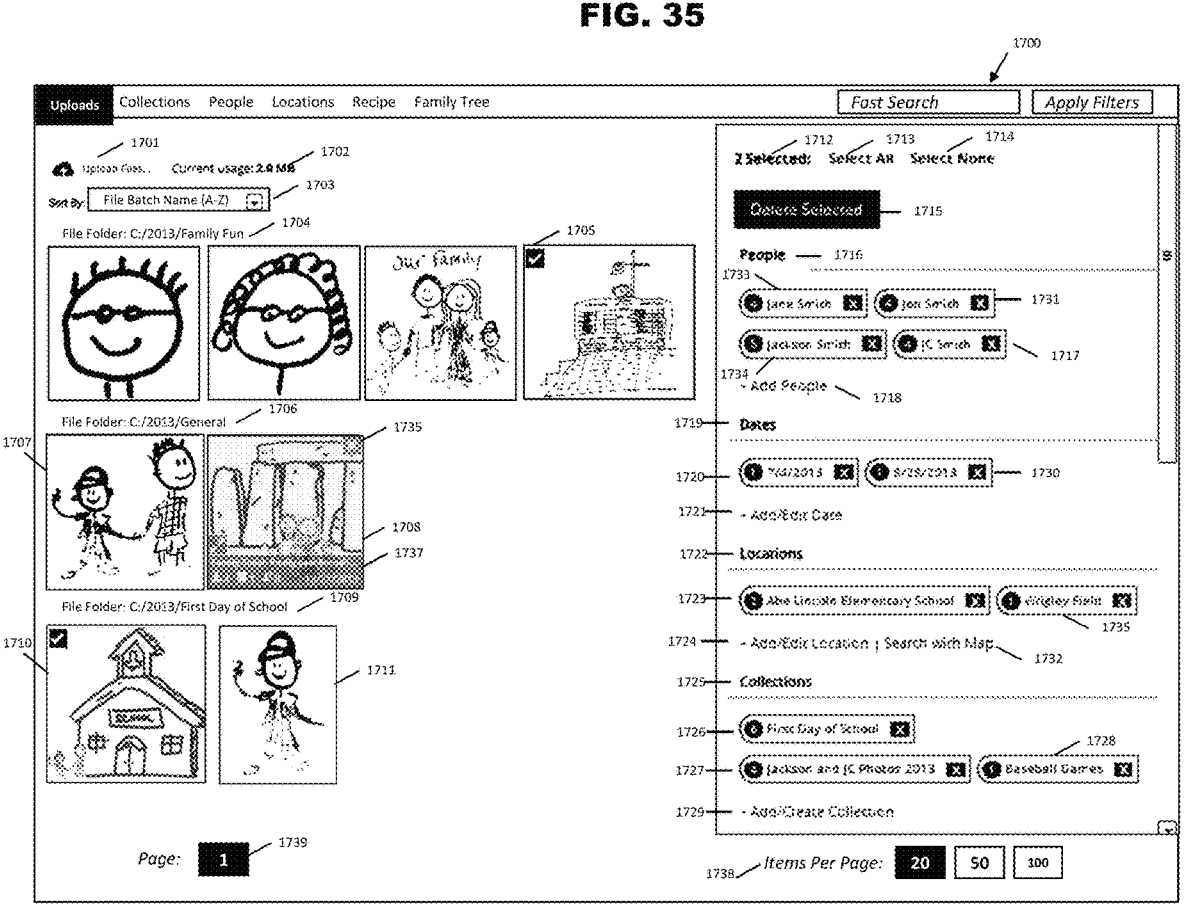
FIG. 35 is screenshot of Uploads Application View.

In FIG. 28, the Application Digital Tag Organizer System (0600) is illustrated. Within various Application Views the user can select, add, delete and edit MemoryWeb Tags for such areas as people, date, location, collections, star rankings, and recipes. An illustration of an Uploads Application View where MemoryWeb Tags for a Digital File can be selected, added, deleted, or edited is illustrated in FIG. 35. The Application Digital Tag Organizer System begins when the user selects one or more Digital Files in MemoryWeb (0601). The system then sends a request to the User Relationship Table for the specific Digital File (0602). The system then retrieves the Digital File and the Digital File Tag Data Blocks (0603) from the User Relationship Table (0300). Next, the system will display the Digital File and the corresponding Digital File Tag Data Blocks in the form of Application Dot-Tags (0604). An example of how the system can illustrate a Digital File with the corresponding Application Dot-Tags is in FIG. 31 (indicators 0780, 0765, 0766, 0768, 0770, and 0771).

If the user selects an Application Dot-Tag (0605), the system will utilize the Continuous Link of Application Dot-Tags System (0700) to produce the results of that Application Dot-Tag within one of the Application Views that is later illustrated in FIG. 30.

If the user selects add for a MemoryWeb Tag (0606), the user can add a new MemoryWeb Tag. When the user begins to type in text to add a tag, the system will produce suggestions on matching MemoryWeb Tags or the option to add a new tag (0607). If a matching tag is selected (0608), the system associates the new MemoryWeb tag to the Tag Block of the Relationship Table for the Digital File (0610). Alternatively, if the tag does not exist the user can create a new MemoryWeb Tag (0609) and then the system associates the new MemoryWeb tag to the Tag Block of the Relationship Table for the Digital File (0611).

If the user selects edit for a MemoryWeb Application Dot-Tag (0612), the user can add information text to edit the MemoryWeb Tag and the system will produce suggestions or matching MemoryWeb tags or the option to add a new tag (0613). If there is a match within the user's system, the matching MemoryWeb Tag will appear and the user can select the MemoryWeb Tag (0614). Once the matching tag is selected, the system associates the new MemoryWeb tag to the Tag Block of the Relationship Table for the Digital File (0616). Alternatively, the user can create a new MemoryWeb Tag (0615) and then the system associates the new MemoryWeb tag to the Tag Block of the Relationship Table for the Digital File (0617). If the user selects delete for a MemoryWeb Application Dot-Tag (0618), the system deletes the association of MemoryWeb tag to Tag Data Block of Relationship Table for Digital File (0619).

In FIG. 29, the Application Dot-Tag Shape and Content is illustrated (0650). MemoryWeb Tags are illustrated as Application Dot-Tags within the Application to help the user organize their Digital Files with key components of related information such as people, date of file, location, collection, star ranking, and recipe. The MemoryWeb Application Dot-Tag is more than just text (as traditional tagging systems) because Memory-Web Application Dot-Tags act as mini search engines that allow the user to see how many matching files there are to that MemoryWeb Tag and if selected will take the user to the corresponding Application View to illustrate the linked search results of that Application Dot-Tag (as illustrated in FIG. 30). In essence, the Application Dot-Tags operate as mini search engines for the user's Digital Tags.

The structure of an Application Dot-Tag (0650) can take on an solid-line enclosed shape of a pill, dot or similar depiction (0651) and within the shape the name of the MemoryWeb Tag is displayed (0653) along with the number of Digital Files (0652) that are also associated with that same MemoryWeb Tag. FIG. 29 further illustrates more examples of the Application Dot-Tags. If the number of Digital Files associated with a specific MemoryWeb Tag is less than a certain number (e.g., 1000), the actual number of Digital Files associated with that MemoryWeb Tag is displayed. In FIG. 29, this is illustrated with an Application Dot-Tag that has 453 files that are associated with the location of Cologne, Germany (0654). However, if the number of Digital Files associated with a specific MemoryWeb tag are greater than the character length, a greater sign along with a number sequence that is less than the total number of associated Digital Files will be displayed (0655). In FIG. 29, this is illustrated with an Application Dot-Tag that has ">999" (0657) as the number of Digital Files with the exact same MemoryWeb Tag and if the name of the MemoryWeb tag is longer than the text sequence, only a portion of the MemoryWeb tag will be displayed along with an ellipse as illustrated with "Holiday Photos from . . . " (0658). Finally, the Application Dot-Tag may be illustrated with a dotted or similar distinction (as opposed to a solid line) to help indicate a partial relationship (0656). In the illustration in FIG. 29, the dotted line is to indicate that only some of the selected Digital Files have the MemoryWeb Tag of Frank Smith.

Figure 30:
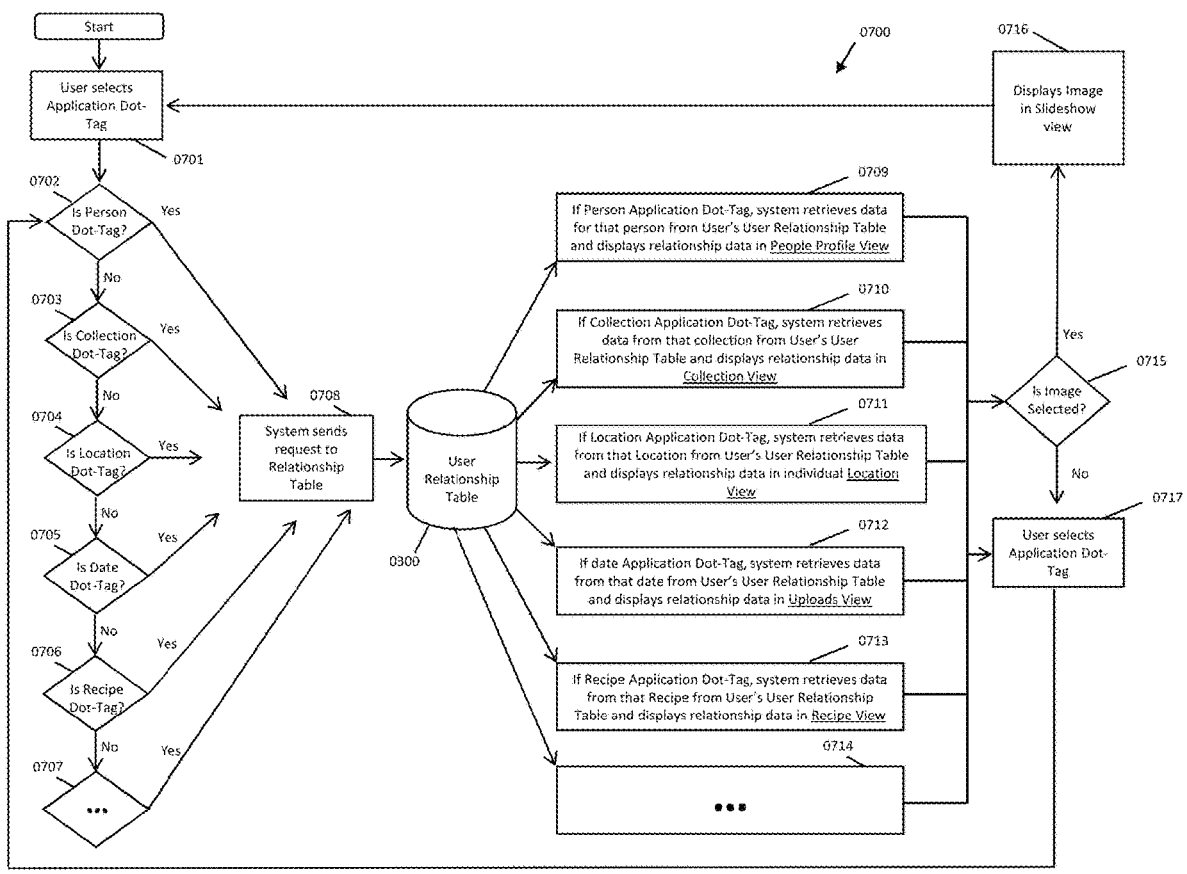
FIG. 30 is a diagram of the Continuous Link of Application Dot-Tag System.

In FIG. 30, the Continuous Link of Dot Tag System is illustrated (0700). When a user selects an Application Dot-Tag, it will take them to the corresponding Application View that relates to the type of MemoryWeb Tag. The Continuous Link of Application Dot-Tag System begins when a user selects an Application Dot-Tag (0701).

If the Application Dot-Tag is a Person (0702), the system will send a request to display the requested information (0708) to the User Relationship Table (0300). A sample illustration of how a user can select a person Application Dot-Tag is in FIG. 31 (indicator 0764). For a person tag, the system receives data for that person from the User Relationship Table and displays the relationship data in a People Profile View (0709). A sample illustration of a selected Person Application Dot-Tag is in FIG. 32 (indicator 1430).

If the Application Dot-Tag is a Collection (0703), the system will send a request to display the requested information (0708) to the User Relationship Table (0300). A sample illustration of a collection Application Dot-Tag that can be selected is in FIG. 31 (indicator 0781). For a collection tag, the system receives data for that collection from the User Relationship Table and displays the relationship data in a Collection View (0710). A sample illustration of a selected Collection Application Dot-Tag within a Collection View is in FIG. 33 (indicator 1530).

If the Application Dot-Tag is a Location (0704), the system will send a request to display the requested information (0708) to the User Relationship Table (0300). A sample illustration of a location Application Dot-Tag that can be selected is in FIG. 31 (indicator 0768). For a location tag, the system receives data for that location from the User Relationship Table and displays the relationship data in a Location View (0711). A sample illustration of a selected Location Application Dot-Tag within a Location View is in FIG. 34 (indicator 1630).

If the Application Dot-Tag is a Date (0705), the system will send a request to display the requested information (0708) to the User Relationship Table (0300). A sample illustration of a date Application Dot-Tag that can be selected is in FIG. 31 (indicator 0766). For a date tag, the system receives data for that date from the User Relationship Table and displays the relationship data in Uploads View with that date filtered (0712). A sample illustration of a selected Date Application Dot-Tag within Uploads View is in FIG. 40 (indicator 0861).

If the Application Dot-Tag is a Recipe (0706), the system will send a request to display the requested information (0708) to the User Relationship Table (0300). For a recipe tag, the system receives data for that recipe from the User Relationship Table and displays the relationship data in a Recipe View with that date filtered (0713). A sample illustration of a selected Date Application Dot-Tag within Recipe View is in FIG. 36 (indicator 1800).

The Application is contemplated to have additional types of Application Dot-Tags (0707) in the future including Family Trees, Timespan, etc. and each of these MemoryWeb Tags will go through the same continuous link of Application Dot-Tag process. For an additional type of Application Dot-Tag, the system will receive data from the User Relationship Table and displays the relationship data in the corresponding view for that type of Application Dot-Tag (0714).

If within any of the Application Views the user selects a Digital File (0715), the Digital File is then displayed in a Slideshow View (0716) where the user can again select an Application Dot-Tag (0701) and start the continuous link of Application Dot-Tag functionality over again. Also within an Application View, if the user selects another Application Dot-Tag (0717), the entire continuous link of Application Dot-Tag functionality begins again and sends the request back to ask if the newly selected Application Dot-Tag is a person (0702).

Figure 31:
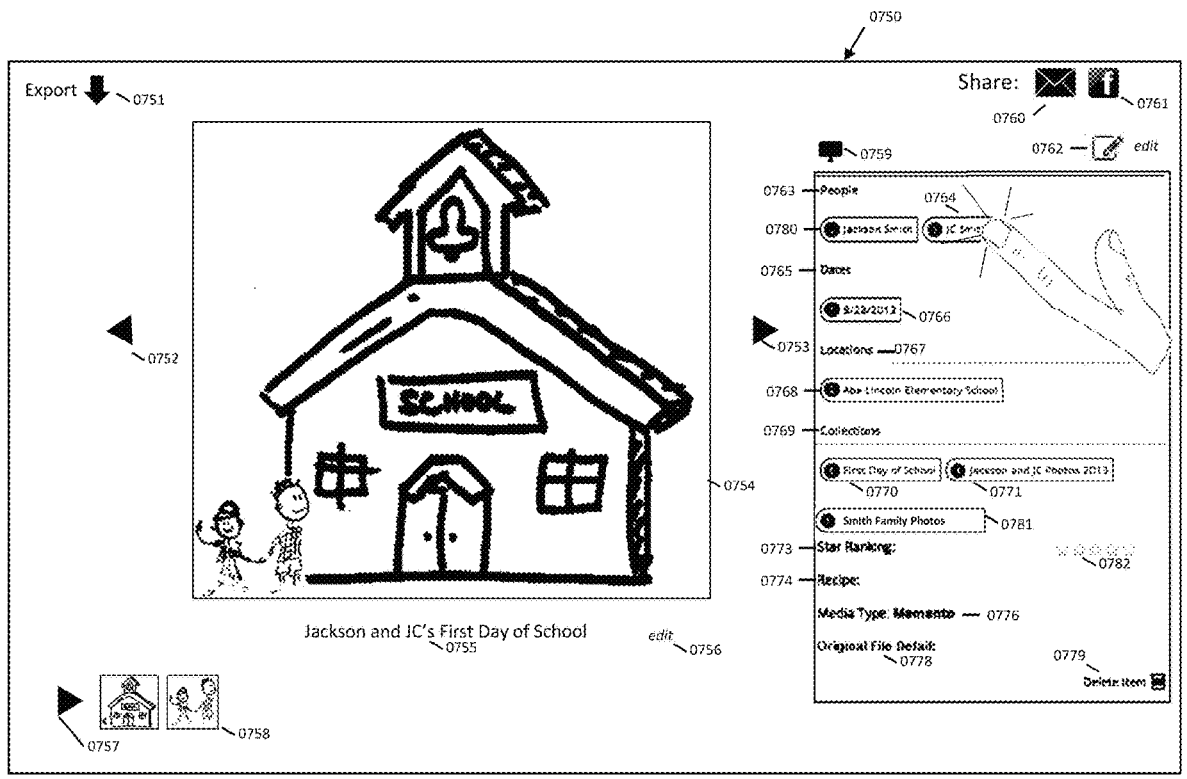
FIG. 31 is an illustration of the Slideshow View of Digital File and Application Dot-Tags.
Figure 49:
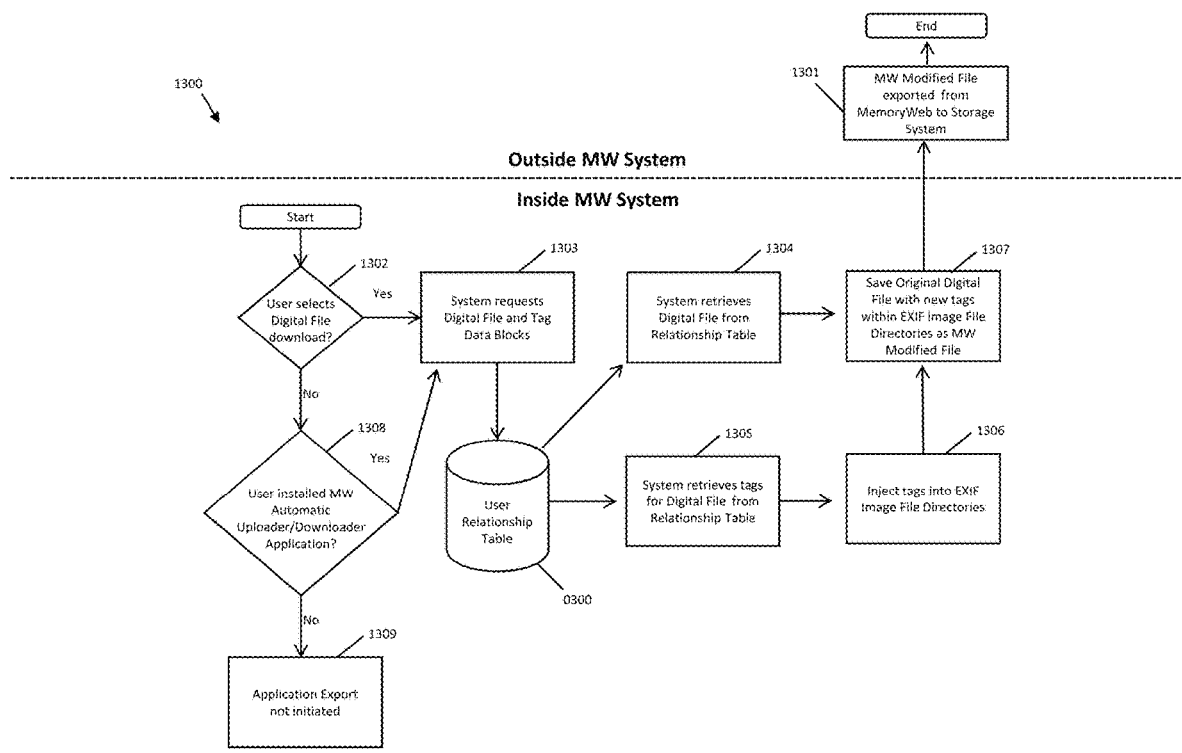
FIG. 49 is a diagram of the Application Export System.

In FIG. 31, the Slideshow view of a Digital File, Application Dot-Tags, and comments are illustrated (0750). When viewing a Digital File or group of Digital Files within the Slideshow Application View (0750), the selected Digital File is displayed in the center of the screen (0754). If the user wants to export this photo with all the associated MemoryWeb Tags, they can select export (0751) which will initiate the Application Export System as illustrated in FIG. 49. If the user wants to see the Digital File that is one file before the selected Digital File, they select the left arrow (0752) or they can select the right arrow (0753) to display the next photo in the sequence. Below the Digital File, the comments (0755) that are specific to that Digital file are depicted. If the user wants to edit the comments, they select edit (0756). If the user would like to see a moving slideshow of all the photos that are part of the group of Digital Files, they can select on the play sign (0757) or simply click the specific thumbnail of a Digital File (0758) to be displayed. The user can also have the slideshow in a full screen slideshow by selecting the full screen icon (0759). If the user wants to share the individual Digital file via email, they can select the mail icon (0760) or share it through a third party median provider, in this case Facebook (0761). A more detailed description on how the share functionality works is in FIG. 46 (indicator 1000).

In FIG. 31, each Application Dot-Tag that is associated with a Digital File is illustrated to the right of the Digital File under each major MemoryWeb Tag area. For this example, the People area (0763) has Application Dot-Tags of Jackson Smith (0780) and JC Smith (0764) associated with the selected Digital File. In the Dates area (0765), the Application Dot-Tag of Aug. 28, 2013 (0766) is associated with the selected Digital File. In the Locations Area (0767), the Application Dot-Tag of Abe Lincoln Elementary School (0768) in the location associated with the selected Digital File. In the Collections Area (0769), the Application Dot-Tags of First Day of School (0770) and Jackson and JC Photos 2013 (0771) are associated with the selected Digital File. The Star Rankings Area (0782) shows that four out of five stars (0773) was selected for this Digital File. If the Digital File is associated with a Recipe (0774) the Application Dot-Tag would be illustrated in this area. The Media Type area indicates that this is a Memento (0776). If the user wants to delete this Digital File from the Application, they can select the Delete Item function (0779). If the user wants to edit the Application Dot-Tags, they can select the edit icon (0762) and all the MemoryWeb Tag areas will be in edit mode as later illustrated in FIG. 35. Finally, any original Digital File detail (e.g., file name, camera specifications, etc.) is illustrated (0778).

In FIG. 32, both of the People Application Views are illustrated. The first People Application View (1400) is used to display all the people that were created within the user's Application. This view can be seen by selecting "People" (1401) from any of the Application Views within the Application. The people can be listed in various sort orders though a drop-down (1402) such as: Newest to Oldest (added), Oldest to Newest (added), Alphabetical (A-Z), Alphabetical (Z-A), etc. Additional sorts are contemplated such as age sort. For each person, a thumbnail of their face along with their name is depicted. In this figure, Jon Smith (1403) and JC Jon Smith (1404) along with some other people are illustrated. Also, the user can determine if they want to have 20, 50 or 100 people shown at one time (1405) by selecting the corresponding number box. At the top of every Application View within the Application, the user can select Fast Search (1450) that is further described in FIG. 44. Also at the top of every Application View within the Application, the user can select Apply Filters (1451) that is further described in FIGS. 37-43.

In the second People Application View within FIG. 32, a single people profile (1430) is illustrated. The individuals name is displayed at the top of the page (1431) along with their Nicknames (1433), when they were Born (1434), who their parents are (1435), Siblings (1436), Children (1437), and the person's Biography (1438). The Person Profile Photo of that individual is illustrated (1439) and if the user wants to change the profile photo, they can change by selecting change profile photo (1440). For each person, the system can allow the user to quickly see all the tags that are associated to a person. In this example, the system illustrates that there are four photos (1452) associated with that person and will also illustrate thumbnails of each of the four photos (1446). These thumbnails can be selected and then the user will be taken to the slideshow view for that Digital File. If the user selects Collections (1441), all of the collections that the person has been tagged within will be displayed. If the user selects Facial Recognitions (1442), all the faces that are confirmed or need to be confirmed are displayed. This is the area where the user can select to confirm or deny a suggested facial recognition through the Third Party Facial Recognition System that is illustrated in FIG. 25. If the user selects Locations (1443), all of the Locations that the specific person has been tagged within will be displayed. If the user selects Family Relationships (1444), the seven people that the user is associated with will be displayed in a family chart or tree. If the user selects Recipe (1445), all the recipe's that the user has been tagged within will be displayed. If the user wants to edit any details within the individual people profile, they can select edit (1447) and all the fields will allow the ability to edit the details. If the user selects any of the Application Dot-Tags such as the individuals mother Jane Smith (Doe) (1449), the application will utilize the Continuous Link of Application Dot-Tag System (see FIG. 30) and take the user to an individual people profile view of Jane Smith (Doe). If the user selects View all People (1432), the Application will go back to the multiple People View (1400).

Figure 33:
FIG. 33 is a screenshot of Collection Application Views.

In FIG. 33, both of the Collection Application Views are illustrated. The first Collection Application View is used to display all the collections that were created within the user's Application (1500). This view can be seen by selecting "Collections" (1501) from any of the Application Views within the Application. The collections can be listed in various sort orders though a drop-down (1502) such as: Newest to Oldest (added), Oldest to Newest (added), Alphabetical (A-Z), Alphabetical (Z-A), etc. For each collection, a thumbnail of a Digital File from that collection depicted. In this figure, Smith Family Photos (1503), Europe Trip (1504), First Day of School (1505), Jackson and JC Photos 2013 (1506), and Baseball Games (1507) is illustrated. At the top of every Application View within the Application, the user can select Fast Search that is further described in FIG. 44. Also at the top of every Application View within the Application, the user can select Apply Filters that is further described in FIGS. 37-43.

In the second Collections Application View within FIG. 33, a single collection (1530) is illustrated. The individual collection name is displayed at the top of the page (1532). Thumbnails of each Digital File within the specific collections are illustrated. In this example, the system shows photos (1533) associated with the Smith Family Photos Collection. If the user wants to edit any Digital Files within the collection, they can select edit (1535) and then the user can add or delete any Digital Files as well as set the cover photo for a collection. If the user wants to share this collection (1534), they can select a method to share and this will take the user through the Share to Third Party Media Provider System illustrated later in FIG. 46. If the user selects View all Collections (1531), the Application will go back to the multiple Collection View (1500).

In FIG. 34, both of the Location Application Views are illustrated. The first Location Application View is used to display all the locations that were created within the user's Application (1600). This view can be seen by selecting "Locations" (1605) from any of the Application Views within the Application. The locations can be listed in various sort orders though a drop-down (1606) such as: Newest to Oldest (added), Oldest to Newest (added), Alphabetical (A-Z), Alphabetical (Z-A), etc. For each location, a thumbnail of a Digital File from that location depicted. In this figure, Wrigley Field (1601), Abe Lincoln Elementary School (1602), Home Sweet Home (1603), and Stonehenge (1604) is illustrated. What is also contemplated instead of a Digital File from that location is that a zoomed in image of a map from the specific location using the Third Party Geographical Mapping System later depicted in FIG. 47. At the top of every Application View within the Application, the user can select Fast Search that is further described in FIG. 44. Also at the top of every Application View within the Application, the user can select Apply Filters that is further described in FIGS. 37-43.

In the second Locations Application View within FIG. 34, a single location (1630) is illustrated. The individual location name is displayed at the top of the page (1632). Thumbnails of each Digital File within the specific collections are illustrated. In this example, the system illustrates a one photo (1633) taken at Wrigley Field (1634) that is associated with the location called Wrigley Field. If the user wants to edit any Digital Files within the collection, they can select edit (1637) and then the user can add or delete any Digital Files. If the user wants to share the Digital Files associated with this location (1636), they can select a method to share and this will take the user through the Share to Third Party Media Provider System illustrated later in FIG. 46. If the user selects View all Collections (1631), the Application will go back to the multiple Collection View (1600). As part of the individual Location View, an interactive map displaying a zoomed-in image of the specific location is displayed (1635).

In FIG. 35, the Uploads Application View and how it uses the Application Digital Tag Organizer System is illustrated (1700). Similar to the concept of writing certain information "on the back of a photo," the system's digital tagging system (also called Application Digital Tag Organizer) allows a user to select large amounts of Digital Files and add Digital Tags that can characterize and document the digital file(s). Digital Files can be individually or group organized at the same time for many tags including, but not limited to, a person's name, family relationships of the subjects to the user and between each other (e.g., mother/father), location, date, album, comments, document type (e.g., birth certificate, poetry), recipe, ranking or rating, and sharing rights. One or more Digital Files can be selected at the same time and displayed with an overlaid check mark when activated (1705 and 1710) and then Digital Tags can be assigned to a single file at a time or to a plurality of files at once. For example, if a user wishes to assign the tag "grandma" to 100 photos at once, the system provides a way for a user to select all 100 photos (1713) and enter the tag only once. In addition, the system does include an indicator that appears when a user hovers over the Digital File providing all the relevant Digital Tags associated with that specific Digital File (1737) and in this example it shows the caption of "Family Smith finally sees Stonehenge," that four People are tagged to this photo, one collection is tagged to this photo, there are zero people recognized through Facial Recognition, and the date of this photo is from Dec. 21, 2013. If the user wants to delete a single photo from uploads, they can click on the "x" (1735) that is displayed when the user hovers over the Digital File thumbnail. When there are multiple Digital Files, the user can determine how many images are displayed at one time in the Items Per Page Buttons (1738) that include such numbers at 20, 50 and 100 on the page at the same time. When there is are more Digital Files that items per page, they are automatically grouped by pages and a Page Button (1739) can be selected to see the next set of Digital Files.

In the Uploads Location View, Digital Files can be directly uploaded to the Application by selecting Upload Files (1701) and the user will have the option to select the specific Digital Files to be uploaded from their Storage System. Users also have the option to install the Memory-Web Download Application that can be installed on either a Microsoft or MAC computer that will automatically upload and sync photos to and from the users Storage System to the MemoryWeb Application. Also displayed is the amount of space being used by the user within the Application (1702). Uploads of Digital Files can be listed in various sort orders though a drop-down (1703) such as: Newest to Oldest (added), Oldest to Newest (added), Alphabetical (A-Z), Alphabetical (Z-A), etc. In addition, the Digital Files can be sorted by File Batch Name (A-Z) or File Batch Name (Z-A). In FIG. 35, the sort of File Batch Name (A-Z) is selected (1703) and this provides three groups of Digital Files with the names File Folder C:/2013/Family Fun (1704), File Folder C:/2013/General (1706), and of File Folder C:/2013/First Day of School (1709). The File Batch Name is created when Digital Files are uploaded to the Application. The File Batch Name allows the user to see the file directory of how they had their Digital Files stored from another Storage System (e.g., on their computer hard drive) that allows for easier organization within the MemoryWeb Application. For example, in the sort of File Folder C:/2013/General (1706), two digital files (1707 and 1708) are illustrated that came from the exact same file folder path of the Users Storage system upon upload. At the top of every Application View within the Application, the user can select Fast Search that is further described in FIG. 44. Also at the top of every Application View within the Application, the user can select Apply Filters that is further described in FIGS. 37-43.

On the right side of FIG. 35, the associated Application Dot-Tags along with the ability to organize one or more Digital Files at the same time is illustrated. At the top of the screen, it shows how two Digital Files are selected (1712) that correspond to the selected (checked) Digital Files (1705 and 1710). Below this area illustrates all the Application Dot-Tags that are associated with the two selected Digital Files. The user has the option to select all (1713) the Digital Files being viewed in the Uploads View as well as selecting none (1714). By selecting all, the user can administer Application Dot-Tags to all the selected Digital Files at the same time. If the user wants to delete Digital Files, they can select the Digital Files to be deleted and then select the Delete Selection (1715) option.

In FIG. 35, each Application Dot-Tag that is associated with the selected Digital File(s) is illustrated. For this example, the People area (1716) has Application Dot-Tags of Jackson Smith (1734), Jane Smith (1733), Jon Smith (1731, and JC Smith (1717) that are associated with the two selected Digital Files (1710 and 1705). If the user wants to add a person to all the selected Digital Files, they can click on "+Add People" (1718) that will display a pop-up where the user can search for an existing person within the user's existing people within the Application or add a new person to the user's group of people within the Application. It is contemplated to have a Facial Recognition suggestions appear in this area of the Application that will allow users to confirm or deny a recognized person to a specific Digital File. However, the current version of the People area is useful for situations where a face is not recognized, but the user desires to tag a person to a Digital File, they can manually assign a Person Application Dot-Tag to that Digital File for an existing person (e.g., if the person's back is turned, it is a document that contains that person, a piece of art created by that person, etc.).

In the Dates area (1719), the organize functionality for assigning a Digital Tag of a date within the Digital File(s) is illustrated. Upon upload, the date when the Digital File was created is automatically read by the Application and illustrated as an Application Dot-Tag (1720 and 1730). As illustrated in the Dates area, the Application Dot-Tags of Jul. 4, 2013 (1720) and Aug. 28, 2013 (1730) are illustrated as they correspond to the dates that are associated with each of the selected Digital Files. If the user wants to change the date for all the selected Digital Files, they can click on "+Add/Edit Date" (1721) that will display a pop-up where the user can add a new date for the selected digital files within the Application. This is a very useful feature when an incorrect date is assigned to a digital file (e.g., if a photo from Oct. 31, 1951 was digitized on Dec. 31, 2012, the digitized dates would show as an Application Dot-Tag that the user can change in this section to the correct date of Oct. 31, 1951).

In the Locations area (1722), the organize functionality for assigning Digital Tags of locations within the Digital File(s) is illustrated. Upon upload, the GPS location of where the Digital File was created (if applicable) is automatically read by the Application and illustrated as an Application Dot-Tag for locations of the selected files. In the locations area, the Application Dot-Tags of Abe Lincoln Elementary School (1723) and Wrigley Field (1735) are illustrated as they correspond to the locations that are associated with each of the selected Digital Files. If the user wants to change the location for all the selected Digital Files, they can click on "+Add/Edit location" (1724) that will display a pop-up where the user can search for an existing location within the user's existing locations within the Application or add a new location to the user's group of locations within the Application. Another added function to assign a location to the selected Digital Files is to use Search with Map (1732) that utilizes the Application's Third Party Geographical Mapping System that is further illustrated in FIG. 47 that allows the user to type in any relevant information (e.g., location name, address, state, etc.) and then the Application will search and pinpoint that location on a map.

In the Collections Area (1725), the organize functionality for assigning Digital Tags of albums within the Digital File(s) is illustrated. Digital Files can be associated to multiple albums. As illustrated in the Collections area, the Application Dot-Tags of First Day of School (1726), Jackson and JC Photos 2013 (1727), and Baseball Games (1728) are associated with the Collections for the selected Digital Files. If the user wants to add a Collection to all the selected Digital Files, they can click on "+Add/Create Collection" (1729) that will display a pop-up where the user can search for an existing Collection within the user's existing Collections within the Application or add a new Collection to the user's group of Collections within the Application.

Within the Uploads View, the ability to perform similar tagging of Star Rankings, Recipes, Family Relationships, and Media Types/Document Type are also contemplated as part of the Application Digital Tag Organizer System. For Star Rankings, it is contemplated to assign MemoryWeb Tags of star rankings within the Digital File(s). Upon upload, if the star ranking is already contained within the Digital File, it is automatically read by the Application and illustrated as an Application Dot-Tag. The user can select one or more Digital Files and then apply a star ranking between 1 and 5 in the Uploads Application View. For Recipes, it is contemplated to assign MemoryWeb Tags of Recipes to Digital File(s). The user can select one or more Digital Files and then type within the "Recipe" search bar to either add a new recipe or associate the Digital File(s) to an existing recipe. Digital Files can be associated to multiple recipes. For Media Type/Document Type, the user can choose from a list of common document types (e.g., Birth Certificate, Death Certificate, Marriage Certificate, etc.) can be utilized for common document type associations. Once a document type is assigned to one or more Digital Files, the document type appears within an Application Dot-Tag. Digital Files can be associated to multiple document types.

Figure 36:
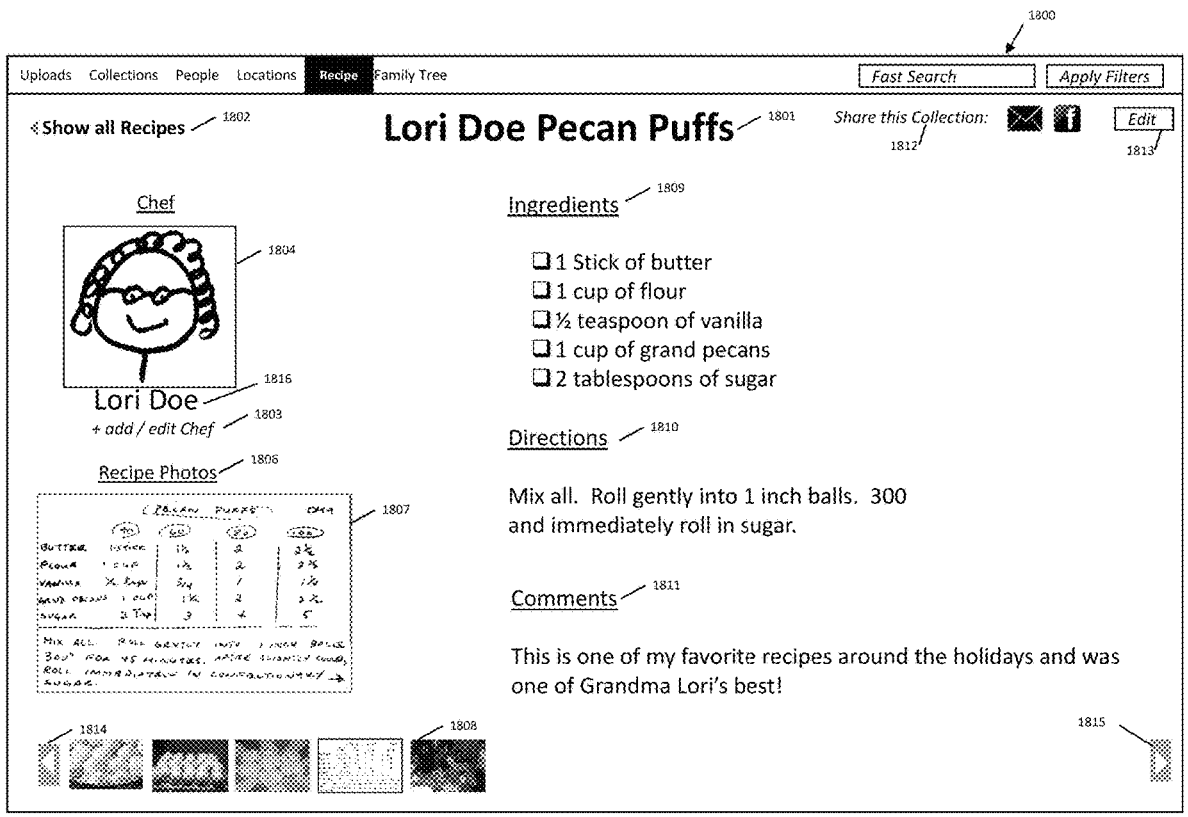
FIG. 36 is a screenshot of Recipe Application View.

In FIG. 36, an individual recipe view (1800) allows one to see all the information that is associated with a specific recipe. The name of the specific recipe is displayed at the top of the page (1801) and the People Profile picture of the "chef" associated with the recipe is illustrated (1804). If no chef is assigned, the user can select the "+add/edit chef" (1803) to either choose an existing person from the user's People in the Application or add a new person.

The view of various Digital Files within the recipe (1808) along with scrolling through the Digital Files using the arrow icons (1814 and 1815), the ability to share this recipe with others by selecting the sharing icon (1812), As the Digital Files are selected on using the film strip on the bottom, a larger thumbnail illustrating the Digital File is shown (1807). The recipe view also allows you to choose a chef for the recipe from the people within the user's Application. When a chef is selected, the profile picture (1804) of the person along with their name as an Application Dot-Tag (1816) is displayed. For each recipe, the user can insert the ingredients (1809), directions (1810), and comments (1811). Each of these areas can be edited by selecting the edit button (1813). Another contemplated feature allows the user to apply star rankings for the recipe as well as categorize they type of recipe (e.g., appetizer, entrée, etc.). It is further contemplated that the Digital Files within the individual recipe view may also include videos where they can be watched showing the chef making the recipe. It is also contemplated that the recipes will be interactive with external sources (e.g., the Food Network) so that recipes can be shared or imported with the Application and that visitors to the account will be able to post/share comments about the recipe. It is further contemplated that the user can print the recipe using a print icon.

Figure 37:
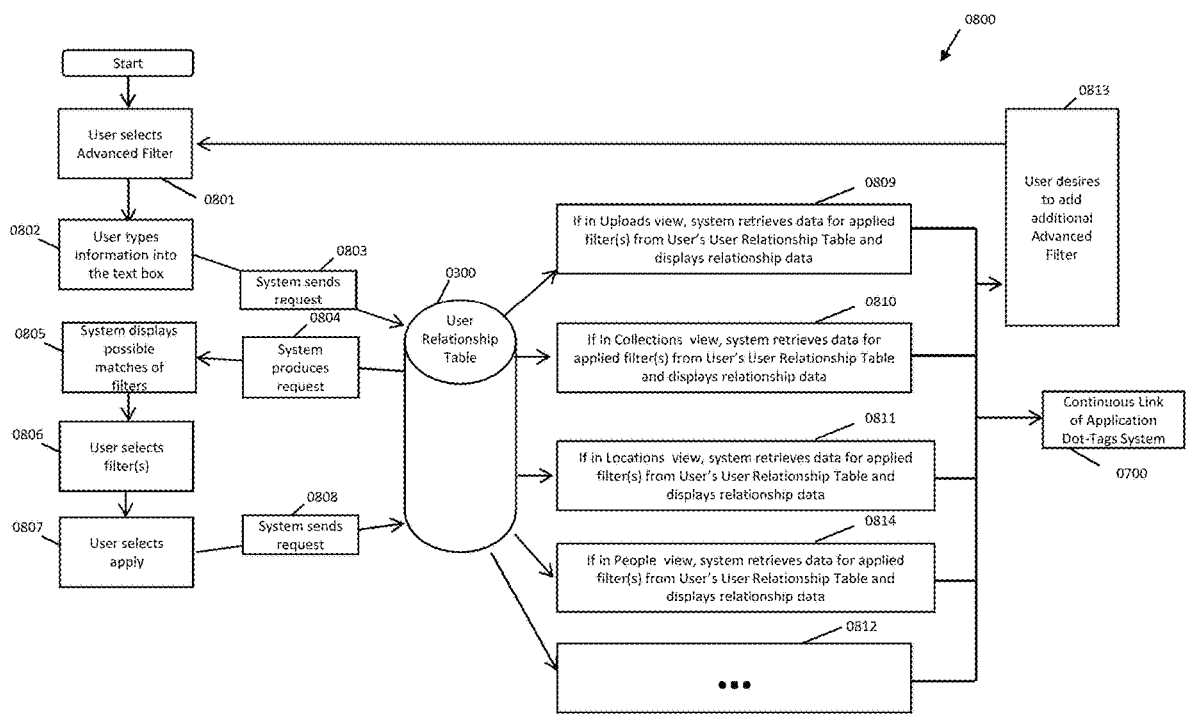
FIG. 37 is a diagram of the Advanced Filters System.

In FIG. 37, the Advanced Filters System is illustrated (0800). This feature allows the user to narrow the Digital Files being viewed within the Application Views by searching the user's entire collection of MemoryWeb Tags within the Application and then displaying the filtered information in one of the Application Views. Advanced Filters System can be filtered by such items as key words (or plurality of key words), event names, location, people, albums, star rating, file type, document type, and dates. A user may filter based on more than one criterion at a time. To help users quickly identify Digital Files that may still need to be organized, the advanced search filter also allows users to isolate files that have no date, no location, no people, no specific date/range, and no upload date information or are lacking any other tag. The Advanced Search Filter can be used within many of the views the Application to narrow the set of Digital Files being viewed. For example, you can use the Advanced Filter Button to only show the map view of locations a specific person has traveled in their lifetime.

When a user selects the "Advanced Filters" from almost any Application View (0801) (the button can be seen in FIGS. 32, 33, 34, 35, and 36), a pop-up will appear that allows the user to type in text into the text box (0802). As the user is typing, the system sends a request (0803) to the User Relationship Table (0300) to look up any possible MemoryWeb Tag matches. The system will then produce the request (0804) and illustrate the potential matches of the filters to the user (0805). As the user types in another letter, the process of sending a request (0803) to the User Relationship Table (0300), producing results (0804) and producing a new set of results (0805) is re-run. If the user selects one of the suggested MemoryWeb tags (0806) and then selects to apply this filter (0807), the system will send this request to the User Relationship Table (0300). This portion of the Advanced Filter System is further illustrated in FIG. 38.

If the Advanced Filter System is applied within the Uploads View, the system retrieves data for the applied filter(s) from the User's Relationship Table and displays the relationship data (0809). An example of this output is later illustrated in FIG. 39 (indicator 0850).

If the Advanced Filter System is applied within the Collections View, the system retrieves data for the applied filter(s) from the User's Relationship Table and displays the relationship data (0810). An example of this output is later illustrated in FIG. 39 (indicator 0852).

If the Advanced Filter System is applied within the Locations View, the system retrieves data for the applied filter(s) from the User's Relationship Table and displays the relationship data (0811). An example of this output is later illustrated in FIG. 40 (indicator 0856).

If the Advanced Filter System is applied within the People View, the system retrieves data for the applied filter(s) from the User's Relationship Table and displays the relationship data (0814). An example of this output is later illustrated in FIG. 39 (indicator 0854).

If the Advanced Filter System is applied within other contemplated views within the Application such as Recipe, Family Trees, Timespan, etc. the system retrieves data for the applied filter(s) from the User's Relationship Table and displays the relationship data (0812).

If the user decides to add an additional filter (0813), the process is repeated when the user selects "Advanced Filter" (0801) while the pre-existing filters are still applied. An example of this process is later illustrated in FIG. 42 and FIG. 43. If the user selects an Application Dot-Tag, then the continuous Link of Application Dot-Tags System is engaged as illustrated in FIG. 30 (0700).

Figure 38:
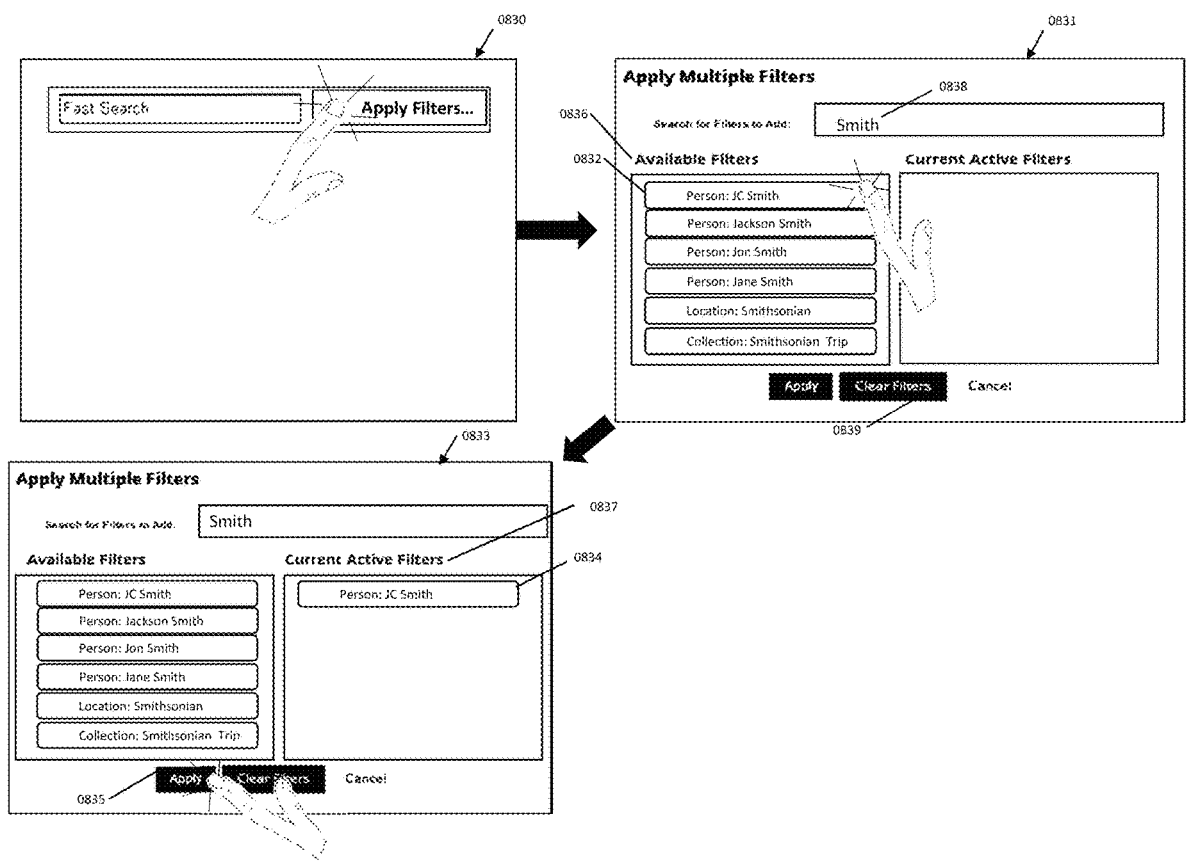
FIG. 38 is a screenshot of Adding the First Application Dot-Tag using Advanced Filter.

In FIG. 38, the process of the Adding the First Application Dot-Tag using the Advanced Filter is illustrated. This is a visual depiction of the process that was illustrated in FIG. 37. In Stage 1 (0830), the user selects "Apply Filters." This takes the user to Stage 2 where the Application generates the Apply Multiple Filters box (0831). The user can then type in the alphanumeric text search criteria within the Advanced Filters text box (0838). In this example, the word "Smith" was typed within the text box. As the alphanumeric text is typed within the text box, the application automatically generates the available filters (0836) that meet the criteria. In this example, the user selects the Application Dot-Tag of a person named JC Smith (0832). In Stage 3, "Apply" is selected and then the application lists the Application Dot-Tag of a Person named JC Smith as a current active filter (0837). This filter will then be applied to each Application view that is further illustrated in FIGS. 39 through 41. If the user wants to clear all the filters, they can select "clear filters" (0839).

Figure 39:
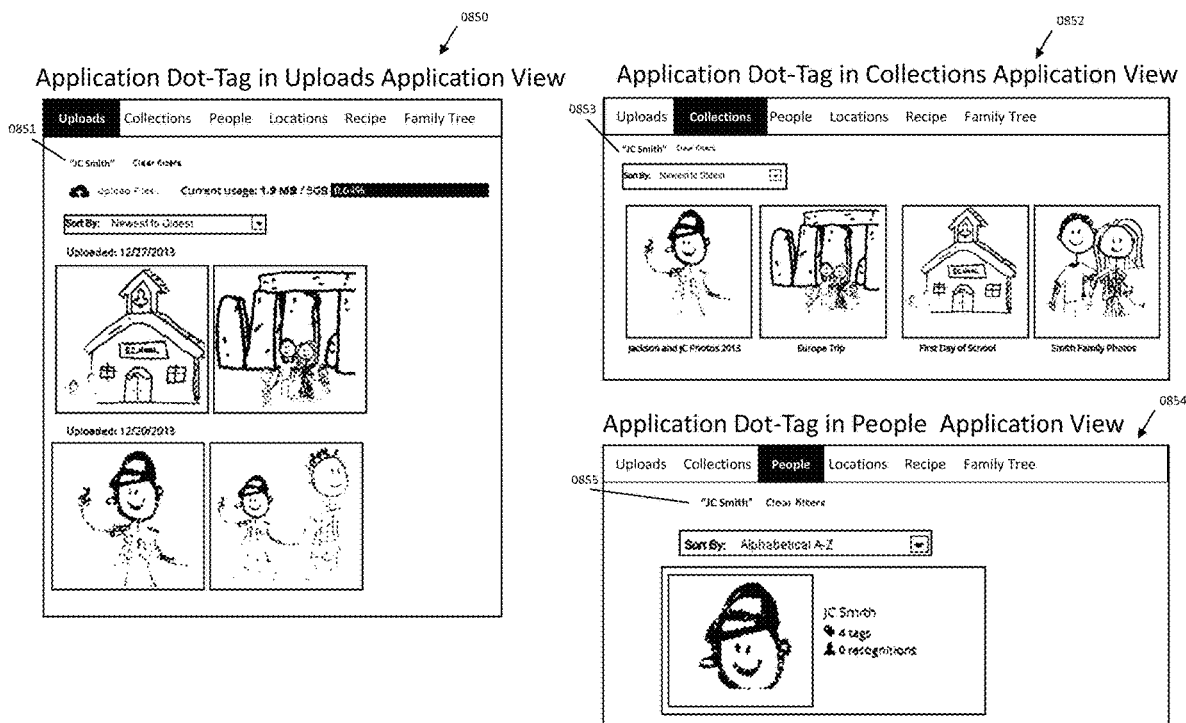
FIG. 39 is a screenshot of Single Application Dot-Tag Filter for Each Application View.

In FIG. 39, an illustration of the results for a Single Application Dot-Tag Filter for each Application view is depicted. If the Advanced Filter is applied in the Uploads Application View (0850), the filter of "JC Smith" (0851) is illustrated and only the Digital Files that contain the person JC Smith are illustrated. If the Advanced Filter is applied in the Collections Application View (0852), the filter of "JC Smith" (0853) is illustrated and only the Collections that contain the person JC Smith are illustrated. If the Advanced Filter is applied in the People Application View (0854), the filter of "JC Smith" (0855) is illustrated and only the person named JC Smith is illustrated.

Figure 40:
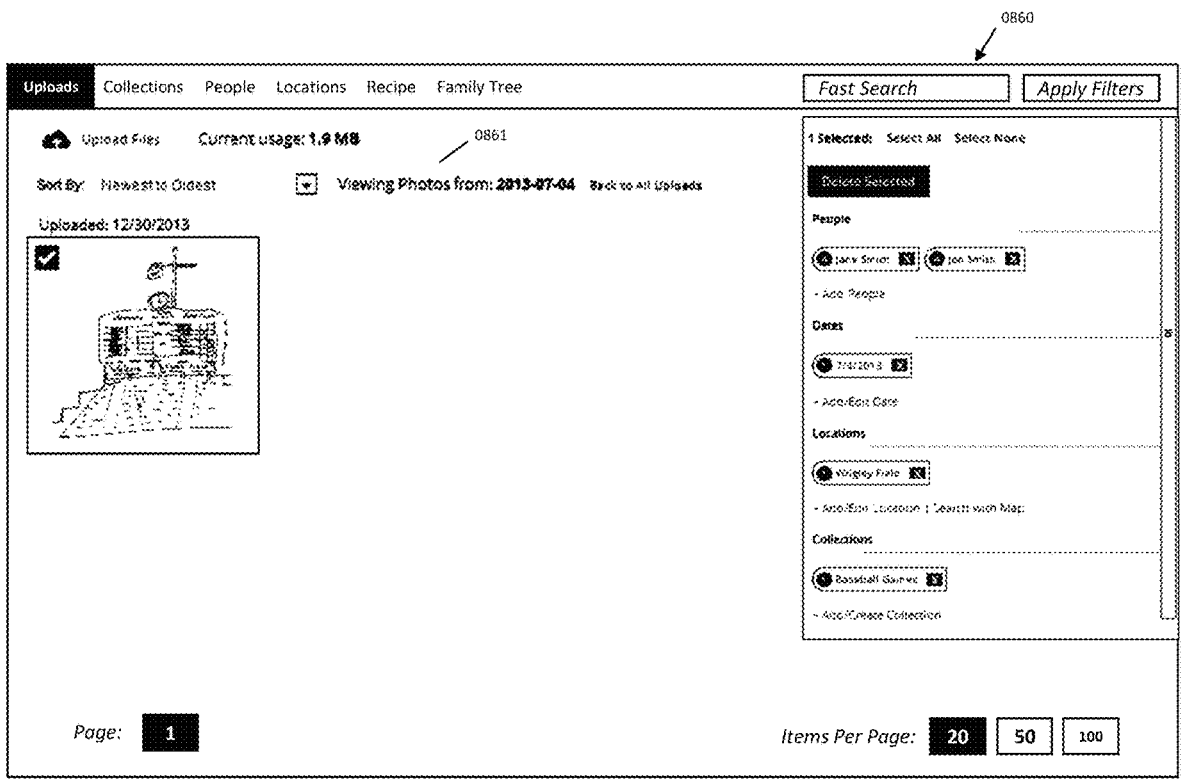
FIG. 40 is a screenshot of Single Application Dot-Tag Filter for Date in Uploads Application View.

In FIG. 40, an illustration of the results for a Single Application Dot-Tag Filter for a date within the Uploads Application View is depicted (0860). If the Advanced Filter is applied using a date filter within the Uploads Application View (0861), the filter date of "2013-07-04" (0876) is illustrated and only the Digital Files that contain that date are illustrated.

Figure 41:
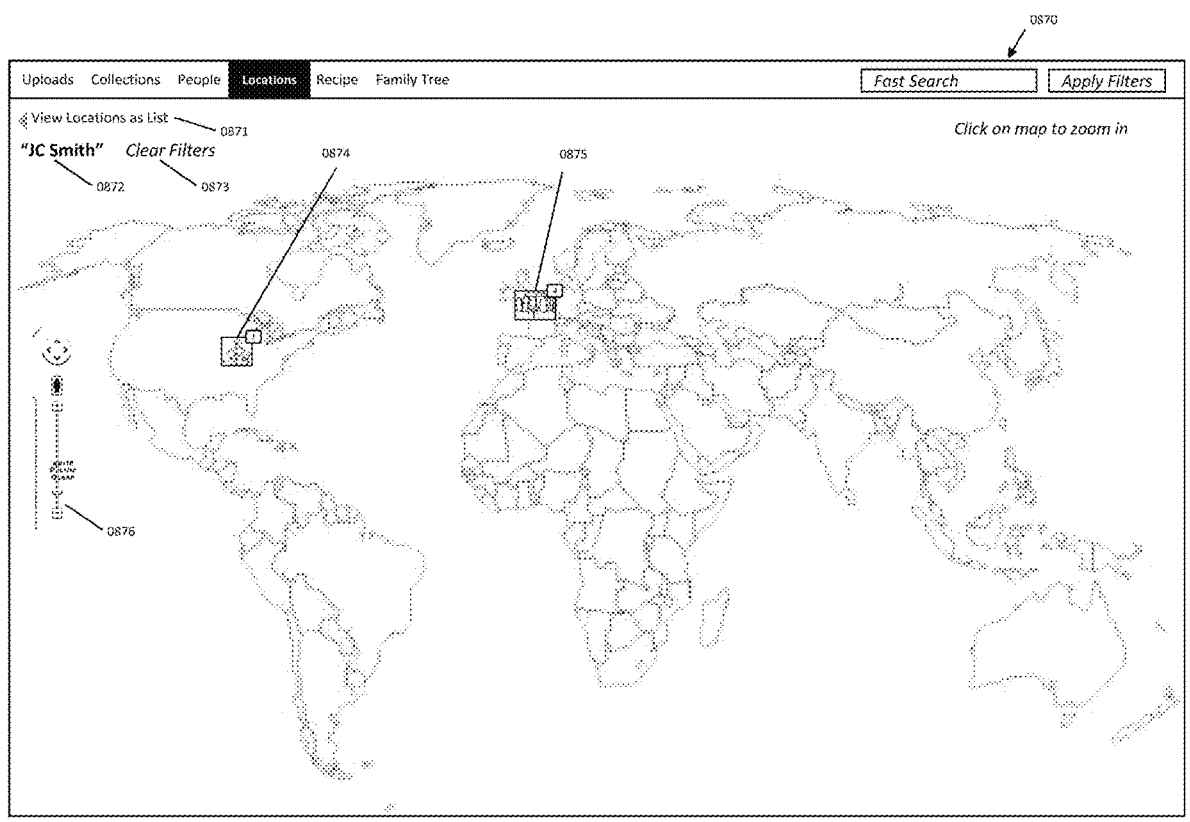
FIG. 41 is a screenshot of the Single Application Dot-Tag Filter in Location Application View.

In FIG. 41, an illustration of the results for a Single Application Dot-Tag Filter in the Location Application View is depicted (0870). Within the Location Application View the Digital Files are displayed within an interactive map (Google map shown as an example). The Location View can also provide additional outputs such as a journey route that identifies the specific locations for an event or trip that can be customized by users. In this view, individual or groups of Digital Files are illustrated as photo thumbnails (see indicators 0874 and 0875)) on the map and the user can select the thumbnail to see all the Digital Files with the same location (as seen FIG. 34 (indicator 1630)) or the user can use the interactive map and narrow the map view by either using the zoom in/zoom out bar (0876) on the left or simply selecting the map. Note that the pinned locations include a thumbnail of the Digital File (or Collection cover) and the number of Digital Files for that location.

If the Advanced Filter is applied in the Locations Applications View, the filter of "JC Smith" (0872) is illustrated and only the Digital Files that contain the person JC Smith are illustrated with their geographic location on the map. The user can select to clear this filter (0873) or see this Advanced Filter with the view of locations as a list (0871). In FIG. 41, there are two illustrated on the map (0874 and 0875).

Figure 42:
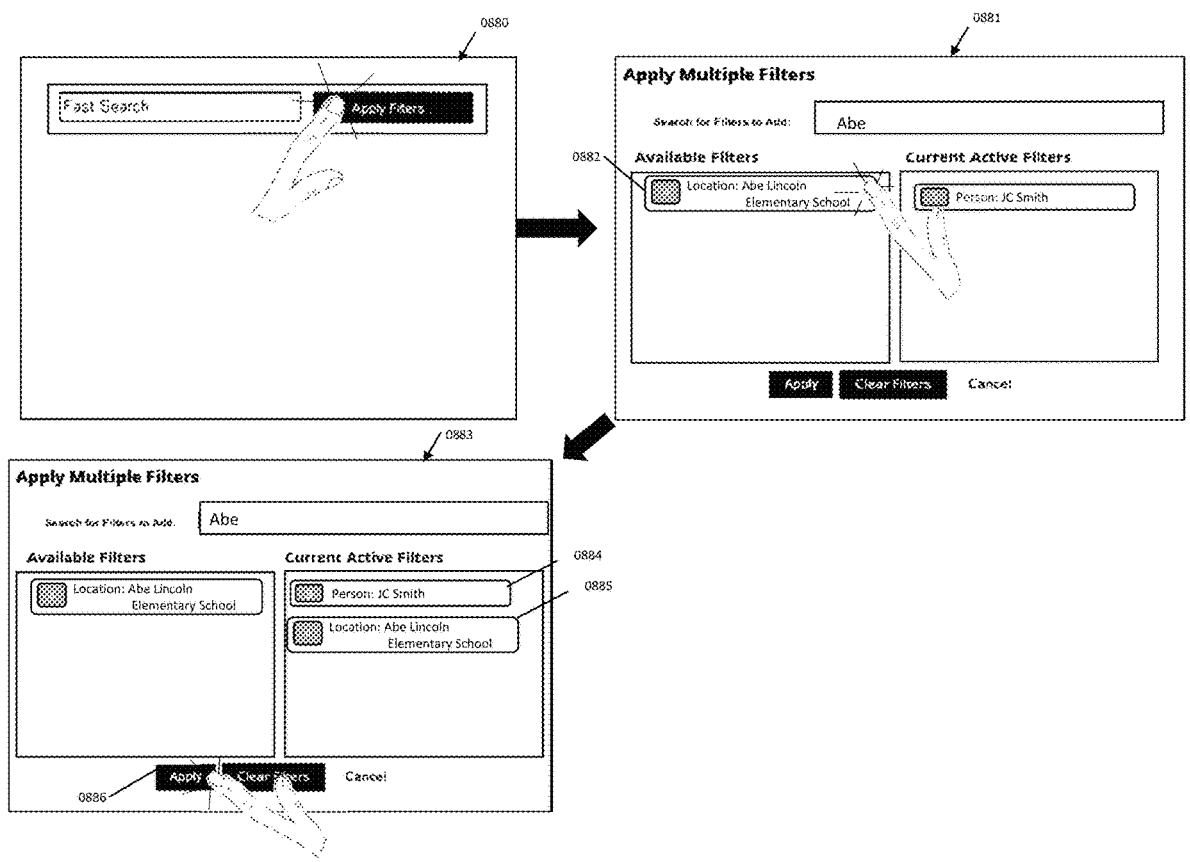
FIG. 42 is a screenshot of Adding Another Application Dot-Tag Filter.

In FIG. 42, the process of the Adding another Application Dot-Tag using the Advanced Filter is illustrated. Continuing on the process that was illustrated in FIG. 38 where the first Application Dot-Tag filter of "Person: JC Smith" was applied, the ability to add a second Application Dot-Tag if further illustrated in FIG. 42. As with FIG. 38, FIG. 42 is a visual depiction of the process that was illustrated in FIG. 37. In Stage 1 (0880), the user selects "Apply Filters." This takes the user to Stage 2 where the Application generates the Apply Multiple Filters box (0881). The user can then type in the text search criteria for the second Advanced Filter within the Advanced Filters text box. In this example, the word "Abe" was typed within the text box. As the alphanumeric text is typed within the text box, the application automatically generates the available filters that meet the criteria. In this example, the user selects the Application Dot-Tag of a location named Abe Lincoln Elementary School (0882). In Stage 3 (0883), the application lists the Application Dot-Tags of both the Person named JC Smith (0884) as well as the location of Abe Lincoln Elementary School (0885) as part of the Current Active Filters. The user then selects "Apply" (0886) to see these filters illustrated in the Application Views. This filter will then be applied to each Application view as previously illustrated in FIGS. 39 through 41.

Figure 43:
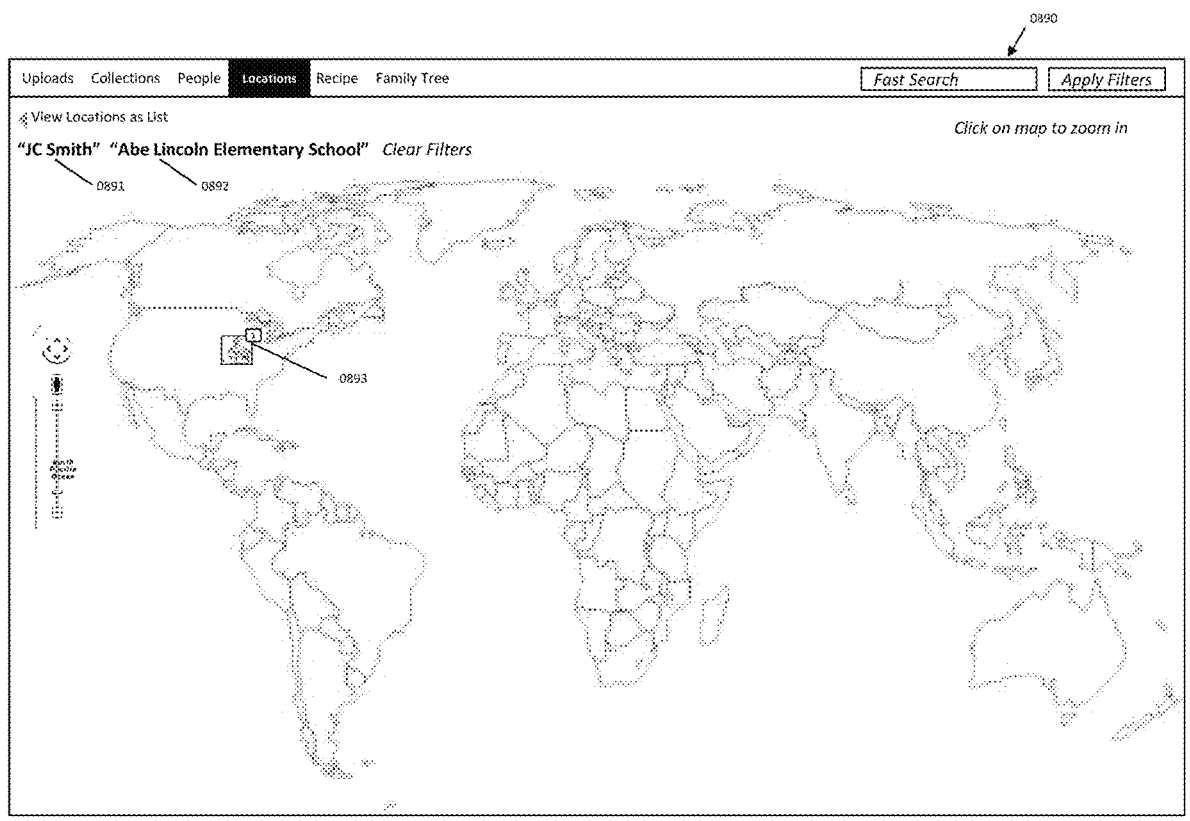
FIG. 43 is a screenshot of the Multi-Dot-Tag Filter in Location Application View.

In FIG. 43, an illustration of the results for Adding Another Application Dot-Tag Filter in the Location Application View is depicted (0890). Continuing on the process that was illustrated in FIG. 42, in FIG. 43 (0890) the Application Dot-Tag filters of "Person: JC Smith" (0891) and "Location: Abe Lincoln Elementary School" (0892) are illustrated. There is one overlapping location that contains both filters for a Digital File that is illustrated on the map (0893).

Figure 44:
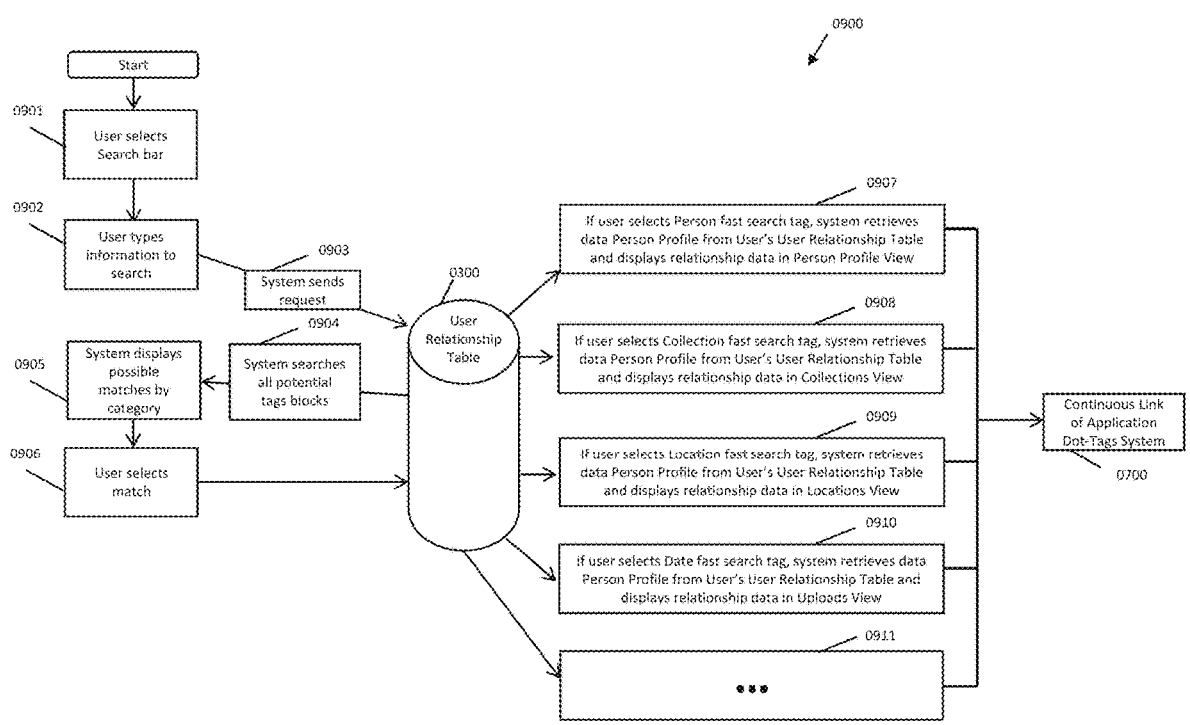
FIG. 44 is a diagram of the Keyword Fast Search System.

In FIG. 44, the Fast Search System is illustrated (0900). Throughout the Application, groups or individual Digital Files can be searched quickly using the Fast Search bar that is at the top of each Application View. Once a key word or phrase is entered into this area, the user's entire collection of Digital Tags within the Application that includes all the Digital tags are searched for potential matches. This feature allows the user to search their entire collection of MemoryWeb Tags within the Application and then displays the information grouped by people, collections, locations, documents, and recipes. The Fast Search System can be searched by such items as key words (or plurality of key words), event names, location, people, albums, star rating, file type, document type, and dates.

When a user selects the Fast Search bar from almost any Application View (0901), the user can type in alphanumeric text into the text box (0902). As the user is typing, the system sends a request (0903) to the User Relationship Table (0300) to look up any possible MemoryWeb Tag matches. The system will then produce the request (0904) and illustrate the potential matches by category for the user (0905). As the user types in another letter, the process of sending a request (0903) to the User Relationship Table (0300), producing results (0904) and producing a new set of results (0905) is re-run. If the user selects one of the suggested MemoryWeb tags (0906), the system will send this request to the User Relationship Table (0300). This process is further illustrated in FIG. 45.

If the user selects a person Fast Search tag, the system retrieves data for the person from the User's Relationship Table and displays the relationship data (0907) in the Person Profile View as illustrated in FIG. 32 (indicator 1430).

If the user selects a collection Fast Search tag, the system retrieves data for the collection from the User's Relationship Table and displays the relationship data (0908) in the Collection View as illustrated in FIG. 33 (indicator 1530).

If the user selects a location Fast Search tag, the system retrieves data for the location from the User's Relationship Table and displays the relationship data (0909) in the Location View as illustrated in FIG. 34 (indicator 1630).

If the user selects a date Fast Search tag, the system retrieves data for the date from the User's Relationship Table and displays the relationship data (0910) in the Uploads View as illustrated in FIG. 40 (indicator 1861).

If the Fast Search System is applied within other contemplated views within the Application such as Family Trees, Timespan, etc. the system retrieves data for the search from the User's Relationship Table and displays the relationship data (0911). As part of the contemplated search process is to also search comments related to a Digital File.

Figure 45:
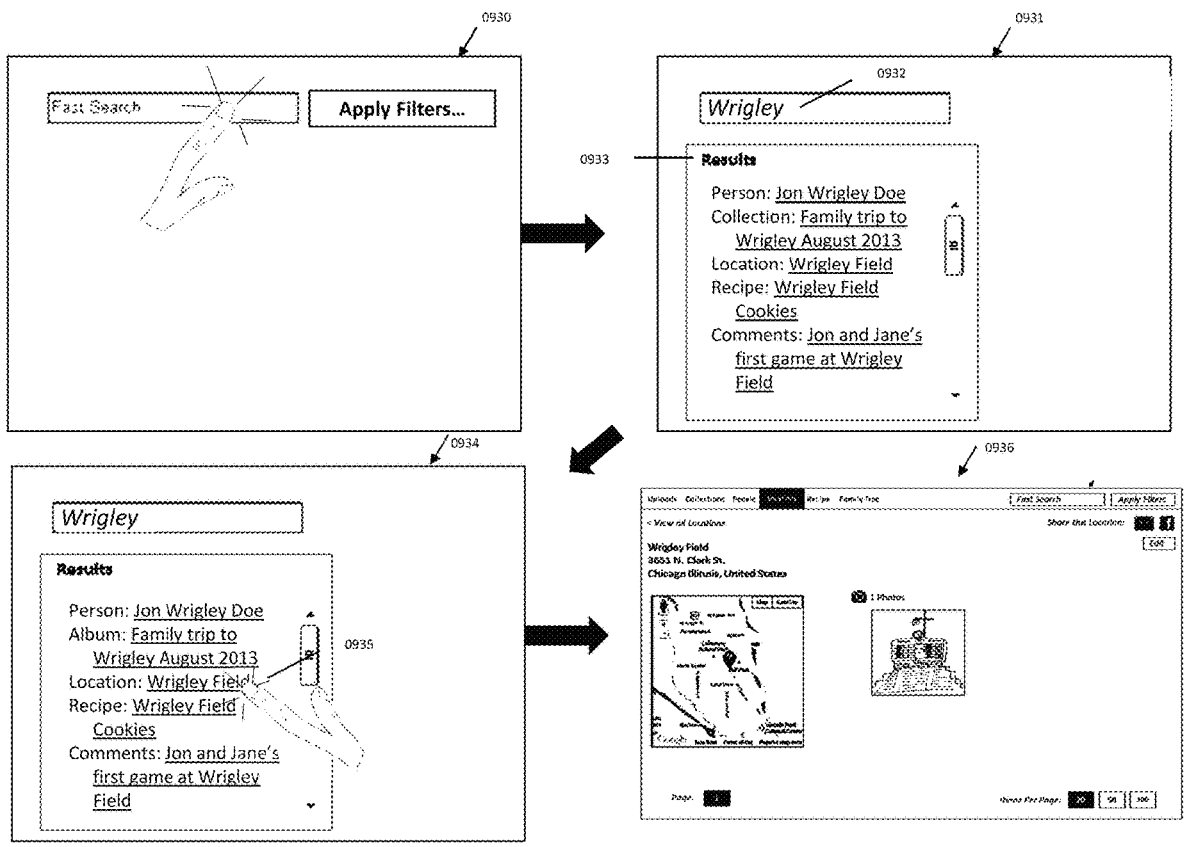
FIG. 45 is a screenshot illustration of Using Keyword Fast Search.

In FIG. 45, the process of using the Keyword Fast Search is illustrated. This is a visual depiction of the process that was illustrated in FIG. 44. In Stage 1 (0930), the user selects the Fast Search bar at the top of one of the Application Views. This takes the user to Stage 2 (0931) where the user can then type in the alphanumeric text search criteria within the Fast Search text box (0932). In this example, the word "Wrigley" was typed within the text box. As the alphanumeric text is typed within the text box, the application automatically generates the available MemoryWeb Tag results (0933) that meet the criteria. Note how the results are organized by various MemoryWeb Tag categories such as Person, Collection, Location, Recipe, and comments. In Stage 3 (0934), the user selects one of the results. In this example, the user selects the location of Wrigley Field (0935). When the user selects a specific MemoryWeb Tag, it takes them to Stage 4 where the information related to that tag is displayed in the corresponding view as discussed within FIG. 44. For the example where the user selected the Location of Wrigley Field, the user was taken to the individual locations Application View where the location of Wrigley Field and the corresponding Digital Files are displayed (0936).

Figure 46:
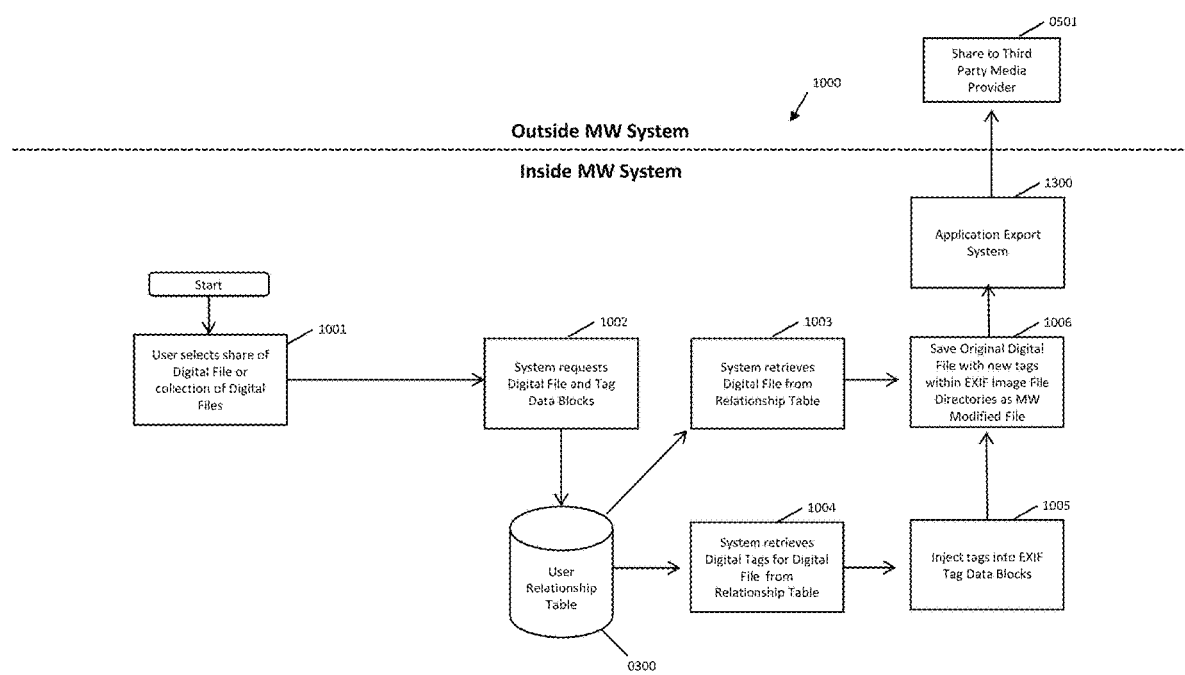
FIG. 46 is a diagram of the Share to Third Party Social Network Provider System.

In FIG. 46, the Share to Third Party Media Provider System (1000) is illustrated. This feature allows the user to share Digital Files from MemoryWeb directly to a third party application. The process begins when the user selects to share a Digital File or collection of Digital Files within the MemoryWeb Application (1001). Examples of where the user can select share can be seen in FIG. 31 (indicator 0760), FIG. 33 (indicator 1534), FIG. 34 (indicator 1636), and FIG. 36 (indicator 1812). Once the request is made, the system requests the Digital File and Tag Data Blocks (1002) from the User Relationship Table (0300). The system then retrieves the Digital File from the User Relationship Table (1003). At the same time, the system will also retrieve the Digital Tags from the Relationship Table (1004). The system will then inject the tags to the corresponding EXIF Tag Data Blocks (1005). The mapping of the EXIF Tag Data Blocks and those of MemoryWeb Data Blocks is illustrated in FIG. 22. Note, for any tags that were modified within the MemoryWeb application, only the new tag information will be transferred into the EXIF Tag Data Blocks. The system then combines the EXIF Tag Data Blocks and embeds them within the Original Digital File (1006). The application then exports the Digital File with the new EXIF Tag Data Blocks using the Application Export System (1300) which then sends the Digital File outside the MemoryWeb Application to the Third Party Media Provider (0501).

Figure 47:
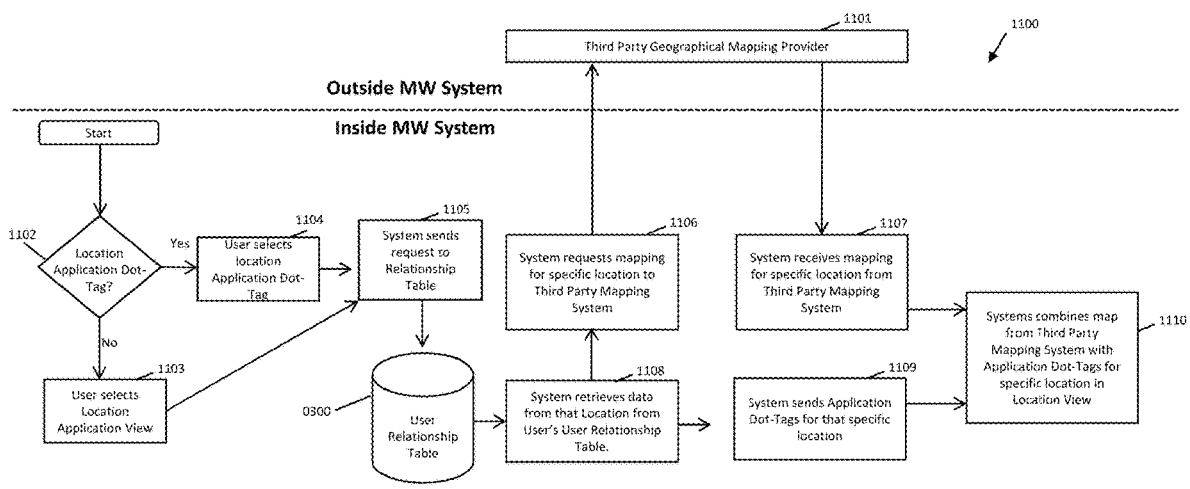
FIG. 47 is a diagram of the Third Party Location Mapping System.

In FIG. 47, the Third Party Geographical Mapping System is illustrated (1100). When Digital Files are imported into MemoryWeb, if there is any GPS data available from the EXIF Tags (See FIG. 22 (indicators 0330, 0331, 0332, and 0333)), the system will utilize this data and automatically create a MemoryWeb location tag within the Application (See FIG. 22 (indicators 0368, 0369, 0370 and 0371)). However, if the GPS coordinates were missing from a Digital File when it was imported into the Application (See FIG. 50 (indicators 1418 and 1419)), the user can add the Location (which the application will automatically add the associated GPS tags) to the Digital File using the Application Digital Tag Organization System (see FIG. 28). As locations are associated with a Digital File, the Application can interact with a Third Party Geographical Mapping System to pull maps that correspond to the exact location of Digital Files that have a location tag (see FIG. 34 (indicator 1630 and FIG. 40, indicator 0875)). In addition, the Application utilizes a world map view to illustrate all the locations that are associated to one or more Digital Files for a user within the Location Application View (see FIG. 41 (indicator 0880)).

The Third Party Geographical Mapping System begins when a Location Application Dot Tag (1102) is selected (1104), the system will send a request (1105) to the User Relationship Table (0300). Examples of when Location Application Dot-Tags can be selected are illustrated in FIG. 31 (indicator 0768 and FIG. 35, indicators 1723 and 1735). In FIG. 47 if the Locations Application View is selected (1103), the system will send a request (1105) to the User Relationship Table. The Location Application View can be selected from almost any Application view as illustrated in FIG. 34 (indicator 1605). When either a single location or the world map view is selected, the system will retrieve the data (1108) from the User Relationship Table (0300) and send a request (1106) to the Third Party Geographical Mapping Provider (1101) who generates the map request and then sends the information back to the system for the specific location (1107). At the same time, the Application Dot-Tags and Digital Files associated with the location or map request are retrieved and then sent (1109) to the Locations Application view. The system will combine the map information along with the Application Dot-Tags and Digital Files and display this information within the Location Application View (1100). Examples of a single Location Application View can be seen in FIG. 34 (indicator 1630) and FIG. 40 (indicator 0875), and an example of a world map view can be seen in FIG. 41 (indicator 0880).

Figure 48:
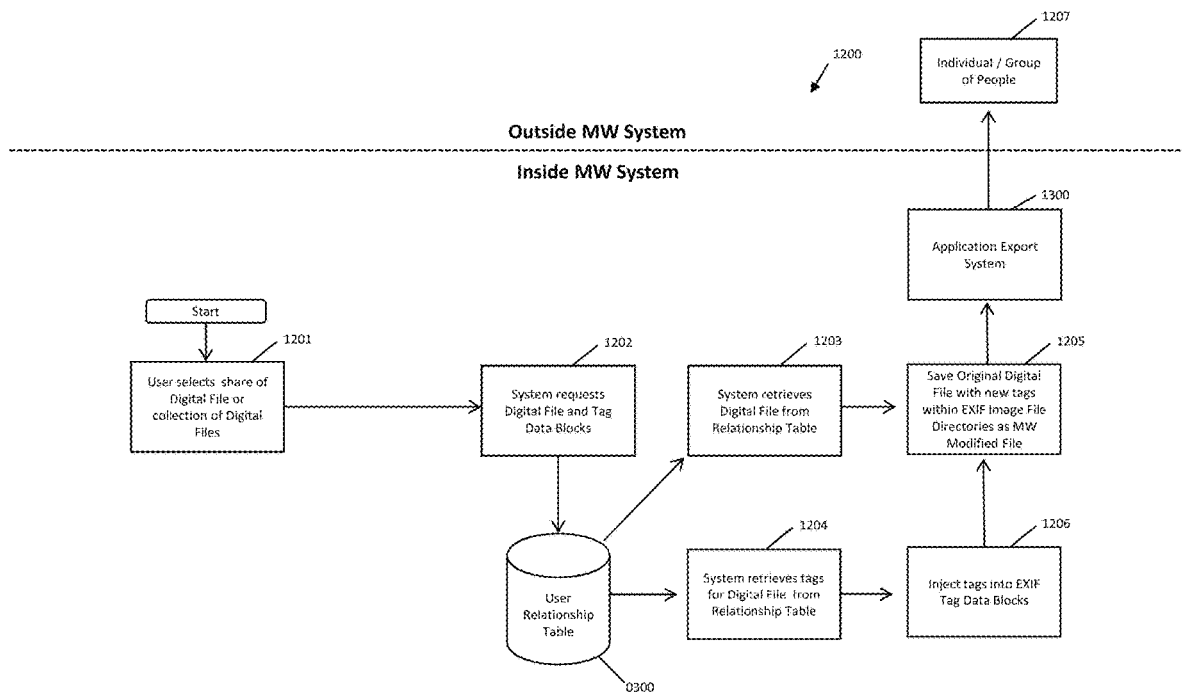
FIG. 48 is a diagram of the Share to Individual System.

In FIG. 48, the Share to Individual System is illustrated (1200). The Share to an individual person or a group of people starts when a user initiates share of a Digital File or a Collection of Digital Files (1201). Examples of where the user share functions are illustrates are in FIG. 31 (indicators 0760 and 0761), FIG. 33 (indicator 1534), FIG. 34 (indicator 1636), and FIG. 36 (indicator 1812). Next, the system requests the Digital File and Tag Data Blocks (1202) from the User Relationship Table (0300). They system will retrieve corresponding Digital File (or collection of Digital Files) (1203) from the User Relationship Table.

At the same time, the system will also retrieve the Digital Tags of the Digital File from the Relationship Table (1204). The system will then inject the tags to the corresponding EXIF Tag Data Blocks (1206). The mapping of the EXIF Tag Data Blocks and those of MemoryWeb Data Blocks is illustrated in FIG. 22. Note, for any tags that were modified within the MemoryWeb application, only the new tag information will be transferred into the EXIF Tag Data Blocks. The system then combines the EXIF Tag Data Blocks and embeds them within the Original Digital File (1205). The application then exports the Digital File with the new EXIF Tag Data Blocks using the Application Export System (1300) which then sends the Digital File outside the MemoryWeb Application to an Individual or Group of People (1207).

In FIG. 49, the Application Export System is illustrated (1300). The Application Export System starts when a user selects the export of a Digital File within the application (1302) or has installed the MW Automatic Uploader/Downloader Application (1308). An example of where the user can select the export of a Digital file within the Application is FIG. 31 (indicator 0751). If the user has installed the MW Automatic Uploader/Downloader Application, the export functionality of the user's entire collection of Digital Files will be downloaded to the User's desired folder on their computer with the Digital Tags embedded within the Digital Files. If neither a user initiated download nor the MW Automatic Uploader/Downloader Application is not used, then the Application Export is not initiated (1309). For either a user initiated download or one using the MW Automatic Uploader/Downloader Application, the system requests the Digital File(s) and Tag Data Blocks (1303) from the User Relationship Table (0300). They system will retrieve corresponding Digital File (or collection of Digital Files) (1304) from the User Relationship Table. At the same time, the system will also retrieve the Digital Tags of the Digital File from the User Relationship Table (1305). The system will then inject the tags to the corresponding EXIF Tag Data Blocks (1306). The mapping of the EXIF Tag Data Blocks and those of MemoryWeb Data Blocks is illustrated in FIG. 22. Note, for any tags that were modified within the MemoryWeb application, only the new tag information will be transferred into the EXIF Tag Data Blocks. The system then combines the EXIF Tag Data Blocks and embeds them within the Original Digital File(s) (1307). The application then exports the Digital File(s) with the new EXIF Tag Data Blocks to the desired Storage System of the user (1301).

Figure 50:
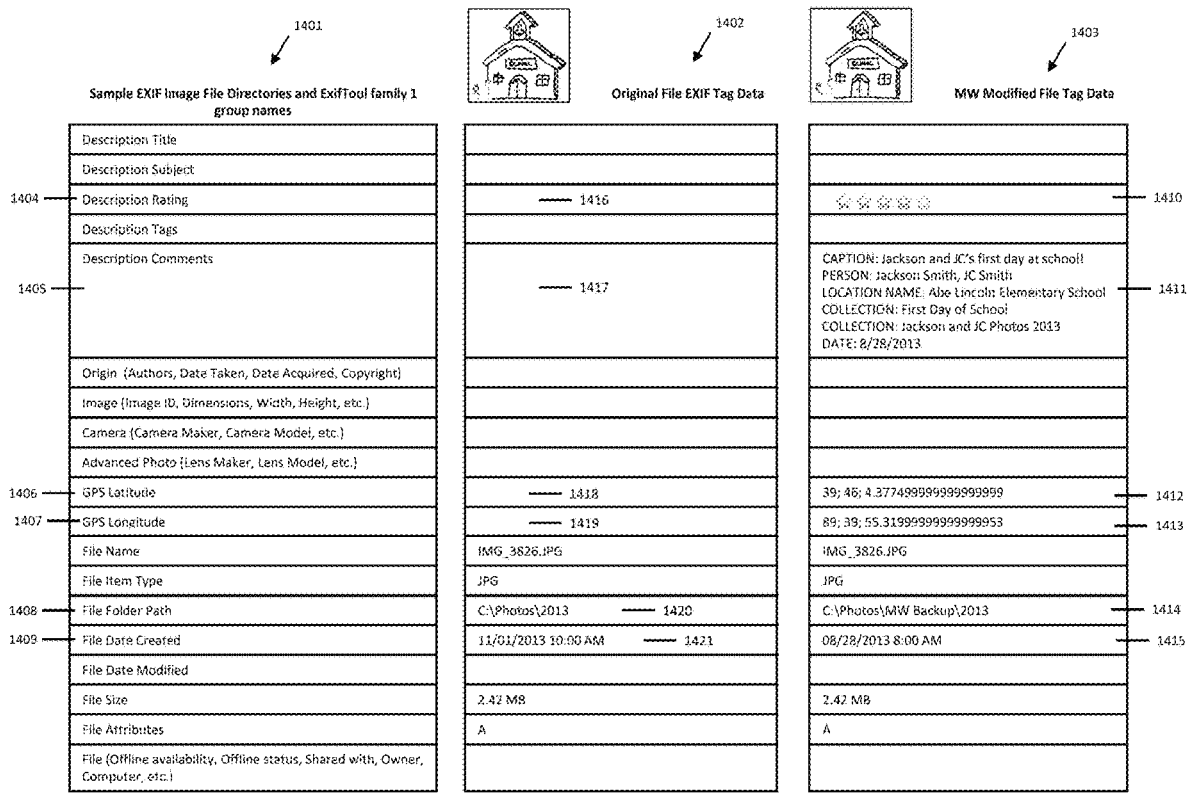
FIG. 50 is a table illustrating the Digital File Image File Directory Data Blocks of JPG Photo within Microsoft Before and After MemoryWeb.

In FIG. 50, there are three charts for the Digital File Image File Directory Data Blocks of JPG Photo within Microsoft Before and After MemoryWeb. This Figure is meant to demonstrate how the EXIF Tag Data Blocks for a Digital File (in this example a JPG file) prior to the use of MemoryWeb Application appear and then how these EXIF Tag Data Blocks are populated with Digital Tags upon export from the MemoryWeb Application.

The first chart illustrates common EXIF Tags (Data Blocks) (1401) and lists certain common the EXIfTool Family 1 Group names that are displayed in the file properties of a JPG file when using Microsoft Windows (these are the same EXIF Tag Blocks that were illustrated in FIG. 22 (indicator 1320)). In the second chart (1402), the Digital Tags associated with the original Digital File are displayed. In the third chart (1403), the updated Digital Tags for the same original Digital File once exported from the MemoryWeb Application is displayed.

In the second chart (1402), the original Digital File prior to import to the MemoryWeb Application did not have Digital Tags for data blocks such as Description Rating (1416), Description Comments (1417), GPS Latitude (1418), GPS Longitude (1419). Also in the second chart the Digital Tags for the data blocks of File Folder Path (1420) and File Date Created (1421) are illustrated.

In the third chart (1403), the original Digital File that was exported from the MemoryWeb Application now contains new or modified Digital Tags for certain data blocks. For example, a star rating of four out of five stars (1410) with the new MW Modified Digital File is now associated with the Description Rating (1404) where it was blank (1416) with the original file before using the MemoryWeb Application.

Another example is the listing of MemoryWeb Tags within the Description Comments data block (1411) as: CAPTION: Jackson and JC's first day at school!, PERSON: Jackson Smith, J C Smith, LOCATION NAME: Abe Lincoln Elementary School, COLLECTION: First Day of School, COLLECTION: Jackson and JC Photos 2013, DATE: Aug. 28, 2013. All of these Digital Tags are now associated with the Description Comments (1405) where it was blank (1417) with the original file before using the MemoryWeb Application.

Also updated in the MW Modified Digital File are the GPS Latitude (1412) and GPS Longitude (1413) as Digital Tags that were assigned in the MemoryWeb Application using the location feature with the Application Digital Tag Organizer System. These tags now replace the blank tags (indicators 1418 and 1419) that were in the original file before using the MemoryWeb Application.

A final example is how the date was modified in the MemoryWeb Application where a new date of Aug. 28, 2013 (1415) was assigned to the Digital File. This replaced the old date that was originally tagged with a date of Nov. 1, 2013 (1421). In a typical Digital File, only the date and perhaps the GPS location if taken with certain newer photo device is pre-populated in a Digital File. For the example in FIG. 50, the Digital File may have been created or scanned on Nov. 1, 2013, but with the MemoryWeb Application Digital Tag Organizer System the user was able to correctly assign the date the photo was taken and now this date is always part of the Digital File within the MemoryWeb Application, but also when the Digital File is exported from MemoryWeb.

A benefit of the Export System is that users can export a single Digital File or their entire set of Digital Files (using the MW Automatic Uploader/Downloader Application), with all the updated Digital Tags from the MemoryWeb Application embedded within the Digital File(s). This feature is unique as it will allow the users to back up their files to another source (e.g., external computer hard drive) or to transport it to another venue (e.g., another website that is used for viewing and/or sharing Digital Files such as a social media website) where it can be viewed with these Digital Tag attributes. This export feature can provide users with the advantage of never losing key data that was stored simply because the user chooses to move its Digital Files to a new digital system.

The application also contemplates the use of a Family Tree Application View where the individual people that have been created within the Application can be displayed with family relationships. This view can illustrate interactive family trees where one can see the family tree of an individual or family. Any family relationships created in the user's personal profile are already pre-populated by the Application for the Family Tree View. If a user selects on an individual within the family tree, it will take them to the people profile Application View of that person. Family Trees can quickly be viewed with the family tree drop-down sort feature. As with other areas within the Application, the family tree view can be narrowed down using an Advanced Filters System. For matching family members, the system will have drag/drop functionality to make new associations to a family tree. It is also contemplated that various family tree views could be displayed (e.g., pedigree chart, fan chart, directs descendants chart, etc.). In addition, it is contemplated that family tree relationships from either data files (e.g., GEDCOM files) or other sources (e.g., Family Search database) would either be imported into the user's versions of the Application or utilize these sources in associating the family tree information.

Another Application View that is contemplated is Timespan or Timeline. The Timeline Application View will have an interactive timeline to display the dates within the Digital Files of the Application for a user. The timeline view acts as an interactive filter or funnel of Digital Files whereas when the user starts to define the parameters of dates towards the bottom, the information above it is filtered to display the major groups of Digital Files that meets the selected date range criteria in various formats until you are able to view an individual Digital File. This funnel approach is designed to allow the user to appreciate the vast amount of data that can be associated with a date range, but then allow them to filter the information with the user's desired criteria. This will be a very useful tool when users want to see the growth and progress of an individual as well as memorialize a lifetime of a friend or family member.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

The invention claimed is:

1. A computer-implemented method for organizing and displaying a plurality of digital files, the method comprising:
   directly responsive to a first single user input, causing an interface to display an interactive family tree view, the interactive family tree view simultaneously including:
   (i) a first family tree selectable element associated with a first person, wherein a first subset of the plurality of digital files is associated with the first person,
   (ii) a second family tree selectable element associated with a second person, wherein a second subset of the plurality of digital files is associated with the second person, and
   (iii) a linkage positioned relative to the first family tree selectable element and the second family tree selectable element indicating a familial relationship between the first person and the second person,
   wherein (i) the first family tree selectable element, (ii) the second family tree selectable element, and (iii) the linkage are caused to be simultaneously included in the interactive family tree view directly responsive to the first single user input;
   in the interactive family tree view, directly responsive to a second single user input associated with the first family tree selectable element, causing the interface to display a first person view, the first person view simultaneously including:
   (i) a name associated with the first person and
   (ii) first thumbnail images associated with at least a portion of the first subset of the plurality of digital files,
   wherein (i) the name associated with the first person and (ii) the first thumbnail images are caused to be simultaneously included in the first person view directly responsive to the second single user input;
   in the interactive family tree view, directly responsive to a third single user input associated with the second family tree selectable element, causing the interface to display a second person view, the second person view simultaneously including:
   (i) a name associated with the second person and
   (ii) second thumbnail images associated with at least a portion of the second subset of the plurality of digital files,
   wherein (i) the name associated with the second person and (ii) the second thumbnail images are caused to be simultaneously included in the second person view directly responsive to the third single user input;
   directly responsive to a fourth single user input associated with a first one of the first thumbnail images, causing the interface to display a first image corresponding to the first one of the first thumbnail images, the first image including the first person and a third person;
   directly responsive to a fifth single user input associated with the first image, causing the interface to simultaneously display (i) a first person selectable element associated with the first person and (ii) a second person selectable element associated with the third person, wherein a third subset of the plurality of digital files is associated with the third person; and
   directly responsive to a sixth single user input associated with the second person selectable element, causing the interface to display a third person view, the third person view simultaneously including:
   (i) a name associated with the third person and
   (ii) third thumbnail images associated with at least a portion of the third subset of the plurality of digital files,
   wherein (i) the name associated with the third person and (ii) the third thumbnail images are caused to be simultaneously included in the third person view directly responsive to the sixth single user input;
   wherein (i) the second single user input occurs subsequent to the first single user input, (ii) the fourth single user input occurs subsequent to the second single user input, (iii) the fifth single user input occurs subsequent to the fourth single user input, and (iv) the sixth single user input occurs subsequent to the fifth single user input.

2. The method of claim 1, wherein the first family tree selectable element includes an image associated with the first person and the name associated with the first person, and wherein the second family tree selectable element includes an image associated with the second person and the name associated with the second person.

3. The method of claim 1, further comprising:
   receiving, in the interactive family tree view, one or more filtering criteria; and
   responsive to the receiving the one or more filtering criteria, causing the interface to display a modify version of the interactive family tree view based on the one or more filtering criteria.

4. The method of claim 1, further comprising:
   causing the interface to display a plurality of navigation selectable elements simultaneously with the interactive family tree view, the plurality of navigation selectable elements including (i) an interactive family tree view selectable element, (ii) a location view selectable element, and (iii) a gallery view selectable element.

5. The method of claim 4, wherein the first single user input is a selection of the interactive family tree view selectable element.

6. The method of claim 5, further comprising:
   directly responsive to a seventh single user input associated with the location view selectable element, causing the interface to display a map view, the map view simultaneously including:
   (i) an interactive geographic map and
   (ii) a first indication positioned at a first location on the interactive geographic map, wherein (i) the interactive geographic map and (ii) the first indication are caused to be simultaneously included in the map view directly responsive to the seventh single user input.

7. The method of claim 6, wherein the first indication is associated with the first person, the method further comprising:
subsequent to an eighth single user input associated with the first indication, causing the interface to display the first person view.

8. The method of claim 6, wherein the first indication includes a number indicating a number of items associated with the first indication.

9. The method of claim 8, wherein the items are digital files.

10. The method of claim 1, wherein the plurality of digital files includes one or more photographs, one or more videos, one or more documents, or any combination thereof.

11. The method of claim 1, wherein the causing the interface to display the interactive family tree view includes causing the interface to display the interactive family tree view in a direct descendant chart format, a pedigree chart format, or a fan chart format.

12. The method of claim 1, further comprising importing a data file from an external data source, wherein information in the interactive family tree view is based at least in part on the data file.

13. The method of claim 12, wherein the data file is a GEDCOM file.

14. The method of claim 1, wherein the first person view further includes birthdate information associated with the first person, wherein the birthdate information is caused to be simultaneously included in the first person view directly responsive to the second single user input.

15. The method of claim 14, wherein the first person view further includes a date of death associated with the first person, wherein the date of death is caused to be simultaneously included in the first person view directly responsive to the second single user input.

16. The method of claim 14, wherein the first person view further includes a biography associated with the first person, wherein the biography is caused to be simultaneously included in the first person view directly responsive to the second single user input.

17. The method of claim 14, wherein the first person view further includes names of one or more relatives of the first person.

18. The method of claim 1, further comprising:
directly responsive to a seventh single user input, causing the interface to display a people view, the people view including a plurality of person selectable elements,
wherein each of the plurality of person selectable elements is associated with a different person, and
wherein the plurality of person selectable elements is caused to be included in the people view directly responsive to the seventh single user input.

19. The method of claim 18, further comprising:
directly responsive to an eighth single user input associated with a first one of the plurality of person selectable elements, causing the interface to display a fourth person view, the fourth person view simultaneously including:
(i) a name associated with the fourth person and
(ii) at least one image associated with the fourth person,
wherein the (i) name associated with fourth person and (ii) the at least one image associated with the fourth person are caused to be simultaneously included in the fourth person view directly responsive to the eighth single user input.

20. The method of claim 19, wherein the fourth person view further includes a family tree displaying element, wherein the family tree displaying element is caused to be simultaneously included in the fourth person view directly responsive to the eighth single user input, the method further comprising:
directly responsive to a ninth single user input associated with the family tree displaying element, causing the interface to display the interactive family tree view.

21. The method of claim 1, further comprising receiving information associated with an event and modifying the interactive family tree view based at least in part on the information.

22. The method of claim 21, wherein the information is received as a data file from an external data source.

23. The method of claim 1, wherein the third person view further includes a slideshow selectable element associated with the third person, wherein the slideshow selectable element is caused to be simultaneously included in the third person view directly responsive to the sixth single user input, the method further comprising:
in the third person view, directly responsive to a seventh single user input associated with the slideshow selectable element, causing the interface to display a slideshow including a plurality of images associated with the third person.

24. The method of 23, wherein the slideshow includes a person application tag associated with the third person, and wherein selection of the person application tag causes the interface to display a person view associated with the third person.

25. The method of claim 24, further comprising:
directly responsive to an eighth single user input associated with a next selectable element from within the slideshow, causing the slideshow to transition from displaying a current image to displaying a next image of the plurality of images associated with the slideshow; and
directly responsive to a ninth single user input associated with a previous selectable element from within the slideshow, causing the slideshow to transition from displaying the current image to displaying a previous image of the plurality of images associated with the slideshow.

26. The method of claim 1, wherein the causing the interface to display the interactive family tree view includes causing the interface to display the interactive family tree view in a direct descendant chart format, the method further comprising causing the interface to display the interactive family tree view in a pedigree chart format.

27. The method of claim 14, wherein the first person view further includes names of one or more relatives of the first person, wherein the names of one or more relatives of the first person are caused to be simultaneously included in the first person view directly responsive to the second single user input.

* * * * *